United States Patent
Becker et al.

(10) Patent No.: US 9,009,641 B2
(45) Date of Patent: Apr. 14, 2015

(54) CIRCUITS WITH LINEAR FINFET STRUCTURES

(71) Applicants: Scott T. Becker, Scotts Valley, CA (US); Michael C. Smayling, Fremont, CA (US); Dhrumil Gandhi, Cupertino, CA (US); Jim Mali, Morgan Hill, CA (US); Carole Lambert, Campbell, CA (US); Jonathan R. Quandt, San Jose, CA (US); Daryl Fox, Campbell, CA (US)

(72) Inventors: Scott T. Becker, Scotts Valley, CA (US); Michael C. Smayling, Fremont, CA (US); Dhrumil Gandhi, Cupertino, CA (US); Jim Mali, Morgan Hill, CA (US); Carole Lambert, Campbell, CA (US); Jonathan R. Quandt, San Jose, CA (US); Daryl Fox, Campbell, CA (US)

(73) Assignee: Tela Innovations, Inc., Los Gatos, CA (US)

( * ) Notice: Subject to any disclaimer, the term of this patent is extended or adjusted under 35 U.S.C. 154(b) by 0 days.

(21) Appl. No.: 13/740,191

(22) Filed: Jan. 12, 2013

(65) Prior Publication Data
US 2013/0126978 A1    May 23, 2013

Related U.S. Application Data

(63) Continuation-in-part of application No. 12/775,429, filed on May 6, 2010.

(60) Provisional application No. 61/586,387, filed on Jan. 13, 2012, provisional application No. 61/589,224, filed on Jan. 20, 2012, provisional application No. 61/176,058, filed on May 6, 2009.

(51) Int. Cl.
*G06F 17/50*      (2006.01)
*H01L 27/088*   (2006.01)
(Continued)

(52) U.S. Cl.
CPC .......... *H01L 27/0886* (2013.01); *H01L 27/092* (2013.01); *H01L 21/36* (2013.01);
(Continued)

(58) Field of Classification Search
USPC ......................................................... 716/118
See application file for complete search history.

(56) References Cited

U.S. PATENT DOCUMENTS 4,197,555 A    4/1980   Uehara et al.
4,417,161 A   11/1983   Uya
(Continued)

FOREIGN PATENT DOCUMENTS

EP    0102644    7/1989
EP    0788166    8/1997
(Continued)

OTHER PUBLICATIONS

International Search Report and Written Opinion for PCT Application No. PCT/US2013/021345.
(Continued)

*Primary Examiner* — Jack Chiang
*Assistant Examiner* — Brandon Bowers
(74) *Attorney, Agent, or Firm* — Martine Penilla Group, LLP

(57) ABSTRACT

A first transistor has source and drain regions within a first diffusion fin. The first diffusion fin projects from a surface of a substrate. The first diffusion fin extends lengthwise in a first direction from a first end to a second end of the first diffusion fin. A second transistor has source and drain regions within a second diffusion fin. The second diffusion fin projects from the surface of the substrate. The second diffusion fin extends lengthwise in the first direction from a first end to a second end of the second diffusion fin. The second diffusion fin is positioned next to and spaced apart from the first diffusion fin. Either the first end or the second end of the second diffusion fin is positioned in the first direction between the first end and the second end of the first diffusion fin.

52 Claims, 164 Drawing Sheets

(51) Int. Cl.
*H01L 27/092* (2006.01)
*H01L 21/36* (2006.01)
*H01L 21/8238* (2006.01)
*H01L 29/78* (2006.01)

(52) U.S. Cl.
CPC ........ *G06F17/5068* (2013.01); *G06F 17/5072* (2013.01); *H01L 21/823821* (2013.01); *H01L 27/0924* (2013.01); *G06F 2217/12* (2013.01); *H01L 29/7853* (2013.01)

(56) References Cited

U.S. PATENT DOCUMENTS

| | | |
|---|---|---|
| 4,424,460 A | 1/1984 | Best |
| 4,613,940 A | 9/1986 | Shenton et al. |
| 4,657,628 A | 4/1987 | Holloway et al. |
| 4,682,202 A | 7/1987 | Tanizawa |
| 4,745,084 A | 5/1988 | Rowson et al. |
| 4,780,753 A | 10/1988 | Ohkura et al. |
| 4,801,986 A | 1/1989 | Chang et al. |
| 4,804,636 A | 2/1989 | Groover, III |
| 4,812,688 A | 3/1989 | Chu et al. |
| 4,884,115 A | 11/1989 | Michel et al. |
| 4,928,160 A | 5/1990 | Crafts |
| 4,975,756 A | 12/1990 | Haken et al. |
| 5,068,603 A | 11/1991 | Mahoney |
| 5,079,614 A | 1/1992 | Khatakhotan |
| 5,097,422 A | 3/1992 | Corbin et al. |
| 5,117,277 A | 5/1992 | Yuyama et al. |
| 5,121,186 A | 6/1992 | Wong et al. |
| 5,208,765 A | 5/1993 | Turnbull |
| 5,224,057 A | 6/1993 | Igarashi |
| 5,242,770 A | 9/1993 | Chen et al. |
| 5,268,319 A | 12/1993 | Harari |
| 5,298,774 A | 3/1994 | Ueda et al. |
| 5,313,426 A | 5/1994 | Sakuma et al. |
| 5,351,197 A | 9/1994 | Upton et al. |
| 5,359,226 A | 10/1994 | DeJong |
| 5,365,454 A | 11/1994 | Nakagawa et al. |
| 5,367,187 A | 11/1994 | Yuen |
| 5,378,649 A | 1/1995 | Huang |
| 5,396,128 A | 3/1995 | Dunning et al. |
| 5,420,447 A | 5/1995 | Waggoner |
| 5,461,577 A | 10/1995 | Shaw et al. |
| 5,471,403 A | 11/1995 | Fujimaga |
| 5,497,334 A | 3/1996 | Russell et al. |
| 5,497,337 A | 3/1996 | Ponnapalli et al. |
| 5,526,307 A | 6/1996 | Lin et al. |
| 5,536,955 A | 7/1996 | Ali |
| 5,545,904 A | 8/1996 | Orbach |
| 5,581,098 A | 12/1996 | Chang |
| 5,581,202 A | 12/1996 | Yano et al. |
| 5,612,893 A | 3/1997 | Hao et al. |
| 5,636,002 A | 6/1997 | Garofalo |
| 5,656,861 A | 8/1997 | Godinho et al. |
| 5,682,323 A | 10/1997 | Pasch et al. |
| 5,684,311 A | 11/1997 | Shaw |
| 5,684,733 A | 11/1997 | Wu et al. |
| 5,698,873 A | 12/1997 | Colwell et al. |
| 5,705,301 A | 1/1998 | Garza et al. |
| 5,723,883 A | 3/1998 | Gheewalla |
| 5,723,908 A | 3/1998 | Fuchida et al. |
| 5,740,068 A | 4/1998 | Liebmann et al. |
| 5,745,374 A | 4/1998 | Matsumoto |
| 5,764,533 A | 6/1998 | deDood |
| 5,774,367 A | 6/1998 | Reyes et al. |
| 5,780,909 A | 7/1998 | Hayashi |
| 5,789,776 A | 8/1998 | Lancaster et al. |
| 5,790,417 A | 8/1998 | Chao et al. |
| 5,796,128 A | 8/1998 | Tran et al. |
| 5,796,624 A | 8/1998 | Sridhar et al. |
| 5,798,298 A | 8/1998 | Yang et al. |
| 5,814,844 A | 9/1998 | Nagata et al. |
| 5,825,203 A | 10/1998 | Kusunoki et al. |
| 5,834,851 A | 11/1998 | Ikeda et al. |
| 5,838,594 A | 11/1998 | Kojima |
| 5,841,663 A | 11/1998 | Sharma et al. |
| 5,847,421 A | 12/1998 | Yamaguchi |
| 5,850,362 A | 12/1998 | Sakuma et al. |
| 5,852,562 A | 12/1998 | Shinomiya et al. |
| 5,858,580 A | 1/1999 | Wang et al. |
| 5,898,194 A | 4/1999 | Gheewala |
| 5,900,340 A | 5/1999 | Reich et al. |
| 5,908,827 A | 6/1999 | Sirna |
| 5,915,199 A | 6/1999 | Hsu |
| 5,917,207 A | 6/1999 | Colwell et al. |
| 5,920,486 A | 7/1999 | Beahm et al. |
| 5,923,059 A | 7/1999 | Gheewala |
| 5,923,060 A | 7/1999 | Gheewala |
| 5,929,469 A | 7/1999 | Mimoto et al. |
| 5,930,163 A | 7/1999 | Hara et al. |
| 5,935,763 A | 8/1999 | Caterer et al. |
| 5,949,101 A | 9/1999 | Aritome |
| 5,973,507 A | 10/1999 | Yamazaki |
| 5,977,305 A | 11/1999 | Wigler et al. |
| 5,977,574 A | 11/1999 | Schmitt et al. |
| 5,998,879 A | 12/1999 | Iwaki et al. |
| 6,009,251 A | 12/1999 | Ho et al. |
| 6,026,223 A | 2/2000 | Scepanovic et al. |
| 6,037,613 A | 3/2000 | Mariyama |
| 6,037,617 A | 3/2000 | Kumagai |
| 6,044,007 A | 3/2000 | Capodieci |
| 6,054,872 A | 4/2000 | Fudanuki et al. |
| 6,063,132 A | 5/2000 | DeCamp et al. |
| 6,077,310 A | 6/2000 | Yamamoto et al. |
| 6,080,206 A | 6/2000 | Tadokoro et al. |
| 6,084,437 A | 7/2000 | Sako |
| 6,091,845 A | 7/2000 | Pierrat et al. |
| 6,099,584 A | 8/2000 | Arnold et al. |
| 6,100,025 A | 8/2000 | Wigler et al. |
| 6,114,071 A | 9/2000 | Chen et al. |
| 6,144,227 A | 11/2000 | Sato |
| 6,159,839 A | 12/2000 | Jeng et al. |
| 6,166,415 A | 12/2000 | Sakemi et al. |
| 6,166,560 A | 12/2000 | Ogura et al. |
| 6,174,742 B1 | 1/2001 | Sudhindranath et al. |
| 6,182,272 B1 | 1/2001 | Andreev et al. |
| 6,194,104 B1 | 2/2001 | Hsu |
| 6,194,252 B1 | 2/2001 | Yamaguchi |
| 6,194,912 B1 | 2/2001 | Or-Bach |
| 6,209,123 B1 | 3/2001 | Maziasz et al. |
| 6,230,299 B1 | 5/2001 | McSherry et al. |
| 6,232,173 B1 | 5/2001 | Hsu et al. |
| 6,240,542 B1 | 5/2001 | Kapur |
| 6,249,902 B1 | 6/2001 | Igusa et al. |
| 6,255,600 B1 | 7/2001 | Schaper |
| 6,255,845 B1 | 7/2001 | Wong et al. |
| 6,262,487 B1 | 7/2001 | Igarashi et al. |
| 6,269,472 B1 | 7/2001 | Garza et al. |
| 6,275,973 B1 | 8/2001 | Wein |
| 6,282,696 B1 | 8/2001 | Garza et al. |
| 6,291,276 B1 | 9/2001 | Gonzalez |
| 6,297,668 B1 | 10/2001 | Schober |
| 6,297,674 B1 | 10/2001 | Kono et al. |
| 6,303,252 B1 | 10/2001 | Lin |
| 6,331,733 B1 | 12/2001 | Or-Bach et al. |
| 6,331,791 B1 | 12/2001 | Huang |
| 6,335,250 B1 | 1/2002 | Egi |
| 6,338,972 B1 | 1/2002 | Sudhindranath et al. |
| 6,347,062 B2 | 2/2002 | Nii et al. |
| 6,356,112 B1 | 3/2002 | Tran et al. |
| 6,359,804 B2 | 3/2002 | Kuriyama et al. |
| 6,370,679 B1 | 4/2002 | Chang et al. |
| 6,378,110 B1 | 4/2002 | Ho |
| 6,380,592 B2 | 4/2002 | Tooher et al. |
| 6,388,296 B1 | 5/2002 | Hsu |
| 6,393,601 B1 | 5/2002 | Tanaka et al. |
| 6,399,972 B1 | 6/2002 | Masuda et al. |
| 6,400,183 B2 | 6/2002 | Yamashita et al. |
| 6,415,421 B2 | 7/2002 | Anderson et al. |
| 6,416,907 B1 | 7/2002 | Winder et al. |
| 6,417,549 B1 | 7/2002 | Oh |
| 6,421,820 B1 | 7/2002 | Mansfield et al. |
| 6,425,112 B1 | 7/2002 | Bula et al. |

(56) References Cited

U.S. PATENT DOCUMENTS

| | | | |
|---|---|---|---|
| 6,425,117 | B1 | 7/2002 | Pasch et al. |
| 6,426,269 | B1 | 7/2002 | Haffner et al. |
| 6,436,805 | B1 | 8/2002 | Trivedi |
| 6,445,049 | B1 | 9/2002 | Iranmanesh |
| 6,445,065 | B1 | 9/2002 | Gheewala et al. |
| 6,467,072 | B1 | 10/2002 | Yang et al. |
| 6,469,328 | B2 | 10/2002 | Yanai et al. |
| 6,470,489 | B1 | 10/2002 | Chang et al. |
| 6,476,493 | B2 | 11/2002 | Or-Bach et al. |
| 6,477,695 | B1 | 11/2002 | Gandhi |
| 6,480,032 | B1 | 11/2002 | Aksamit |
| 6,480,989 | B2 | 11/2002 | Chan et al. |
| 6,492,066 | B1 | 12/2002 | Capodieci et al. |
| 6,496,965 | B1 | 12/2002 | van Ginneken et al. |
| 6,504,186 | B2 | 1/2003 | Kanamoto et al. |
| 6,505,327 | B2 | 1/2003 | Lin |
| 6,505,328 | B1 | 1/2003 | van Ginneken et al. |
| 6,507,941 | B1 | 1/2003 | Leung et al. |
| 6,509,952 | B1 | 1/2003 | Govil et al. |
| 6,514,849 | B1 | 2/2003 | Hui et al. |
| 6,516,459 | B1 | 2/2003 | Sahouria |
| 6,523,156 | B2 | 2/2003 | Cirit |
| 6,525,350 | B1 | 2/2003 | Kinoshita et al. |
| 6,536,028 | B1 | 3/2003 | Katsioulas et al. |
| 6,543,039 | B1 | 4/2003 | Watanabe |
| 6,553,544 | B2 | 4/2003 | Tanaka et al. |
| 6,553,559 | B2 | 4/2003 | Liebmann et al. |
| 6,553,562 | B2 | 4/2003 | Capodieci et al. |
| 6,566,720 | B2 | 5/2003 | Aldrich |
| 6,570,234 | B1 | 5/2003 | Gardner |
| 6,571,140 | B1 | 5/2003 | Wewalaarachchi |
| 6,571,379 | B2 | 5/2003 | Takayama |
| 6,578,190 | B2 | 6/2003 | Ferguson et al. |
| 6,583,041 | B1 | 6/2003 | Capodieci |
| 6,588,005 | B1 | 7/2003 | Kobayashi et al. |
| 6,590,289 | B2 | 7/2003 | Shively |
| 6,591,207 | B2 | 7/2003 | Naya et al. |
| 6,609,235 | B2 | 8/2003 | Ramaswamy et al. |
| 6,610,607 | B1 | 8/2003 | Armbrust et al. |
| 6,617,621 | B1 | 9/2003 | Gheewala et al. |
| 6,620,561 | B2 | 9/2003 | Winder et al. |
| 6,621,132 | B2 | 9/2003 | Onishi et al. |
| 6,632,741 | B1 | 10/2003 | Clevenger et al. |
| 6,633,182 | B2 | 10/2003 | Pileggi et al. |
| 6,635,935 | B2 | 10/2003 | Makino |
| 6,642,744 | B2 | 11/2003 | Or-Bach et al. |
| 6,643,831 | B2 | 11/2003 | Chang et al. |
| 6,650,014 | B2 | 11/2003 | Kariyazaki |
| 6,661,041 | B2 | 12/2003 | Keeth |
| 6,662,350 | B2 | 12/2003 | Fried et al. |
| 6,664,587 | B2 | 12/2003 | Guterman et al. |
| 6,673,638 | B1 | 1/2004 | Bendik et al. |
| 6,677,649 | B2 | 1/2004 | Minami et al. |
| 6,687,895 | B2 | 2/2004 | Zhang |
| 6,690,206 | B2 | 2/2004 | Rikino et al. |
| 6,691,297 | B1 | 2/2004 | Misaka et al. |
| 6,700,405 | B1 | 3/2004 | Hirairi |
| 6,703,170 | B1 | 3/2004 | Pindo |
| 6,709,880 | B2 | 3/2004 | Yamamoto et al. |
| 6,714,903 | B1 | 3/2004 | Chu et al. |
| 6,732,338 | B2 | 5/2004 | Crouse et al. |
| 6,732,344 | B2 | 5/2004 | Sakamoto et al. |
| 6,734,506 | B2 | 5/2004 | Oyamatsu |
| 6,737,199 | B1 | 5/2004 | Hsieh |
| 6,737,318 | B2 | 5/2004 | Murata et al. |
| 6,737,347 | B1 | 5/2004 | Houston et al. |
| 6,745,372 | B2 | 6/2004 | Cote et al. |
| 6,745,380 | B2 | 6/2004 | Bodendorf et al. |
| 6,749,972 | B2 | 6/2004 | Yu |
| 6,750,555 | B2 | 6/2004 | Satomi et al. |
| 6,760,269 | B2 | 7/2004 | Nakase et al. |
| 6,765,245 | B2 | 7/2004 | Bansal |
| 6,777,138 | B2 | 8/2004 | Pierrat et al. |
| 6,777,146 | B1 | 8/2004 | Samuels |
| 6,787,823 | B2 | 9/2004 | Shibutani |
| 6,789,244 | B1 | 9/2004 | Dasasathyan et al. |
| 6,789,246 | B1 | 9/2004 | Mohan et al. |
| 6,792,591 | B2 | 9/2004 | Shi et al. |
| 6,792,593 | B2 | 9/2004 | Takashima et al. |
| 6,794,677 | B2 | 9/2004 | Tamaki et al. |
| 6,794,914 | B2 | 9/2004 | Sani et al. |
| 6,795,332 | B2 | 9/2004 | Yamaoka et al. |
| 6,795,358 | B2 | 9/2004 | Tanaka et al. |
| 6,795,952 | B1 | 9/2004 | Stine et al. |
| 6,795,953 | B2 | 9/2004 | Bakarian et al. |
| 6,800,883 | B2 | 10/2004 | Furuya et al. |
| 6,807,663 | B2 | 10/2004 | Cote et al. |
| 6,809,399 | B2 | 10/2004 | Ikeda et al. |
| 6,812,574 | B2 | 11/2004 | Tomita et al. |
| 6,818,389 | B2 | 11/2004 | Fritze et al. |
| 6,818,929 | B2 | 11/2004 | Tsutsumi et al. |
| 6,819,136 | B2 | 11/2004 | Or-Bach |
| 6,820,248 | B1 | 11/2004 | Gan |
| 6,826,738 | B2 | 11/2004 | Cadouri |
| 6,834,375 | B1 | 12/2004 | Stine et al. |
| 6,841,880 | B2 | 1/2005 | Matsumoto et al. |
| 6,850,854 | B2 | 2/2005 | Naya et al. |
| 6,854,096 | B2 | 2/2005 | Eaton et al. |
| 6,854,100 | B1 | 2/2005 | Chuang et al. |
| 6,867,073 | B1 | 3/2005 | Enquist |
| 6,871,338 | B2 | 3/2005 | Yamauchi |
| 6,872,990 | B1 | 3/2005 | Kang |
| 6,877,144 | B1 | 4/2005 | Rittman et al. |
| 6,881,523 | B2 | 4/2005 | Smith |
| 6,884,712 | B2 | 4/2005 | Yelehanka et al. |
| 6,885,045 | B2 | 4/2005 | Hidaka |
| 6,889,370 | B1 | 5/2005 | Kerzman et al. |
| 6,897,517 | B2 | 5/2005 | Houdt et al. |
| 6,897,536 | B2 | 5/2005 | Nomura et al. |
| 6,898,770 | B2 | 5/2005 | Boluki et al. |
| 6,904,582 | B1 | 6/2005 | Rittman et al. |
| 6,918,104 | B2 | 7/2005 | Pierrat et al. |
| 6,920,079 | B2 | 7/2005 | Shibayama |
| 6,921,982 | B2 | 7/2005 | Joshi et al. |
| 6,922,354 | B2 | 7/2005 | Ishikura et al. |
| 6,924,560 | B2 | 8/2005 | Wang et al. |
| 6,928,635 | B2 | 8/2005 | Pramanik et al. |
| 6,931,617 | B2 | 8/2005 | Sanie et al. |
| 6,953,956 | B2 | 10/2005 | Or-Bach et al. |
| 6,954,918 | B2 | 10/2005 | Houston |
| 6,957,402 | B2 | 10/2005 | Templeton et al. |
| 6,968,527 | B2 | 11/2005 | Pierrat |
| 6,974,978 | B1 | 12/2005 | Possley |
| 6,977,856 | B2 | 12/2005 | Tanaka et al. |
| 6,978,436 | B2 | 12/2005 | Cote et al. |
| 6,978,437 | B1 | 12/2005 | Rittman et al. |
| 6,980,211 | B2 | 12/2005 | Lin et al. |
| 6,992,394 | B2 | 1/2006 | Park |
| 6,992,925 | B2 | 1/2006 | Peng |
| 6,993,741 | B2 | 1/2006 | Liebmann et al. |
| 6,994,939 | B1 | 2/2006 | Ghandehari et al. |
| 7,003,068 | B2 | 2/2006 | Kushner et al. |
| 7,009,862 | B2 | 3/2006 | Higeta et al. |
| 7,016,214 | B2 | 3/2006 | Kawamata |
| 7,022,559 | B2 | 4/2006 | Barnak et al. |
| 7,028,285 | B2 | 4/2006 | Cote et al. |
| 7,041,568 | B2 | 5/2006 | Goldbach et al. |
| 7,052,972 | B2 | 5/2006 | Sandhu et al. |
| 7,053,424 | B2 | 5/2006 | Ono |
| 7,063,920 | B2 | 6/2006 | Baba-Ali |
| 7,064,068 | B2 | 6/2006 | Chou et al. |
| 7,065,731 | B2 | 6/2006 | Jacques et al. |
| 7,079,413 | B2 | 7/2006 | Tsukamoto et al. |
| 7,079,989 | B2 | 7/2006 | Wimer |
| 7,093,208 | B2 | 8/2006 | Williams et al. |
| 7,093,228 | B2 | 8/2006 | Andreev et al. |
| 7,103,870 | B2 | 9/2006 | Misaka et al. |
| 7,105,871 | B2 | 9/2006 | Or-Bach et al. |
| 7,107,551 | B1 | 9/2006 | de Dood et al. |
| 7,115,343 | B2 | 10/2006 | Gordon et al. |
| 7,115,920 | B2 | 10/2006 | Bernstein et al. |
| 7,120,882 | B2 | 10/2006 | Kotani et al. |
| 7,124,386 | B2 | 10/2006 | Smith et al. |
| 7,126,837 | B1 | 10/2006 | Banachowicz et al. |

(56) References Cited

U.S. PATENT DOCUMENTS

| | | |
|---|---|---|
| 7,132,203 B2 | 11/2006 | Pierrat |
| 7,137,092 B2 | 11/2006 | Maeda |
| 7,141,853 B2 | 11/2006 | Campbell et al. |
| 7,143,380 B1 | 11/2006 | Anderson et al. |
| 7,149,999 B2 | 12/2006 | Kahng et al. |
| 7,152,215 B2 | 12/2006 | Smith et al. |
| 7,155,685 B2 | 12/2006 | Mori et al. |
| 7,155,689 B2 | 12/2006 | Pierrat et al. |
| 7,159,197 B2 | 1/2007 | Falbo et al. |
| 7,174,520 B2 | 2/2007 | White et al. |
| 7,175,940 B2 | 2/2007 | Laidig et al. |
| 7,176,508 B2 | 2/2007 | Joshi et al. |
| 7,177,215 B2 | 2/2007 | Tanaka et al. |
| 7,185,294 B2 | 2/2007 | Zhang |
| 7,188,322 B2 | 3/2007 | Cohn et al. |
| 7,194,712 B2 | 3/2007 | Wu |
| 7,200,835 B2 | 4/2007 | Zhang et al. |
| 7,202,517 B2 | 4/2007 | Dixit et al. |
| 7,205,191 B2 | 4/2007 | Kobayashi |
| 7,208,794 B2 | 4/2007 | Hofmann et al. |
| 7,214,579 B2 | 5/2007 | Widdershoven et al. |
| 7,219,326 B2 | 5/2007 | Reed et al. |
| 7,221,031 B2 | 5/2007 | Ryoo et al. |
| 7,225,423 B2 | 5/2007 | Bhattacharya et al. |
| 7,227,183 B2 | 6/2007 | Donze et al. |
| 7,228,510 B2 | 6/2007 | Ono |
| 7,231,628 B2 | 6/2007 | Pack et al. |
| 7,235,424 B2 | 6/2007 | Chen et al. |
| 7,243,316 B2 | 7/2007 | White et al. |
| 7,252,909 B2 | 8/2007 | Shin et al. |
| 7,264,990 B2 | 9/2007 | Rueckes et al. |
| 7,266,787 B2 | 9/2007 | Hughes et al. |
| 7,269,803 B2 | 9/2007 | Khakzadi et al. |
| 7,278,118 B2 | 10/2007 | Pileggi et al. |
| 7,279,727 B2 | 10/2007 | Ikoma et al. |
| 7,287,320 B2 | 10/2007 | Wang et al. |
| 7,294,534 B2 | 11/2007 | Iwaki |
| 7,302,651 B2 | 11/2007 | Allen et al. |
| 7,308,669 B2 | 12/2007 | Buehler et al. |
| 7,312,003 B2 | 12/2007 | Cote et al. |
| 7,315,994 B2 * | 1/2008 | Aller et al. .......... 716/106 |
| 7,327,591 B2 | 2/2008 | Sadra et al. |
| 7,329,938 B2 | 2/2008 | Kinoshita |
| 7,335,966 B2 | 2/2008 | Ihme et al. |
| 7,337,421 B2 | 2/2008 | Kamat |
| 7,338,896 B2 | 3/2008 | Vanhaelemeersch et al. |
| 7,345,909 B2 | 3/2008 | Chang et al. |
| 7,346,885 B2 | 3/2008 | Semmler |
| 7,350,183 B2 | 3/2008 | Cui et al. |
| 7,353,492 B2 | 4/2008 | Gupta et al. |
| 7,360,179 B2 | 4/2008 | Smith et al. |
| 7,360,198 B2 | 4/2008 | Rana et al. |
| 7,366,997 B1 | 4/2008 | Rahmat et al. |
| 7,367,008 B2 | 4/2008 | White et al. |
| 7,376,931 B2 | 5/2008 | Kokubun |
| 7,383,521 B2 | 6/2008 | Smith et al. |
| 7,397,260 B2 | 7/2008 | Chanda et al. |
| 7,400,627 B2 | 7/2008 | Wu et al. |
| 7,402,848 B2 | 7/2008 | Chang et al. |
| 7,404,154 B1 | 7/2008 | Venkatraman et al. |
| 7,404,173 B2 | 7/2008 | Wu et al. |
| 7,411,252 B2 | 8/2008 | Anderson et al. |
| 7,421,678 B2 | 9/2008 | Barnes et al. |
| 7,423,298 B2 | 9/2008 | Mariyama et al. |
| 7,424,694 B2 | 9/2008 | Ikeda |
| 7,424,695 B2 | 9/2008 | Tamura et al. |
| 7,426,710 B2 | 9/2008 | Zhang et al. |
| 7,432,562 B2 | 10/2008 | Bhattacharyya |
| 7,434,185 B2 | 10/2008 | Dooling et al. |
| 7,441,211 B1 | 10/2008 | Gupta et al. |
| 7,442,630 B2 | 10/2008 | Kelberlau et al. |
| 7,444,609 B2 | 10/2008 | Charlebois et al. |
| 7,446,352 B2 | 11/2008 | Becker et al. |
| 7,449,371 B2 | 11/2008 | Kemerling et al. |
| 7,458,045 B2 | 11/2008 | Cote et al. |
| 7,459,792 B2 | 12/2008 | Chen |
| 7,465,973 B2 | 12/2008 | Chang et al. |
| 7,466,607 B2 | 12/2008 | Hollis et al. |
| 7,469,396 B2 | 12/2008 | Hayashi et al. |
| 7,480,880 B2 | 1/2009 | Visweswariah et al. |
| 7,480,891 B2 | 1/2009 | Sezginer |
| 7,484,197 B2 | 1/2009 | Allen et al. |
| 7,485,934 B2 | 2/2009 | Liaw |
| 7,487,475 B1 | 2/2009 | Kriplani et al. |
| 7,492,013 B2 | 2/2009 | Correale, Jr. |
| 7,500,211 B2 | 3/2009 | Komaki |
| 7,502,275 B2 | 3/2009 | Nii et al. |
| 7,503,026 B2 | 3/2009 | Ichiryu et al. |
| 7,504,184 B2 | 3/2009 | Hung et al. |
| 7,506,300 B2 | 3/2009 | Sezginer et al. |
| 7,508,238 B2 | 3/2009 | Yamagami |
| 7,509,621 B2 | 3/2009 | Melvin, III |
| 7,509,622 B2 | 3/2009 | Sinha et al. |
| 7,512,017 B2 | 3/2009 | Chang |
| 7,512,921 B2 | 3/2009 | Shibuya |
| 7,514,959 B2 | 4/2009 | Or-Bach et al. |
| 7,523,429 B2 | 4/2009 | Kroyan et al. |
| 7,527,900 B2 | 5/2009 | Zhou et al. |
| 7,538,368 B2 | 5/2009 | Yano |
| 7,543,262 B2 | 6/2009 | Wang et al. |
| 7,563,701 B2 | 7/2009 | Chang et al. |
| 7,564,134 B2 | 7/2009 | Lee et al. |
| 7,568,174 B2 | 7/2009 | Sezginer et al. |
| 7,569,309 B2 | 8/2009 | Blatchford et al. |
| 7,569,310 B2 | 8/2009 | Wallace et al. |
| 7,569,894 B2 | 8/2009 | Suzuki |
| 7,575,973 B2 | 8/2009 | Mokhlesi et al. |
| 7,598,541 B2 | 10/2009 | Okamoto et al. |
| 7,598,558 B2 | 10/2009 | Hashimoto et al. |
| 7,614,030 B2 | 11/2009 | Hsu |
| 7,625,790 B2 | 12/2009 | Yang |
| 7,632,610 B2 | 12/2009 | Wallace et al. |
| 7,640,522 B2 | 12/2009 | Gupta et al. |
| 7,646,651 B2 | 1/2010 | Lee et al. |
| 7,653,884 B2 | 1/2010 | Furnish et al. |
| 7,665,051 B2 | 2/2010 | Ludwig et al. |
| 7,700,466 B2 | 4/2010 | Booth et al. |
| 7,712,056 B2 | 5/2010 | White et al. |
| 7,739,627 B2 | 6/2010 | Chew et al. |
| 7,749,662 B2 | 7/2010 | Matthew et al. |
| 7,755,110 B2 | 7/2010 | Gliese et al. |
| 7,770,144 B2 | 8/2010 | Dellinger |
| 7,791,109 B2 | 9/2010 | Wann et al. |
| 7,802,219 B2 | 9/2010 | Tomar et al. |
| 7,825,437 B2 | 11/2010 | Pillarisetty et al. |
| 7,842,975 B2 | 11/2010 | Becker et al. |
| 7,873,929 B2 | 1/2011 | Kahng et al. |
| 7,882,456 B2 | 2/2011 | Zach |
| 7,888,705 B2 | 2/2011 | Becker et al. |
| 7,898,040 B2 | 3/2011 | Nawaz |
| 7,906,801 B2 | 3/2011 | Becker et al. |
| 7,908,578 B2 | 3/2011 | Becker et al. |
| 7,910,958 B2 | 3/2011 | Becker et al. |
| 7,910,959 B2 | 3/2011 | Becker et al. |
| 7,917,877 B2 | 3/2011 | Singh et al. |
| 7,917,879 B2 | 3/2011 | Becker et al. |
| 7,923,266 B2 | 4/2011 | Thijs et al. |
| 7,923,337 B2 | 4/2011 | Chang et al. |
| 7,923,757 B2 | 4/2011 | Becker et al. |
| 7,932,544 B2 | 4/2011 | Becker et al. |
| 7,932,545 B2 | 4/2011 | Becker et al. |
| 7,934,184 B2 | 4/2011 | Zhang |
| 7,943,966 B2 | 5/2011 | Becker et al. |
| 7,943,967 B2 | 5/2011 | Becker et al. |
| 7,948,012 B2 | 5/2011 | Becker et al. |
| 7,948,013 B2 | 5/2011 | Becker et al. |
| 7,952,119 B2 | 5/2011 | Becker et al. |
| 7,956,421 B2 | 6/2011 | Becker |
| 7,958,465 B2 | 6/2011 | Lu et al. |
| 7,962,867 B2 | 6/2011 | White et al. |
| 7,962,879 B2 | 6/2011 | Tang et al. |
| 7,964,267 B1 | 6/2011 | Lyons et al. |
| 7,971,160 B2 | 6/2011 | Osawa et al. |
| 7,989,847 B2 | 8/2011 | Becker et al. |

(56) References Cited

U.S. PATENT DOCUMENTS

| | | |
|---|---|---|
| 7,989,848 B2 | 8/2011 | Becker et al. |
| 7,992,122 B1 | 8/2011 | Burstein et al. |
| 7,994,583 B2 | 8/2011 | Inaba |
| 8,004,042 B2 | 8/2011 | Yang et al. |
| 8,022,441 B2 | 9/2011 | Becker et al. |
| 8,030,689 B2 | 10/2011 | Becker et al. |
| 8,035,133 B2 | 10/2011 | Becker et al. |
| 8,044,437 B1 | 10/2011 | Venkatraman et al. |
| 8,058,671 B2 | 11/2011 | Becker et al. |
| 8,058,690 B2 | 11/2011 | Chang |
| 8,072,003 B2 | 12/2011 | Becker et al. |
| 8,072,053 B2 | 12/2011 | Li |
| 8,088,679 B2 | 1/2012 | Becker et al. |
| 8,088,680 B2 | 1/2012 | Becker et al. |
| 8,088,681 B2 | 1/2012 | Becker et al. |
| 8,088,682 B2 | 1/2012 | Becker et al. |
| 8,089,098 B2 | 1/2012 | Becker et al. |
| 8,089,099 B2 | 1/2012 | Becker et al. |
| 8,089,100 B2 | 1/2012 | Becker et al. |
| 8,089,101 B2 | 1/2012 | Becker et al. |
| 8,089,102 B2 | 1/2012 | Becker et al. |
| 8,089,103 B2 | 1/2012 | Becker et al. |
| 8,089,104 B2 | 1/2012 | Becker et al. |
| 8,101,975 B2 | 1/2012 | Becker et al. |
| 8,110,854 B2 | 2/2012 | Becker et al. |
| 8,129,750 B2 | 3/2012 | Becker et al. |
| 8,129,751 B2 | 3/2012 | Becker et al. |
| 8,129,752 B2 | 3/2012 | Becker et al. |
| 8,129,754 B2 | 3/2012 | Becker et al. |
| 8,129,755 B2 | 3/2012 | Becker et al. |
| 8,129,756 B2 | 3/2012 | Becker et al. |
| 8,129,757 B2 | 3/2012 | Becker et al. |
| 8,129,819 B2 | 3/2012 | Becker et al. |
| 8,130,529 B2 | 3/2012 | Tanaka |
| 8,134,183 B2 | 3/2012 | Becker et al. |
| 8,134,184 B2 | 3/2012 | Becker et al. |
| 8,134,185 B2 | 3/2012 | Becker et al. |
| 8,134,186 B2 | 3/2012 | Becker et al. |
| 8,138,525 B2 | 3/2012 | Becker et al. |
| 8,161,427 B2 | 4/2012 | Morgenshtein et al. |
| 8,178,905 B2 | 5/2012 | Toubou |
| 8,178,909 B2 | 5/2012 | Venkatraman et al. |
| 8,198,656 B2 | 6/2012 | Becker et al. |
| 8,207,053 B2 | 6/2012 | Becker et al. |
| 8,214,778 B2 | 7/2012 | Quandt et al. |
| 8,217,428 B2 | 7/2012 | Becker et al. |
| 8,225,239 B2 | 7/2012 | Reed et al. |
| 8,225,261 B2 | 7/2012 | Hong et al. |
| 8,245,180 B2 | 8/2012 | Smayling et al. |
| 8,247,846 B2 | 8/2012 | Becker |
| 8,253,172 B2 | 8/2012 | Becker et al. |
| 8,253,173 B2 | 8/2012 | Becker et al. |
| 8,258,547 B2 | 9/2012 | Becker et al. |
| 8,258,548 B2 | 9/2012 | Becker et al. |
| 8,258,549 B2 | 9/2012 | Becker et al. |
| 8,258,550 B2 | 9/2012 | Becker et al. |
| 8,258,551 B2 | 9/2012 | Becker et al. |
| 8,258,552 B2 | 9/2012 | Becker et al. |
| 8,264,007 B2 | 9/2012 | Becker et al. |
| 8,264,008 B2 | 9/2012 | Becker et al. |
| 8,264,009 B2 | 9/2012 | Becker et al. |
| 8,283,701 B2 | 10/2012 | Becker et al. |
| 8,316,327 B2 | 11/2012 | Herold |
| 8,356,268 B2 | 1/2013 | Becker et al. |
| 8,378,407 B2 | 2/2013 | Audzeyeu et al. |
| 8,395,224 B2 | 3/2013 | Becker et al. |
| 8,402,397 B2 | 3/2013 | Robles et al. |
| 8,405,163 B2 | 3/2013 | Becker et al. |
| 8,422,274 B2 | 4/2013 | Tomita et al. |
| 8,436,400 B2 | 5/2013 | Becker et al. |
| 8,453,094 B2 | 5/2013 | Kornachuk et al. |
| 8,575,706 B2 | 11/2013 | Becker et al. |
| 2002/0003270 A1 | 1/2002 | Makino |
| 2002/0015899 A1 | 2/2002 | Chen et al. |
| 2002/0030510 A1 | 3/2002 | Kono et al. |
| 2002/0068423 A1 | 6/2002 | Park et al. |
| 2002/0079927 A1 | 6/2002 | Katoh et al. |
| 2002/0149392 A1 | 10/2002 | Cho |
| 2002/0166107 A1 | 11/2002 | Capodieci et al. |
| 2002/0194575 A1 | 12/2002 | Allen et al. |
| 2003/0042930 A1 | 3/2003 | Pileggi et al. |
| 2003/0046653 A1 | 3/2003 | Liu |
| 2003/0061592 A1 | 3/2003 | Agrawal et al. |
| 2003/0088839 A1 | 5/2003 | Watanabe |
| 2003/0088842 A1 | 5/2003 | Cirit |
| 2003/0103176 A1 | 6/2003 | Abe et al. |
| 2003/0106037 A1 | 6/2003 | Moniwa et al. |
| 2003/0117168 A1 | 6/2003 | Uneme et al. |
| 2003/0124847 A1 | 7/2003 | Houston et al. |
| 2003/0125917 A1 | 7/2003 | Rich et al. |
| 2003/0126569 A1 | 7/2003 | Rich et al. |
| 2003/0145288 A1 | 7/2003 | Wang et al. |
| 2003/0145299 A1 | 7/2003 | Fried et al. |
| 2003/0177465 A1 | 9/2003 | MacLean et al. |
| 2003/0185076 A1 | 10/2003 | Worley |
| 2003/0229868 A1 | 12/2003 | White et al. |
| 2003/0229875 A1 | 12/2003 | Smith et al. |
| 2004/0029372 A1 | 2/2004 | Jang et al. |
| 2004/0049754 A1 | 3/2004 | Liao et al. |
| 2004/0063038 A1 | 4/2004 | Shin et al. |
| 2004/0115539 A1 | 6/2004 | Broeke et al. |
| 2004/0139412 A1 | 7/2004 | Ito et al. |
| 2004/0145028 A1 | 7/2004 | Matsumoto et al. |
| 2004/0153979 A1 | 8/2004 | Chang |
| 2004/0161878 A1 | 8/2004 | Or-Bach et al. |
| 2004/0169201 A1 | 9/2004 | Hidaka |
| 2004/0194050 A1 | 9/2004 | Hwang et al. |
| 2004/0196705 A1 | 10/2004 | Ishikura et al. |
| 2004/0229135 A1 | 11/2004 | Wang et al. |
| 2004/0232444 A1 | 11/2004 | Shimizu |
| 2004/0243966 A1 | 12/2004 | Dellinger |
| 2004/0262640 A1 | 12/2004 | Suga |
| 2005/0009312 A1 | 1/2005 | Butt et al. |
| 2005/0009344 A1 | 1/2005 | Hwang et al. |
| 2005/0012157 A1 | 1/2005 | Cho et al. |
| 2005/0055828 A1 | 3/2005 | Wang et al. |
| 2005/0076320 A1 | 4/2005 | Maeda |
| 2005/0087806 A1 | 4/2005 | Hokazono |
| 2005/0093147 A1 | 5/2005 | Tu |
| 2005/0101112 A1 | 5/2005 | Rueckes et al. |
| 2005/0110130 A1 | 5/2005 | Kitabayashi et al. |
| 2005/0135134 A1 | 6/2005 | Yen et al. |
| 2005/0136340 A1 | 6/2005 | Baselmans et al. |
| 2005/0138598 A1 | 6/2005 | Kokubun |
| 2005/0156200 A1 | 7/2005 | Kinoshita |
| 2005/0185325 A1 | 8/2005 | Hur |
| 2005/0189604 A1 | 9/2005 | Gupta et al. |
| 2005/0189614 A1 | 9/2005 | Ihme et al. |
| 2005/0196685 A1 | 9/2005 | Wang et al. |
| 2005/0205894 A1 | 9/2005 | Sumikawa et al. |
| 2005/0212018 A1 | 9/2005 | Schoellkopf et al. |
| 2005/0224982 A1 | 10/2005 | Kemerling et al. |
| 2005/0229130 A1 | 10/2005 | Wu et al. |
| 2005/0251771 A1 | 11/2005 | Robles |
| 2005/0264320 A1 | 12/2005 | Chan et al. |
| 2005/0264324 A1 | 12/2005 | Nakazato |
| 2005/0266621 A1 | 12/2005 | Kim |
| 2005/0268256 A1 | 12/2005 | Tsai et al. |
| 2005/0280031 A1 | 12/2005 | Yano |
| 2006/0038234 A1 | 2/2006 | Liaw |
| 2006/0063334 A1 | 3/2006 | Donze et al. |
| 2006/0070018 A1 | 3/2006 | Semmler |
| 2006/0084261 A1 | 4/2006 | Iwaki |
| 2006/0091550 A1 | 5/2006 | Shimazaki et al. |
| 2006/0095872 A1 | 5/2006 | McElvain |
| 2006/0101370 A1 | 5/2006 | Cui et al. |
| 2006/0112355 A1 | 5/2006 | Pileggi et al. |
| 2006/0113567 A1 | 6/2006 | Ohmori et al. |
| 2006/0120143 A1 | 6/2006 | Liaw |
| 2006/0121715 A1 | 6/2006 | Chang et al. |
| 2006/0123376 A1 | 6/2006 | Vogel et al. |
| 2006/0125024 A1 | 6/2006 | Ishigaki |
| 2006/0131609 A1 | 6/2006 | Kinoshita et al. |
| 2006/0136848 A1 | 6/2006 | Ichiryu et al. |

(56) References Cited

U.S. PATENT DOCUMENTS

| | | |
|---|---|---|
| 2006/0146638 A1 | 7/2006 | Chang et al. |
| 2006/0151810 A1 | 7/2006 | Ohshige |
| 2006/0158270 A1 | 7/2006 | Gibet et al. |
| 2006/0177744 A1 | 8/2006 | Bodendorf et al. |
| 2006/0181310 A1 | 8/2006 | Rhee |
| 2006/0195809 A1 | 8/2006 | Cohn et al. |
| 2006/0197557 A1 | 9/2006 | Chung |
| 2006/0206854 A1 | 9/2006 | Barnes et al. |
| 2006/0223302 A1 | 10/2006 | Chang et al. |
| 2006/0248495 A1 | 11/2006 | Sezginer |
| 2007/0001304 A1 | 1/2007 | Liaw |
| 2007/0002617 A1 | 1/2007 | Houston |
| 2007/0007574 A1* | 1/2007 | Ohsawa ............... 257/314 |
| 2007/0038973 A1 | 2/2007 | Li et al. |
| 2007/0074145 A1 | 3/2007 | Tanaka |
| 2007/0094634 A1 | 4/2007 | Seizginer et al. |
| 2007/0101305 A1 | 5/2007 | Smith et al. |
| 2007/0105023 A1 | 5/2007 | Zhou et al. |
| 2007/0106971 A1 | 5/2007 | Lien et al. |
| 2007/0113216 A1 | 5/2007 | Zhang |
| 2007/0172770 A1 | 7/2007 | Witters et al. |
| 2007/0196958 A1 | 8/2007 | Bhattacharya et al. |
| 2007/0209029 A1 | 9/2007 | Ivonin et al. |
| 2007/0210391 A1 | 9/2007 | Becker et al. |
| 2007/0234252 A1 | 10/2007 | Visweswariah et al. |
| 2007/0256039 A1 | 11/2007 | White |
| 2007/0257277 A1 | 11/2007 | Takeda et al. |
| 2007/0274140 A1 | 11/2007 | Joshi et al. |
| 2007/0277129 A1 | 11/2007 | Allen et al. |
| 2007/0288882 A1 | 12/2007 | Kniffin et al. |
| 2007/0290361 A1 | 12/2007 | Chen |
| 2007/0294652 A1 | 12/2007 | Bowen |
| 2007/0297249 A1 | 12/2007 | Chang et al. |
| 2008/0005712 A1 | 1/2008 | Charlebois et al. |
| 2008/0046846 A1 | 2/2008 | Chew et al. |
| 2008/0081472 A1 | 4/2008 | Tanaka |
| 2008/0082952 A1 | 4/2008 | O'Brien |
| 2008/0086712 A1 | 4/2008 | Fujimoto |
| 2008/0097641 A1 | 4/2008 | Miyashita et al. |
| 2008/0098334 A1 | 4/2008 | Pileggi et al. |
| 2008/0099795 A1 | 5/2008 | Bernstein et al. |
| 2008/0127000 A1 | 5/2008 | Majumder et al. |
| 2008/0127029 A1 | 5/2008 | Graur et al. |
| 2008/0134128 A1 | 6/2008 | Blatchford et al. |
| 2008/0144361 A1 | 6/2008 | Wong |
| 2008/0148216 A1 | 6/2008 | Chan et al. |
| 2008/0163141 A1 | 7/2008 | Scheffer et al. |
| 2008/0168406 A1 | 7/2008 | Rahmat et al. |
| 2008/0211028 A1 | 9/2008 | Suzuki |
| 2008/0216207 A1 | 9/2008 | Tsai |
| 2008/0244494 A1 | 10/2008 | McCullen |
| 2008/0251779 A1* | 10/2008 | Kakoschke et al. ............... 257/5 |
| 2008/0265290 A1 | 10/2008 | Nielsen et al. |
| 2008/0276105 A1 | 11/2008 | Hoberman et al. |
| 2008/0283910 A1 | 11/2008 | Dreeskornfeld et al. |
| 2008/0285331 A1 | 11/2008 | Torok et al. |
| 2008/0308848 A1 | 12/2008 | Inaba |
| 2008/0315258 A1 | 12/2008 | Masuda et al. |
| 2009/0014811 A1 | 1/2009 | Becker et al. |
| 2009/0024974 A1 | 1/2009 | Yamada |
| 2009/0031261 A1 | 1/2009 | Smith et al. |
| 2009/0032898 A1 | 2/2009 | Becker et al. |
| 2009/0032967 A1 | 2/2009 | Becker et al. |
| 2009/0037864 A1 | 2/2009 | Becker et al. |
| 2009/0057780 A1 | 3/2009 | Wong et al. |
| 2009/0075485 A1 | 3/2009 | Ban et al. |
| 2009/0077524 A1 | 3/2009 | Nagamura |
| 2009/0085067 A1 | 4/2009 | Hayashi et al. |
| 2009/0087991 A1 | 4/2009 | Yatsuda et al. |
| 2009/0101940 A1 | 4/2009 | Barrows et al. |
| 2009/0106714 A1 | 4/2009 | Culp et al. |
| 2009/0155990 A1 | 6/2009 | Yanagidaira et al. |
| 2009/0181314 A1 | 7/2009 | Shyu et al. |
| 2009/0187871 A1 | 7/2009 | Cork |
| 2009/0206443 A1 | 8/2009 | Juengling |
| 2009/0224408 A1 | 9/2009 | Fox |
| 2009/0228853 A1 | 9/2009 | Hong et al. |
| 2009/0228857 A1 | 9/2009 | Kornachuk et al. |
| 2009/0273100 A1 | 11/2009 | Aton et al. |
| 2009/0280582 A1 | 11/2009 | Thijs et al. |
| 2009/0302372 A1 | 12/2009 | Chang et al. |
| 2009/0319977 A1 | 12/2009 | Saxena et al. |
| 2010/0001321 A1 | 1/2010 | Becker et al. |
| 2010/0006897 A1 | 1/2010 | Becker et al. |
| 2010/0006898 A1 | 1/2010 | Becker et al. |
| 2010/0006899 A1 | 1/2010 | Becker et al. |
| 2010/0006900 A1 | 1/2010 | Becker et al. |
| 2010/0006901 A1 | 1/2010 | Becker et al. |
| 2010/0006902 A1 | 1/2010 | Becker et al. |
| 2010/0006903 A1 | 1/2010 | Becker et al. |
| 2010/0006947 A1 | 1/2010 | Becker et al. |
| 2010/0006948 A1 | 1/2010 | Becker et al. |
| 2010/0006950 A1 | 1/2010 | Becker et al. |
| 2010/0006951 A1 | 1/2010 | Becker et al. |
| 2010/0006986 A1 | 1/2010 | Becker et al. |
| 2010/0011327 A1 | 1/2010 | Becker et al. |
| 2010/0011328 A1 | 1/2010 | Becker et al. |
| 2010/0011329 A1 | 1/2010 | Becker et al. |
| 2010/0011330 A1 | 1/2010 | Becker et al. |
| 2010/0011331 A1 | 1/2010 | Becker et al. |
| 2010/0011332 A1 | 1/2010 | Becker et al. |
| 2010/0011333 A1 | 1/2010 | Becker et al. |
| 2010/0012981 A1 | 1/2010 | Becker et al. |
| 2010/0012982 A1 | 1/2010 | Becker et al. |
| 2010/0012983 A1 | 1/2010 | Becker et al. |
| 2010/0012984 A1 | 1/2010 | Becker et al. |
| 2010/0012985 A1 | 1/2010 | Becker et al. |
| 2010/0012986 A1 | 1/2010 | Becker et al. |
| 2010/0017766 A1 | 1/2010 | Becker et al. |
| 2010/0017767 A1 | 1/2010 | Becker et al. |
| 2010/0017768 A1 | 1/2010 | Becker et al. |
| 2010/0017769 A1 | 1/2010 | Becker et al. |
| 2010/0017770 A1 | 1/2010 | Becker et al. |
| 2010/0017771 A1 | 1/2010 | Becker et al. |
| 2010/0017772 A1 | 1/2010 | Becker et al. |
| 2010/0019280 A1 | 1/2010 | Becker et al. |
| 2010/0019281 A1 | 1/2010 | Becker et al. |
| 2010/0019282 A1 | 1/2010 | Becker et al. |
| 2010/0019283 A1 | 1/2010 | Becker et al. |
| 2010/0019284 A1 | 1/2010 | Becker et al. |
| 2010/0019285 A1 | 1/2010 | Becker et al. |
| 2010/0019286 A1 | 1/2010 | Becker et al. |
| 2010/0019287 A1 | 1/2010 | Becker et al. |
| 2010/0019288 A1 | 1/2010 | Becker et al. |
| 2010/0019308 A1 | 1/2010 | Chan et al. |
| 2010/0023906 A1 | 1/2010 | Becker et al. |
| 2010/0023907 A1 | 1/2010 | Becker et al. |
| 2010/0023908 A1 | 1/2010 | Becker et al. |
| 2010/0023911 A1 | 1/2010 | Becker et al. |
| 2010/0025731 A1 | 2/2010 | Becker et al. |
| 2010/0025732 A1 | 2/2010 | Becker et al. |
| 2010/0025733 A1 | 2/2010 | Becker et al. |
| 2010/0025734 A1 | 2/2010 | Becker et al. |
| 2010/0025735 A1 | 2/2010 | Becker et al. |
| 2010/0025736 A1 | 2/2010 | Becker et al. |
| 2010/0032722 A1 | 2/2010 | Becker et al. |
| 2010/0032723 A1 | 2/2010 | Becker et al. |
| 2010/0032724 A1 | 2/2010 | Becker et al. |
| 2010/0032726 A1 | 2/2010 | Becker et al. |
| 2010/0037194 A1 | 2/2010 | Becker et al. |
| 2010/0037195 A1 | 2/2010 | Becker et al. |
| 2010/0096671 A1 | 4/2010 | Becker et al. |
| 2010/0203689 A1 | 8/2010 | Bernstein et al. |
| 2010/0224943 A1 | 9/2010 | Kawasaki |
| 2010/0229140 A1 | 9/2010 | Strolenberg et al. |
| 2010/0232212 A1 | 9/2010 | Anderson et al. |
| 2010/0264468 A1 | 10/2010 | Xu |
| 2010/0270681 A1 | 10/2010 | Bird et al. |
| 2010/0287518 A1 | 11/2010 | Becker |
| 2011/0016909 A1 | 1/2011 | Mirza et al. |
| 2011/0108890 A1 | 5/2011 | Becker et al. |
| 2011/0108891 A1 | 5/2011 | Becker et al. |
| 2011/0154281 A1 | 6/2011 | Zach |
| 2011/0207298 A1 | 8/2011 | Anderson et al. |

(56) References Cited

U.S. PATENT DOCUMENTS

| | | |
|---|---|---|
| 2011/0260253 A1 | 10/2011 | Inaba |
| 2011/0298025 A1 | 12/2011 | Haensch et al. |
| 2012/0012932 A1 | 1/2012 | Perng et al. |
| 2012/0273841 A1 | 11/2012 | Quandt et al. |
| 2013/0097574 A1 | 4/2013 | Balabanov et al. |
| 2013/0200465 A1 | 8/2013 | Becker et al. |
| 2013/0200469 A1 | 8/2013 | Becker et al. |
| 2013/0207198 A1 | 8/2013 | Becker et al. |
| 2013/0207199 A1 | 8/2013 | Becker et al. |
| 2013/0254732 A1 | 9/2013 | Kornachuk et al. |

FOREIGN PATENT DOCUMENTS

| | | |
|---|---|---|
| EP | 1394858 | 3/2004 |
| EP | 1670062 | 6/2006 |
| EP | 1833091 | 8/2007 |
| EP | 1730777 | 9/2007 |
| EP | 2251901 | 11/2010 |
| FR | 2860920 | 4/2005 |
| JP | 58-182242 | 10/1983 |
| JP | 61-182244 | 8/1986 |
| JP | S63-310136 A | 12/1988 |
| JP | H01284115 | 11/1989 |
| JP | 03-165061 | 7/1991 |
| JP | H05211437 | 8/1993 |
| JP | H05218362 | 8/1993 |
| JP | H07-153927 A | 6/1995 |
| JP | 2684980 | 7/1995 |
| JP | 1995-302706 | 11/1995 |
| JP | 1997-09289251 A | 11/1997 |
| JP | 10-116911 | 5/1998 |
| JP | 1999-045948 | 2/1999 |
| JP | 2001-068558 | 3/2001 |
| JP | 2001-168707 | 6/2001 |
| JP | 2002-026125 | 1/2002 |
| JP | 2002-026296 A | 1/2002 |
| JP | 2002-184870 A | 6/2002 |
| JP | 2001-056463 | 9/2002 |
| JP | 2002-258463 | 9/2002 |
| JP | 2002-289703 | 10/2002 |
| JP | 2001-272228 | 3/2003 |
| JP | 2003-264231 | 9/2003 |
| JP | 2004-013920 | 1/2004 |
| JP | 2004-200300 | 7/2004 |
| JP | 2004-241529 | 8/2004 |
| JP | 2004-342757 A | 12/2004 |
| JP | 2005-020008 | 1/2005 |
| JP | 2003-359375 | 5/2005 |
| JP | 2005-135971 A | 5/2005 |
| JP | 2005-149265 | 6/2005 |
| JP | 2005-183793 | 7/2005 |
| JP | 2005-203447 | 7/2005 |
| JP | 2005-268610 | 9/2005 |
| JP | 2005-114752 | 10/2006 |
| JP | 2006-303022 A | 11/2006 |
| JP | 2007-013060 | 1/2007 |
| JP | 2007-043049 | 2/2007 |
| KR | 10-0417093 | 6/1997 |
| KR | 10-1998-087485 | 12/1998 |
| KR | 1998-0084215 A | 12/1998 |
| KR | 10-1999-0057943 A | 7/1999 |
| KR | 10-2000-0028830 A | 5/2000 |
| KR | 10-2002-0034313 | 5/2002 |
| KR | 10-2002-0070777 | 9/2002 |
| KR | 2003-0022006 | 3/2003 |
| KR | 10-2005-0030347 A | 3/2005 |
| KR | 2005-0037965 A | 4/2005 |
| KR | 2006-0108233 A | 10/2006 |
| TW | 386288 | 4/2000 |
| WO | WO 2005/104356 | 11/2005 |
| WO | WO 2006/014849 | 2/2006 |
| WO | WO 2006/052738 | 5/2006 |
| WO | WO 2007/014053 | 2/2007 |
| WO | WO 2007/103587 | 9/2007 |

OTHER PUBLICATIONS

U.S. Appl. No. 60/625,342, filed May 25, 2006, Pileggi et al.
Acar, et al., "A Linear-Centric Simulation Framework for Parametric Fluctuations", 2002, IEEE, Carnegie Mellon University USA, pp. 1-8, Jan. 28, 2002.
Amazawa, et al., "Fully Planarized Four-Level Interconnection with Stacked VLAS Using CMP of Selective CVD-A1 and Insulator and its Application to Quarter Micron Gate Array LSIs", 1995, IEEE, Japan, pp. 473-476, Dec. 10, 1995.
Axelrad et al. "Efficient Full-Chip Yield Analysis Methodology for OPC-Corrected VLSI Design", 2000, International Symposium on Quality Electronic Design (ISQED), Mar. 20, 2000.
Balasinski et al. "Impact of Subwavelength CD Tolerance on Device Performance", 2002, SPIE vol. 4692, Jul. 11, 2002.
Burkhardt, et al., "Dark Field Double Dipole Lithography (DDL) for Back-End-Of-Line Processes", 2007, SPIE Proceeding Series, vol. 6520; Mar. 26, 2007.
Capetti, et al., "Sub k1 = 0.25 Lithography with Double Patterning Technique for 45nm Technology Node Flash Memory Devices at λ = 193nm", 2007, SPEI Proceeding Series, vol. 6520; Mar. 27, 2007.
Capodieci, L., et al., "Toward a Methodology for Manufacturability-Driven Design Rule Exploration," DAC 2004, Jun. 7, 2004, San Diego, CA.
Chandra, et al., "An Interconnect Channel Design Methodology for High Performance Integrated Circuits", 2004, IEEE, Carnegie Mellon University, pp. 1-6, Feb. 16, 2004.
Cheng, et al., "Feasibility Study of Splitting Pitch Technology on 45nm Contact Patterning with 0.93 NA", 2007, SPIE Proceeding Series, vol. 6520; Feb. 25, 2007.
Chow, et al., "The Design of a SRAM-Based Field-Programmable Gate Array—Part II: Circuit Design and Layout", 1999, IEEE, vol. 7 # 3 pp. 321-330, Sep. 1, 1999.
Clark et al. "Managing Standby and Active Mode Leakage Power in Deep Sub-Micron Design", Aug. 9, 2004, ACM.
Cobb et al. "Using OPC to Optimize for Image Slope and Improve Process Window", 2003, SPIE vol. 5130, Apr. 16, 2003.
Devgan "Leakage Issues in IC Design: Part 3", 2003, ICCAD, Nov. 9, 2003.
DeVor, et al., "Statistical Quality Design and Control", 1992, Macmillan Publishing Company, pp. 264-267, Jan. 3, 1992.
Dictionary.com, "channel," in Collins English Dictionary—Complete & Unabridged 10th Edition. Source location: HarperCollins Publishers. Sep. 3, 2009.
Dusa, et al. "Pitch Doubling Through Dual Patterning Lithography Challenges in Integration and Litho Budgets", 2007, SPIE Proceeding Series, vol. 6520; Feb. 25, 2007.
El-Gamal, "Fast, Cheap and Under Control: The Next Implementation Fabric", Jun. 2, 2003, ACM Press, pp. 354-355.
Firedberg, et al., "Modeling Within-Field Gate Length Spatial Variation for Process-Design Co-Optimization," 2005 Proc. of SPIE vol. 5756, pp. 178-188, Feb. 27, 2005.
Frankel, "Quantum State Control Interference Lithography and Trim Double Patterning for 32-16nm Lithography", 2007, SPIE Proceeding Series, vol. 6520; Feb. 27, 2007.
Garg, et al. "Lithography Driven Layout Design", 2005, IEEE VLSI Design 2005, Jan. 3, 2005.
Grobman et al. "Reticle Enhancement Technology Trends: Resource and Manufacturability Implications for the Implementation of Physical Designs" Apr. 1, 2001, ACM.
Grobman et al. "Reticle Enhancement Technology: Implications and Challenges for Physical Design" Jun. 18, 2001, ACM.
Gupta et al. "Enhanced Resist and Etch CD Control by Design Perturbation", Oct. 4, 2006, Society of Photo-Optical Instrumentation Engineers.
Gupta et al. "A Practical Transistor-Level Dual Threshold Voltage Assignment Methodology", 2005, Sixth International Symposium on Quality Electronic Design (ISQED), Mar. 21, 2005.
Gupta et al. "Detailed Placement for Improved Depth of Focus and CD Control", 2005, ACM, Jan. 18, 2005.
Gupta et al. "Joining the Design and Mask Flows for Better and Cheaper Masks", Oct. 14, 2004, Society of Photo-Optical Instrumentation Engineers.

(56) References Cited

OTHER PUBLICATIONS

Gupta et al. "Manufacturing-Aware Physical Design", ICCAD 2003, Nov. 9, 2003.
Gupta et al. "Selective Gate-Length Biasing for Cost-Effective Runtime Leakage Control", Jun. 7, 2004, ACM.
Gupta et al. "Wafer Topography-Aware Optical Proximity Correction for Better DOF Margin and CD Control", Apr. 13, 2005, SPIE.
Gupta, Puneet, et al., "Manufacturing-aware Design Methodology for Assist Feature Correctness," SPIE vol. 5756, May 13, 2005.
Ha et al., "Reduction in the Mask Error Factor by Optimizing the Diffraction Order of a Scattering Bar in Lithography," Journal of the Korean Physical Society, vol. 46, No. 5, May 5, 2005, pp. 1213-1217.
Hakko, et al., "Extension of the 2D-TCC Technique to Optimize Mask Pattern Layouts," 2008 Proc. of SPIE vol. 7028, 11 pages, Apr. 16, 2008.
Halpin et al., "Detailed Placement with Net Length Constraints," Publication Year 2003, Proceedings of the 3rd IEEE International Workshop on System-on-Chip for Real-Time Applications, pp. 22-27, Jun. 30, 2003.
Hayashida, et al., "Manufacturable Local Interconnect technology Fully Compatible with Titanium Salicide Process", Jun. 11, 1991, VMIC Conference.
Heng, et al., "A VLSI Artwork Legalization Technique Base on a New Criterion of Minimum Layout Perturbation", Proceedings of 1997 International Symposium on Physical Design, pp. 116-121, Apr. 14, 1997.
Heng, et al., "Toward Through-Process Layout Quality Metrics", Mar. 3, 2005, Society of Photo-Optical Instrumentation Engineers.
Hu, et al., "Synthesis and Placement Flow for Gain-Based Programmable Regular Fabrics", Apr. 6, 2003, ACM Press, pp. 197-203.
Hur et al., "Mongrel: Hybrid Techniques for Standard Cell Placement," Publication Year 2000, IEEE/ACM International Conference on Computer Aided Design, ICCAD-2000, pp. 165-170, Nov. 5, 2000.
Hutton, et al., "A Methodology for FPGA to Structured-ASIC Synthesis and Verification", 2006, EDAA, pp. 64-69, Mar. 6, 2006.
Intel Core Microarchitecture White Paper "Introducing the 45 nm Next-Generation Intel Core Microarchitecture," Intel Corporation, 2007 (best available publication date).
Jayakumar, et al., "A Metal and VIA Maskset Programmable VLSI Design Methodology using PLAs", 2004, IEEE, pp. 590-594, Nov. 7, 2004.
Jhaveri, T. et al., Maximization of Layout Printability/Manufacturability by Extreme Layout Regularity, Proc. of the SPIE vol. 6156, Feb. 19, 2006.
Kang, S.M., Metal-Metal Matrix (M3) for High-Speed MOS VLSI Layout, IEEE Trans. on CAD, vol. CAD-6, No. 5, Sep. 1, 1987.
Kawashima, et al., "Mask Optimization for Arbitrary Patterns with 2D-TCC Resolution Enhancement Technique," 2008 Proc. of SPIE vol. 6924, 12 pages, Feb. 24, 2008.
Kheterpal, et al., "Design Methodology for IC Manufacturability Based on Regular Logic-Bricks", DAC, Jun. 13, 2005, IEEE/AMC, vol. 6520.
Kheterpal, et al., "Routing Architecture Exploration for Regular Fabrics", DAC, Jun. 7, 2004, ACM Press, pp. 204-207.
Kim, et al., "Double Exposure Using 193nm Negative Tone Photoresist", 2007, SPIE Proceeding Series, vol. 6520; Feb. 25, 2007.
Kim, et al., "Issues and Challenges of Double Patterning Lithography in DRAM", 2007, SPIE Proceeding Series, vol. 6520; Feb. 25, 2007.
Koorapaty, et al., "Exploring Logic Block Granularity for Regular Fabrics", 2004, IEEE, pp. 1-6, Feb. 16, 2004.
Koorapaty, et al., "Heterogeneous Logic Block Architectures for Via-Patterned Programmable Fabric", 13th International Conference on Field Programmable Logic and Applications (FPL) 2003, Lecture Notes in Computer Science (LNCS), Sep. 1, 2003, Springer-Verlag, vol. 2778, pp. 426-436.
Koorapaty, et al., "Modular, Fabric-Specific Synthesis for Programmable Architectures", 12th International Conference on Field Programmable Logic and Applications (FPL_2002, Lecture Notes in Computer Science (LNCS)), Sep. 2, 2002, Springer-Verlag, vol. 2438 pp. 132-141.
Kuh et al., "Recent Advances in VLSI Layout," Proceedings of the IEEE, vol. 78, Issue 2, pp. 237-263, Feb. 1, 1990.
Lavin et al. "Backend DAC Flows for "Restrictive Design Rules"", 2004, IEEE, Nov. 7, 2004.
Li, et al., "A Linear-Centric Modeling Approach to Harmonic Balance Analysis", 2002, IEEE, pp. 1-6, Mar. 4, 2002.
Li, et al., "Nonlinear Distortion Analysis Via Linear-Centric Models", 2003, IEEE, pp. 897-903, Jan. 21, 2003.
Liebmann et al., "Integrating DfM Components into a Cohesive Design-to-Silicon Solution," Proc. SPIE 5756, Design and Process Integration for Microelectronic Manufacturing III, Feb. 27, 2005.
Liebmann et al., "Optimizing Style Options for Sub-Resolution Assist Features," Proc. of SPIE vol. 4346, Feb. 25, 2001, pp. 141-152.
Liebmann, et al., "High-Performance Circuit Design for the RET-Enabled 65nm Technology Node", Feb. 26, 2004, SPIE Proceeding Series, vol. 5379 pp. 20-29.
Liebmann, L. W., Layout Impact of Resolution Enhancement Techniques: Impediment or Opportunity?, International Symposium on Physical Design, Apr. 6, 2003.
Liu et al., "Double Patterning with Multilayer Hard Mask Shrinkage for Sub 0.25 k1 Lithography," Proc. SPIE 6520, Optical Microlithography XX, Feb. 25, 2007.
Mansfield et al., "Lithographic Comparison of Assist Feature Design Strategies," Proc. of SPIE vol. 4000, Feb. 27, 2000, pp. 63-76.
Miller, "Manufacturing-Aware Design Helps Boost IC Yield", Sep. 9, 2004, http://www.eetimes.com/showArticle.jhtml?articleID=47102054.
Mishra, P., et al., "FinFET Circuit Design," Nanoelectronic Circuit Design, pp. 23-54, Dec. 21, 2010.
Mo, et al., "Checkerboard: A Regular Structure and its Synthesis, International Workshop on Logic and Synthesis", Department of Electrical Engineering and Computer Sciences, UC Berkeley, California, pp. 1-7, Jun. 1, 2003.
Mo, et al., "PLA-Based Regular Structures and Their Synthesis", Department of Electrical Engineering and Computer Sciences, IEEE, pp. 723-729, Jun. 1, 2003.
Mo, et al., "Regular Fabrics in Deep Sub-Micron Integrated-Circuit Design", Kluwer Academic Publishers, Entire Book, Jun. 1, 2002.
Moore, Samuel K., "Intel 45-nanometer Penryn Processors Arrive," Nov. 13, 2007, IEEE Spectrum, http://spectrum.ieee.org/semiconductors/design/intel-45nanometer-penryn-processors-arrive.
Mutoh et al. "1-V Power Supply High-Speed Digital Circuit Technology with Multithreshold-Voltage CMOS", 1995, IEEE, Aug. 1, 1995.
Op de Beek, et al., "Manufacturability issues with Double Patterning for 50nm half pitch damascene applications, using RELACS® shrink and corresponding OPC", 2007, SPIE Proceeding Series, vol. 6520; Feb. 25, 2007.
Or-Bach, "Programmable Circuit Fabrics", Sep. 18, 2001, e-ASIC, pp. 1-36.
Otten, et al., "Planning for Performance", DAC 1998, ACM Inc., pp. 122-127, Jun. 15, 1998.
Pack et al. "Physical & Timing Verification of Subwavelength-Scale Designs—Part I: Lithography Impact on MOSFETs", 2003, SPIE vol. 5042, Feb. 23, 2003.
Pandini, et al., "Congestion-Aware Logic Synthesis", 2002, IEEE, pp. 1-8, Mar. 4, 2002.
Pandini, et al., "Understanding and Addressing the Impact of Wiring Congestion During Technology Mapping", ISPD Apr. 7, 2002, ACM Press, pp. 131-136.
Patel, et al., "An Architectural Exploration of Via Patterned Gate Arrays, ISPD 2003", Apr. 6, 2003, pp. 184-189.
Pham, D., et al., "FINFET Device Junction Formation Challenges," 2006 International Workshop on Junction Technology, pp. 73-77, Aug. 1, 2006.
Pileggi, et al., "Exploring Regular Fabrics to Optimize the Performance-Cost Trade-Offs, Proceedings of the 40th ACM/IEEE Design Automation Conference (DAC) 2003", Jun. 2, 2003, ACM Press, pp. 782-787.

(56) References Cited

OTHER PUBLICATIONS

Poonawala, et al., "ILT for Double Exposure Lithography with Conventional and Novel Materials", 2007, SPIE Proceeding Series, vol. 6520; Feb. 25, 2007.
Qian et al. "Advanced Physical Models for Mask Data Verification and Impacts on Physical Layout Synthesis" 2003 IEEE, Mar. 24, 2003.
Ran, et al., "An Integrated Design Flow for a Via-Configurable Gate Array", 2004, IEEE, pp. 582-589, Nov. 7, 2004.
Ran, et al., "Designing a Via-Configurable Regular Fabric", Custom Integrated Circuits Conference (CICC). Proceedings of the IEEE, Oct. 1, 2004, pp. 423-426.
Ran, et al., "On Designing Via-Configurable Cell Blocks for Regular Fabrics" Proceedings of the Design Automation Conference (DAC) 2004, Jun. 7, 2004, ACM Press, s 198-203.
Ran, et al., "The Magic of a Via-Configurable Regular Fabric", Proceedings of the IEEE International Conference on Computer Design (ICCD) Oct. 11, 2004.
Ran, et al., "Via-Configurable Routing Architectures and Fast Design Mappability Estimation for Regular Fabrics", 2005, IEEE, pp. 25-32, Sep. 1, 2006.
Reis, et al., "Physical Design Methodologies for Performance Predictability and Manufacturability", Apr. 14, 2004, ACM Press, pp. 390-397.
Robertson, et al., "The Modeling of Double Patterning Lithographic Processes", 2007, SPIE Proceeding Series, vol. 6520; Feb. 25, 2007.
Rosenbluth, et al., "Optimum Mask and Source Patterns to Print a Given Shape," 2001 Proc. of SPIE vol. 4346, pp. 486-502, Feb. 25, 2001.
Rovner, "Design for Manufacturability in Via Programmable Gate Arrays", May 1, 2003, Graduate School of Carnegie Mellon University.
Sengupta, "An Integrated CAD Framework Linking VLSI Layout Editors and Process Simulators", 1998, Thesis for Rice University, pp. 1-101, Nov. 1, 1998.
Sengupta, et al., "An Integrated CAD Framework Linking VLSI Layout Editors and Process Simulators", 1996, SPIE Proceeding Series, vol. 2726; pp. 244-252, Mar. 10, 1996.
Sherlekar, "Design Considerations for Regular Fabrics", Apr. 18, 2004, ACM Press, pp. 97-102.
Shi et al., "Understanding the Forbidden Pitch and Assist Feature Placement," Proc. of SPIE vol. 4562, pp. 968-979, Mar. 11, 2002.
Smayling et al., "APF Pitch Halving for 22 nm Logic Cells Using Gridded Design Rules," Proceedings of SPIE, USA, vol. 6925, Jan. 1, 2008, pp. 69251E-1-69251E-7.
Socha, et al., "Simultaneous Source Mask Optimization (SMO)," 2005 Proc. of SPIE vol. 5853, pp. 180-193, Apr. 13, 2005.
Sreedhar et al. "Statistical Yield Modeling for Sub-Wavelength Lithography", 2008 IEEE, Oct. 28, 2008.
Stapper, "Modeling of Defects in Integrated Circuit Photolithographic Patterns", Jul. 1, 1984, IBM, vol. 28 # 4, pp. 461-475.
Taylor, et al., "Enabling Energy Efficiency in Via-Patterned Gate Array Devices", Jun. 7, 2004, ACM Press, pp. 874-877.
Tian et al. "Model-Based Dummy Feature Placement for Oxide Chemical_Mechanical Polishing Manufacturability" IEEE, vol. 20, Issue 7, Jul. 1, 2001.
Tong, et al., "Regular Logic Fabrics for a Via Patterned Gate Array (VPGA), Custom Integrated Circuits Conference", Sep. 21, 2003, Proceedings of the IEEE, pp. 53-56.
Vanleenhove, et al., "A Litho-Only Approach to Double Patterning", 2007, SPIE Proceeding Series, vol. 6520; Feb. 25, 2007.
Wang, et al., "Performance Optimization for Gridded-Layout Standard Cells", vol. 5567 SPIE, Sep. 13, 2004.
Wang, J. et al., Standard Cell Layout with Regular Contact Placement, IEEE Trans. on Semicon. Mfg., vol. 17, No. 3, Aug. 9, 2004.
Webb, Clair, "45nm Design for Manufacturing," Intel Technology Journal, vol. 12, Issue 02, Jun. 17, 2008, ISSN 1535-864X, pp. 121-130.
Webb, Clair, "Layout Rule Trends and Affect upon CPU Design", vol. 6156 SPIE, Feb. 19, 2006.
Wenren, et al., "The Improvement of Photolithographic Fidelity of Two-dimensional Structures Though Double Exposure Method", 2007, SPIE Proceeding Series, vol. 6520; Feb. 25, 2007.
Wilcox, et al., "Design for Manufacturability: A Key to Semiconductor Manufacturing Excellence", 1998 IEEE, pp. 308-313, Sep. 23, 1998.
Wong, et al., "Resolution Enhancement Techniques and Design for Manufacturability: Containing and Accounting for Variabilities in Integrated Circuit Creation," J. Micro/Nanolith. MEMS MOEMS, Sep. 27, 2007, vol. 6(3), 2 pages.
Wu, et al., "A Study of Process Window Capabilities for Two-dimensional Structures under Double Exposure Condition", 2007, SPIE Proceeding Series, vol. 6520; Feb. 25, 2007.
Xiong, et al., "The Constrained Via Minimization Problem for PCB and VLSI Design", 1988 ACM Press/IEEE, pp. 573-578, Jun. 12, 1998.
Yamamaoto, et al., "New Double Exposure Technique without Alternating Phase Shift Mask", SPIE Proceeding Series, vol. 6520; Feb. 25, 2007.
Yamazoe, et al., "Resolution Enhancement by Aerial Image Approximation with 2D-TCC," 2007 Proc. of SPIE vol. 6730, 12 pages, Sep. 17, 2007.
Yang, et al., "Interconnection Driven VLSI Module Placement Based on Quadratic Programming and Considering Congestion Using LFF Principles", 2004 IEEE, pp. 1243-1247, Jun. 27, 2004.
Yao, et al., "Multilevel Routing With Redundant Via Insertion", Oct. 23, 2006, IEEE, pp. 1148-1152.
Yu, et al., "True Process Variation Aware Optical Proximity Correction with Variational Lithography Modeling and Model Calibration," J. Micro/Nanolith. MEMS MOEMS, Sep. 11, 2007, vol. 6(3), 16 pages.
Zheng, et al. "Modeling and Analysis of Regular Symmetrically Structured Power/Ground Distribution Networks", DAC, Jun. 10, 2002, ACM Press, pp. 395-398.
Zhu, et al., "A Stochastic Integral Equation Method for Modeling the Rough Surface Effect on Interconnect Capacitance", 2004 IEEE, Nov. 7, 2004.
Zhu, et al., "A Study of Double Exposure Process Design with Balanced Performance Parameters for Line/Space Applications", 2007, SPIE Proceeding Series, vol. 6520; Feb. 25, 2007.
Zuchowski, et al., "A Hybrid ASIC and FPGA Architecture", 2003 IEEE, pp. 187-194, Nov. 10, 2002.
Alam, Syed M. et al., "A Comprehensive Layout Methodology and Layout-Specific Circuit Analyses for Three-Dimensional Integrated Circuits," Mar. 21, 2002.
Alam, Syed M. et al., "Layout-Specific Circuit Evaluation in 3-D Integrated Circuits," May 1, 2003.
Aubusson, Russel, "Wafer-Scale Integration of Semiconductor Memory," Apr. 1, 1979.
Bachtold, "Logic Circuits with Carbon," Nov. 9, 2001.
Baker, R. Jacob, "CMOS: Circuit Design, Layout, and Simulation (2nd Edition)," Nov. 1, 2004.
Baldi et al., "A Scalable Single Poly EEPROM Cell for Embedded Memory Applications," pp. 1-4, Fig. 1, Sep. 1, 1997.
Cao, Ke, "Design for Manufacturing (DFM) in Submicron VLSI Design," Aug. 1, 2007.
Capodieci, Luigi, "From Optical Proximity Correction to Lithography-Driven Physical Design (1996-2006): 10 years of Resolution Enhancement Technology and the roadmap enablers for the next decade," Proc. SPIE 6154, Optical Microlithography XIX, 615401, Mar. 20, 2006.
Chang, Leland et al., "Stable SRAM Cell Design for the 32 nm Node and Beyond," Jun. 16, 2005.
Cheung, Peter, "Layout Design," Apr. 4, 2004.
Chinnery, David, "Closing the Gap Between ASIC & Custom: Tools and Techniques for High-Performance ASIC Design," Jun. 30, 2002.
Chou, Dyiann et al., "Line End Optimization through Optical Proximity Correction (OPC): A Case Study," Feb. 19, 2006.
Clein, Dan, "CMOS IC Layout: Concepts, Methodologies, and Tools," Dec. 22, 1999.
Cowell, "Exploiting Non-Uniform Access Time," Jul. 1, 2003.
Das, Shamik, "Design Automation and Analysis of Three-Dimensional Integrated Circuits," May 1, 2004.

(56) References Cited

OTHER PUBLICATIONS

Dehaene, W. et al., "Technology-Aware Design of SRAM Memory Circuits," Mar. 1, 2007.
Deng, Liang et al., "Coupling-aware Dummy Metal Insertion for Lithography," p. 1, col. 2, Jan. 23, 2007.
Devoivre et al., "Validated 90nm CMOS Technology Platform with Low-k Copper Interconnects for Advanced System-on-Chip (SoC)," Jul. 12, 2002.
Enbody, R. J., "Near-Optimal n-Layer Channel Routing," Jun. 29, 1986.
Ferretti, Marcos et al., "High Performance Asynchronous ASIC Back-End Design Flow Using Single-Track Full-Buffer Standard Cells," Apr. 23, 2004.
Garg, Manish et al., "Litho-driven Layouts for Reducing Performance Variability," p. 2, Figs. 2b-2c, May 23, 2005.
Greenway, Robert et al., "32nm 1-D Regular Pitch SRAM Bitcell Design for Interference-Assisted Lithography," Oct. 6, 2008.
Gupta et al., "Modeling Edge Placement Error Distribution in Standard Cell Library," Feb. 23, 2006.
Grad, Johannes et al., "A standard cell library for student projects," Proceedings of the 2003 IEEE International Conference on Microelectronic Systems Education, Jun. 2, 2003.
Hartono, Roy et al., "Active Device Generation for Automatic Analog Layout Retargeting Tool," May 13, 2004.
Hartono, Roy et al., "IPRAIL—Intellectual Property Reuse-based Analog IC Layout Automation," Mar. 17, 2003.
Hastings, Alan, "The Art of Analog Layout (2nd Edition)," Jul. 4, 2005.
Hurat et al., "A Genuine Design Manufacturability Check for Designers," Feb. 19, 2006.
Institute of Microelectronic Systems, "Digital Subsystem Design," Oct. 13, 2006.
Ishida, M. et al., "A Novel 6T-SRAM Cell Technology Designed with Rectangular Patterns Scalable beyond 0.18 pm Generation and Desirable for Ultra High Speed Operation," IEDM 1998, Dec. 6, 1998.
Jakusovszky, "Linear IC Parasitic Element Simulation Methodology," Oct. 1, 1993.
Jangkrajarng, Nuttorn et al., "Template-Based Parasitic-Aware Optimization and Retargeting of Analog and RF Integrated Circuit Layouts," Nov. 5, 2006.
Kahng, Andrew B., "Design Optimizations DAC-2006 DFM Tutorial, part V)," Jul. 24, 2006.
Kang, Sung-Mo et al., "CMOS Digital Integrated Circuits Analysis & Design," Oct. 29, 2002.
Kottoor, Mathew Francis, "Development of a Standard Cell Library based on Deep Sub-Micron SCMOS Design Rules using Open Source Software (MS Thesis)," Aug. 1, 2005.
Kubicki, "Intel 65nm and Beyond (or Below): IDF Day 2 Coverage (available at http://www.anandtech.com/show/1468/4)," Sep. 9, 2004.
Kuhn, Kelin J., "Reducing Variation in Advanced Logic Technologies: Approaches to Process and Design for Manufacturability of Nanoscale CMOS," p. 27, Dec. 12, 2007.
Kurokawa, Atsushi et al., "Dummy Filling Methods for Reducing Interconnect Capacitance and Number of Fills, Proc. of ISQED," pp. 586-591, Mar. 21, 2005.
Lavin, Mark, "Open Access Requirements from RDR Design Flows," Nov. 11, 2004.
Liebmann, Lars et al., "Layout Methodology Impact of Resolution Enhancement Techniques," pp. 5-6, Apr. 6, 2003.
Liebmann, Lars et al., "TCAD development for lithography resolution enhancement," Sep. 1, 2001.
Lin, Chung-Wei et al., "Recent Research and Emerging Challenges in Physical Design for Manufacturability/Reliability," Jan. 26, 2007.
McCullen, Kevin W., "Layout Techniques for Phase Correct and Gridded Wiring," pp. 13, 17, Fig. 5, Dec. 1, 2006.
MOSIS, "Design Rules MOSIS Scalable CMOS (SCMOS) (Revision 8.00)," Oct. 4, 2004.
MOSIS, "MOSIS Scalable CMOS (SCMOS) Design Rules (Revision 7.2)," Jan. 1, 1995.
Muta et al., "Manufacturability-Aware Design of Standard Cells," pp. 2686-2690, Figs. 3, 12, Dec. 1, 2007.
Na, Kee-Yeol et al., "A Novel Single Polysilicon EEPROM Cell With a Polyfinger Capacitor," Nov. 30, 2007.
Pan et al., "Redundant Via Enhanced Maze Routing for Yield Improvement," DAC 2005, Jan. 18, 2005.
Park, Tae Hong, "Characterization and Modeling of Pattern Dependencies in Copper Interconnects for Integrated Circuits," Ph.D. Thesis, MIT, May 24, 2002.
Patel, Chetan, "An Architectural Exploration of Via Patterned Gate Arrays (CMU Master's Project)," May 1, 2003.
Pease, R. Fabian et al., "Lithography and Other Patterning Techniques for Future Electronics," IEEE 2008, vol. 96, Issue 2, Jan. 16, 2008.
Serrano, Diego Emilio, Pontificia Universidad Javeriana Facultad De Ingenieria, Departamento De Electronica, "Diseño De Multiplicador 4 x 8 en VLSI, Introduccion al VLSI," 2006 (best available publication date).
Pramanik, "Impact of layout on variability of devices for sub 90nm technologies," 2004 (best available publication date).
Pramanik, Dipankar et al., "Lithography-driven layout of logic cells for 65-nm node (SPIE Proceedings vol. 5042)," Jul. 10, 2003.
Roy et al., "Extending Aggressive Low-K1 Design Rule Requirements for 90 and 65 Nm Nodes Via Simultaneous Optimization of Numerical Aperture, Illumination and Optical Proximity Correction," J.Micro/Nanolith, MEMS MOEMS, 4(2), 023003, Apr. 26, 2005.
Saint, Christopher et al., "IC Layout Basics: A Practical Guide," Chapter 3, Nov. 5, 2001.
Saint, Christopher et al., "IC Mask Design: Essential Layout Techniques," May 24, 2002.
Scheffer, "Physical CAD Changes to Incorporate Design for Lithography and Manufacturability," Feb. 4, 2004.
Smayling, Michael C., "Part 3: Test Structures, Test Chips, In-Line Metrology & Inspection," Jul. 24, 2006.
Spence, Chris, "Full-Chip Lithography Simulation and Design Analysis: How OPC is changing IC Design, Emerging Lithographic Technologies IX," May 6, 2005.
Subramaniam, Anupama R., "Design Rule Optimization of Regular layout for Leakage Reduction in Nanoscale Design," pp. 474-478, Mar. 24, 2008.
Tang, C. W. et al., "A compact large signal model of LDMOS," Solid-State Electronics 46(2002) 2111-2115, May 17, 2002.
Taylor, Brian et al., "Exact Combinatorial Optimization Methods for Physical Design of Regular Logic Bricks," Jun. 8, 2007.
Tian, Ruiqi et al., "Dummy Feature Placement for Chemical-Mechanical Uniformity in a Shallow Trench Isolation Process," IEEE Trans. on Computer-Aided Design of Integrated Circuits and Systems, vol. 21, No. 1, pp. 63-71, Jan. 1, 2002.
Tian, Ruiqi et al., "Proximity Dummy Feature Placement and Selective Via Sizing for Process Uniformity in a Trench-First-Via-Last Dual-Inlaid Metal Process," Proc. of IITC, pp. 48-50, Jun. 6, 2001.
Torres, J. A. et al., "RET Compliant Cell Generation for sub-130nm Processes," SPIE vol. 4692, Mar. 6, 2002.
Uyemura, John P., "Introduction to VLSI Circuits and Systems," Chapters 2, 3, 5, and Part 3, Jul. 30, 2001.
Uyemura, John, "Chip Design for Submicron VLSI: CMOS Layout and Simulation," Chapters 2-5, 7-9, Feb. 8, 2005.
Verhaegen et al., "Litho Enhancements for 45nm-nod MuGFETs," Aug. 1, 2005.
Wong, Ban P., "Bridging the Gap between Dreams and Nano-Scale Reality (DAC-2006 DFM Tutorial)," Jul. 28, 2006.
Wang, Dunwei et al., "Complementary Symmetry Silicon Nanowire Logic: Power-Efficient Inverters with Gain," Aug. 17, 2006.
Wang, Jun et al., "Effects of grid-placed contacts on circuit performance," pp. 135-139, Figs. 2, 4-8, Feb. 28, 2003.
Wang, Jun et al., "Standard cell design with regularly placed contacts and gates (SPIE vol. 5379)," Feb. 22, 2004.
Wang, Jun et al., "Standard cell design with resolution-enhancement-technique-driven regularly placed contacts and gates," J. Micro/Nanolith, MEMS MOEMS, 4(1), 013001, Mar. 16, 2005.
Watson, Bruce, "Challenges and Automata Applications in Chip-Design Software," pp. 38-40, Jul. 16, 2007.

(56) References Cited

OTHER PUBLICATIONS

Weste, Neil et al., "CMOS VLSI Design: A Circuits and Systems Perspective, 3rd Edition," May 21, 2004.
Wingerden, Johannes van, "Experimental verification of improved printability for litho-driven designs," Mar. 14, 2005.
Wong, Alfred K., "Microlithography: Trends, Challenges, Solutions,, and Their Impact on Design," Micro IEEE vol. 23, Issue 2, Apr. 29, 2003.
Xu, Gang, "Redundant-Via Enhanced Maze Routing for Yield Improvement," Proceedings of ASP-DAC 2005, Jan. 18, 2005.
Yang, Jie, "Manufacturability Aware Design," pp. 93, 102, Fig. 5.2, Jan. 16, 2008.
Yongshun, Wang et al., "Static Induction Devices with Planar Type Buried Gate," Chinese Journal of Semiconductors, vol. 25, No. 2, Feb. 1, 2004.
Zobrist, George (editor), "Progress in Computer Aided VLSI Design: Implementations (Ch. 5)," Ablex Publishing Corporation, Feb. 1, 1990.
Petley, Graham, "VLSI and ASIC Technology Standard Cell Library Design," from website www.vlsitechnology.org, Jan. 11, 2005.
Liebmann, Lars, et al., "Layout Optimization at the Pinnacle of Optical Lithography," Design and Process Integration for Microelectronic Manufacturing II, Proceedings of SPIE vol. 5042, Jul. 8, 2003.

\* cited by examiner

View A-A

View A-A (NAND Circuit)

(NOR Circuit)

(NOR Configuration)

- - - - Cell Abutment Edge

CIRCUITS WITH LINEAR FINFET STRUCTURES

CLAIM OF PRIORITY

This application claims priority under 35 U.S.C. 119(e) to U.S. Provisional Patent Application No. 61/586,387, filed Jan. 13, 2012, entitled "Circuits with Linear Finfet Structures," the disclosure of which is incorporated herein by reference in its entirety.

This application also claims priority under 35 U.S.C. 119 (e) to U.S. Provisional Patent Application No. 61/589,224, filed Jan. 20, 2012, entitled "Circuits with Linear Finfet Structures," the disclosure of which is incorporated herein by reference in its entirety.

This application is also a continuation-in-part application under 35 U.S.C. 120 of prior U.S. Application No. 12/775,429, filed May 6, 2010, which claims priority under 35 U.S.C. 119(e) to U.S. Provisional Patent Application No. 61/176,058, filed May 6, 2009. Each of the above-identified applications is incorporated herein by reference in its entirety.

CROSS-REFERENCE TO RELATED APPLICATIONS

This application is related to U.S. application Ser. No. 12/572,225, filed Oct. 1, 2009, which is a continuation application under 35 U.S.C. 120 of prior U.S. application Ser. No. 12/212,562, filed Sep. 17, 2008, issued as U.S. Pat. No. 7,842,975, which is a continuation application under 35 U.S.C. 120 of prior U.S. application Ser. No. 11/683,402, filed Mar. 7, 2007, issued as U.S. Pat. No. 7,446,352, which claims priority under 35 U.S.C. 119(e) to U.S. Provisional Patent Application No. 60/781,288, filed Mar. 9, 2006. Each of the above-identified applications is incorporated herein by reference in its entirety.

This application is also related to U.S. application Ser. No. 13/073,994, filed Mar. 28, 2011, which is a continuation application under 35 U.S.C. 120 of prior U.S. application Ser. No. 12/013,342, filed Jan. 11, 2008, issued as U.S. Pat. No. 7,917,879, which claims priority under 35 U.S.C. 119(e) to each of 1) U.S. Provisional Patent Application No. 60/963,364, filed Aug. 2, 2007, and 2) U.S. Provisional Patent Application No. 60/972,394, filed Sep. 14, 2007. Each of the above-identified applications is incorporated herein by reference in its entirety.

This application is also related to U.S. application Ser. No. 12/753,793, filed Apr. 2, 2010, which is a continuation application under 35 U.S.C. 120 of prior U.S. application Ser. No. 12/402,465, filed Mar. 11, 2009, issued as U.S. Pat. No. 7,956,421, which claims priority under 35 U.S.C. 119(e) to each of 1) U.S. Provisional Patent Application No. 61/036,460, filed Mar. 13, 2008, and 2) U.S. Provisional Patent Application No. 61/042,709, filed Apr. 4, 2008, and 3) U.S. Provisional Patent Application No. 61/045,953, filed Apr. 17, 2008, and 4) U.S. Provisional Patent Application No. 61/050,136, filed May 2, 2008. Each of the above-identified applications is incorporated herein by reference in its entirety.

This application is also related to U.S. application Ser. No. 13/189,433, filed July 22, 2011, which is a continuation application under 35 U.S.C. 120 of prior U.S. application Ser. No. 12/814,411, filed Jun. 11, 2010, issued as U.S. Pat. No. 7,994,545, which is a divisional application under 35 U.S.C. 121 of prior U.S. application Ser. No. 11/969,854, filed Jan. 4, 2008, issued as U.S. Pat. No. 7,763,534, which claims priority under 35 U.S.C. 119(e) to U.S. Provisional Patent Application No. 60/983,091, filed Oct. 26, 2007. Each of the above-identified applications is incorporated herein by reference in its entirety.

This application is also related to U.S. application Ser. No. 11/956,305, filed Dec. 13, 2007, the disclosure of which is incorporated herein by reference in its entirety.

This application is also related to U.S. application Ser. No. 13/540,529, filed Jul. 2, 2012, which is a continuation application under 35 U.S.C. 120 of prior U.S. application Ser. No. 12/497,052, filed Jul. 2, 2009, issued as U.S. Pat. No. 8,214,778, which claims priority: 1) under 35 U.S.C. 119(e) to U.S. Provisional Patent Application No. 61/081,370, filed Jul. 16, 2008, and 2) as a continuation-in-part application under 35 U.S.C. 120 to U.S. application Ser. No. 12/013,342, filed Jan. 11, 2008, issued as U.S. Pat. No. 7,917,879, which claims priority under 35 U.S.C. 119(e) both U.S. Provisional Patent Application No. 60/963,364, filed Aug. 2, 2007, and U.S. Provisional Patent Application No. 60/972,394, filed Sep. 14, 2007. Each of the above-identified applications is incorporated herein by reference in its entirety.

BACKGROUND

It is known that optical lithography has reached the end of its capability at the 193 nm light wavelength and 1.35 numerical aperture (NA) immersion system. The minimum straight line resolution capability of this equipment is approximately 40 nm with an approximate 80 nm feature-to-feature pitch. A feature-to-feature pitch requirement lower than about 80 nm would require multiple patterning steps for a given structure type within a given chip level. Also, line end resolution becomes more challenging as lithography is pushed toward its resolution limits. In semiconductor device layout, a typical metal line pitch at the 32 nm critical dimension is approximately 100 nm. In order to achieve the cost benefit of feature scaling, a scaling factor of 0.7 to 0.75 is desirable. The scaling factor of about 0.75 to reach the 22 nm critical dimension would require a metal line pitch of about 75 nm, which is below the capability of current single exposure lithography systems and technology. It is within this context that the present invention arises.

SUMMARY

In one embodiment, a semiconductor device includes a substrate, a first transistor, and a second transistor. The first transistor has a source region and a drain region within a first diffusion fin. The first diffusion fin is structured to project from a surface of the substrate. The first diffusion fin is structured to extend lengthwise in a first direction from a first end of the first diffusion fin to a second end of the first diffusion fin. The second transistor has a source region and a drain region within a second diffusion fin. The second diffusion fin is structured to project from the surface of the substrate. The second diffusion fin is structured to extend lengthwise in the first direction from a first end of the second diffusion fin to a second end of the second diffusion fin. The second diffusion fin is positioned next to and spaced apart from the first diffusion fin. Also, either the first end or the second end of the second diffusion fin is positioned in the first direction between the first end and the second end of the first diffusion fin.

In one embodiment, a method of fabricating a semiconductor device is disclosed. The method includes providing a substrate. The method also includes forming a first transistor on the substrate, such that the first transistor has a source region and a drain region within a first diffusion fin, and such that the first diffusion fin is formed to project from a surface of the substrate, and such that the first diffusion fin is formed to extend lengthwise in a first direction from a first end of the first diffusion fin to a second end of the first diffusion fin. The method also includes forming a second transistor on the substrate, such that the second transistor has a source region and a drain region within a second diffusion fin, and such that the second diffusion fin is formed to project from the surface of the substrate, and such that the second diffusion fin is formed to extend lengthwise in the first direction from a first end of the second diffusion fin to a second end of the second diffusion fin, and such that the second diffusion fin is formed at a position next to and spaced apart from the first diffusion fin. Also, the first and second transistors are formed such that either the first end or the second end of the second diffusion fin is formed at a position in the first direction between the first end and the second end of the first diffusion fin.

In one embodiment, a data storage device has computer executable program instructions stored thereon for rendering a layout of a semiconductor device. The data storage device includes computer program instructions for defining a first transistor to be formed on a substrate, such that the first transistor is defined to have a source region and a drain region within a first diffusion fin, and such that the first diffusion fin is defined to project from a surface of the substrate, and such that the first diffusion fin is defined to extend lengthwise in a first direction from a first end of the first diffusion fin to a second end of the first diffusion fin. The data storage device also includes computer program instructions for defining a second transistor to be formed on the substrate, such that the second transistor is defined to have a source region and a drain region within a second diffusion fin, and such that the second diffusion fin is defined to project from the surface of the substrate, and such that the second diffusion fin is defined to extend lengthwise in the first direction from a first end of the second diffusion fin to a second end of the second diffusion fin, and such that the second diffusion fin is defined to be positioned next to and spaced apart from the first diffusion fin, and such that the second diffusion fin is defined to have either its first end or its second end positioned in the first direction between the first end and the second end of the first diffusion fin.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention. Additionally, it should be understood that the various circuit and/or layout features depicted in a given figure presented herein can be utilized in combination with other circuit and/or layout features depicted in other figures presented herein.

Figure 1A:
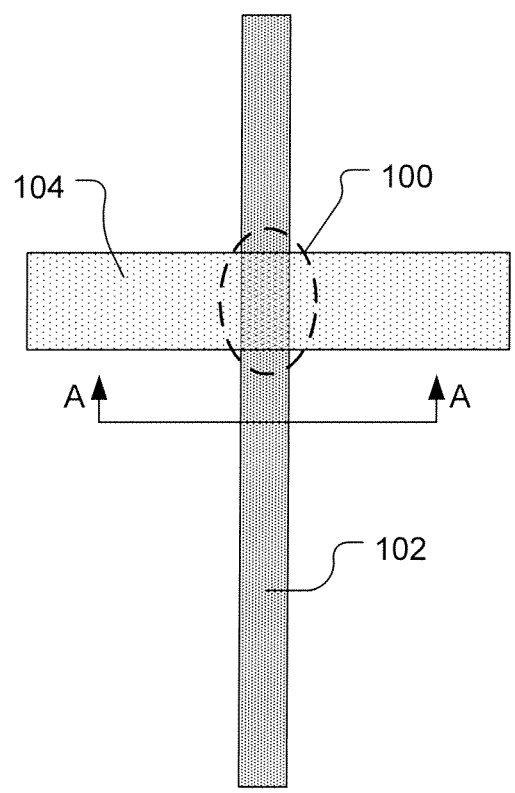
FIGS. 1A and 1B show an example layout view of a finfet transistor, in accordance with some embodiments of the present invention.
Figure 1B:
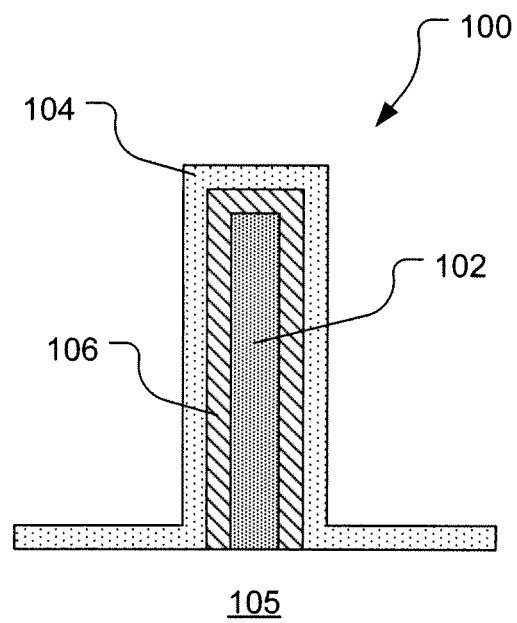

A "finfet" is a transistor constructed from a vertical silicon island, i.e., fin. The finfet transistor can also be referred to as a tri-gate transistor. The term "finfet" transistor as used herein refers to any transistor configuration that includes a diffusion structure that projects upward from an underlying substrate. FIGS. 1A and 1B show an example layout view of a finfet transistor 100, in accordance with some embodiments of the present invention. The finfet transistor 100 is constructed from a diffusion fin 102 and a gate electrode layer 104. The diffusion fin 102 projects vertically upward from a substrate 105, as shown in FIG. 1B. A gate oxide layer 106 is disposed between the diffusion fin 102 and the gate electrode layer 104. The diffusion fin 102 can be doped to form either a p-type transistor or an n-type transistor. The portion of the gate electrode layer 104 that covers the diffusion fin 102 forms the gate electrode of the finfet transistor 100. Therefore, the gate electrode of the finfet transistor 100 can exist on three or more sides of the diffusion fin 102, thereby providing for control of the finfet transistor channel from three or more sides, as opposed to from one side as in a non-finfet transistor. Also, in some embodiments, the finfet transistor is formed as a "wrap-around" transistor in which the gate oxide layer 106 and the gate electrode layer 104 also extend beneath the diffusion fin 102.

It should be understood that the example finfet transistor 100 depicted in FIGS. 1A and 1B is provided by way of example and does not represent any limitation on the manner in which a finfet transistor, as referenced herein, may be designed and/or fabricated. Specifically, in some embodiments, the diffusion fin (e.g., 102) can be formed as a layering of different materials, including but not limited to Si (silicon), SiGe (silicon germanium), Ge (germanium), InP (indium phosphide), CNT (carbon nanotube), SiNT (silicon nanotube), or any combination thereof, among others. The gate oxide layer 106 can be formed from many different types of dielectric materials. For example, in some embodiments, the gate oxide layer 106 may be formed as a layer of hafnium oxide on a layer of silicon dioxide. In other embodiments, the gate oxide layer 106 can be formed by one or more other dielectric materials. In some embodiments, the gate electrode layer 104 can be formed by any number of electrically conductive materials. For example, in some embodiments, the gate electrode layer 104 can be formed as a film of TiN (titanium nitride) or TaN (tantalum nitride) covered by polysilicon. It should be understood, however, that in other embodiments the gate electrode layer 104 can be formed by other materials.

Figure 1C:
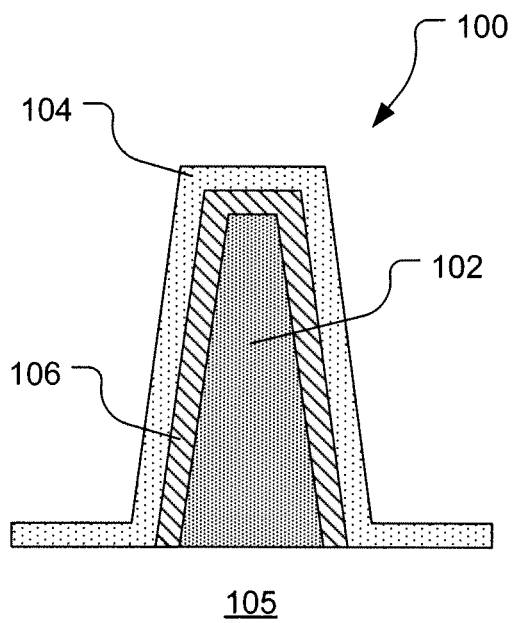
FIG. 1C shows a variation of the finfet transistor of FIGS. 1A/1B in which the diffusion fin 102 is more pyramid-shaped in the vertical cross-section view A-A, in accordance with some embodiments of the present invention.

Also, while the example diffusion fin 102 of FIG. 1B is shown as having a substantially vertically projecting rectangular structure relative to the substrate 105 in the vertical cross-section view A-A, it should be understood that diffusion fins 102 in as "as-fabricated" state on a semiconductor chip may or may not have the substantially vertically projecting rectangular structure relative to the substrate 105. For example, in some embodiments, the diffusion fins 102 in their "as-fabricated" state may have a more triangular or pyramid-like shape in the vertical cross-section view A-A. FIG. 1C shows a variation of the finfet transistor 100 in which the diffusion fin 102 is more pyramid-shaped in the vertical cross-section view A-A. As depicted in FIG. 1C, in some embodiments, the sides of the diffusion fins 102 that extend upward from the substrate 105 may extend upward from the substrate at an angle to the substrate 105, so as to be non-perpendicular to the substrate 105. Also, it should be understood that such a non-perpendicular relationship between the substrate 105 and the sides of the diffusion fins 102 that extend upward from the substrate 105 may be by design or may be a result of fabrication.

Additionally, in some embodiments, a vertical projection distance of the diffusion fins 102 above the substrate 105 will be substantially equal across a region of the semiconductor chip. However, in other embodiments, some diffusion fins 102 may be designed and fabricated to have multiple different vertical projection distances above the substrate 105 across one or more regions of the semiconductor chip. Because the channel area of the finfet transistor 100 is a function of the diffusion fin 102 vertical projection distance above the substrate 105, such a variation in diffusion fin 102 vertical projection distance above the substrate 105 can be used to adjust a drive strength of selected finfet transistors 100 relative to others on the semiconductor chip. In one example, selective variation in diffusion fin 102 height can be provided through selective etching/overetching of the diffusion fin 102 structures during fabrication.

Figure 1D:
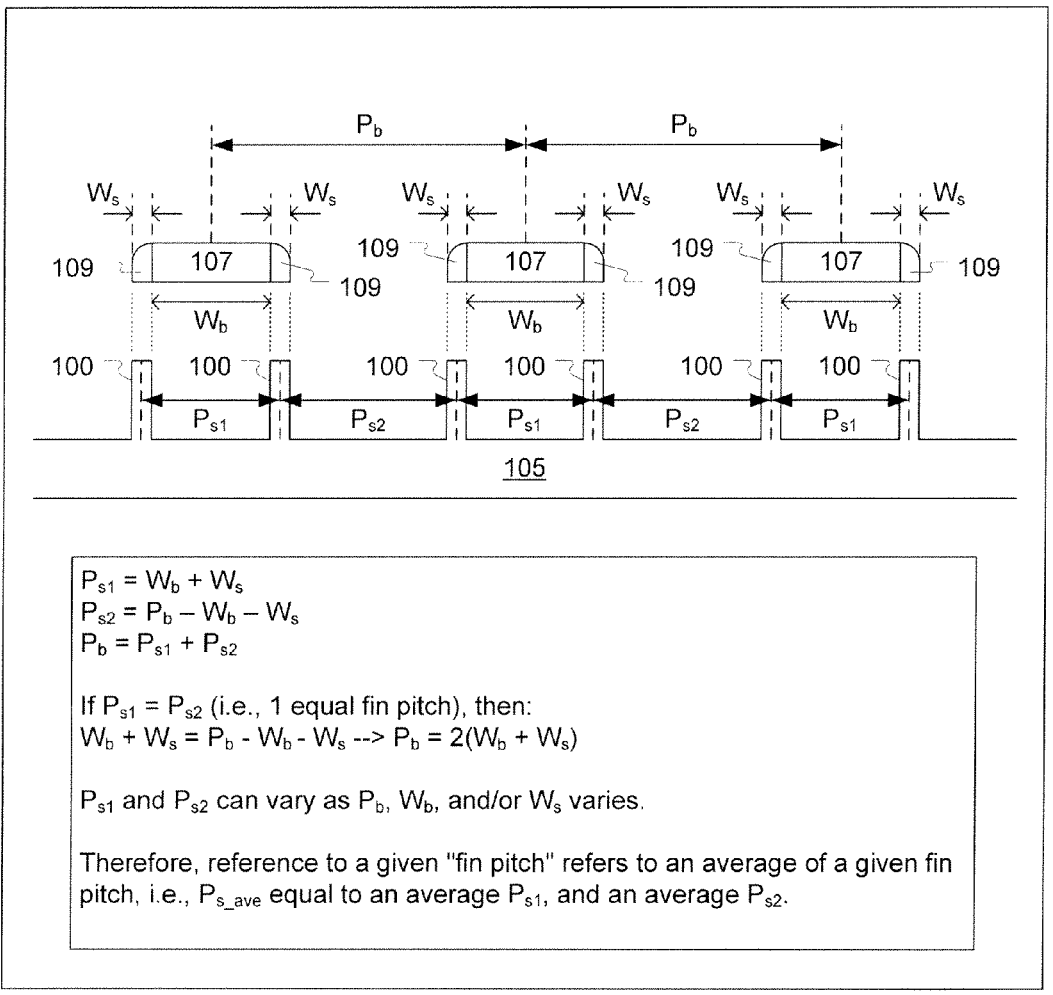
FIG. 1D shows a simplified vertical cross-section view of the substrate having a number of finfet transistors formed thereon, in accordance with some embodiments of the present invention.

FIG. 1D shows a simplified vertical cross-section view of the substrate 105 having a number of finfet transistors 100 formed thereon, in accordance with some embodiments of the present invention. During fabrication of the finfet transistors 100, a series of cores 107 are formed to facilitate formation of side spacers 109 for each of the cores 107. The side spacers 109 are utilized as masking features to facilitate formation of the underlying finfet transistors 100. It should be understood that the cores 107, the side spacers 109, and the finfet transistors 100 extend lengthwise in a parallel manner, i.e., into the page as shown in FIG. 1D. It should be understood that the cores 107 and side spacers 109 are ultimately removed so as not to be present in the final as-fabricated semiconductor chip/device. The relative spacing of the finfet transistors 100 to each other is a function of the sizes and spacings of the cores 107 and side spacers 109.

FIG. 1D shows the cores 107 as having a width Wb and a pitch Pb. Also, FIG. 1D shows the side spacers 109 as having a width Ws. The finfet transistors 100 can then be characterized as having an alternating pair of fin pitches Ps1, Ps2, where Ps1 is an average centerline-to-centerline pitch between side spacers 109 of a given core 107 (Ps1 is referred to as an internal fin pitch), and where Ps2 is an average centerline-to-centerline pitch between neighboring side spacers 109 of a adjacently positioned cores 107 (Ps2 is referred to as an external fin pitch). Assuming uniformity in each of the core 107 width Wb, the core 107 pitch Pb, and the side spacer 109 width Ws, the internal fin pitch Ps1 is equal to the sum of the core 107 width Wb and side spacer 109 width Ws. And, the external fin pitch Ps2 is equal to the core 107 pitch Pb minus the sum of the core 107 width Wb and side spacer 109 width Ws. Therefore, both the internal fin pitch Ps1 and the external fin pitch Ps2 will vary as each of the core 107 pitch Pb, core 107 width Wb, and/or side spacer 109 width Ws varies. Thus, it should be understood that reference to a given "fin pitch" refers to an average of a given fin pitch, i.e., fin pitch Ps_ave is equal to an average of the internal fin pitch Ps1 and the external fin pitch Ps2, where each of the internal fin pitch Ps1 and the external fin pitch Ps2 are themselves averages.

Figure 1E:
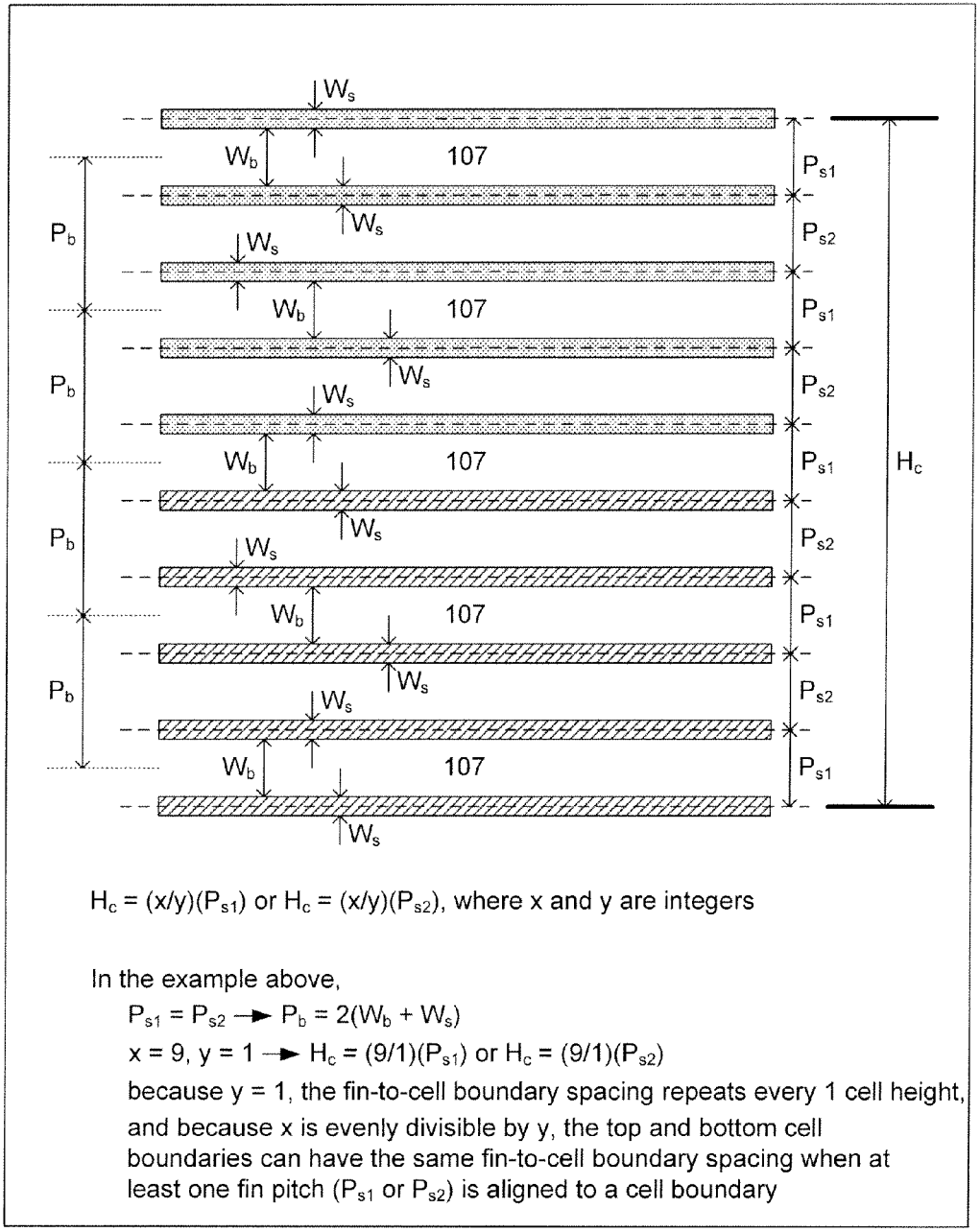
FIG. 1E shows a diagram of fin pitch relationship in which the internal fin pitch Ps1 is substantially equal to the external fin pitch Ps2, in accordance with some embodiments of the present invention.

FIG. 1E shows a diagram of fin pitch relationship in which the internal fin pitch Ps1 is substantially equal to the external fin pitch Ps2, in accordance with some embodiments of the present invention. A cell height Hc is equal to the average fin pitch multiplied by a rational number, i.e., multiplied by a ratio of integers x and y, where x is the numerator of the rational number and y is the denominator of the rational number. In the case of FIG. 1E where the internal fin pitch Ps1 and external fin pitch Ps2 are equal, the average fin pitch is equal to each of Ps1 and Ps2. Therefore, the cell height Hc is equal to either the internal fin pitch Ps1 or the external fin pitch Ps2 multiplied by the rational number. It should be understood that the denominator (y) of the rational number indicates a number of cells required to obtain a repetition of a fin-to-cell boundary spacing when the number of cells are positioned in an abutting manner in the direction of the cell height Hc, i.e., in the direction perpendicular to the lengthwise direction of the fins. Also, when the numerator (x) of the rational number is evenly divisible by the denominator (y) of the rational number, the top and bottom cell boundaries can have the same fin-to-cell boundary spacing when the internal fin pitch Ps1. and/or the external fin pitch Ps2 is aligned with (indexed to) the cell boundary.

Figure 1F:
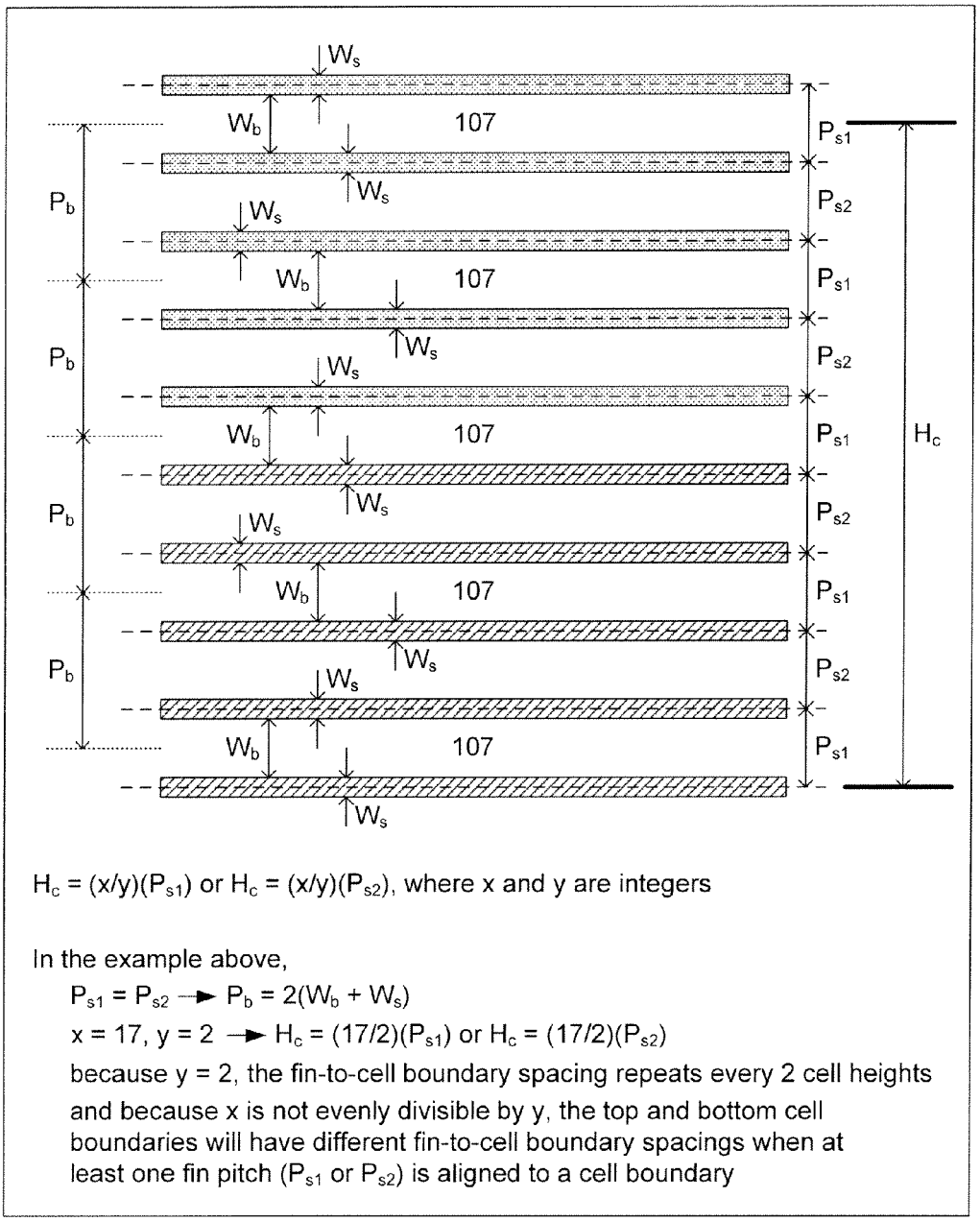
FIG. 1F shows a variation of the fin pitch relationship diagram of FIG. 1E in which the denominator (y) of the rational number is two, in accordance with some embodiments of the present invention.

FIG. 1F shows a variation of the fin pitch relationship diagram of FIG. 1E in which the denominator (y) of the rational number is two, in accordance with some embodiments of the present invention. Therefore, in FIG. 1F the fin-to-cell boundary spacing will repeat every two cell heights Hc. Also, in the example of FIG. 1F, the numerator (x) of the rational number is not evenly divisible by the denominator (y) of the rational number. Therefore, the top and bottom fin-to-cell boundary spacings will be different when the internal fin pitch Ps1 and/or the external fin pitch Ps2 is aligned with (indexed to) the cell boundary.

Figure 1G:
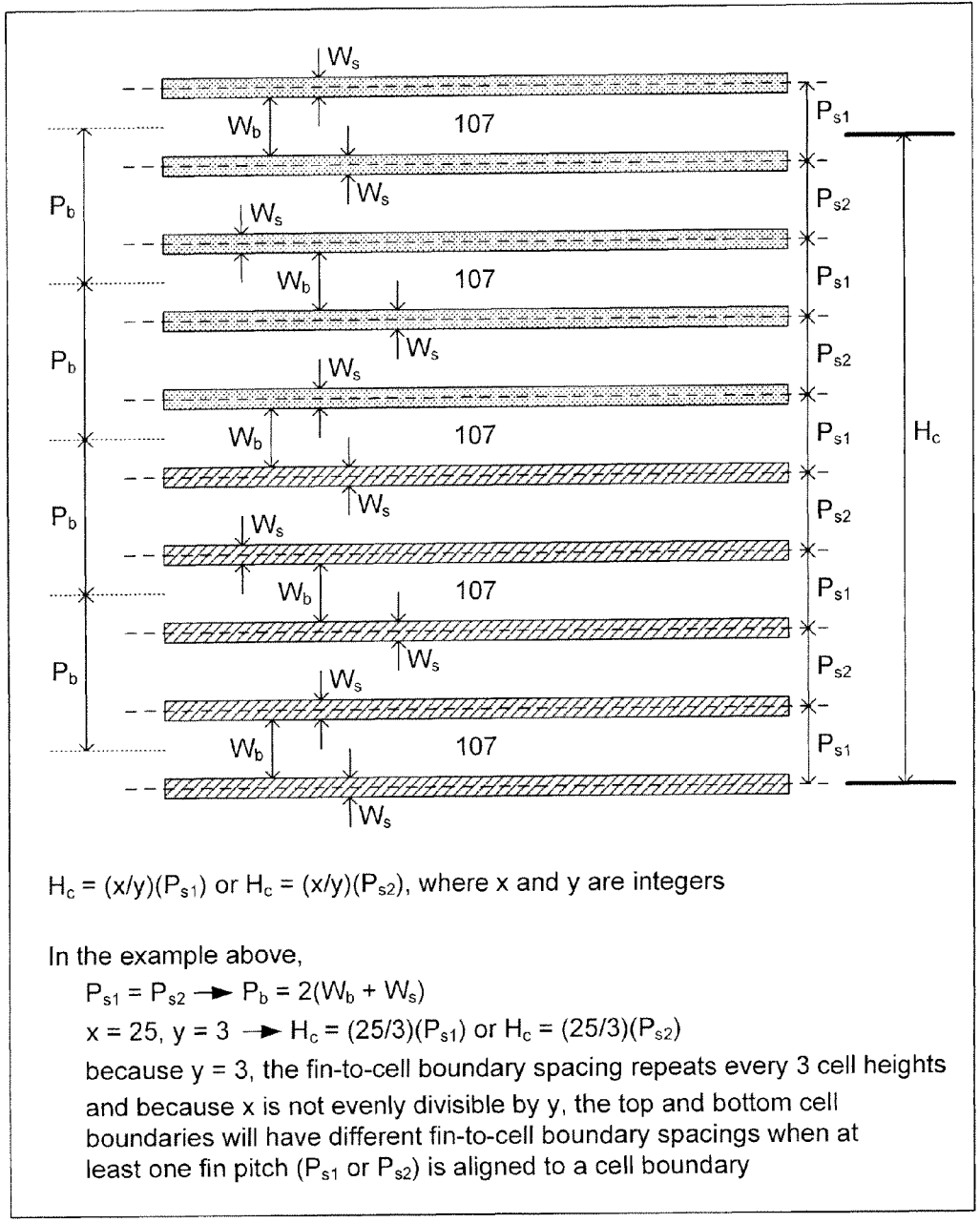
FIG. 1G shows a variation of the fin pitch relationship diagram of FIG. 1E in which the denominator (y) of the rational number is three, in accordance with some embodiments of the present invention.

FIG. 1G shows a variation of the fin pitch relationship diagram of FIG. 1E in which the denominator (y) of the rational number is three, in accordance with some embodiments of the present invention. Therefore, in FIG. 1G the fin-to-cell boundary spacing will repeat every three cell heights He. Also, in the example of FIG. 1G, the numerator (x) of the rational number is not evenly divisible by the denominator (y) of the rational number. Therefore, the top and bottom fin-to-cell boundary spacings will be different when the internal fin pitch Ps1 and/or the external fin pitch Ps2 is aligned with (indexed to) the cell boundary. It should be appreciated that the rational number can be defined in any manner necessary to obtain any desired fin-to-cell boundary spacing repetition frequency in the direction of the cell height He and/or any desired fin-to-cell boundary spacing specification.

Figure 1H:
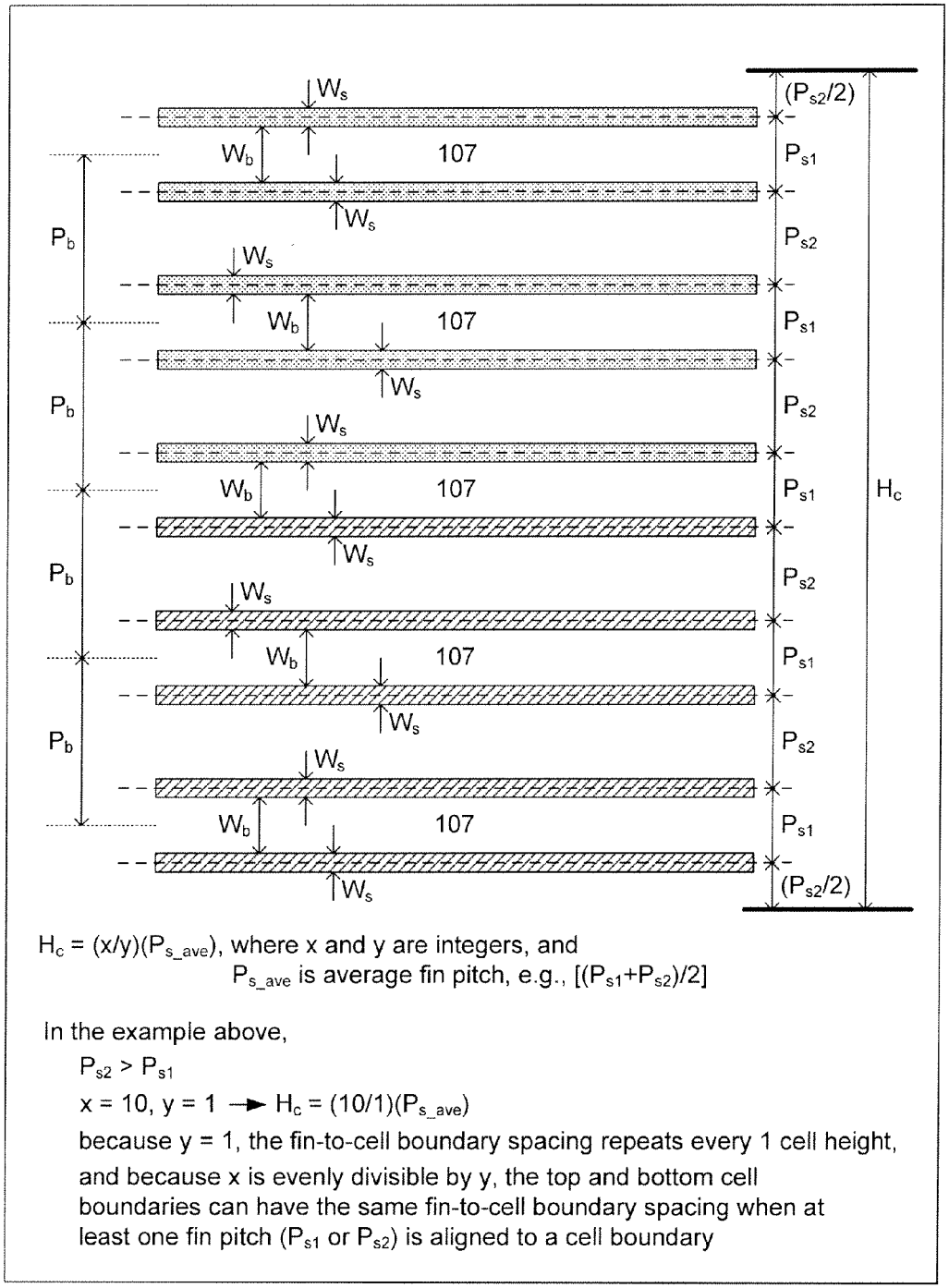
FIG. 1H shows a more generalized version of the fin pitch relationship diagram of FIG. 1E in which the internal fin pitch Ps1 and external fin pitch Ps2 are different, in accordance with some embodiments of the present invention.

FIG. 1H shows a more generalized version of the fin pitch relationship diagram of FIG. 1E in which the internal fin pitch Ps1 and external fin pitch Ps2 are different, in accordance with some embodiments of the present invention. In this example, the external fin pitch Ps2 is greater than the internal fin pitch Ps1. It should be understood that the cell height He is equal to the average fin pitch Ps_ave multiplied by the rational number (x/y), where x and y are integers. Also, it should be understood that the integer y indicates the fin-to-cell boundary spacing repetition frequency in the direction of the cell height Hc. Also, it should be understood that the top and bottom fin-to-cell boundary spacings can be equal to each other when the rational number (x/y) reduces to an integer value, i.e., when x is evenly divisible by y. If the rational number (x/y) does not reduce to an integer value, different fin phasing variations of a given cell may be defined in a cell library, where each fin phasing variation corresponds to a different possible fin-to-cell boundary spacing relationship for the given cell. Also, the number of possible fin phasing variations for a given cell will be equal to the denominator (y) of the rational number (x/y) in its most mathematically reduced form.

As discussed above, FIG. 1H shows use of two different diffusion fin pitches Ps1 and Ps2, in accordance with some embodiments of the present invention. More specifically, in FIG. 1H every other pair of adjacently positioned diffusion fin structures is placed according to a smaller pitch Ps1. In some embodiments, the larger diffusion fin pitch Ps2 is about 80 nanometers (nm) and the smaller diffusion fin pitch Ps1 is about 60 nm. However, it should be understood that in other embodiments, the smaller diffusion fin pitch Ps1 can be any size, and the larger diffusion fin pitch Ps2 can be any size. It should be understood that some embodiments can utilize more than two diffusion fin pitches within a given cell or block. And, some embodiments may utilize a single diffusion fin pitch within a given cell or block. Also, it should be understood that any layer of the semiconductor device, or portion thereof, can be formed in a manner similar to that described herein with regard to the diffusion fin pitch(es). For example, a local interconnect layer or a higher-level interconnect layer of the semiconductor device, or portion thereof, can include interconnect conductive structures formed on one or more corresponding pitch(es) in a manner similar to that described herein with regard to the diffusion fin pitch(es).

Transistor scaling has slowed below the 45 nanometers (nm) critical dimension due to gate oxide limitations and/or source/drain leakage scaling issues. The finfet transistor mitigates these issues by controlling the channel of the finfet transistor from three sides. The increased electrical fields in the channel of the finfet transistor improve the relationship between I-on (on drive current) and I-off (sub-threshold leakage current).

Finfet transistors can be employed at the 22 nm critical dimension and below. However, due to their vertical projection, finfet transistors can have restricted placement in various circuit layouts. For instance, there can be a required finfet-to-finfet minimum spacing and/or a required finfet-to-finfet minimum pitch, among other restrictions. Embodiments are disclosed herein for cell layouts that utilize finfet transistors in a manner which complements layout scaling.

A cell, as referenced herein, represents an abstraction of a logic function, and encapsulates lower-level integrated circuit layouts for implementing the logic function. It should be understood that a given logic function can be represented by multiple cell variations, wherein the cell variations may be differentiated by feature size, performance, and process compensation technique (PCT) processing. For example, multiple cell variations for a given logic function may be differentiated by power consumption, signal timing, current leakage, chip area, OPC (optical proximity correction), RET (reticle enhancement technology), etc. It should also be understood that each cell description includes the layouts for the cell in each level (or layer) of a chip within the associated vertical column of the chip, as required to implement the logic function of the cell. More specifically, a cell description includes layouts for the cell in each level of the chip extending from the substrate level up through a particular interconnect level.

Figure 2A:
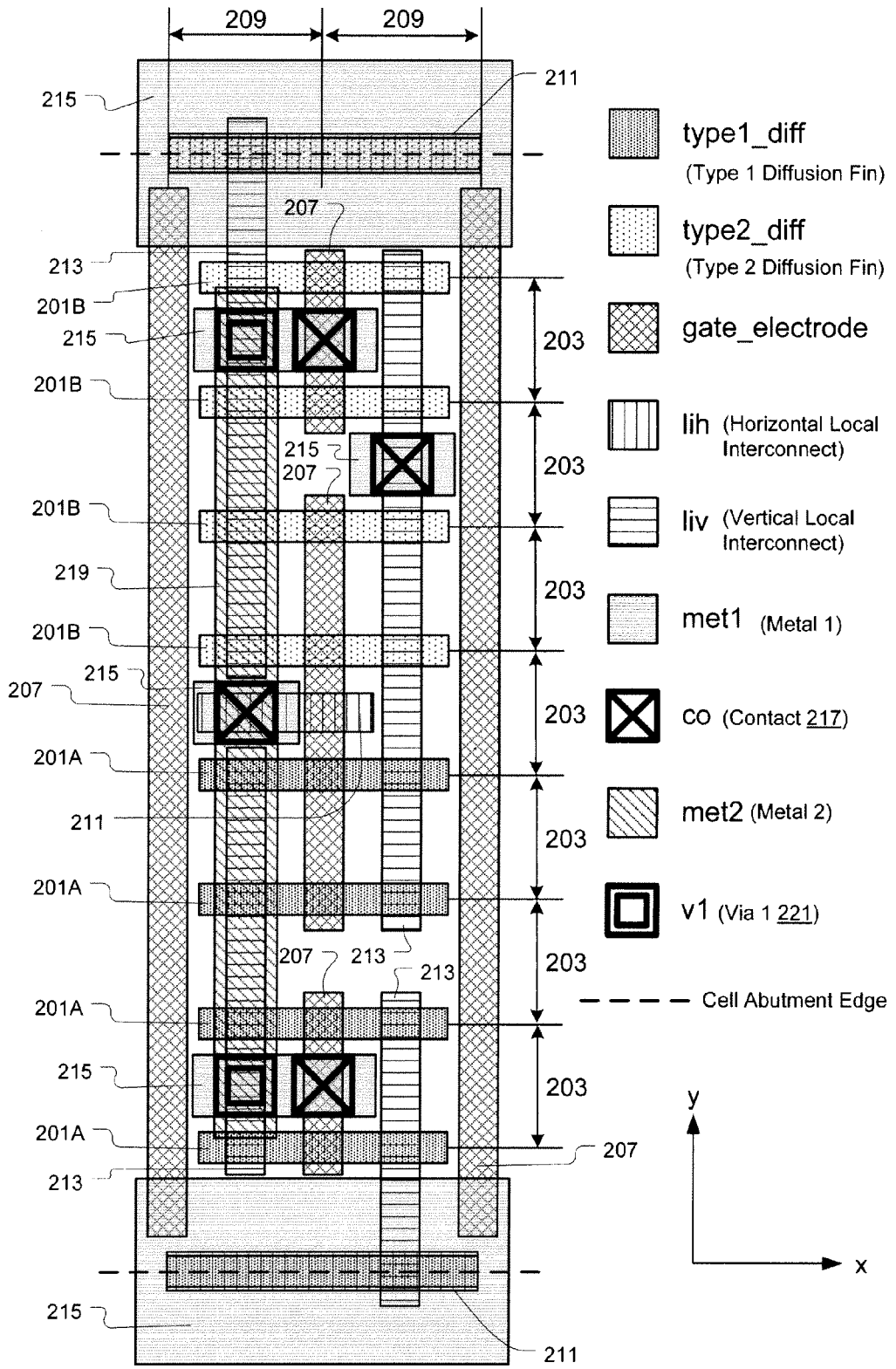
FIG. 2A shows an exemplary cell layout incorporating finfet transistors, in accordance with some embodiments of the present invention.

FIG. 2A shows an exemplary cell layout incorporating finfet transistors, in accordance with some embodiments of the present invention. The cell layout includes a diffusion level within which a number of diffusion fins 201A/201B are defined for subsequent formation of finfet transistors and associated connections. In some embodiments, in an as-drawn layout state, the diffusion fins 201A/201B are linear-shaped. The diffusion fins 201A/201B are oriented to be parallel to each other such that their lengths extend in a first direction (x), and such that their widths extend in a second direction (y) perpendicular to the first direction (x).

In some embodiments, such as shown in FIG. 2A, the diffusion fins 201A/201B are placed in accordance with a fixed lengthwise centerline-to-lengthwise centerline pitch 203, as measured in the second direction (y). In this embodiment, the pitch 203 of the diffusion fins 201A/201B may be related to the cell height as measured in the second direction (y), such that the diffusion fin pitch 203 can be continued across cell boundaries. In FIG. 2A, the cell abutment edges represent the cell boundaries that run parallel to the diffusion fins 201A/201B. In some embodiments, the diffusion fins for multiple neighboring cells will be placed in accordance with a common global diffusion fin pitch, thereby facilitating chip level manufacturing of the diffusion fins in multiple cells.

Figure 2B:
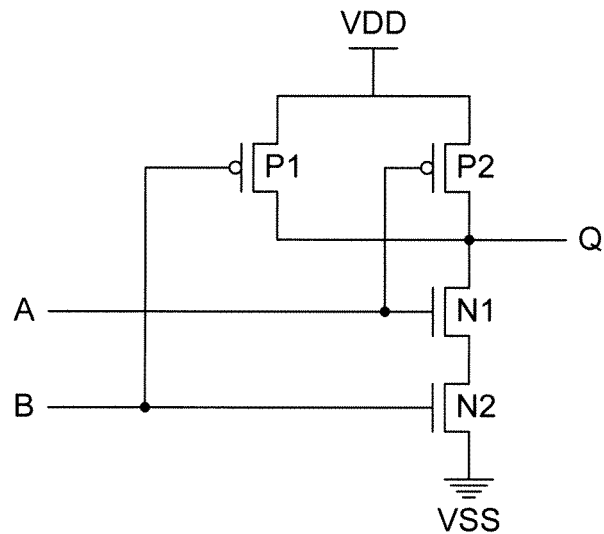
FIG. 2B shows a circuit diagram corresponding to the 2-input NAND configuration of FIG. 2D, in accordance with some embodiments of the present invention.
Figure 2C:
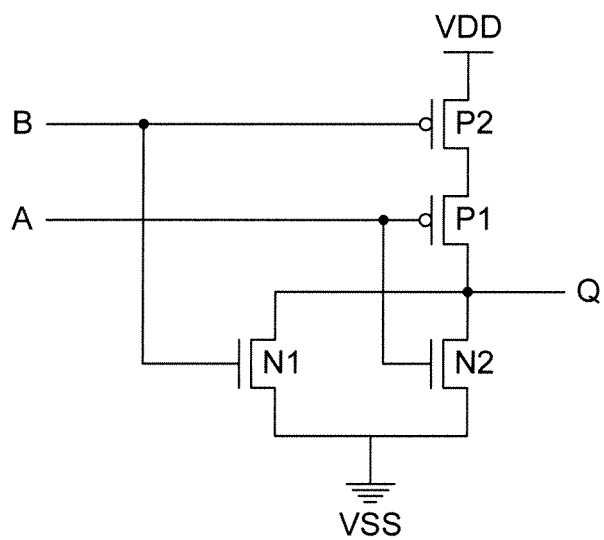
FIG. 2C shows a circuit diagram corresponding to the 2-input NOR configuration of FIG. 2E, in accordance with some embodiments of the present invention.
Figure 2D:
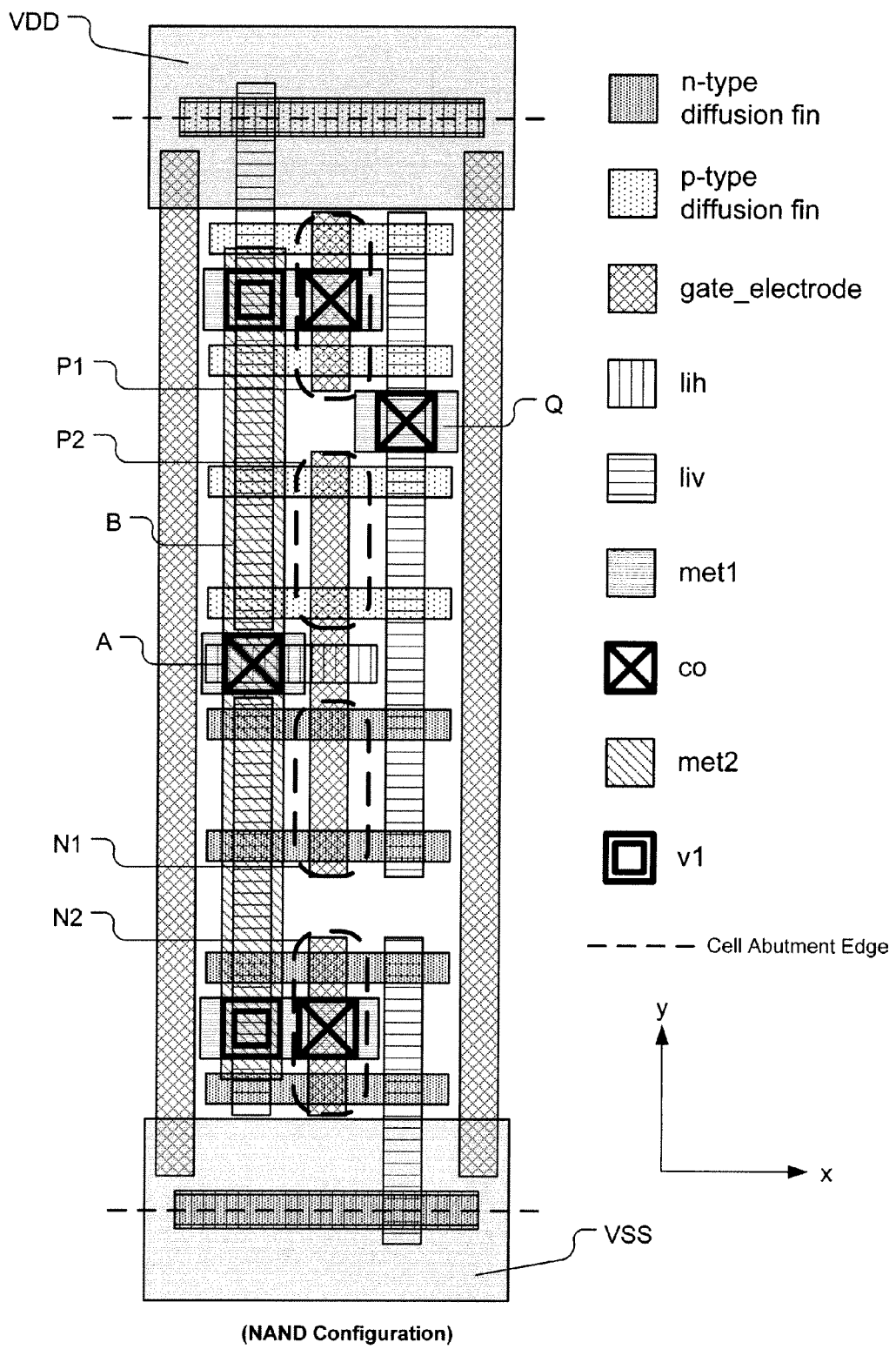
FIG. 2D shows the layout of FIG. 2A in which the diffusion fins 201A are formed of an n-type diffusion material and the diffusion fins 201B are formed of a p-type diffusion material, in accordance with some embodiments of the present invention.
Figure 2E:
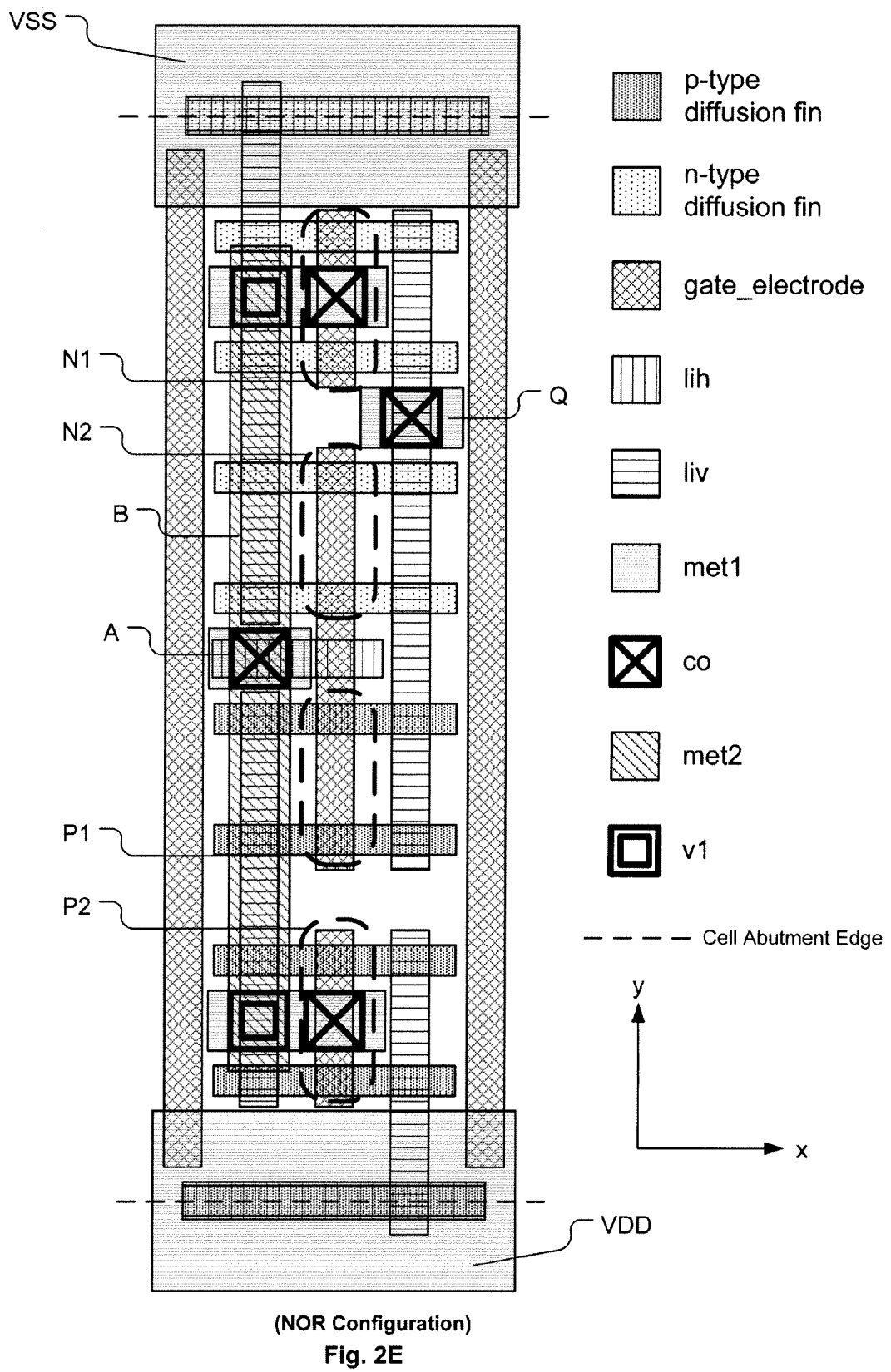
FIG. 2E shows the layout of FIG. 2A in which the diffusion fins 201A are formed of a p-type diffusion material and the diffusion fins 201B are formed of an n-type diffusion material, in accordance with some embodiments of the present invention.

It should be understood that other embodiments may utilize multiple diffusion fin pitches within a given cell or among a collection of cells. For example, FIG. 2H shows a variation of the cell of FIG. 2A in which two different diffusion fin pitches 203 and 205 are used, in accordance with some embodiments of the present invention. It should be understood in some embodiments the diffusion fins 201A/201B can be placed in accordance with one or more lengthwise centerline-to-lengthwise centerline pitches, or may be placed in an unrestricted manner with regard to lengthwise centerline-to-lengthwise centerline spacing. Also, in some embodiments, the diffusion fins 201A/201B can be placed in accordance with a given pitch and some pitch locations may be vacant with regard to diffusion fin placement. Additionally, in some embodiments, diffusion fins can be placed in a spaced apart, end-to-end manner at a given diffusion fin pitch location within a cell.

In each Figure presented herein, each diffusion fin, e.g., diffusion fins 201A/201B in FIG. 2A, is of either an n-type diffusion material or a p-type diffusion material. Also, depending on the particular cell implementation, the type of material of the diffusion fins may swapped to obtain a different cell logic function. Therefore, the notation type1_diff and type2_diff is used in the Figures to denote different material types for the diffusion fins. For example, if the t1_diff material is an n-type material, then the t2_diff material is a p-type material, vice-versa.

The cell layout also includes a number of linear-shaped gate electrode structures 207. The linear-shaped gate electrode structures 207 extend in a substantially perpendicular direction to the diffusion fins 201A/201B, i.e., in the second direction (y). When fabricated, the linear-shaped gate electrode structures 207 wrap over the diffusion fins 201A/201B to form gate electrodes of finfet transistors. It should be understood that an appropriate gate oxide material is disposed, i.e., positioned/deposited, between the diffusion fins 201A/201B and the gate electrode structures 207 formed thereover.

In some embodiments, the linear-shaped gate electrode structures 207 are placed in accordance with a fixed gate pitch 209 as measured in the first direction (x) between lengthwise centerlines of adjacently positioned gate electrode structures 207. In some embodiments, the gate pitch 209 is related to the cell width as measured in the first direction (x), such that the gate pitch can be continued across cell boundaries. Therefore, in some embodiments, the gate electrode structures 207 for multiple neighboring cells can be placed in accordance with a common global gate pitch, thereby facilitating chip level manufacturing of the linear-shaped gate electrode structures 207 in multiple cells.

It should be understood that some of the gate pitch locations in a given cell may be occupied by gate electrode structures 207, while other gate pitch locations in the given cell are left vacant. Also, it should be understood that multiple gate electrode structures 207 can be placed in a spaced apart, end-to-end manner along any of the gate electrode pitch locations within a given cell. It should be further understood that in some embodiments, the gate electrode structures 207 can be placed in accordance with one or more gate pitches, or can be placed in an unrestricted manner with regard to gate pitch.

The cell layout can also include a number of horizontal linear-shaped local interconnect structures (lih) 211, and/or a number of vertical linear-shaped local interconnect structures (liv) 213. The vertical local interconnect structures 213 are oriented parallel to the gate electrode structures 207. The horizontal local interconnect structures 211 are oriented parallel to the diffusion fins 201A/201B. In some embodiments, placement of the vertical local interconnect structures 213 is defined to be out of phase from placement of the gate electrode structures 207 by one-half of the gate pitch. Thus, in this embodiment, each vertical local interconnect structure 213 is centered between its neighboring gate electrode structures 207, when the neighboring gate electrode structures 207 are positioned on the gate pitch. Therefore, in this embodiment, adjacently placed vertical local interconnect structures 213 will have a center-to-center spacing equal to a local gate pitch or a global gate pitch, where the local gate pitch is applied within a given cell, and the global gate pitch is applied across multiple cells.

In some embodiments, placement of the horizontal local interconnect structures 211 is defined to be out of phase from placement of the diffusion fins 201A/201B by one-half of the diffusion fin pitch. Thus, in this embodiment, the horizontal local interconnect structures 211 can be centered between its neighboring diffusion fins 201A/201B, when the neighboring diffusion fins 201A/201B are positioned on the diffusion fin pitch. Therefore, in this embodiment, adjacently placed horizontal local interconnect structures 211 will have a center-to-center spacing equal to a local diffusion fin pitch or a global diffusion fin pitch, where the local diffusion fin pitch is applied within a given cell, and the global diffusion fin pitch is applied across multiple cells.

In some embodiments, the cell layout also includes a number of linear-shaped metal 1 (met1) interconnect structures 215. The met1 interconnect structures 215 are oriented parallel to the diffusion fins 201A/201B and perpendicular to the gate electrode structures 207. In some embodiments, placement of the met1 interconnect structures 215 is defined to be out of phase from placement of the diffusion fins 201A/201B by one-half of the diffusion fin pitch. Thus, in this embodiment, each met1 interconnect structure 215 is centered between its neighboring diffusion fins, when its neighboring diffusion fins are positioned on the diffusion fin pitch, albeit within a higher chip level. Therefore, in this embodiment, adjacently placed met1 interconnect structures 215 will have a center-to-center spacing equal to a local diffusion fin pitch or a global diffusion fin pitch, where the local diffusion fin pitch is applied within a given cell, and the global diffusion fin pitch is applied across multiple cells. In some embodiments, the met1 interconnect structure 215 pitch, and hence the diffusion track pitch, is set at the single exposure lithographic limit, e.g., 80 nm for 193 nm wavelength light and 1.35 NA. In this embodiment, no double exposure lithography, i.e., multiple patterning, is required to manufacture the met1 interconnect structures 215. It should be understood that other embodiments can utilize met1 interconnect structures 215 that are oriented perpendicular to the diffusion fins 201A/201B and parallel to the gate electrode structures 207.

The cell layout also includes a number of contacts 217 defined to connect various met1 interconnect structures 215 to various local interconnect structures 211/213 and gate electrode structures 207, thereby providing electrical connectivity between the various finfet transistors as necessary to implement the logic function of the cell. In some embodiments, the contacts 217 are defined to satisfy single exposure lithographic limits. For example, in some embodiments, layout features to which the contacts 217 are to connect are sufficiently separated to enable single exposure manufacture of the contacts 217. For instance, the met1 interconnect structures 215 are defined such that their line ends which are to receive contacts 217 are sufficiently separated from neighboring met1 interconnect structure 215 line ends which are also to receive contacts 217, such that a spatial proximity between the contacts 217 is sufficiently large to enable single exposure lithography of the contacts 217. In some embodiments, neighboring contacts 217 are separated from each other by at least 1.5 times the gate pitch. It should be appreciated that line end cutting and the associated increased expense of double exposure lithography can be eliminated by sufficiently separating opposing line ends of the met1 interconnect structures 215. It should be understood that contact separation and line end separation on metal layers can be independent of each other in some embodiments, depending on choices made in the manufacturing process.

In some embodiments, the cell layout also includes a number of linear-shaped metal 2 (met2) interconnect structures 219. The met2 interconnect structures 219 are oriented parallel to the gate electrodes 207 and perpendicular to the diffusion fins 201A/201B. The met2 interconnect structures 219 can be physically connected to the met1 interconnect structures 215 by via 1 structures (v1) 221, as necessary to implement the logic function of the cell. Although the example cell of FIG. 2A shows the met1 interconnect structures 219 extending in a lengthwise manner perpendicular to the gate electrode structures 207 and the met 2 interconnect structures 219 extending in a lengthwise manner parallel to the gate electrode structures 207, it should be understood that in other embodiments the met1 interconnect structures 219 and met 2 interconnect structures 219 can be defined to extend in any orientation relative to the gate electrode structures 207. It should be understood that other embodiments can utilize met2 interconnect structures 219 are oriented perpendicular to the gate electrodes 207 and parallel to the diffusion fins 201A/201B.

The cell of FIG. 2A represents a multi-input logic gate having substantially aligned input gate electrodes, i.e., the center three gate electrode structures 207 that are co-aligned in the direction (y). Depending on the assignment of diffusion material type to the diffusion fins of type1 and type2, the cell of FIG. 2A can have a different logic function. For example, FIG. 2D shows the layout of FIG. 2A in which the diffusion fins 201A are formed of an n-type diffusion material and the diffusion fins 201B are formed of a p-type diffusion material. The layout of FIG. 2D is that of a 2-input NAND gate. FIG. 2B shows a circuit diagram corresponding to the 2-input NAND configuration of FIG. 2D. FIG. 2E shows the layout of FIG. 2A in which the diffusion fins 201A are formed of a p-type diffusion material and the diffusion fins 201B are formed of an n-type diffusion material. The layout of FIG. 2E is that of a 2-input NOR gate. FIG. 2C shows a circuit diagram corresponding to the 2-input NOR configuration of FIG. 2E. In FIGS. 2B-2E, each of P1 and P2 identifies a respective p-type transistor (e.g., PMOS transistor), each of N1 and N2 identifies a respective n-type transistor (e.g., NMOS transistor), each of A and B identifies a respective input node, and Q identifies an output note. It should be understood that similar notation for p-type transistors, n-type transistors, input nodes, and output nodes is also used in other figures herein.

Based on the foregoing, it should be appreciated that the logic function of a given cell layout can be changed by swapping the material types of the diffusion fins. Therefore, for each cell layout present herein, it should be understood that multiple logic functions can be represented depending on the assignment of n-type and p-type materials to the diffusion fins.

FIGS. 3 through 7 and 11 through 29 show variations on the layout of FIG. 2A, in accordance with some embodiments of the present invention. Therefore, each of the cells depicted in FIGS. 3 through 7 and 11 through 29 represent either a 2-input NAND gate or a 2-input NOR gate, depending on the assignment of n-type and p-type materials to the type1_diff and type2_diff diffusion fins. Each of cell layouts shown in FIGS. 2A through 7 and 11 through 29 have the following features:

a multi-input logic gate with all its input electrodes substantially aligned, a local diffusion fin layer power supply, a global higher level interconnect power supply, a horizontal interconnect used to connect gate electrode to vertical local interconnect and to help improve manufacturability of the contact layers by enabling greater flexibility in contact placement.

It should be appreciated that each of the layouts in FIGS. 2A through 7 and 11 through 29 shows a different implementation of the same logic function. The layout of FIG. 2A shows the following features:

gate electrodes for two or more inputs, with the gate electrodes substantially aligned, gate electrode end line spaces located between diffusion fins of the same diffusion type, gate electrode contacts between diffusion fins of the same diffusion type, type1_diff and type2_diff diffusion fins used for a local power supply, i.e., to the local interconnect of the cell, with met1 used for higher level interconnect (global) power supply, with both local and global power supplies shared with abutting cells, diffusion fins of t1_diff and type2_diff supply current to cell on a local level and can be connected to the higher level interconnect, e.g., met1, at prescribed intervals to support multiple chip power strategies, use of horizontal local interconnect for connection to gate electrode, a substantially horizontal local interconnect that connects the vertical local interconnect layer to the gate electrode layer can be used to shift locations of the gate electrode contacts, thereby serving to increase flexibility in the contact mask patterns, which can ease potential lithography issues.

Figure 2F:
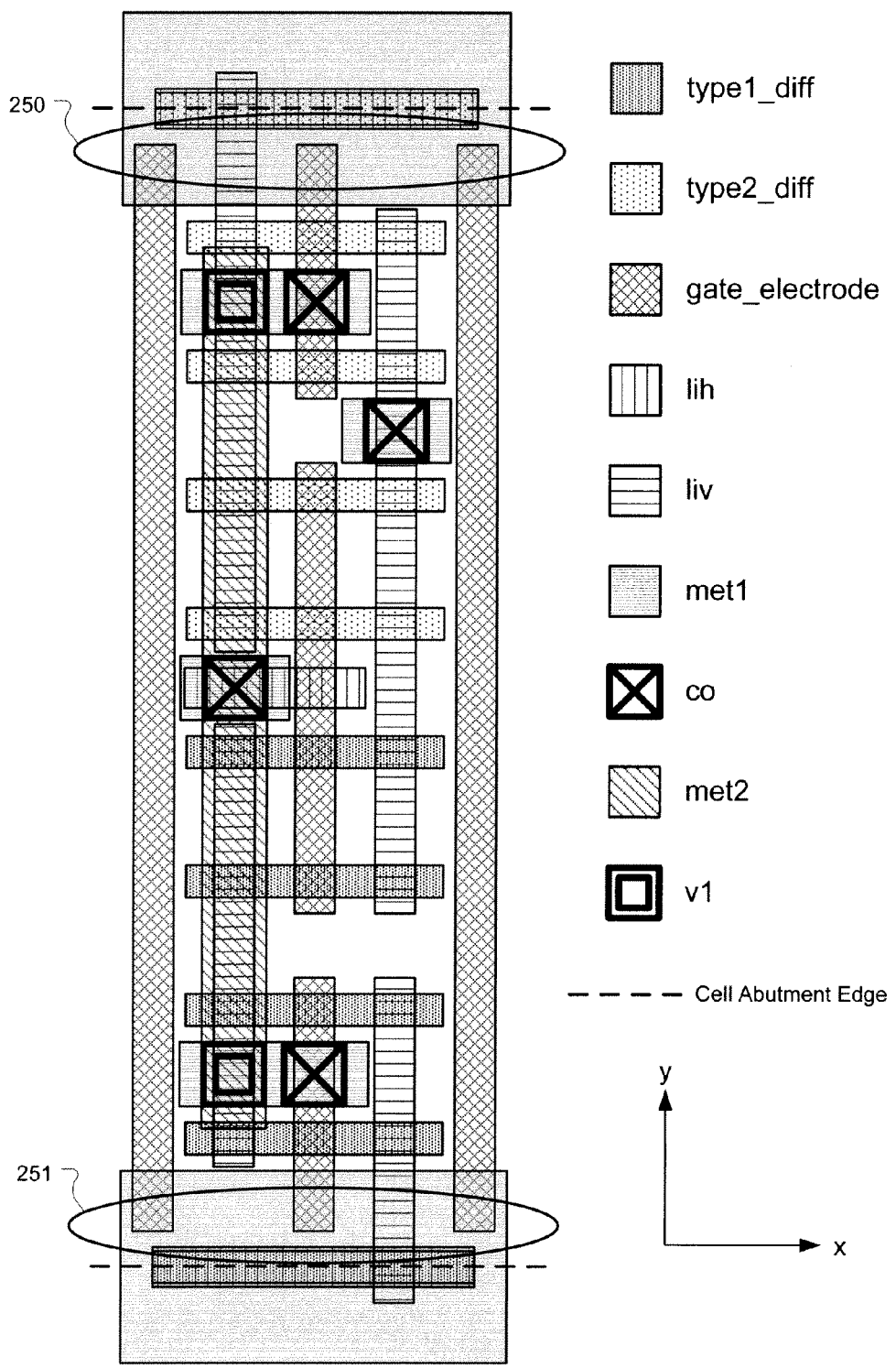
FIG. 2F shows a variation of the layout of FIG. 2A in which the gate electrode structures have their ends substantially aligned on the top of the cell and on the bottom of the cell, in accordance with some embodiments of the present invention.

FIG. 2F shows a variation of the layout of FIG. 2A in which the gate electrode structures have their ends substantially aligned on the top of the cell, as indicated by the oval 250, and on the bottom of the cell, as indicated by the oval 251, in accordance with some embodiments of the present invention.

Figure 2G:
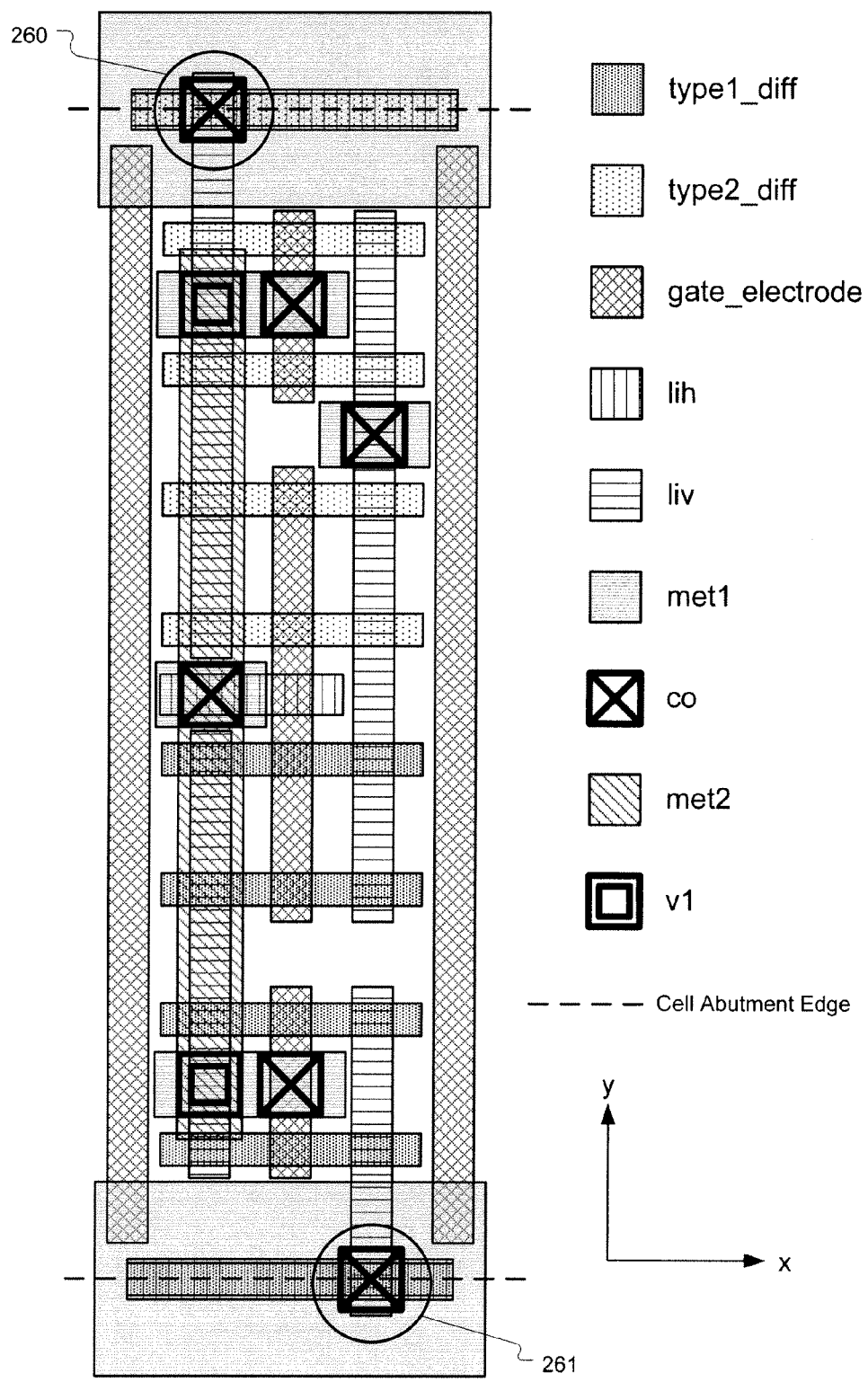
FIG. 2G shows a variation of the layout of FIG. 2A in which contacts are formed to extend from the men interconnect structure to the horizontal local interconnect structure under the power rail at the top of the cell and at the bottom of the cell, in accordance with some embodiments of the present invention.
Figure 2H:
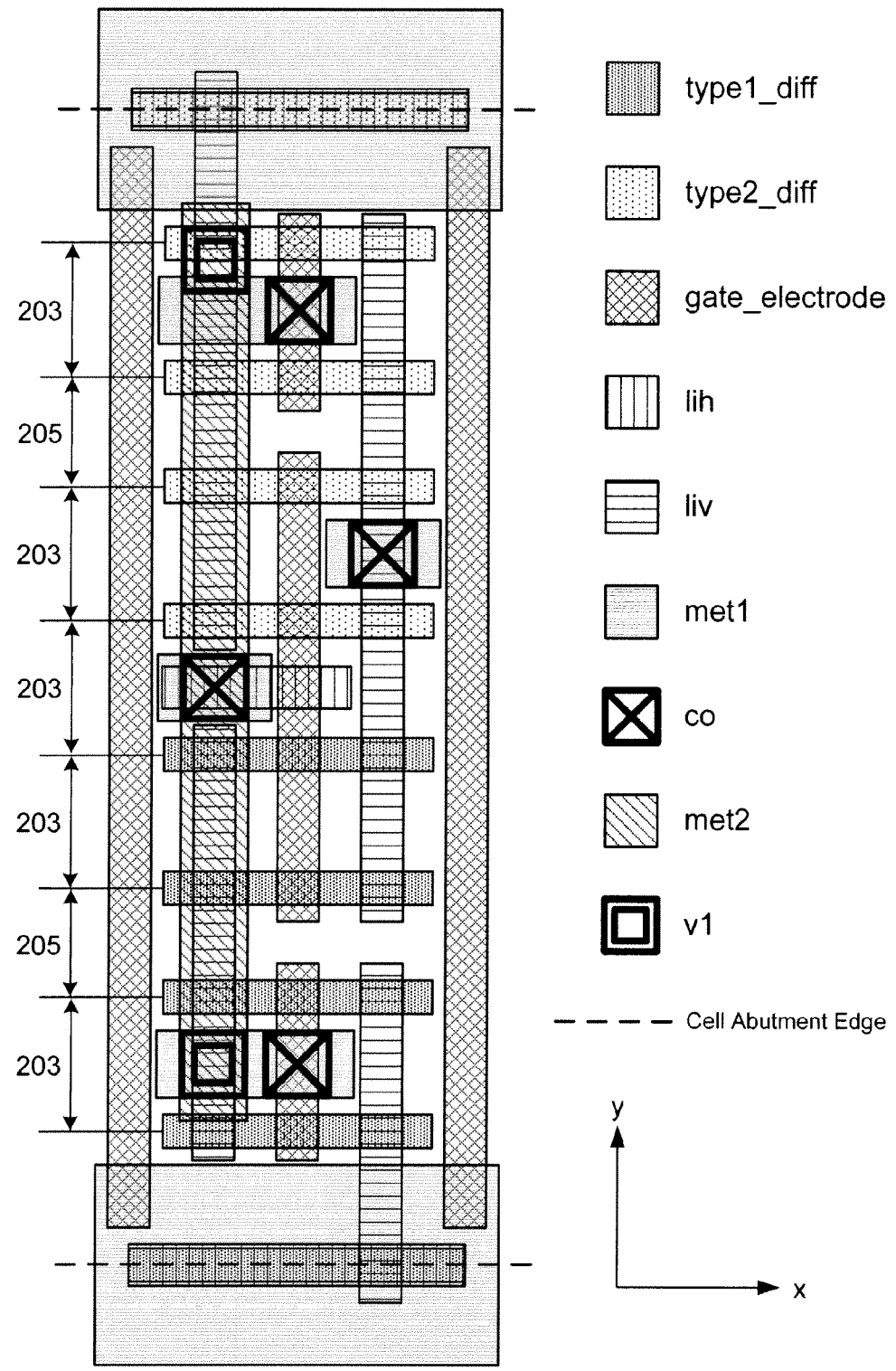
FIG. 2H shows a variation of the cell of FIG. 2A in which two different diffusion fin pitches are used, in accordance with some embodiments of the present invention.

FIG. 2G shows a variation of the layout of FIG. 2A in which contacts are formed to extend from the men interconnect structure to the horizontal local interconnect structure under the power rail at the top of the cell, as indicated by circle 260, and at the bottom of the cell, as indicated by circle 261, in accordance with some embodiments of the present invention.

As previously mentioned, FIG. 2H shows a variation of the cell of FIG. 2A in which two different diffusion fin pitches 203 and 205 are used, in accordance with some embodiments of the present invention.

Figure 2I:
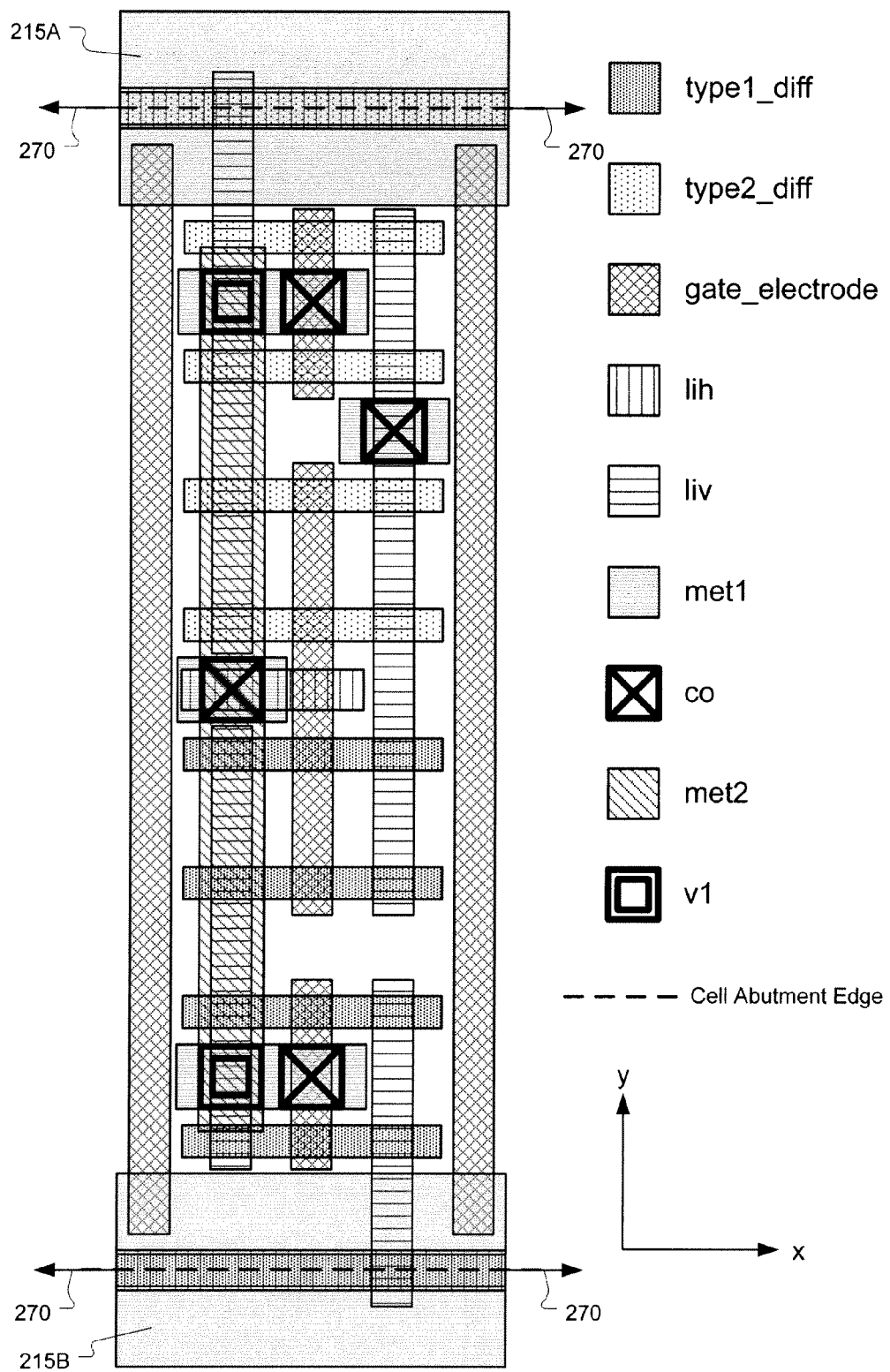
FIG. 2I shows a variation of the layout of FIG. 2A in which the diffusion fins and horizontal local interconnect structures under the power rails at the top and bottom of the cell are extended to the full width of the men interconnect structures that serve as the power rails, in accordance with some embodiments of the present invention.

It should be understood that the diffusion fins and horizontal local interconnect structures under the power rails at the top and bottom of the cells in the various layouts depicted herein extend continuously in the horizontal direction (x) so as to service multiple cells that are positioned in a row, and possibly in adjacent rows. To illustrate this point, FIG. 2I shows a variation of the layout of FIG. 2A in which the diffusion fins and horizontal local interconnect structures under the power rails at the top and bottom of the cell are extended to the full width of the met1 interconnect structures 215A/215B that serve as the power rails, in accordance with some embodiments of the present invention. It should be understood that the diffusion fins and horizontal local interconnect structures under the power rails 215A/215B, along with the power rails 215A/215B themselves, extend continuously in the (x) direction, as indicated by arrows 270.

Figure 3:
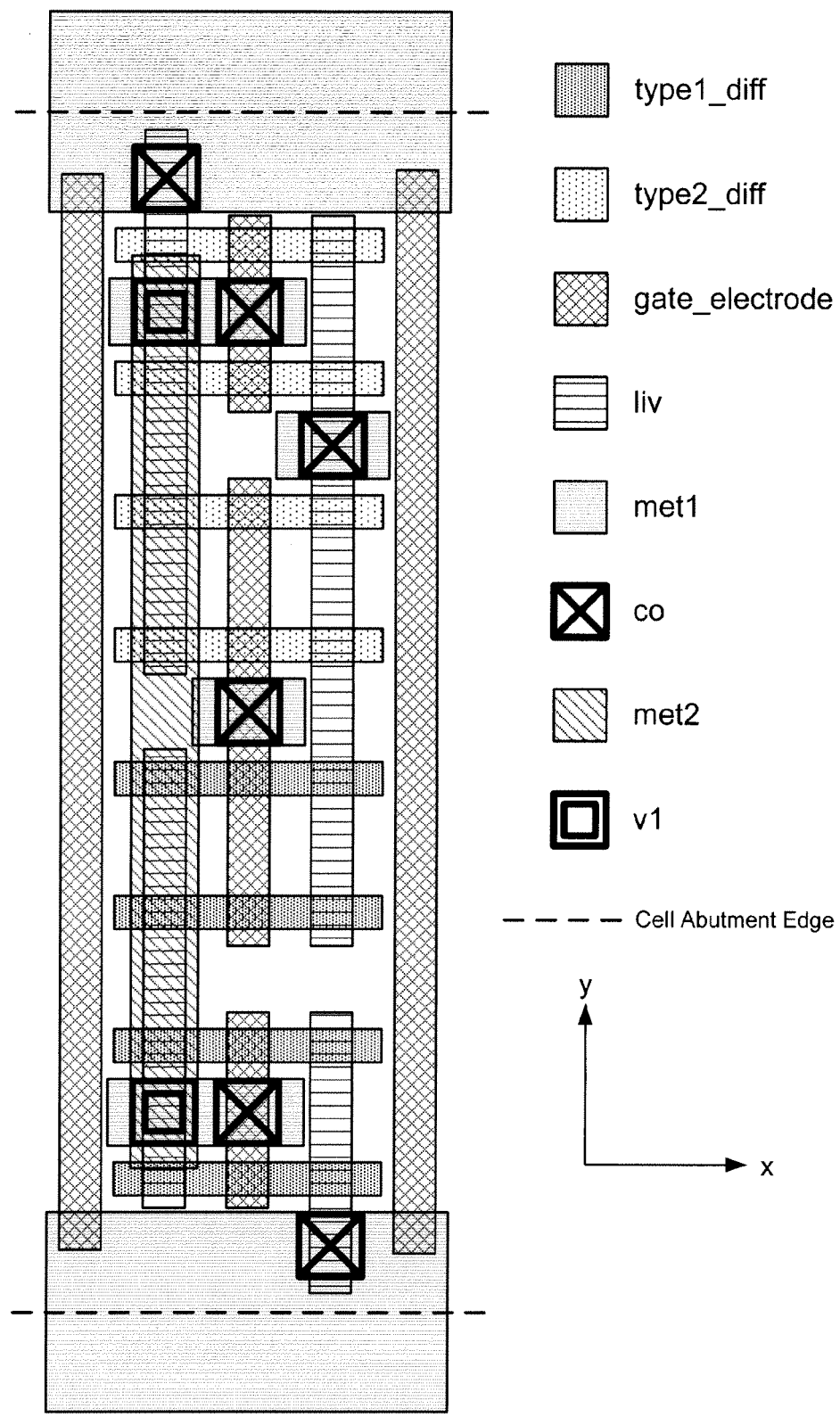
FIG. 3 shows a variation of the layout of FIG. 2A in which the men power rails are connected to vertical local interconnect, such that the met1 power rails serve as local power supplies, in accordance with some embodiments of the present invention.

FIG. 3 shows a variation of the layout of FIG. 2A in which the met1 power rails are connected to vertical local interconnect, such that the met1 power rails serve as local power supplies, in accordance with some embodiments of the present invention. It should be understood that the met1 power rails can be of variable width based on the cell library requirements. As with the layout of FIG. 2A, the layout of FIG. 3 uses multi-input logic gate with input electrodes substantially aligned.

Figure 4:
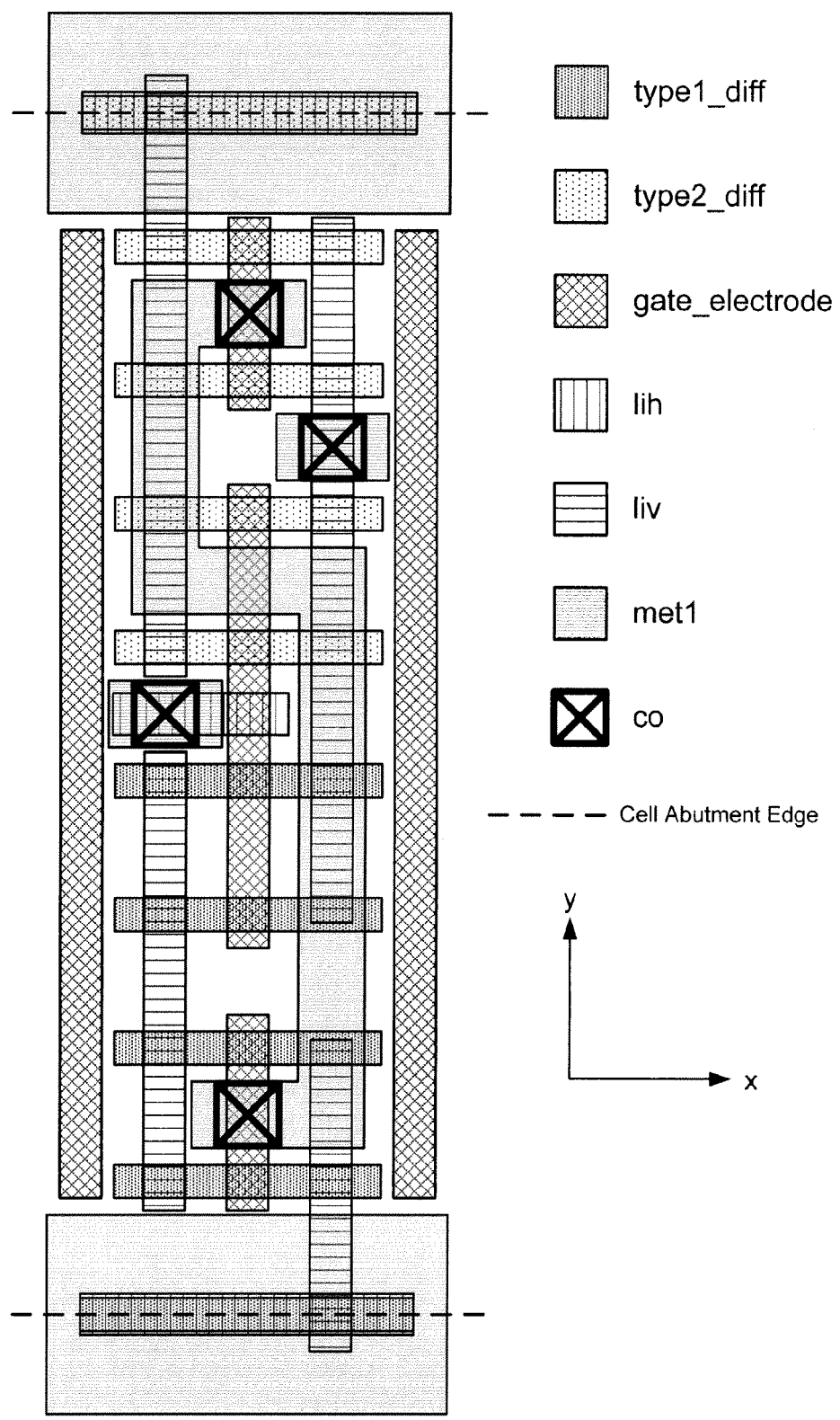
FIG. 4 shows a variation of the layout of FIG. 2A in which a two-dimensionally varying met1 interconnect structure is used within the cell for intra-cell routing, in accordance with some embodiments of the present invention.

FIG. 4 shows a variation of the layout of FIG. 2A in which a two-dimensionally varying met1 interconnect structure is used within the cell for intra-cell routing, in accordance with some embodiments of the present invention. As with the layout of FIG. 2A, the layout of FIG. 4 uses multi-input logic gate with input electrodes substantially aligned and shared local and global power supplies. In some embodiments, bends in met1, i.e., the two-dimensional changes in direction of met1, occur on a fixed grid. In some embodiments, this met 1 fixed grid can include horizontal grid lines positioned between and extending parallel to the diffusion fins and positioned on the same pitch as the diffusion fins. Also, in some embodiments, this met 1 fixed grid can include vertical grid lines extending perpendicular to the diffusion fins and positioned so as to be centered on the vertical local interconnect.

Figure 5:
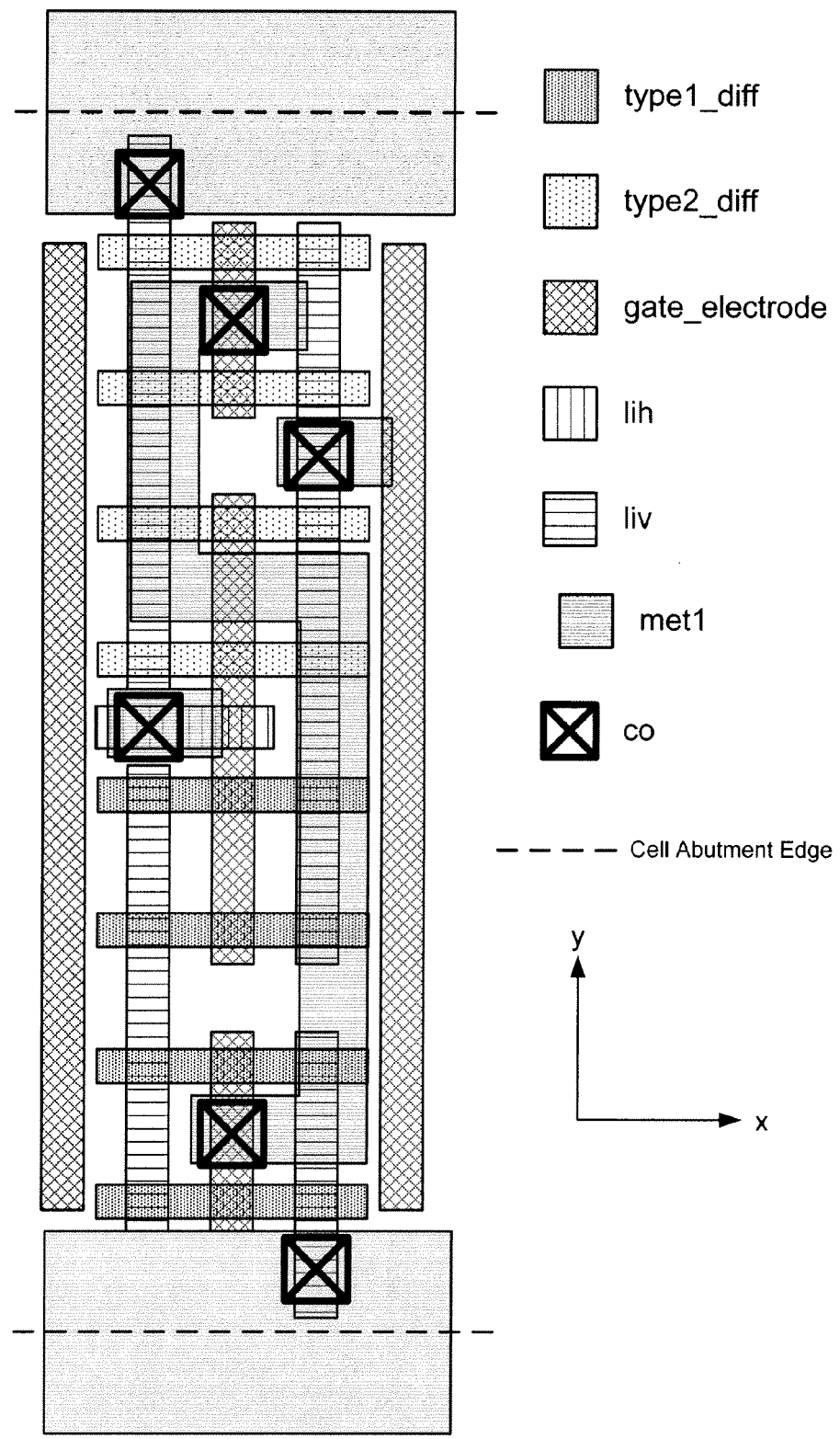
FIG. 5 shows a variation of the layout of FIG. 2A in which the met1 power rails are connected to vertical local interconnect and in which a two-dimensionally varying met1 interconnect structure is used within the cell for intra-cell routing, in accordance with some embodiments of the present invention.

FIG. 5 shows a variation of the layout of FIG. 2A in which the met 1 power rails are connected to vertical local interconnect, such that the met 1 power rails serve as local power supplies, and in which a two-dimensionally varying met1 interconnect structure is used within the cell for intra-cell routing, in accordance with some embodiments of the present invention. As with the layout of FIG. 2A, the layout of FIG. 5 uses multi-input logic gate with input electrodes substantially aligned.

Figure 6:
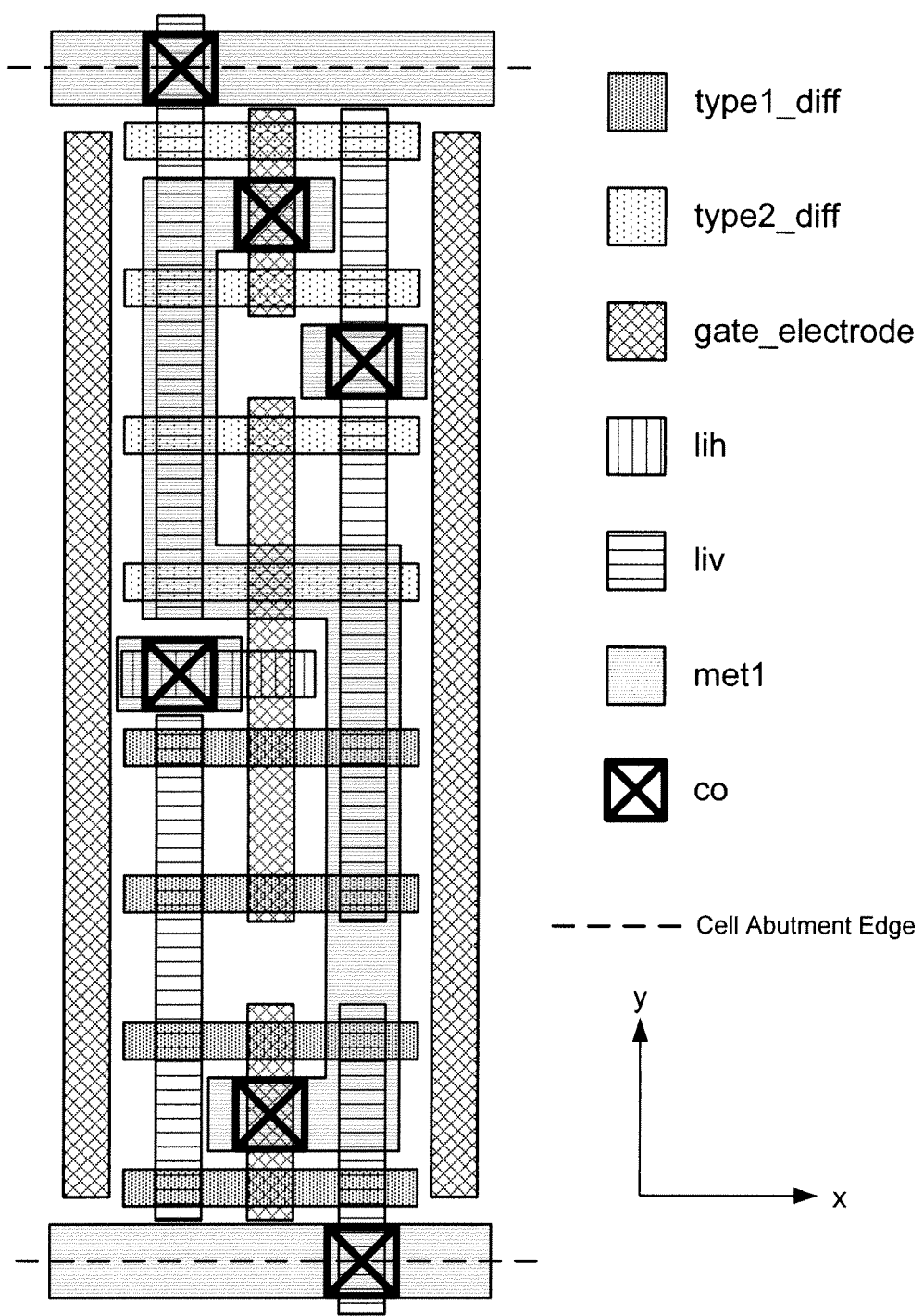
FIG. 6 shows a variation of the layout of FIG. 2A in which fixed, minimum width, shared local met1 power supplies are used, along with a two-dimensionally varying met1 interconnect structure within the cell for intra-cell routing, in accordance with some embodiments of the present invention.

FIG. 6 shows a variation of the layout of FIG. 2A in which fixed, minimum width, shared local met1 power supplies are used, along with a two-dimensionally varying met1. interconnect structure within the cell for intra-cell routing, in accordance with some embodiments of the present invention. As with the layout of FIG. 2A, the layout of FIG. 6 uses multi-input logic gate with input electrodes substantially aligned.

Figure 7:
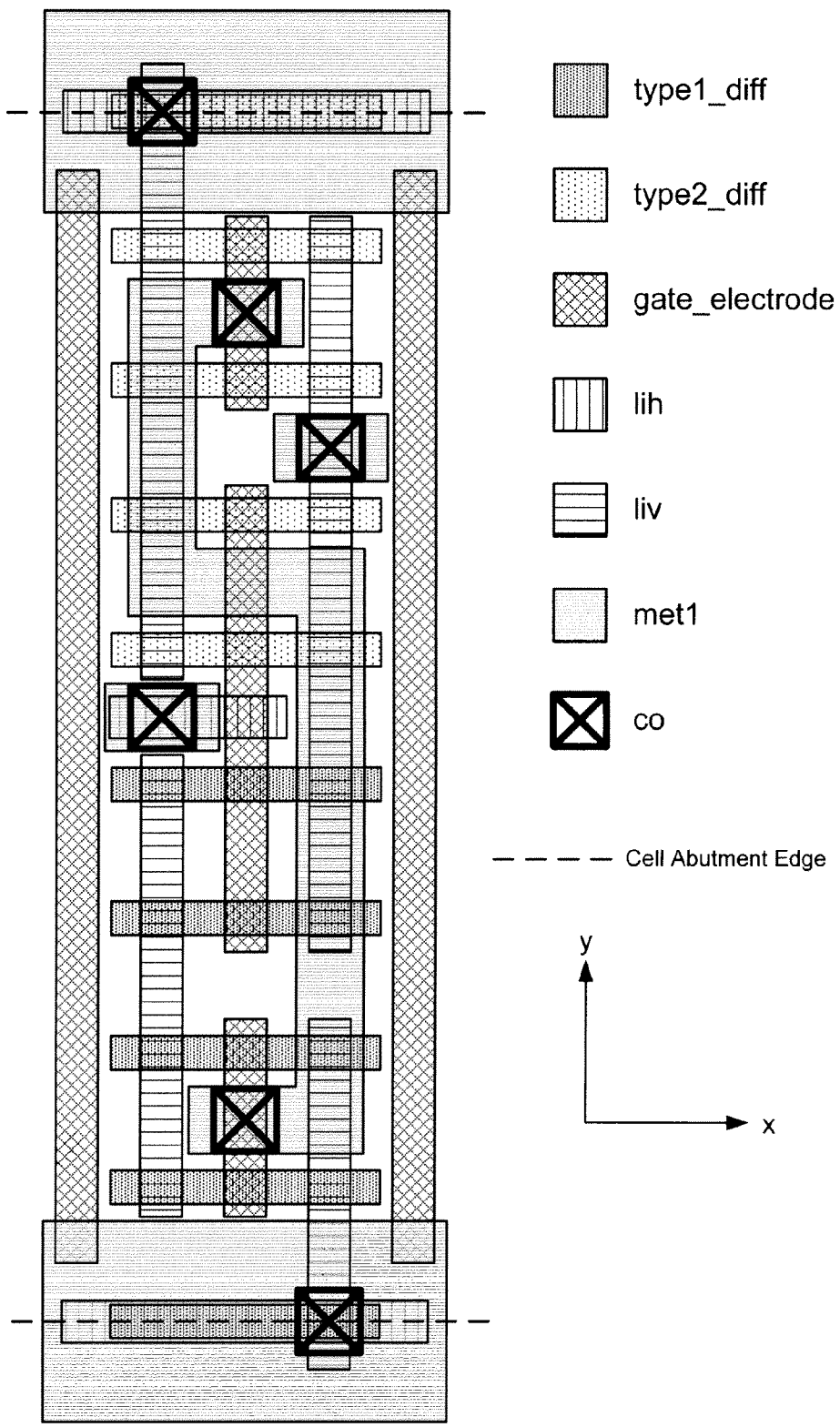
FIG. 7 shows a variation of the layout of FIG. 2A having shared local and global power supplies with hard connections in the cell, and a two-dimensionally varying met1 interconnect structure within the cell for intra-cell routing, in accordance with some embodiments of the present invention.

FIG. 7 shows a variation of the layout of FIG. 2A having shared local and global power supplies with hard connections in the cell, and a two-dimensionally varying met1 interconnect structure within the cell for intra-cell routing, in accordance with some embodiments of the present invention. As with the layout of FIG. 2A, the layout of FIG. 7 uses multi-input logic gate with input electrodes substantially aligned.

Figure 8A:
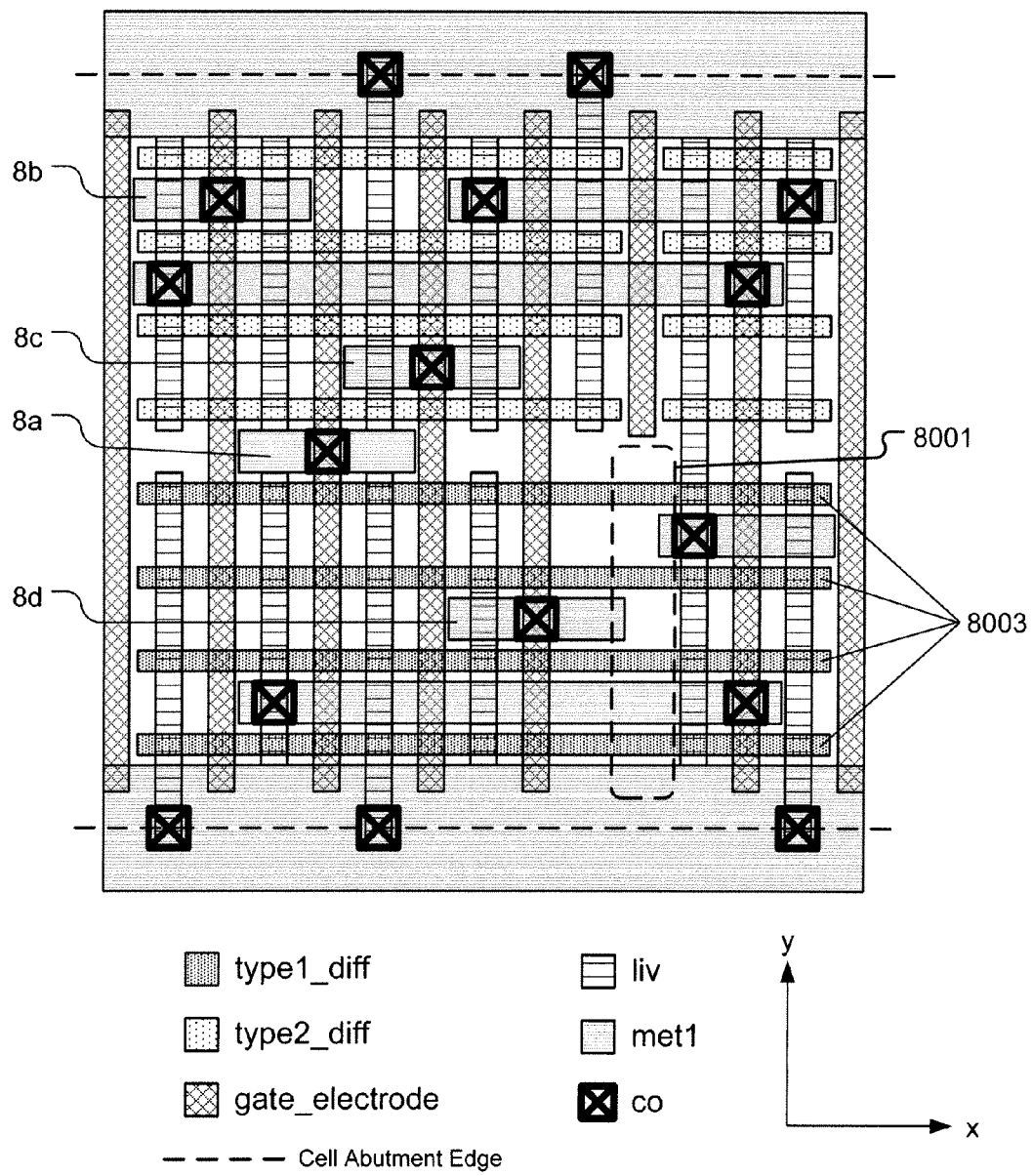
FIG. 8A shows a layout of an example standard cell in which input pins are placed between diffusion fins of the same type to ease routing congestion, and in which some diffusion fins are used as interconnect conductors, in accordance with some embodiments of the present invention.

FIG. 8A shows a layout of an example standard cell in which input pins are placed between diffusion fins of the same type to ease routing congestion, and in which some diffusion fins are used as interconnect conductors, in accordance with some embodiments of the present invention. FIG. 8C shows a circuit schematic of the layout of FIG. 8A, including input pins 8a, 8b, 8c, and 8d. Planar standard cells, i.e., non-finfet cells, typically have input pins located between diffusion features of the opposite type, i.e., n-type versus p-type, or between the diffusion features and the neighboring power rail, thereby creating a higher concentration of input pins in local areas of the planar cells. As demonstrated in FIG. 8A, by utilizing diffusion fins and placing some input pins between diffusion fins of the same diffusion type, the input pins can be spread apart in a more even manner over a larger area, thereby easing routing congestion for the cell. Also, as demonstrated in FIG. 8A, by selectively removing some gate electrode structures, as shown in the region 8001, the diffusion fin layers can be utilized as a substantially horizontal routing layer to connect to transistors or local interconnect that is not neighboring. For example, in the region 8001, the diffusion fins 8003 are used as horizontal routing conductors.

Figure 8B:
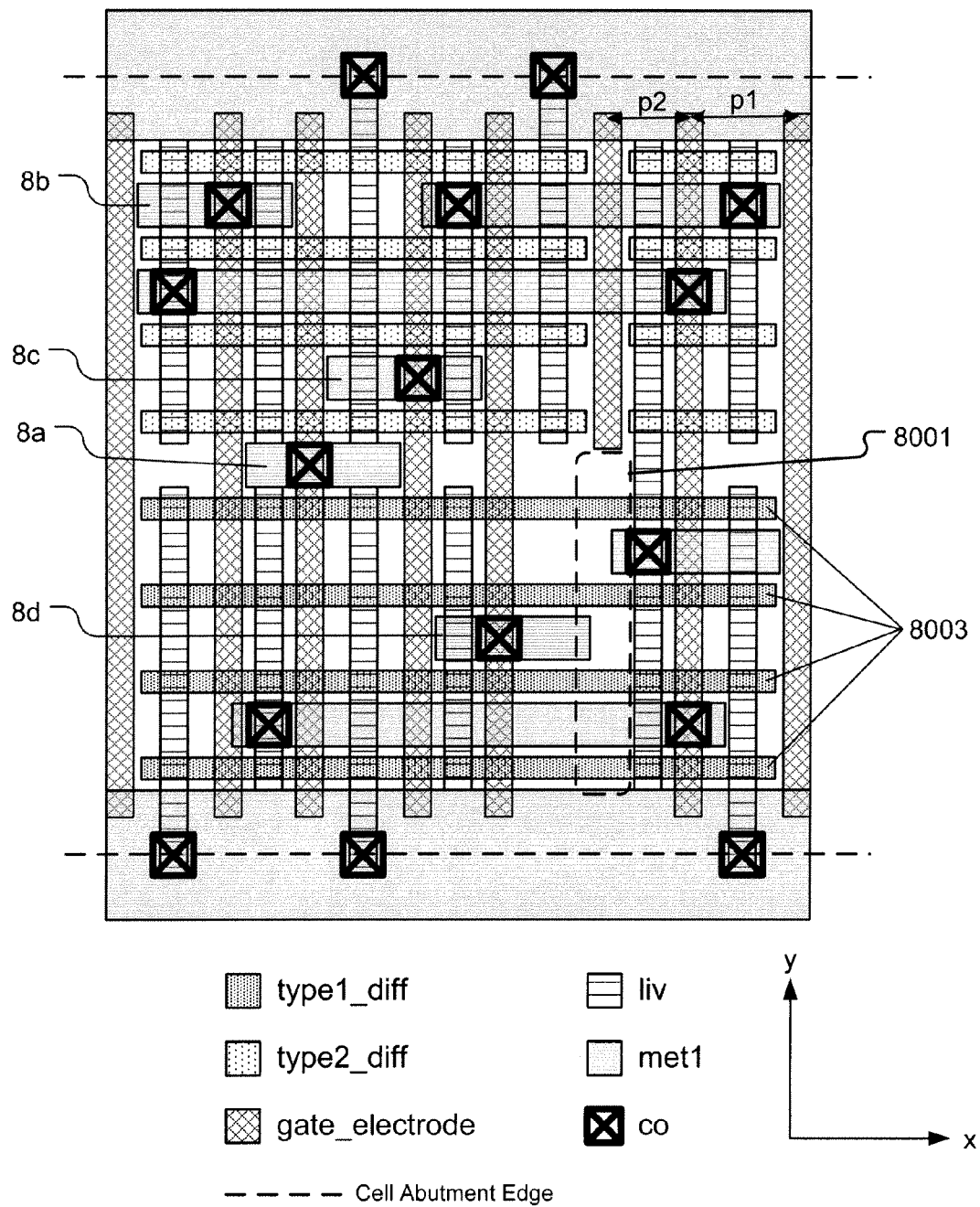
FIG. 8B shows a variation of FIG. 8A in which two different gate electrode pitches are used, in accordance with some embodiments of the present invention.
Figure 8C:
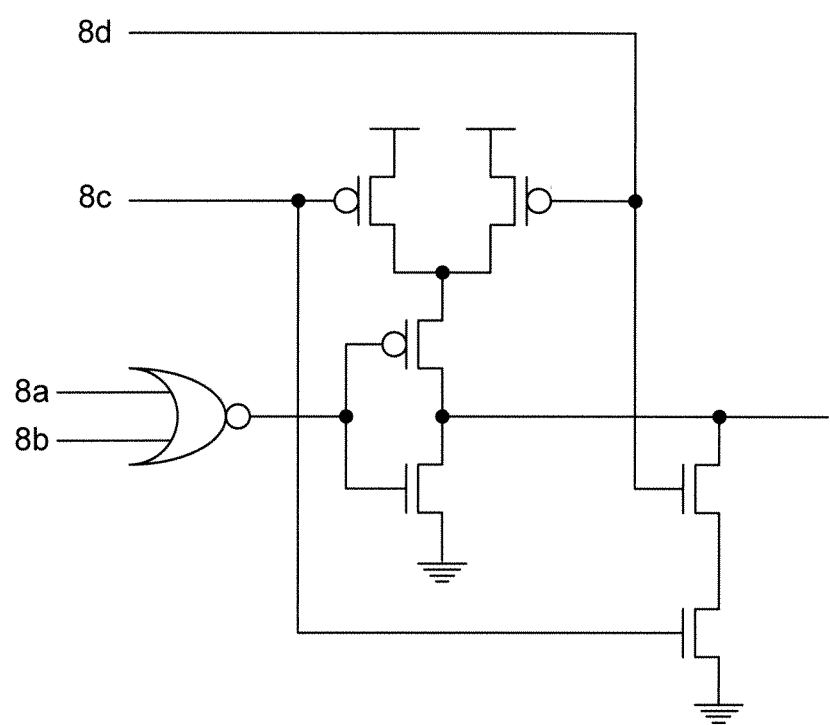
FIG. 8C shows a circuit schematic of the layout of FIG. 8A, in accordance with some embodiments of the present invention.

FIG. 8B shows a variation of FIG. 8A in which two different gate electrode pitches p1 and p2 are used, in accordance with some embodiments of the present invention. More specifically, in FIG. 8B every other pair of adjacently positioned gate electrode structures is placed according to a smaller pitch p2. In some embodiments, the larger gate electrode pitch p1 is about 80 nanometers (nm) and the smaller gate electrode pitch p2 is about 60 nm. It should be understood that some embodiments can utilize more than two gate electrode structure pitches within a given cell or block. And, some embodiments may utilize a single gate electrode structure pitch within a given cell or block. Also, it should be understood that any layer of the semiconductor device, or portion thereof, can be formed in a manner similar to that described herein with regard to the gate electrode pitch(es). For example, a local interconnect layer or a higher-level interconnect layer of the semiconductor device, or portion thereof, can include interconnect conductive structures formed on one or more corresponding pitch(es) in a manner similar to that described herein with regard to the gate electrode pitch(es).

Additionally, conductive structures in different layers (a.k.a. levels) of the semiconductor device, or portion thereof, can be positioned on respective pitch arrangements where a defined relationship exists between the conductive structure pitch arrangements of the different layers. For example, in some embodiments, diffusion fins in the diffusion fin layer are positioned in accordance with a diffusion fin pitch arrangement that can include one or more diffusion fin pitches, and metal 1 (met 1) interconnect structures in the met1 layer are positioned in accordance with a met1 pitch arrangement that can include one or more met1 pitches, where one or more of the diffusion fin pitches are related to one or more of the met1 pitches by a rational number (x/y), where x and y are integer values. In some embodiments, a relationship between a diffusion fin pitch and a met1 pitch is defined by a rational number within a range extending from (1/4) to (4/1).

Also, in some embodiments, vertical local interconnect structures (liv) can be positioned in accordance with a vertical local interconnect pitch that is substantially equal to the gate electrode pitch. In some embodiments, the gate electrode pitch is less than 100 nanometers. Also, in a manner similar to that discussed above with regard to the diffusion fin pitch-to-met1 pitch relationship, in some embodiments the diffusion fin pitch arrangement can be related to the horizontal local interconnect pitch arrangement by a rational number (x/y), where x and y are integer values. That is, one or more diffusion fin pitches can be related to one or more horizontal local interconnect pitches by a rational number (x/y).

Figure 9A:
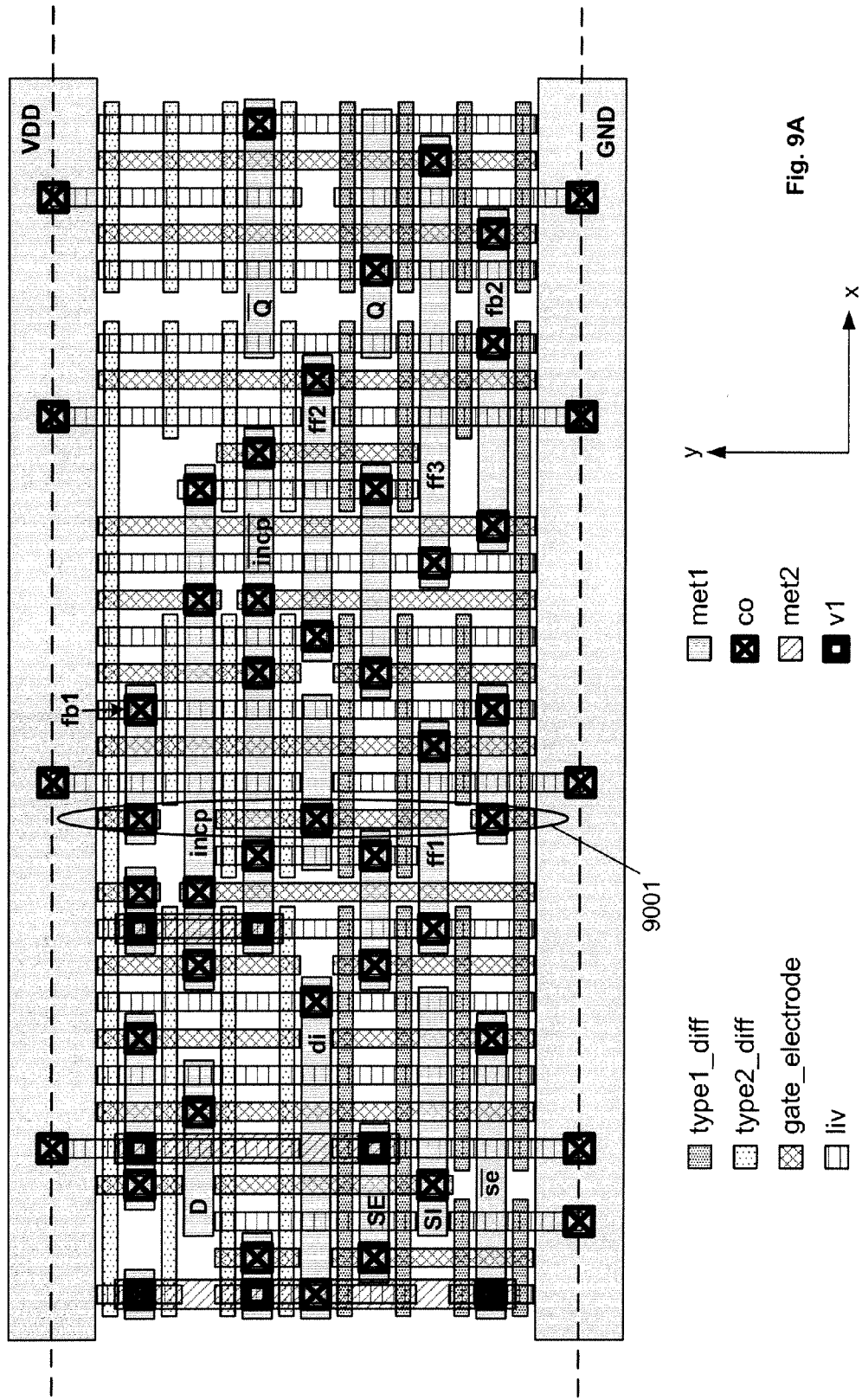
FIG. 9A shows an example standard cell layout in which diffusion fins are utilized as interconnect conductors, in accordance with some embodiments of the present invention.
Figure 9B:
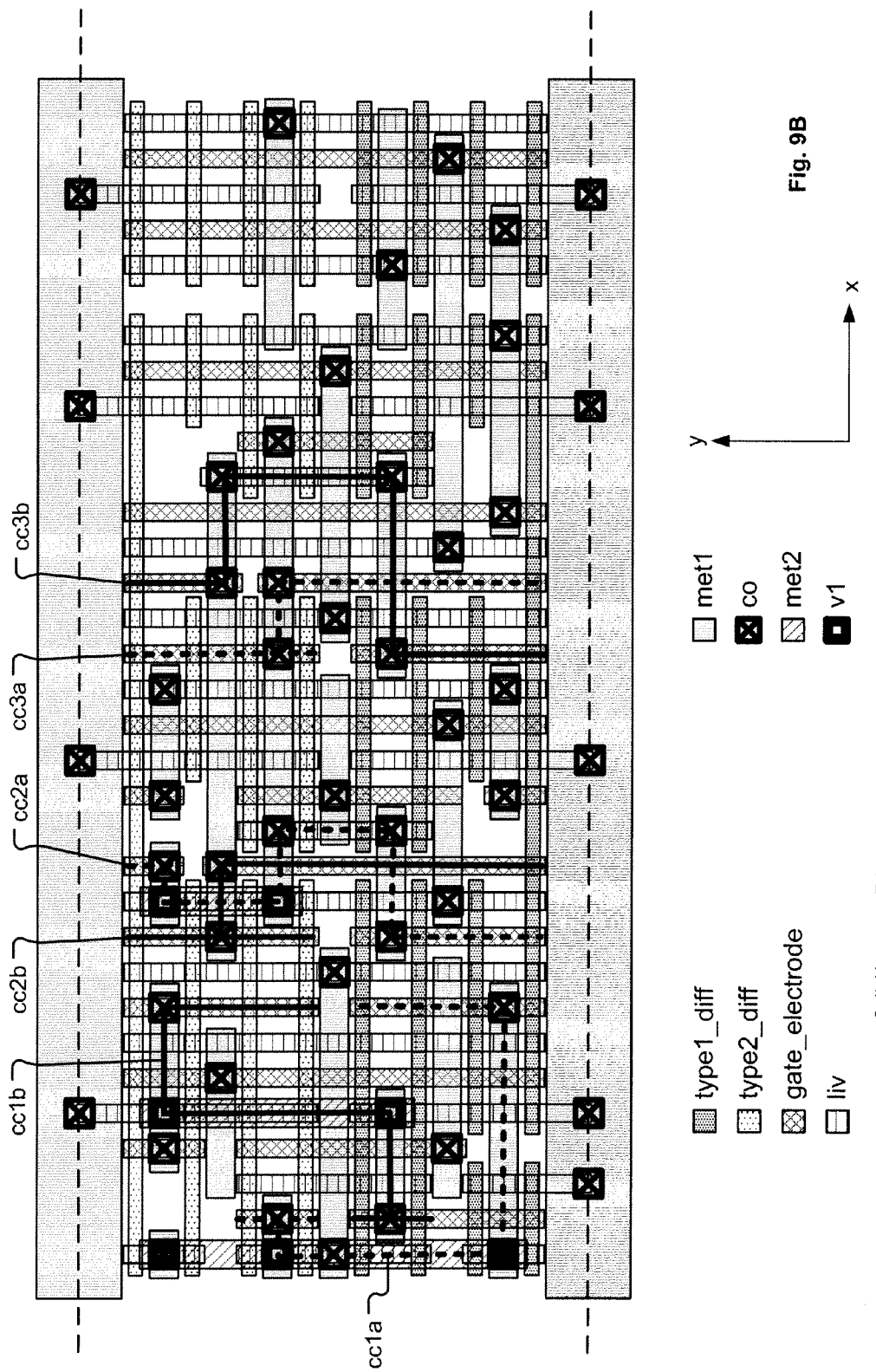
FIG. 9B shows the layout of FIG. 9A with three sets of cross-coupled transistors identified, in accordance with some embodiments of the present invention.
Figure 9C:
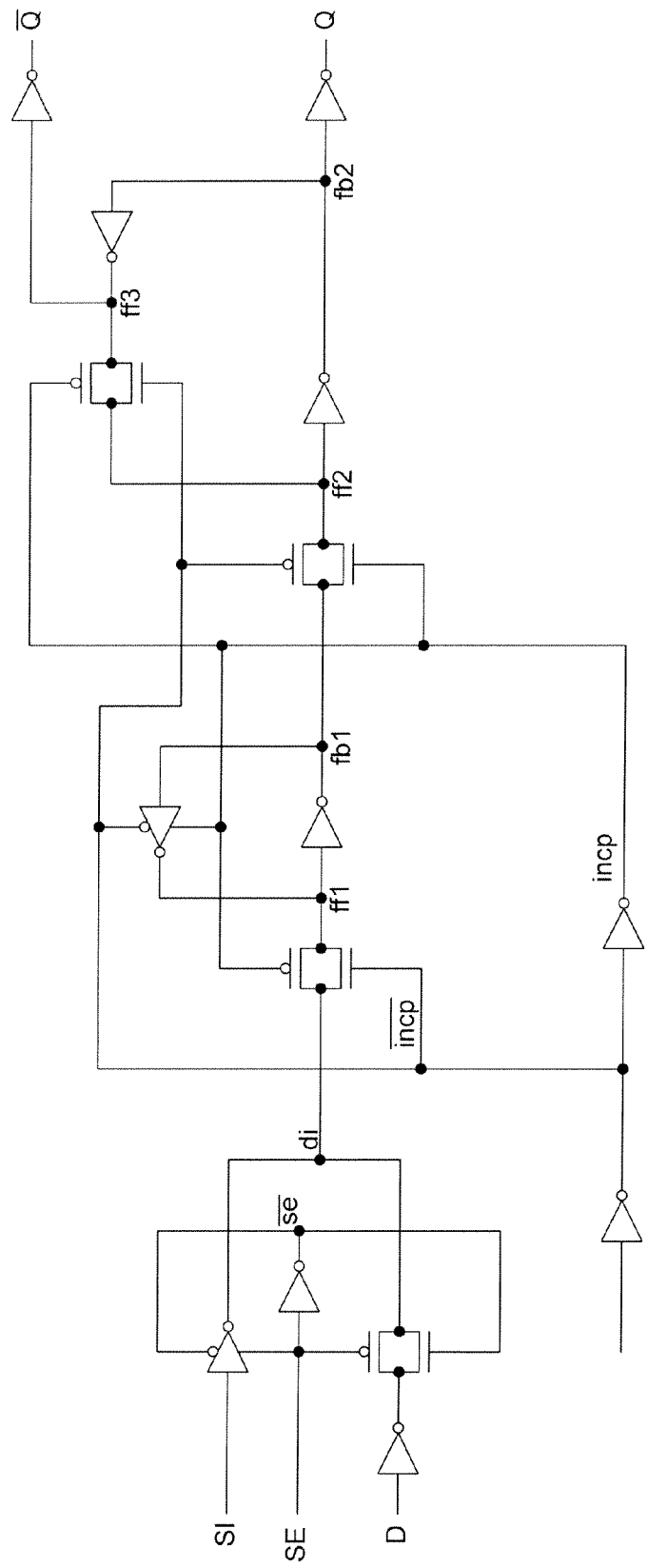
FIG. 9C shows a circuit schematic of the layout of FIG. 9A, in accordance with some embodiments of the present invention.

FIG. 9A shows an example standard cell layout in which diffusion fins are utilized as interconnect conductors, in accordance with some embodiments of the present invention. FIG. 9C shows a circuit schematic of the layout of FIG. 9A. The example standard cell layout of FIG. 9A includes multiple gate electrode line ends in a single track, such as in the gate electrode track 9001. FIG. 9B shows the layout of FIG. 9A with three sets of cross-coupled transistors identified. The first set of cross-coupled transistors is identified by the pair of lines cc1a and cc1b. The second set of cross-coupled transistors is identified by the pair of lines cc2a and cc2b. The third set of cross-coupled transistors is identified by the pair of lines cc3a and cc3b.

Figure 10:
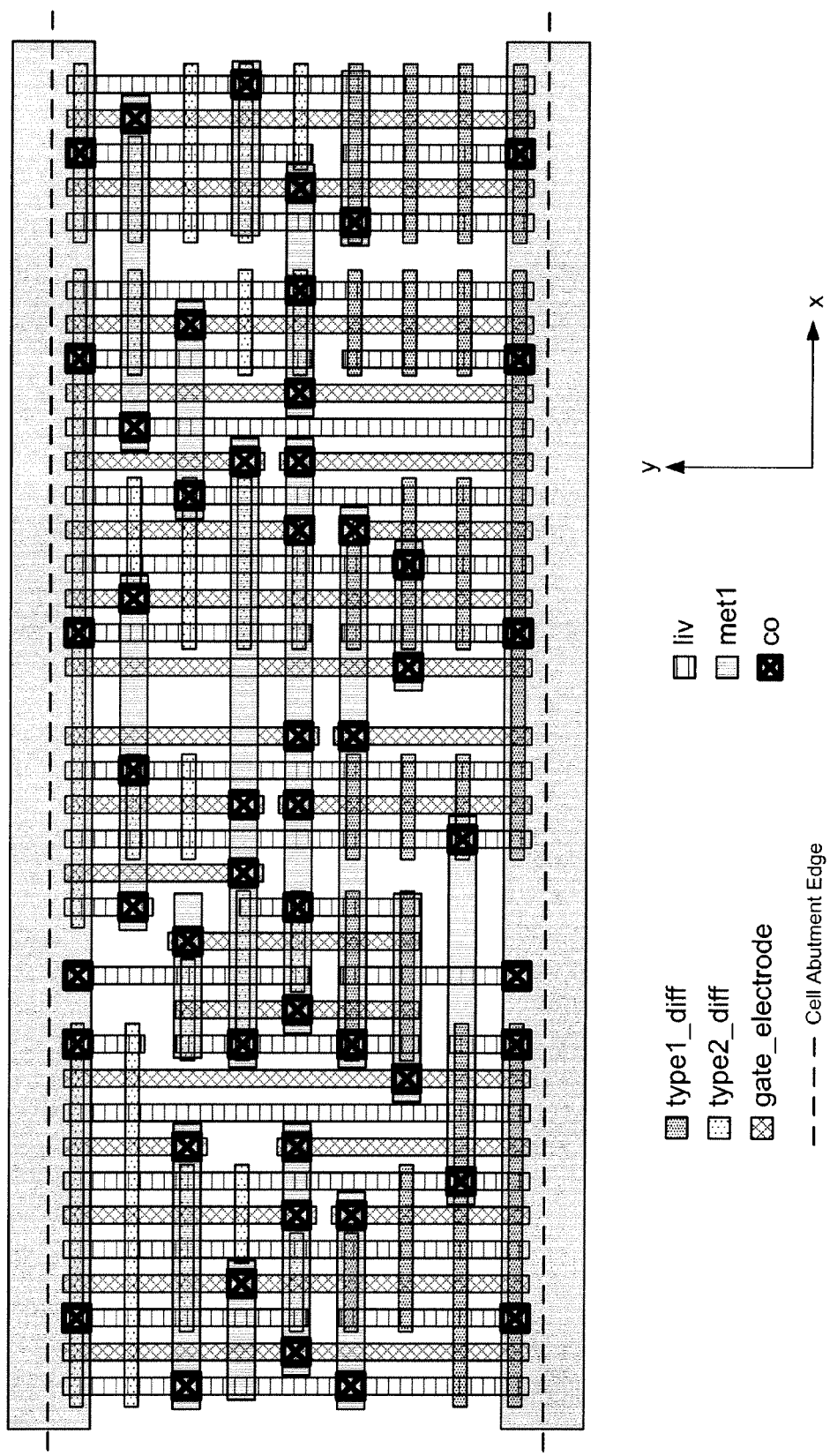
FIG. 10 shows an example standard cell layout with gate electrode contacts positioned substantially over the diffusion fins, in accordance with some embodiments of the present invention.

FIG. 10 shows an example standard cell layout with gate electrode contacts positioned substantially over the diffusion fins, instead of between the diffusion fins, in accordance with some embodiments of the present invention. The example standard cell layout of FIG. 10 also shows variable-width met1 local power structures. In the example standard cell layout of FIG. 10, the contact layer is vertically aligned over the diffusion fins instead of between them. This technique could enable sharing on an abutment edge between diffusion fin structures without a dummy diffusion fin, providing a more efficient layout. It should be understood that a dummy diffusion fin is a diffusion fin that does not form a transistor. Also, it should be appreciated that this technique of vertically aligning the contact layer over the diffusion fins can change the vertical alignment relationship between the met1 interconnect structures and the diffusion fins.

Figure 11:
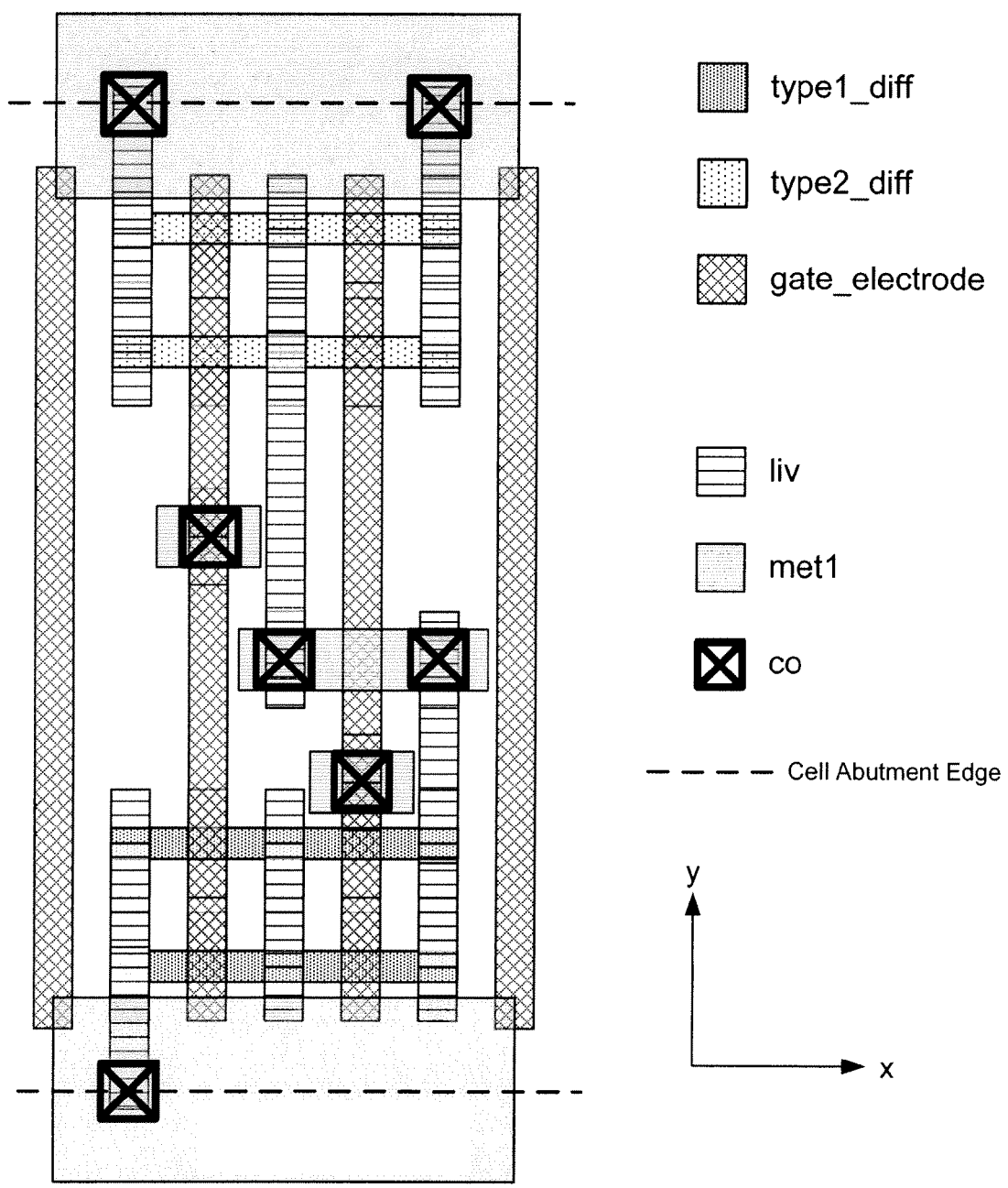
FIG. 11 shows an example cell layout implementing diffusion fins, in accordance with some embodiments of the present invention.

FIG. 11 shows an example cell layout implementing diffusion fins, in accordance with some embodiments of the present invention. In the example layout of FIG. 11, the gate electrode layer includes the following features:
  substantially linear gate electrode structures,
  three or more linear-shaped gate electrode structures on gate electrode layer, two of which are dummies, i.e., gate electrode level structures that do not form a gate electrode of a transistor,
  three or more gate electrode structures on gate electrode layer that have the same vertical dimension (length), i.e., same length in the y direction perpendicular to the lengthwise direction of the diffusion fins (x direction),
  gate electrode structures on gate electrode layer substantially evenly spaced at substantially equal lengthwise centerline-to-lengthwise centerline pitch,
  dummy gate electrode structures shared with adjacent cell on left and/or right, and
  dummy gate electrode structures cut under met1 power rails.

In the example layout of FIG. 11, the diffusion fins include the following features:
  substantially evenly spaced diffusion fins in accordance with substantially equal pitch, diffusion fins can be on a grid, diffusion fin pitch less than 90 nm in some embodiments,
  one or more diffusion fins for each of p-type and n-type, FIG. 11 shows two diffusion fins of n-type and two diffusion fins of p-type, but other embodiments can include any number of diffusion fins of either type,
  same number of p-type and n-type diffusion fins, other embodiments may have different number of p-type versus n-type diffusion fins
  one or more diffusion fins omitted under power rails,
  one of more diffusion fins omitted between p-type and n-type sections, and
  each diffusion fin of substantially equal width and length.

In the example layout of FIG. 11, the local interconnect include the following features:
  gate electrodes and diffusion fin source/drain connections are on different conductor layers, and these different conductor layers are isolated from each other,
  substantially linear conductor layer parallel to gate for source drain connection; in some embodiments, on same pitch as gate layer; and in some embodiments, this linear conductor layer may be offset by the gate half-pitch.
  positive overlap of local interconnect with diffusion fins.

In the example layout of FIG. 11, the higher level met1 interconnect layer includes the following features:
  gate conductor contact between p-type and n-type diffusion fins,
  contacts gridded in both directions,
  contacts connect local interconnect and gate conductors to the metal layer above, substantially linear metal; metal on a pitch; metal on a pitch that is same as diffusion fin pitch with half-pitch offset vertically, output node and input node pins on same layer, wide power rails on top and bottom edges, each shared; power rails connect to left and right by abutment, output and input nodes on highest metal level; contacts positioned between p-type and n-type diffusion fins, and power rail contacts to local interconnect shared with abutting cells on top and bottom.

Figure 12A:
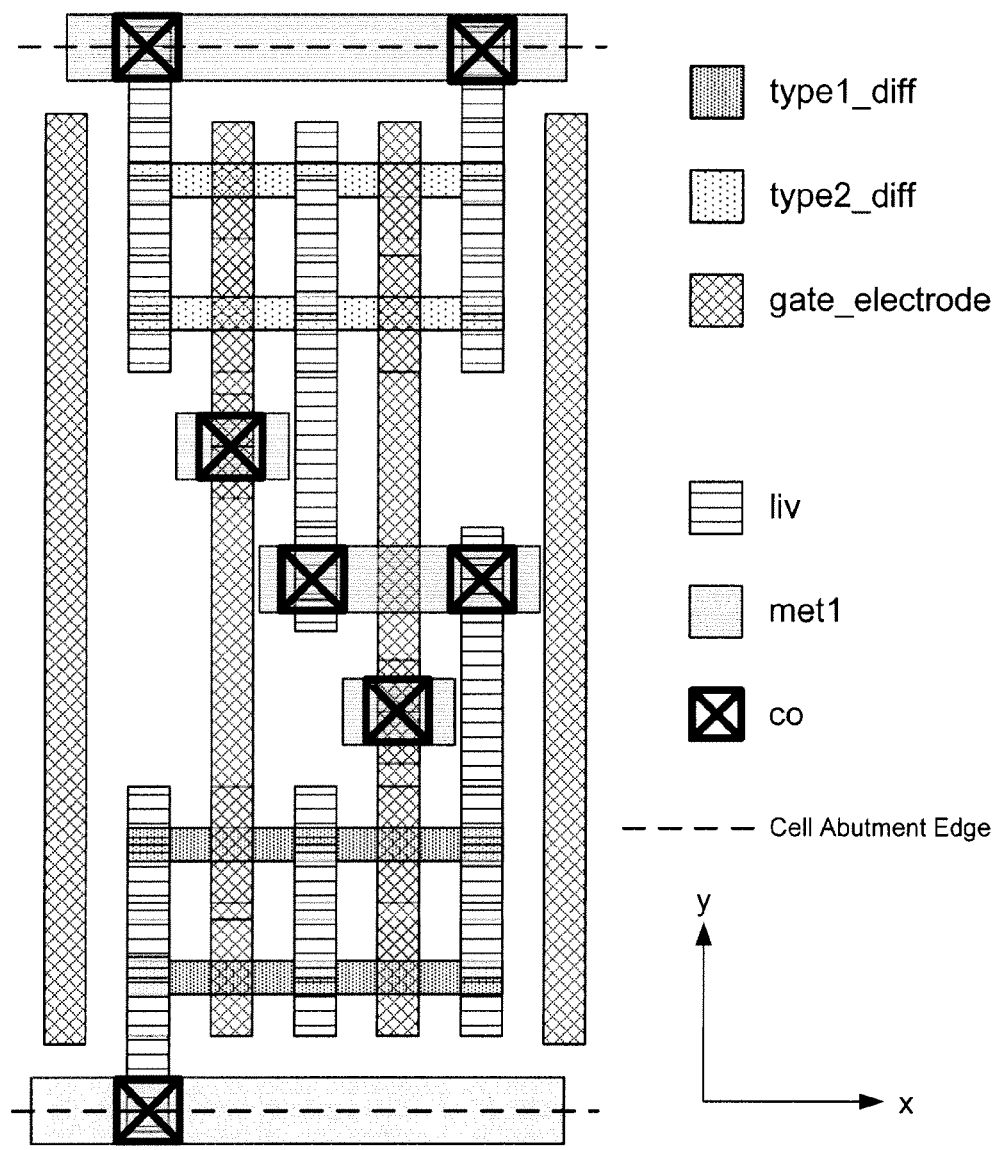
FIGS. 12A/B show a variation of the layout of FIG. 11 having minimum width men power rails, in accordance with some embodiments of the present invention.
Figure 12B:
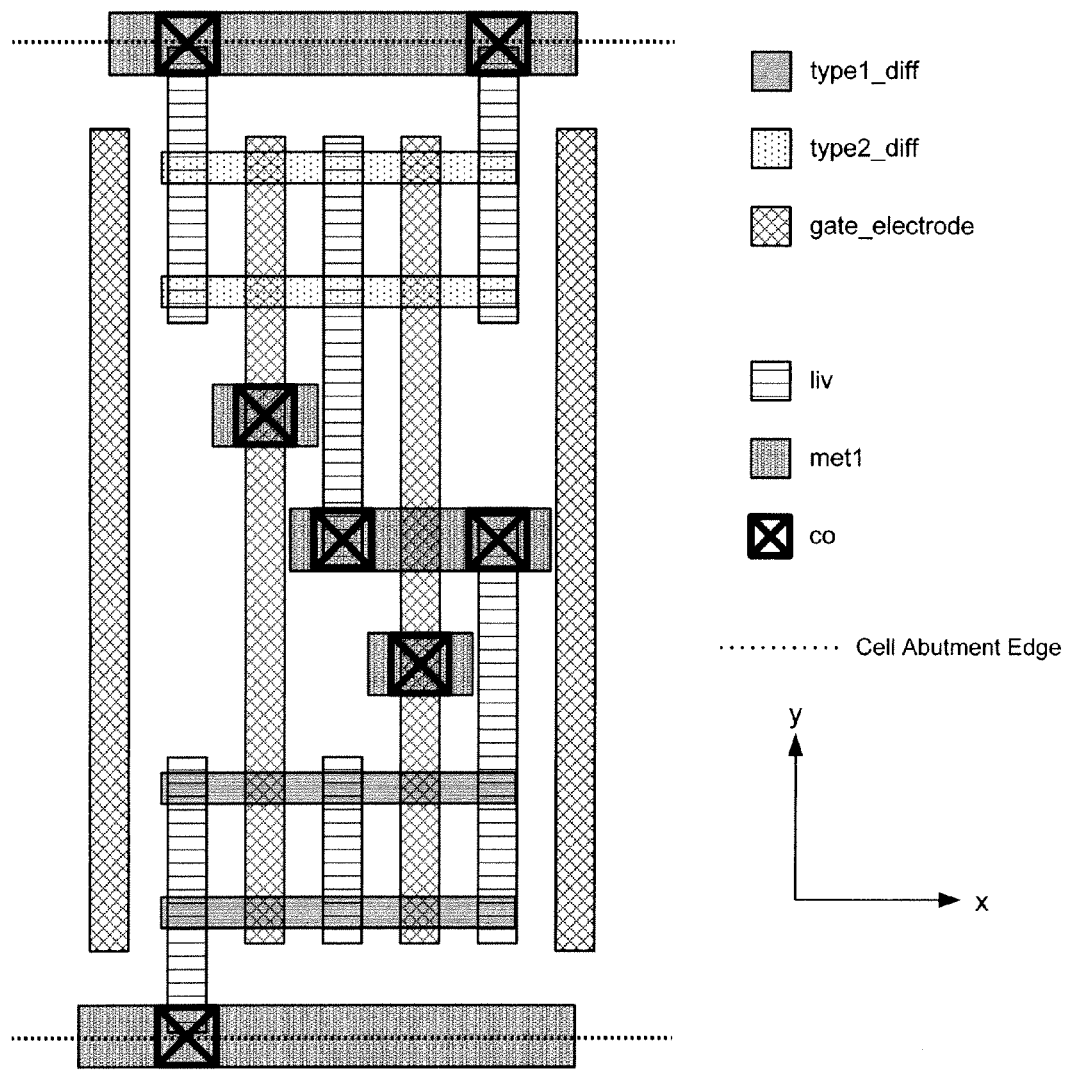

FIGS. 12A/B show a variation of the layout of FIG. 11 having minimum width men power rails, in accordance with some embodiments of the present invention. FIG. 12B shows the same layout as FIG. 12A, with the layout depicted in a merged format for clarity. The example layout of FIGS. 12A/B also has all met1 of the same width, on the same pitch, including the power rails. Also, in the layout of FIGS. 12/B, met1 is positioned at the same (y) direction locations as the diffusion fin pitch.

Figure 13A:
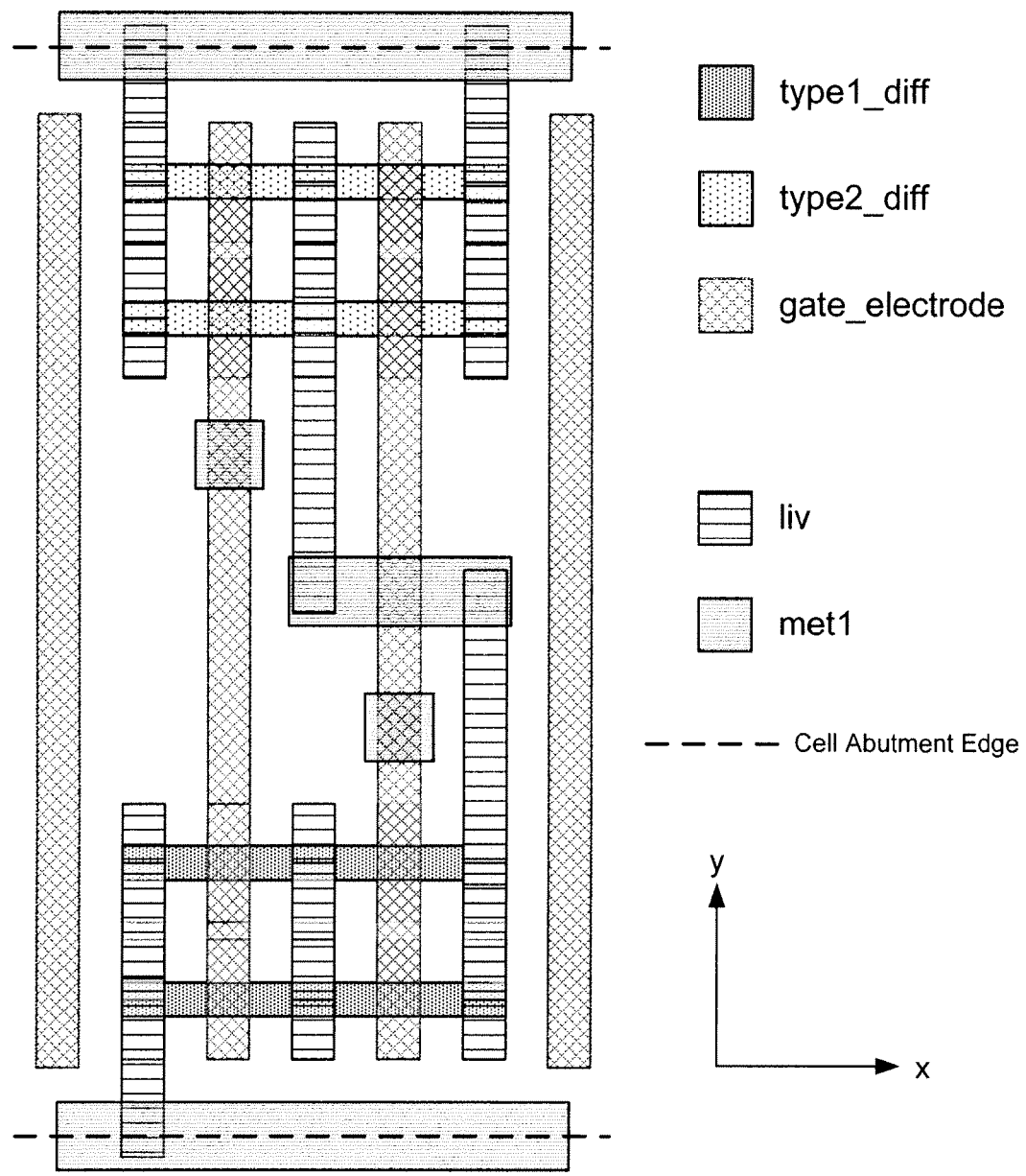
FIGS. 13A/B show a variation of the layout of FIGS. 12A/B that does not have contacts from each of local interconnect and gate electrode structures to met1, in accordance with some embodiments of the present invention.
Figure 13B:
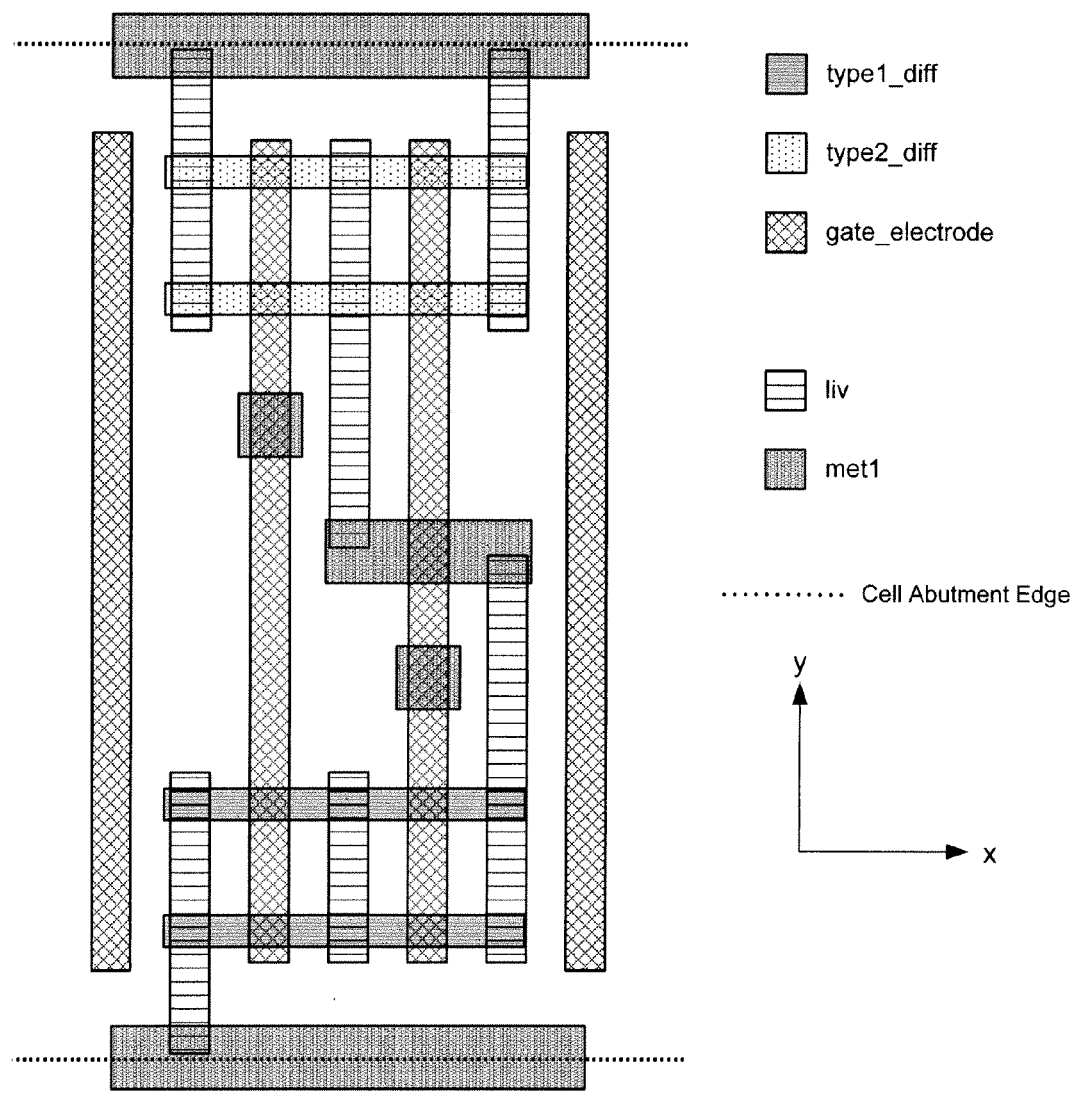

FIGS. 13A/13 show a variation of the layout of FIGS. 12A/B that does not have contacts from each of local interconnect and gate electrode structures to met1, in accordance with some embodiments of the present invention. FIG. 13B shows the same layout as FIG. 13A, with the layout depicted in a merged format for clarity. In this embodiment, met1 is formed to directly connect with the local interconnect and gate electrode structures. Also, in other embodiments, either the local interconnect structure, gate electrode structures, or both local interconnect and gate electrode structures can directly connect to met1.

Figure 14A:
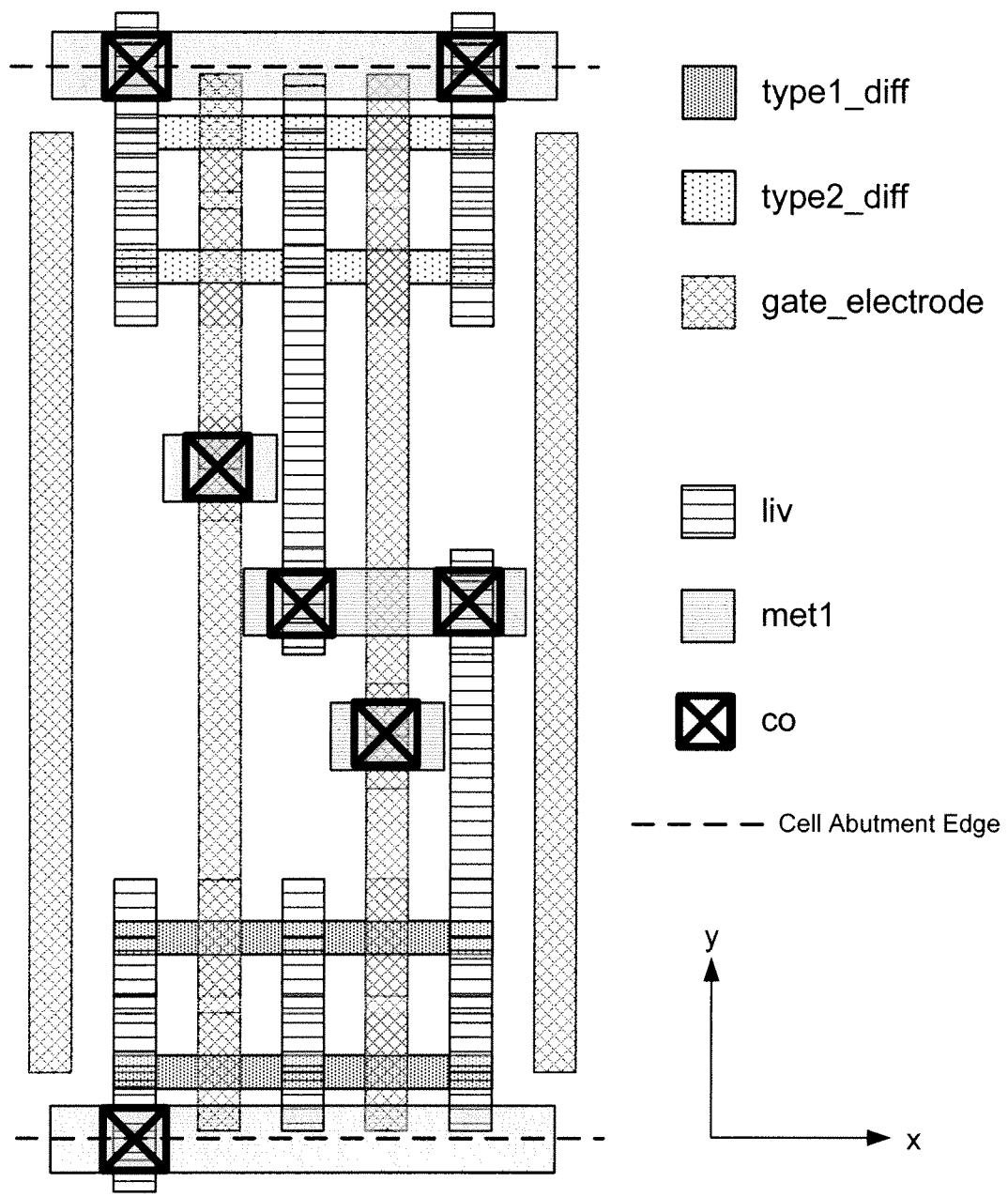
FIGS. 14A/B show a variation of the layout of FIG. 11 having minimum width met1 power rails, with all met1 structures of the same width and on the same pitch, including the power rails, in accordance with some embodiments of the present invention.
Figure 14B:
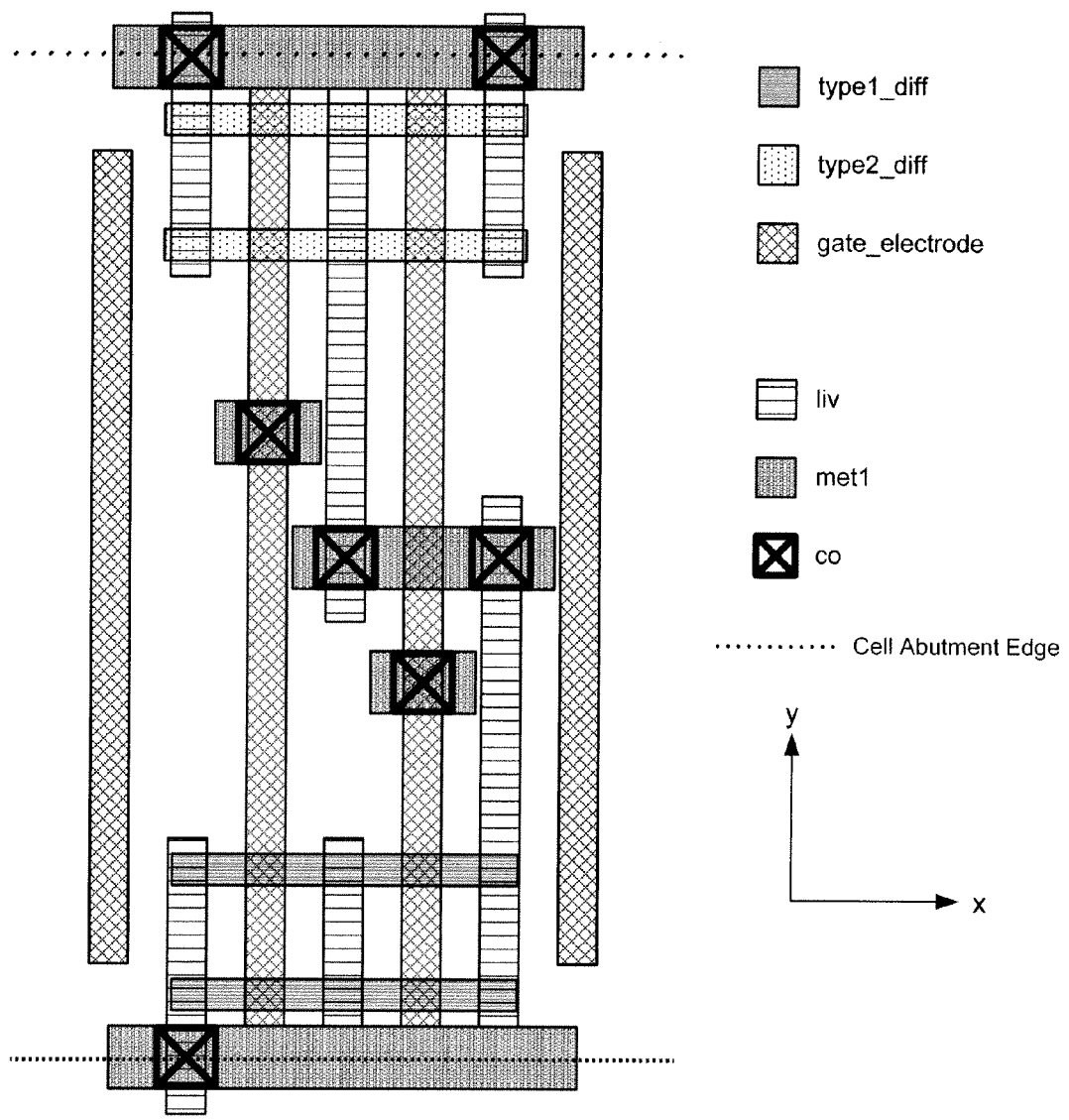

FIGS. 14A/B show a variation of the layout of FIG. 11 having minimum width met1 power rails, with all met1 structures of the same width and on the same pitch, including the power rails, in accordance with some embodiments of the present invention. FIG. 14B shows the same layout as FIG. 14A, with the layout depicted in a merged format for clarity.

Figure 15A:
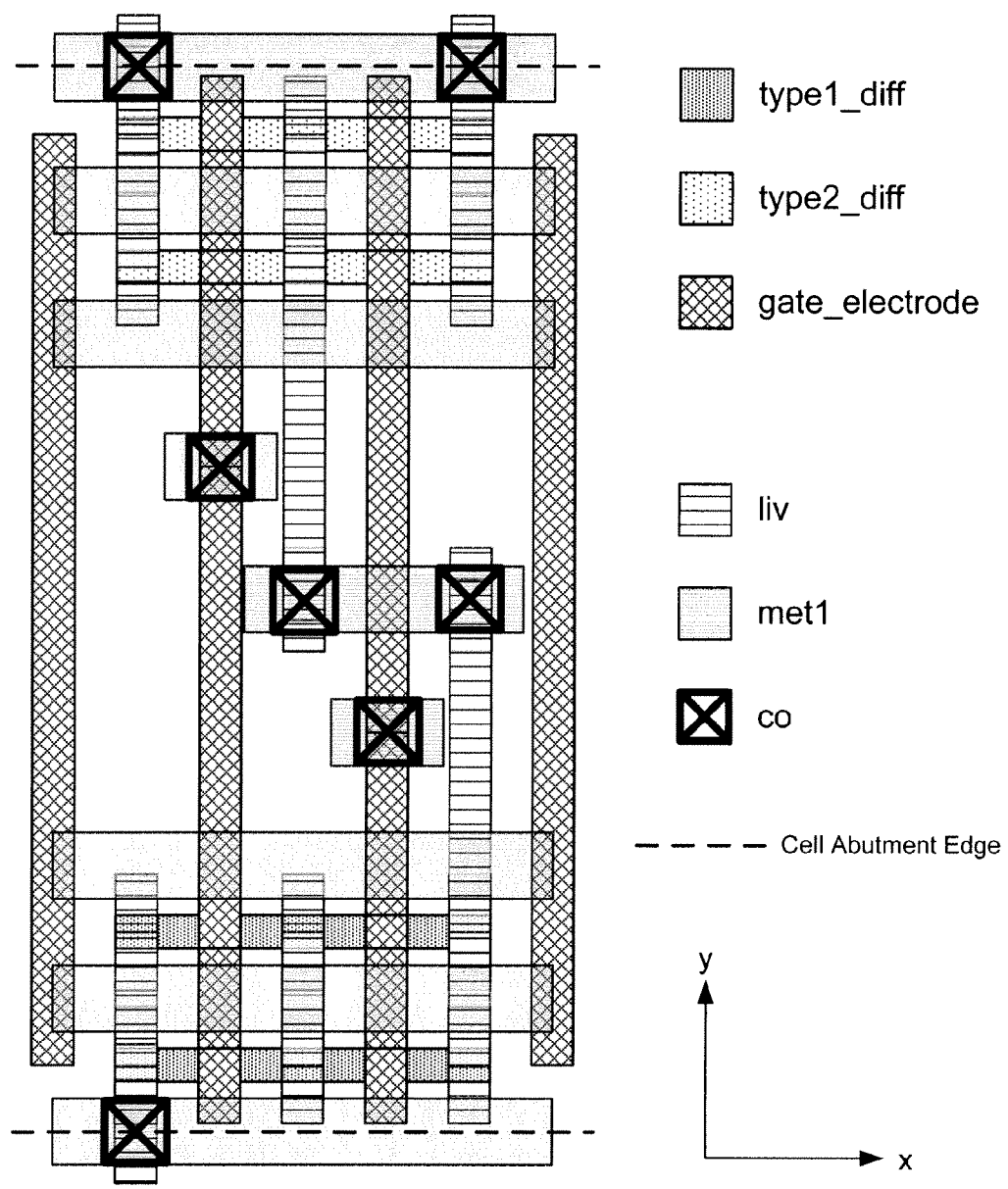
FIGS. 15A/B show a variation of the layout of FIGS. 14A/B having met1 routing structures populated so each (y) location has a men structure, in accordance with some embodiments of the present invention.
Figure 15B:
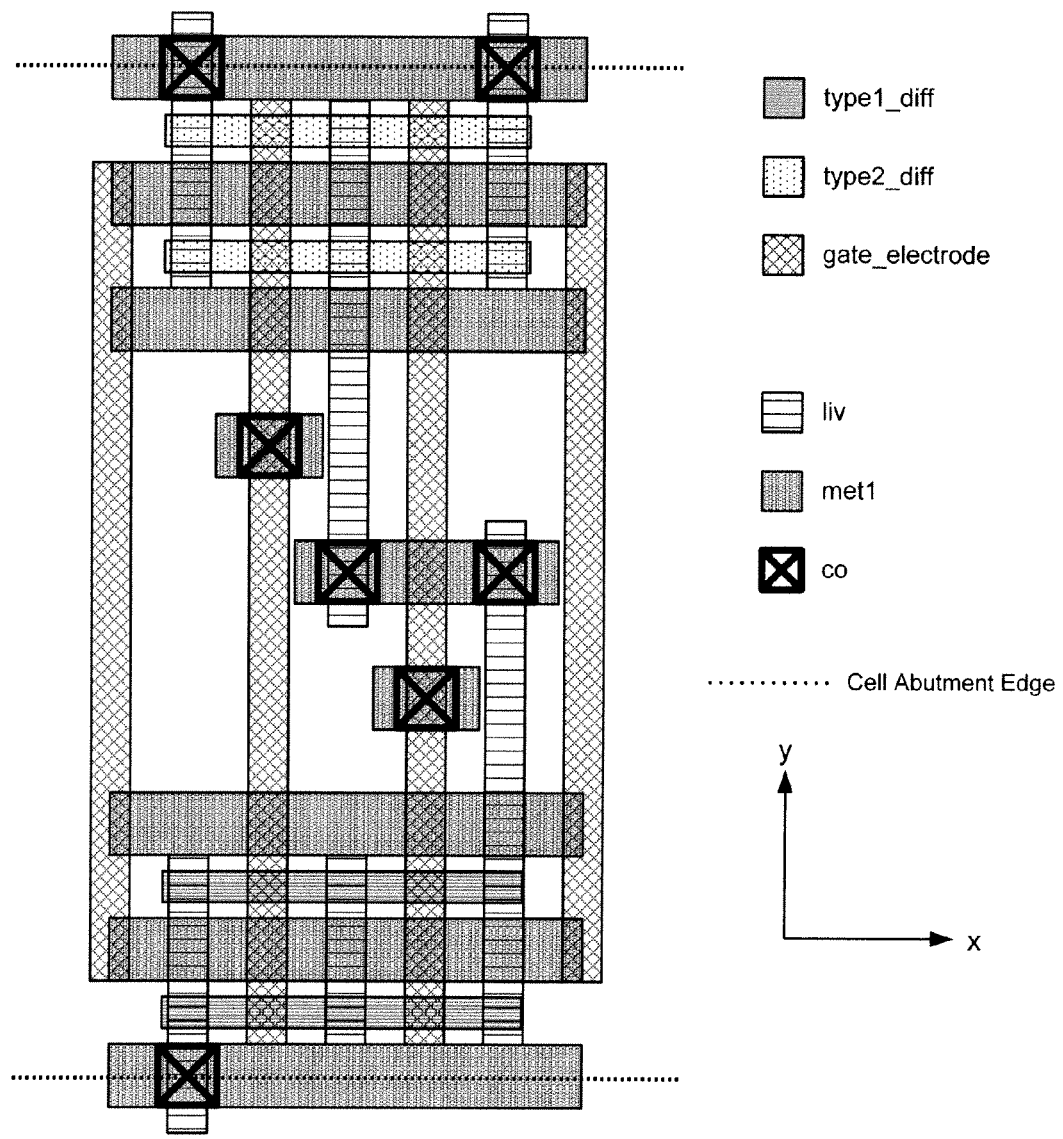

FIGS. 15A/B show a variation of the layout of FIGS. 14A/B having met1 routing structures populated so each (y) location has a met1 structure, in accordance with some embodiments of the present invention. FIG. 15B shows the same layout as FIG. 15A, with the layout depicted in a merged format for clarity.

Figure 16A:
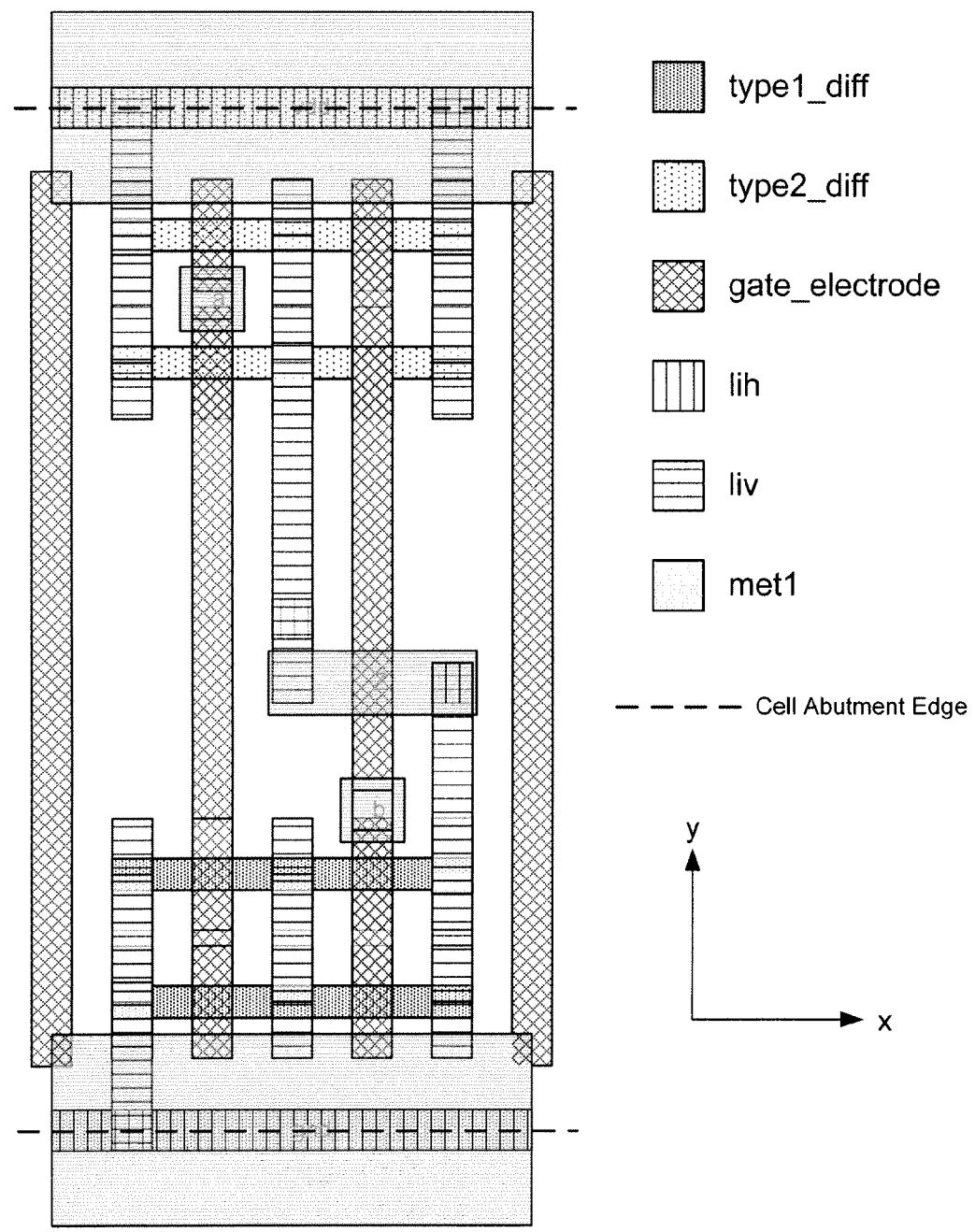
FIGS. 16A/B show a variation of the layout of FIG. 11 having gate electrode structure contacts placed between p-type diffusion fins, in accordance with some embodiments of the present invention.
Figure 16B:
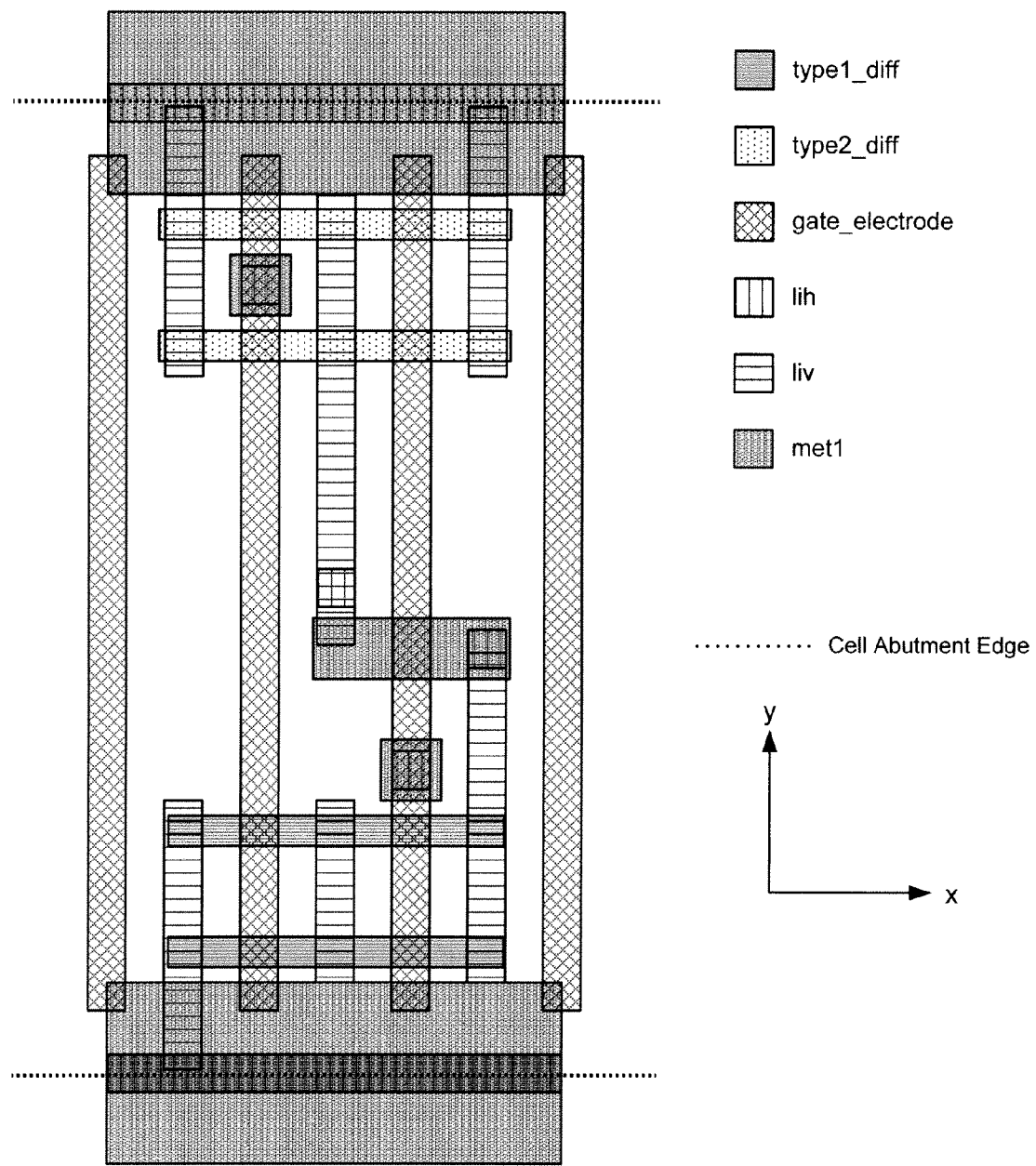

FIGS. 16A/B show a variation of the layout of FIG. 11 having gate electrode structure contacts placed between p-type diffusion fins, in accordance with some embodiments of the present invention. FIG. 16B shows the same layout as FIG. 16A, with the layout depicted in a merged format for clarity. The example layout of FIGS. 16A/B also shows diffusion fins positioned under the met1 power rails and connected to VSS/VDD. Also, the diffusion fin VDD/VSS structures are shared with the cells above and/or below. For ease of illustration, the contact layer is not shown in the layout of FIGS. 16A/B.

Figure 17A:
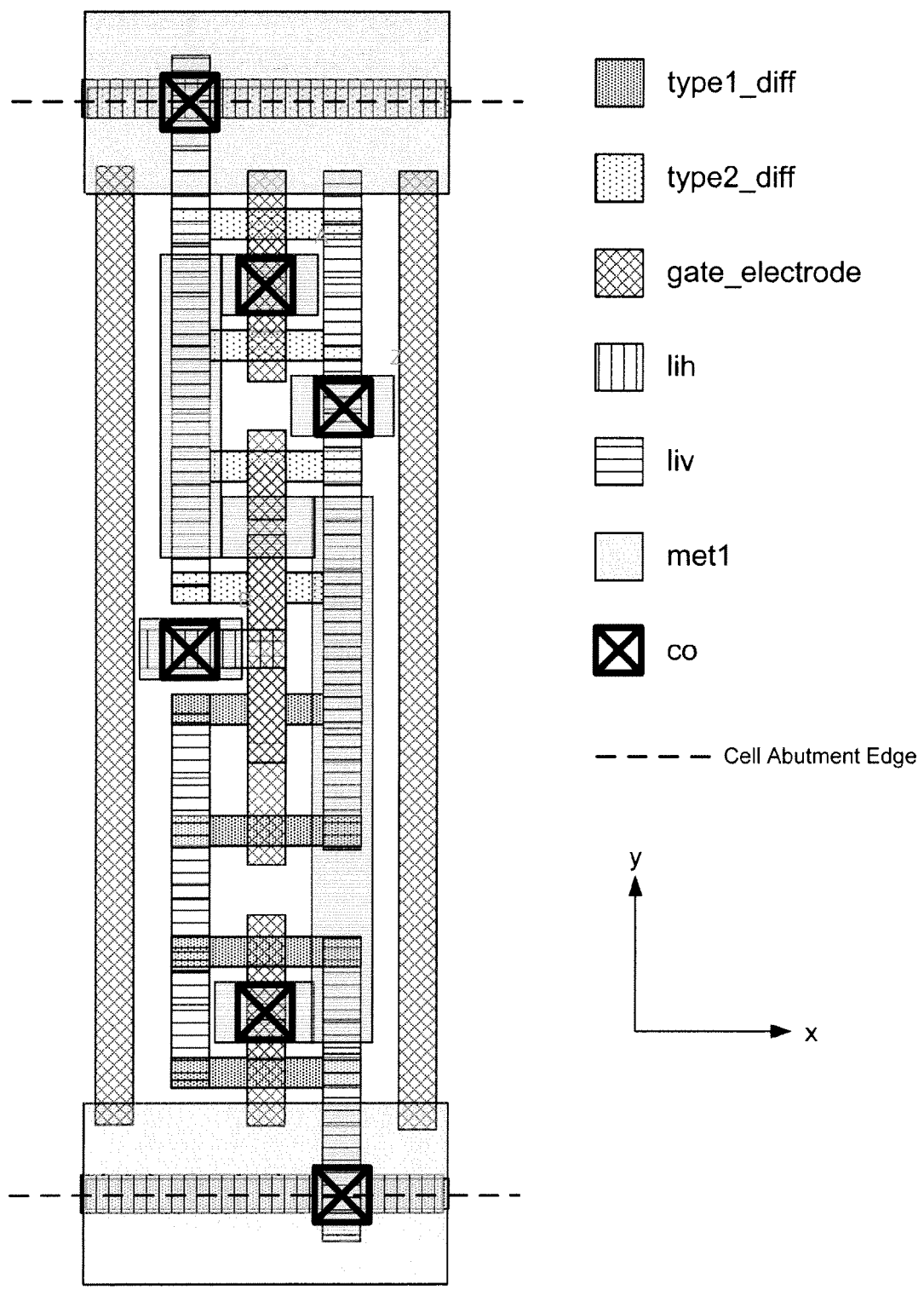
FIGS. 17A/B show an example cell layout implementing diffusion fins, in accordance with some embodiments of the present invention.
Figure 17B:
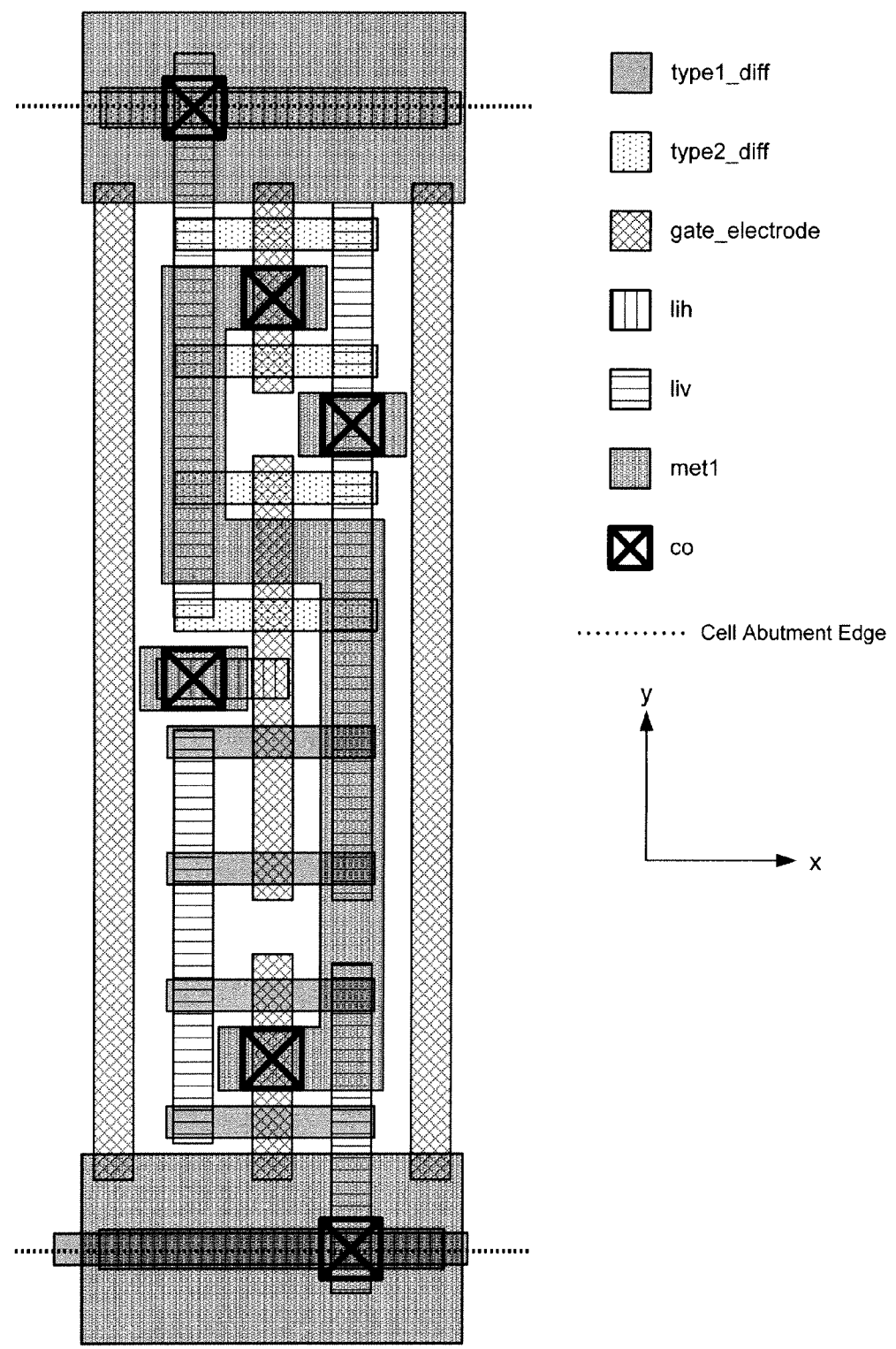

FIGS. 17A/B show an example cell layout implementing diffusion fins, in accordance with some embodiments of the present invention. FIG. 17B shows the same layout as FIG. 17A, with the layout depicted in a merged format for clarity. In the example layout of FIGS. 17A/B, the gate electrode layer includes the following features:

substantially linear gate electrode structures, three or more linear structures on gate electrode layer, at least two of which are dummies, dummy structures on gate electrode layer are of same vertical dimension (length), i.e., same length in the y direction perpendicular to the lengthwise direction of the diffusion fins (x direction), structures on gate electrode layer substantially evenly spaced and/or equal pitched in x direction, dummy structures shared with adjacent cell on left and/or right, dummy structures as well as gate electrode structures drawn as a single line and then cut under power rails as well as where needed; gate electrode structure cuts drawn on separate layer; gate electrode layer shown as final result with cuts in FIGS. 17A/B, three or more segments of gate electrode, controlling two of more type p-type and n-type transistors, multiple gate electrodes structures in the same x location, each connected to a different net; and connected to two different input nets.

In the example layout of FIGS. 17A/B, the diffusion fins include the following features:

substantially evenly spaced diffusion fins in accordance with substantially equal pitch, diffusion fins can be on a grid, diffusion fin pitch less than 90 nm in some embodiments, one or more diffusion fins for each of p-type and n-type, same number of p-type and n-type diffusion fins, shared diffusion fins under power rails, diffusion fins may or may not be omitted between p-type and n-type sections; FIGS. 17A/B show all fins present, each diffusion fin of substantially equal width and length, with the diffusion fin width measured in the y direction and the diffusion fin length measured in the x direction, diffusion fins drawn as continuous lines; separate cut mask drawn to separate them into segments; FIGS. 17A/B show diffusion fin segments after separation; it should be understood that in some embodiments the diffusion fin line ends can be drawn in the diffusion fin level layout or formed using the cut mask.

In the example layout of FIGS. 17A/B, the local interconnect include the following features:

gate electrodes and diffusion fin source/drain connections are on different conductor layers; these different conductor layers may be merged during fabrication, substantially linear conductor layer parallel to gate for source drain connection; in some embodiments, on same pitch as gate layer; and in some embodiments, this linear conductor layer may be offset by the gate half-pitch.

positive, zero, or negative overlap of local interconnect with diffusion fins, direct connection of local interconnect to diffusion fin source/drain and gate electrode structures, shared local interconnect under power rail; local interconnect under power rail may be omitted in some embodiments.

In the example layout of FIGS. 17A/B, the higher level met1 interconnect layer includes the following features:

gate electrode structure contact between diffusion fins, contacts gridded in one or both of the x and y directions, contacts connect local interconnect and gate conductors to the metal layer above, metal locations may be fixed in one or both of x and y directions, output node and input node pins on same layer, wide power rails on top and bottom are shared; power rails connect to left and right by abutment; power rails contact to local interconnect are shared, metal can have bends. In some embodiments, the bends in metal interconnect can be centered between adjacent diffusion fins. Also, in some embodiments, the vertical segments of the metal interconnect that extend in the y direction can be aligned with the vertical local interconnect so as to extend along an over the vertical local interconnect in the y direction.

Figure 18A:
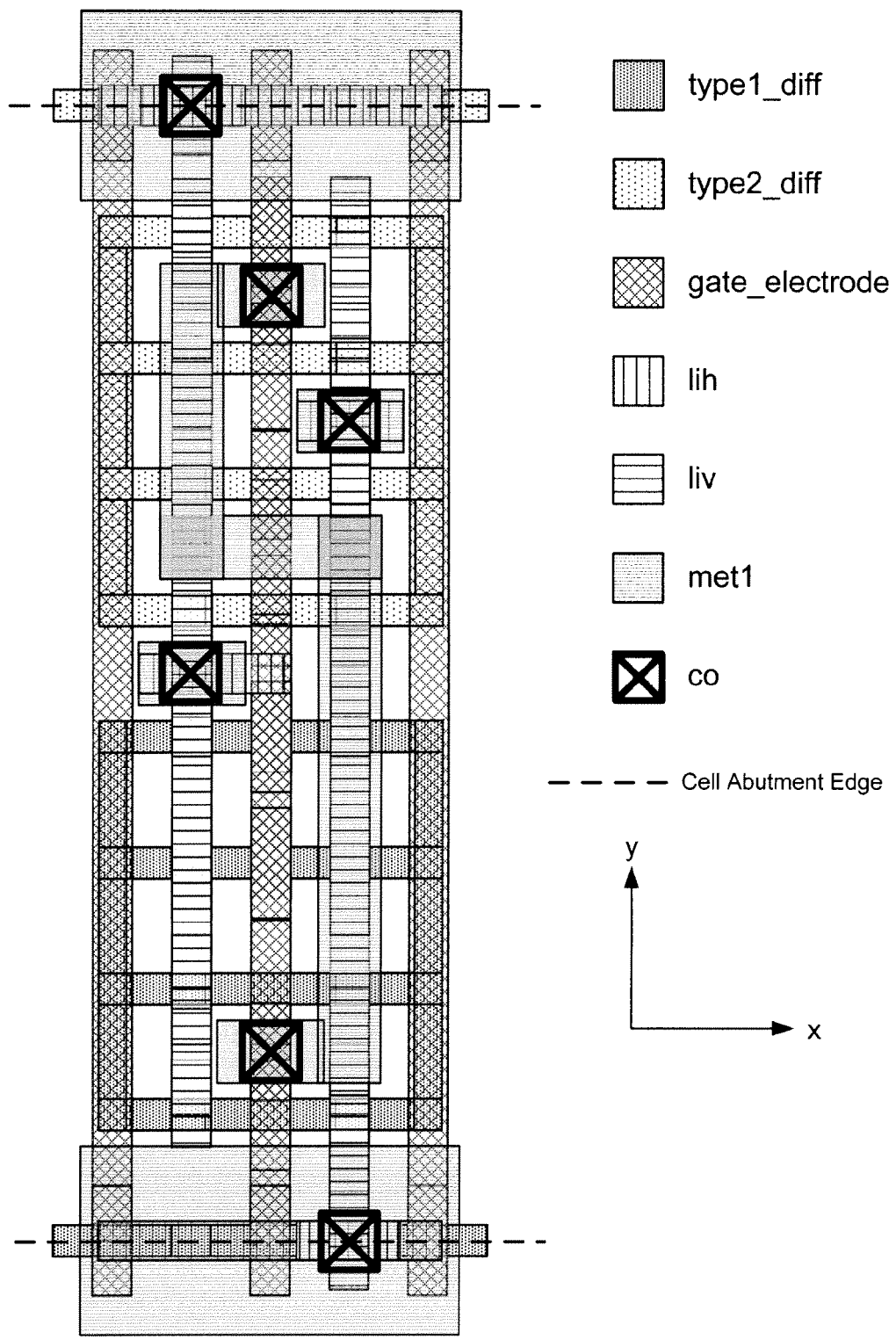
FIGS. 18A/B show a variation of the layout of FIGS. 17A/B in which the contacts connect to the horizontal local interconnect, and in which the horizontal local interconnect connects directly to the vertical local interconnect, in accordance with some embodiments of the present invention.
Figure 18B:
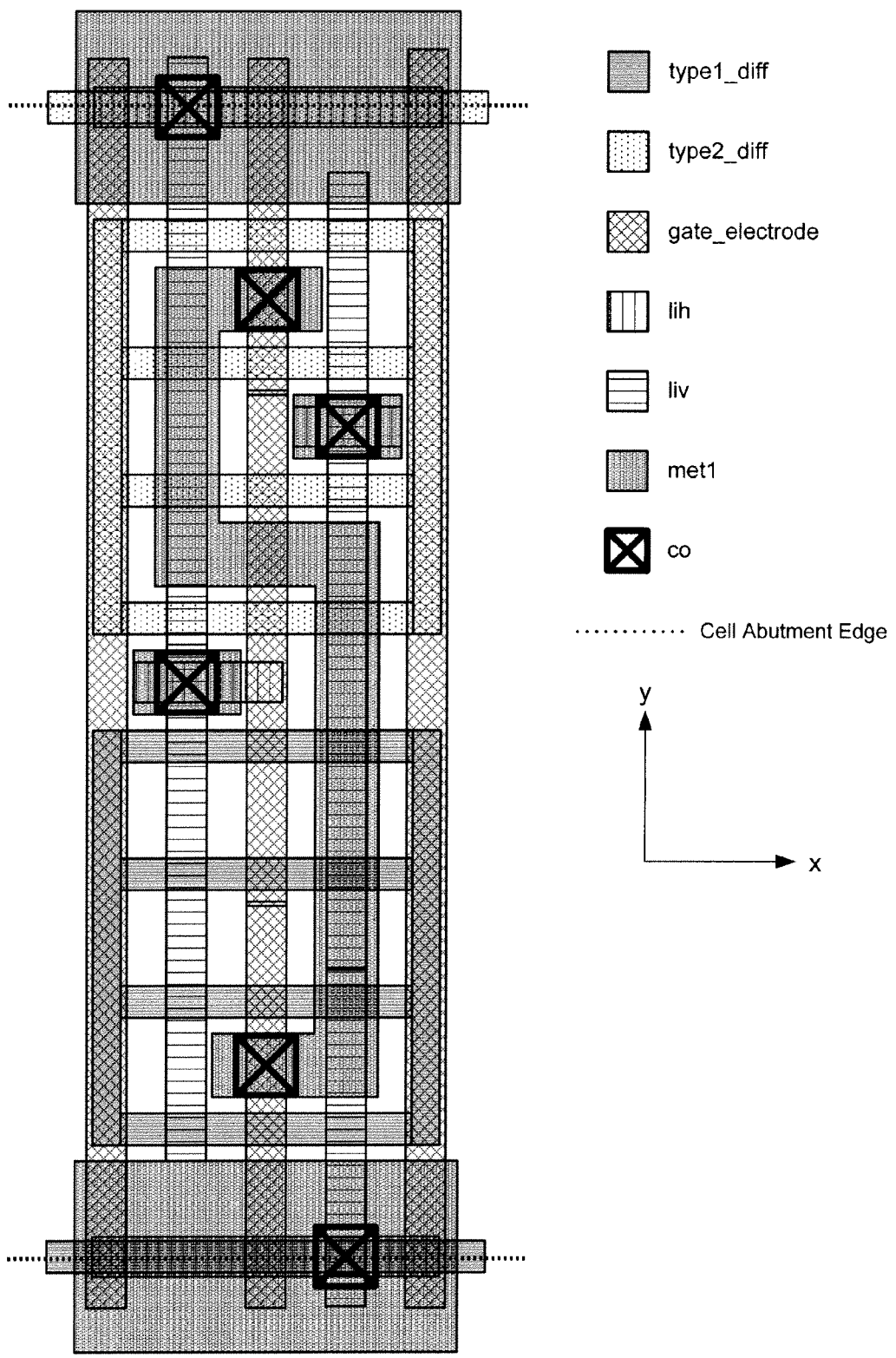

FIGS. 18A/B show a variation of the layout of FIGS. 17A/B in which the contacts connect to the horizontal local interconnect, and in which the horizontal local interconnect connects directly to the vertical local interconnect, in accordance with some embodiments of the present invention. FIG. 18B shows the same layout as FIG. 18A, with the layout depicted in a merged format for clarity. In the layout of FIGS. 18A/B, the cuts on diffusion fin, gate electrode, and local interconnect layers are not shown.

Figure 19A:
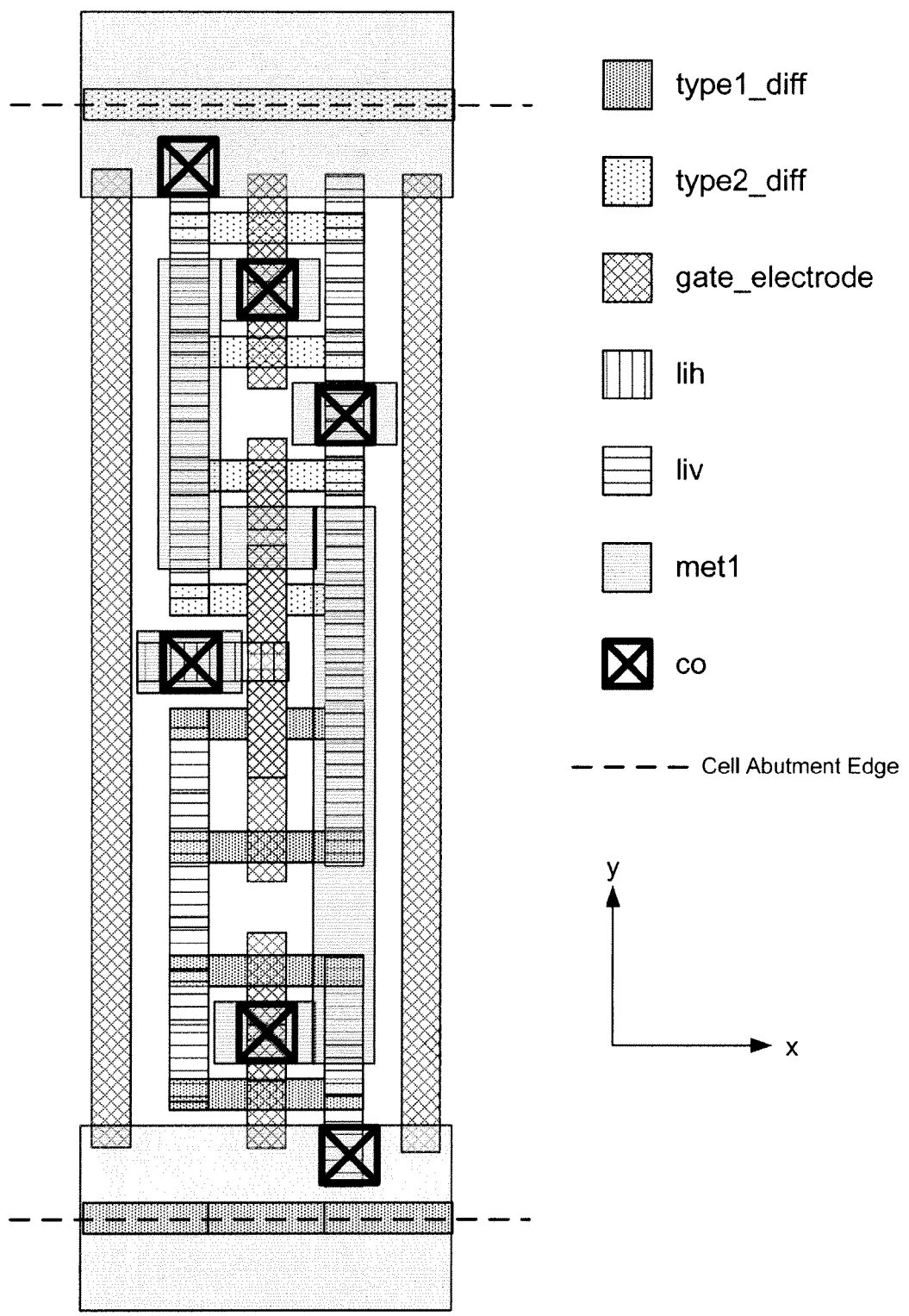
FIGS. 19A/B show a variation of the layout of FIGS. 17A/B in which the power rail contact to local interconnect are not shared, and in which there is no shared local interconnect under the power rails, in accordance with some embodiments of the present invention.
Figure 19B:
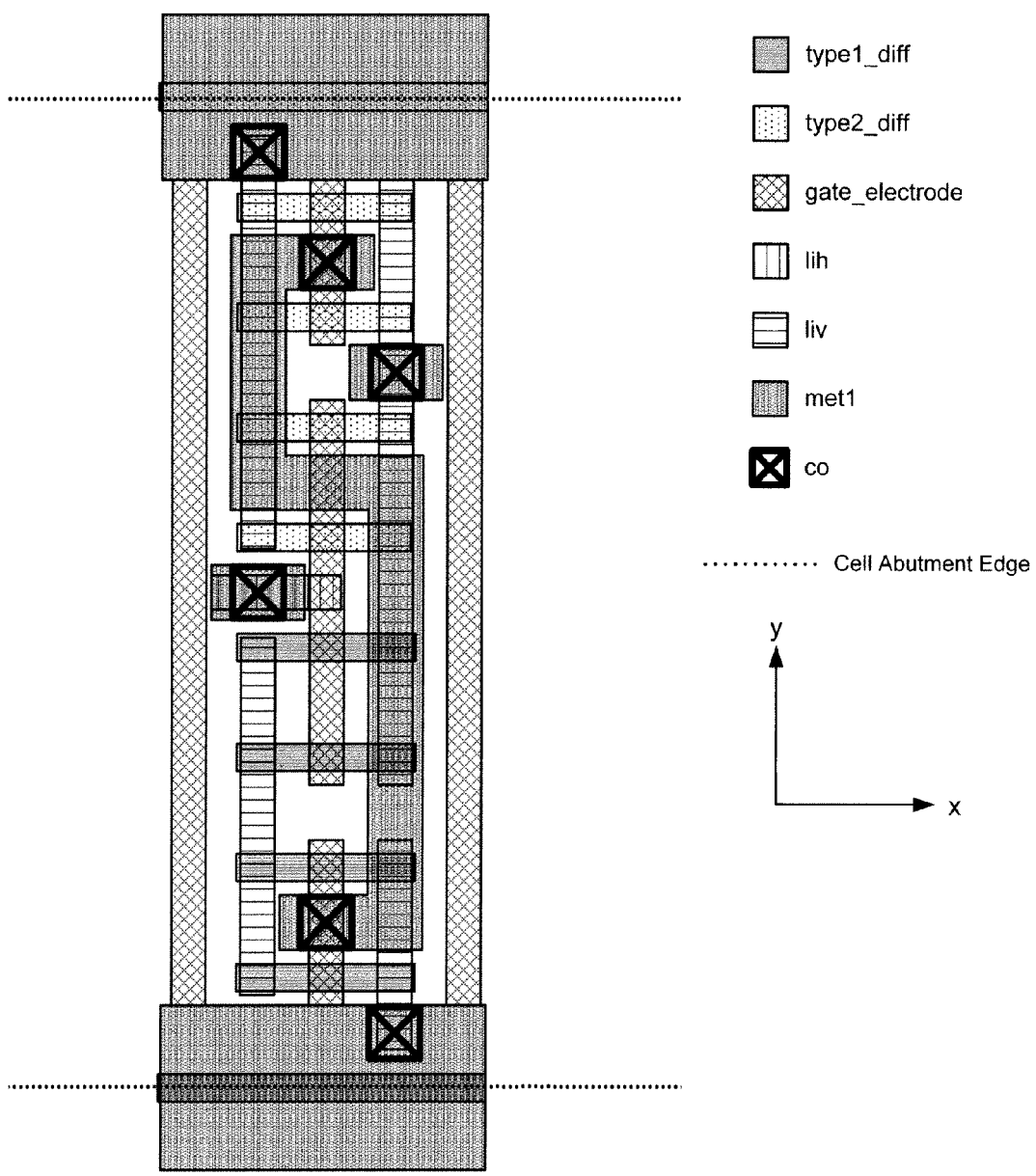

FIGS. 19A/B show a variation of the layout of FIGS. 17A/B in which the power rail contact to local interconnect are not shared, and in which there is no shared local interconnect under the power rails, in accordance with some embodiments of the present invention. FIG. 19B shows the same layout as FIG. 19A, with the layout depicted in a merged format for clarity.

Figure 20A:
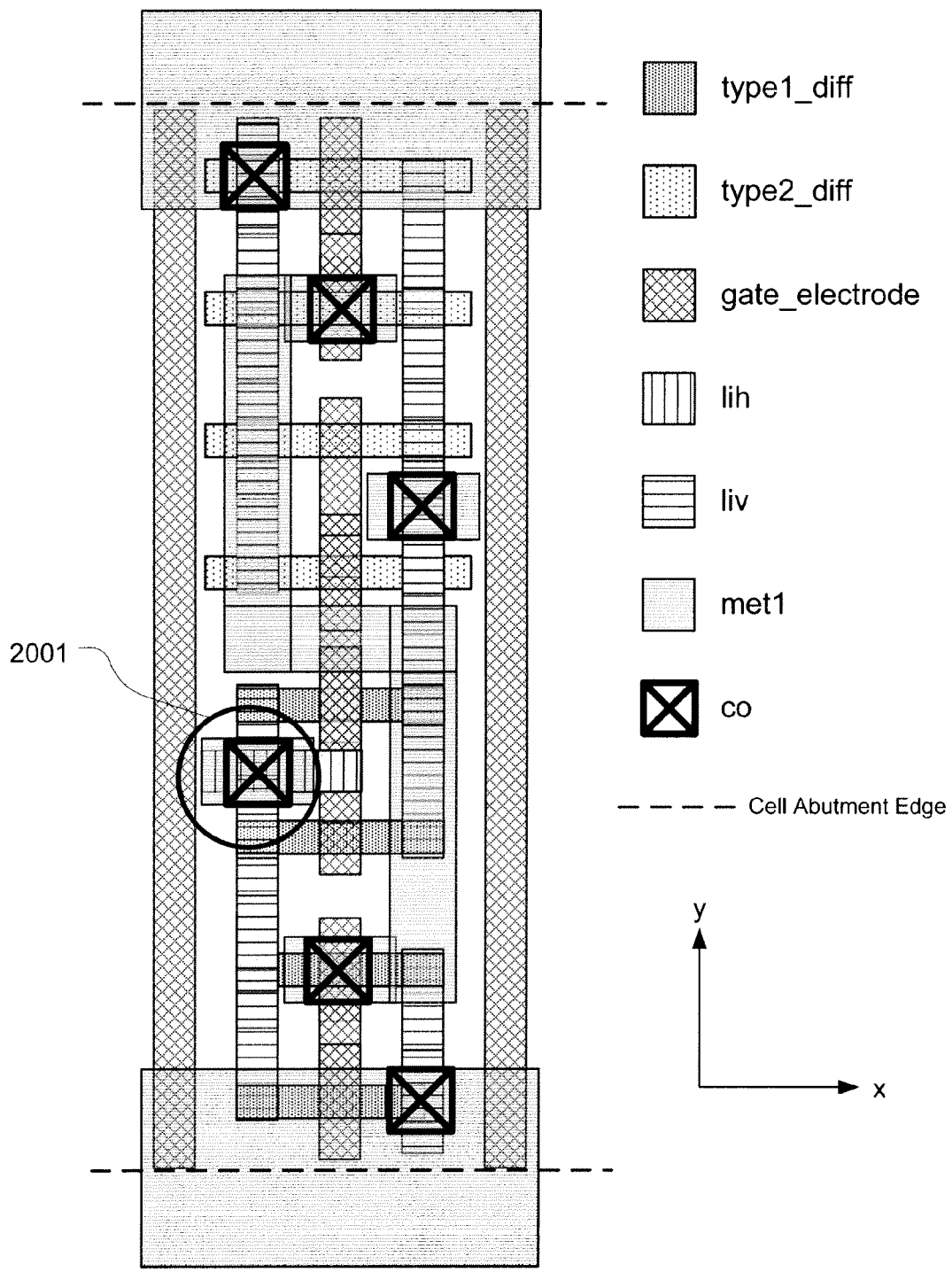
FIGS. 20A/B show a variation of the layout of FIGS. 19A/B in which the diffusion fins are offset by a diffusion fin half-pitch with respect to the cell boundary, in accordance with some embodiments of the present invention.
Figure 20B:
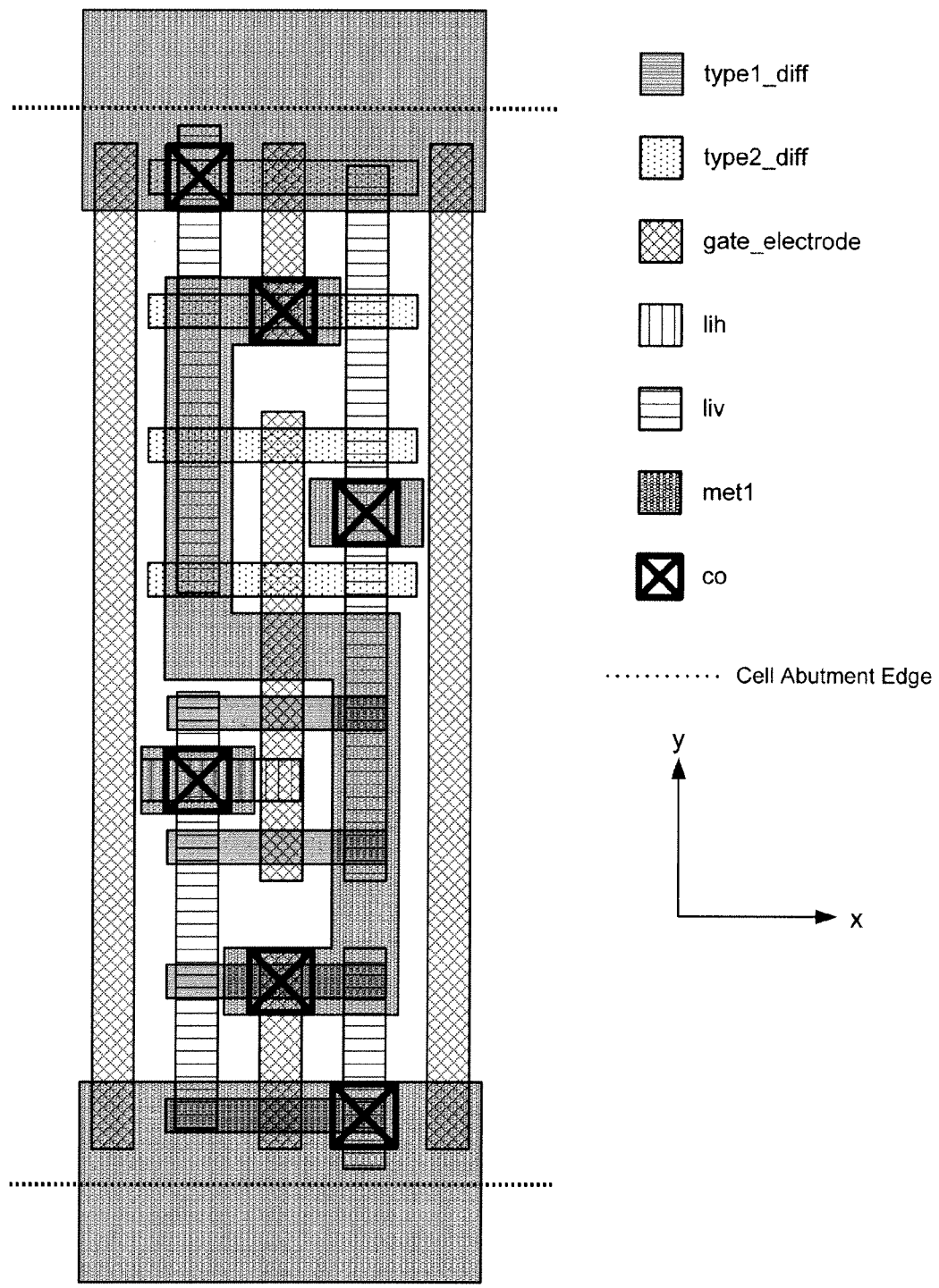

FIGS. 20A/B show a variation of the layout of FIGS. 19A/B in which the diffusion fins are offset by a diffusion fin half-pitch with respect to the cell boundary, in accordance with some embodiments of the present invention. FIG. 20B shows the same layout as FIG. 20A, with the layout depicted in a merged format for clarity. The layout of FIGS. 20A/B also includes diffusion fin locations which are the same as the men locations. Also, the diffusion fins are not shared on the top and bottom of the cell. FIGS. 20A/B also show the contacts positioned on the top of the gate electrodes and diffusion fins. FIGS. 20A/B also show different diffusion fin/local interconnect overlaps. It should be understood that in the particular layout of FIGS. 20A/B, although the horizontal local interconnect lih and vertical local interconnect liv are shown to overlap each other in region 2001, the horizontal local interconnect lih and vertical local interconnect liv do not contact each other in region 2001. This is also true for region 2001 in FIGS. 21A/B to follow. However, it should also be understood that in some other layouts, the horizontal local interconnect lih and vertical local interconnect liv can be made to contact each other at locations where they cross each other.

Figure 21A:
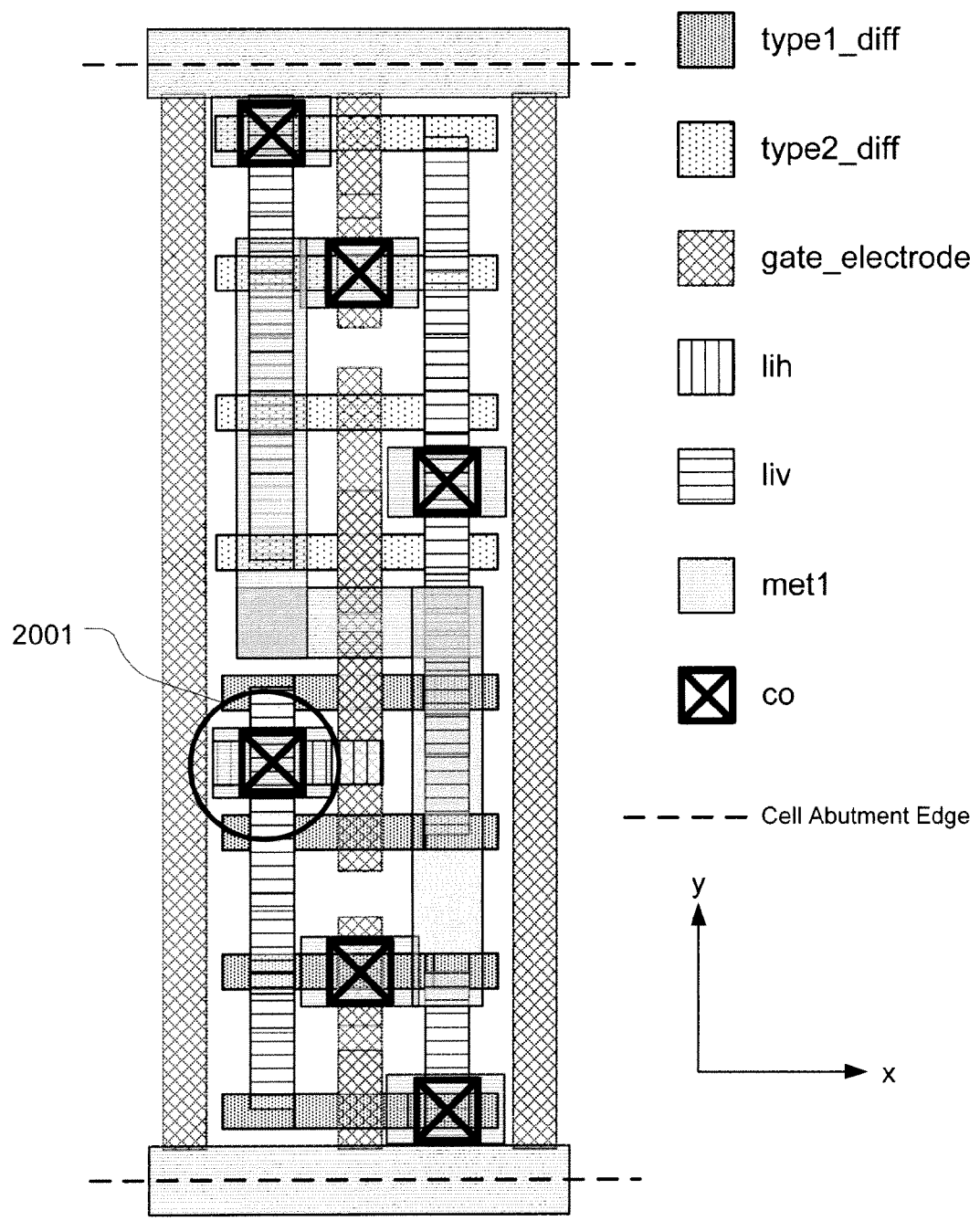
FIGS. 21A/B show a variation of the layout of FIGS. 20A/B having minimum width power rails and negative vertical local interconnect overlap of the diffusion fins, in accordance with some embodiments of the present invention.
Figure 21B:
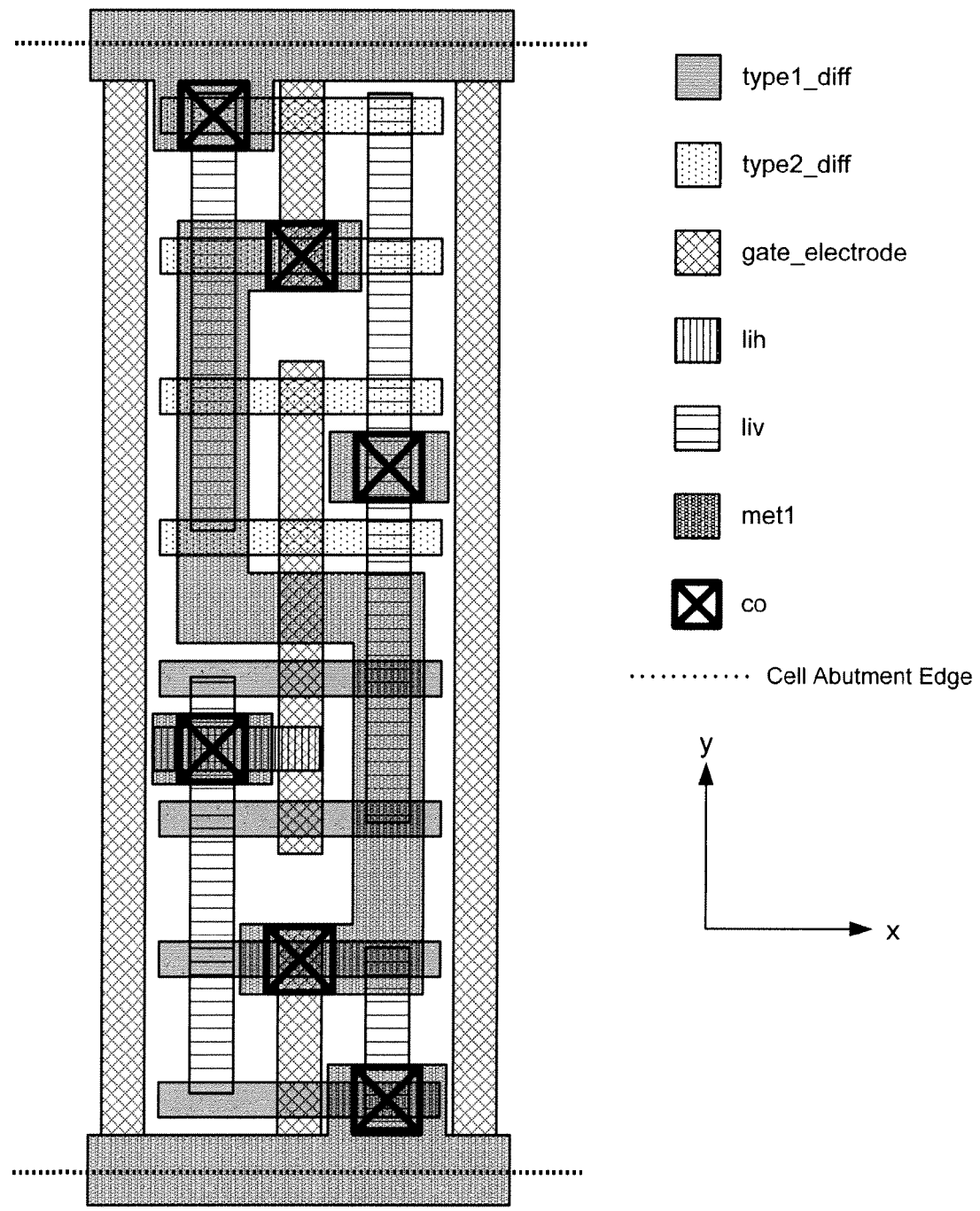

FIGS. 21A/B show a variation of the layout of FIGS. 20A/B having minimum width power rails and negative vertical local interconnect overlap of the diffusion fins, in accordance with some embodiments of the present invention. FIG. 21B shows the same layout as FIG. 21A, with the layout depicted in a merged format for clarity.

Figure 22A:
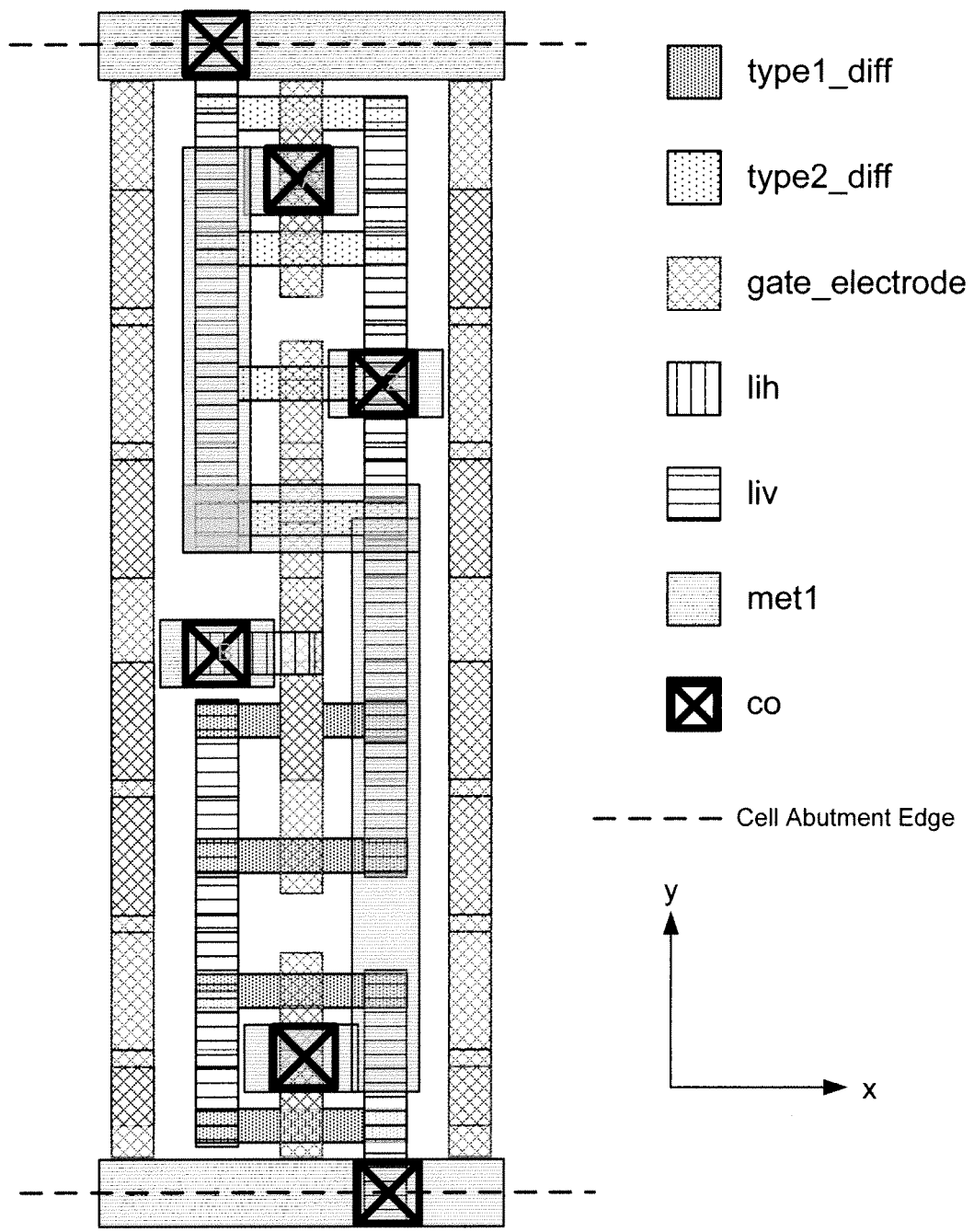
FIGS. 22A/B show a variation of the layout of FIGS. 17A/B having minimum width power rails, no shared local interconnect or diffusion fins under the power rails, and a larger space between p-find and n-fins, in accordance with some embodiments of the present invention.
Figure 22B:
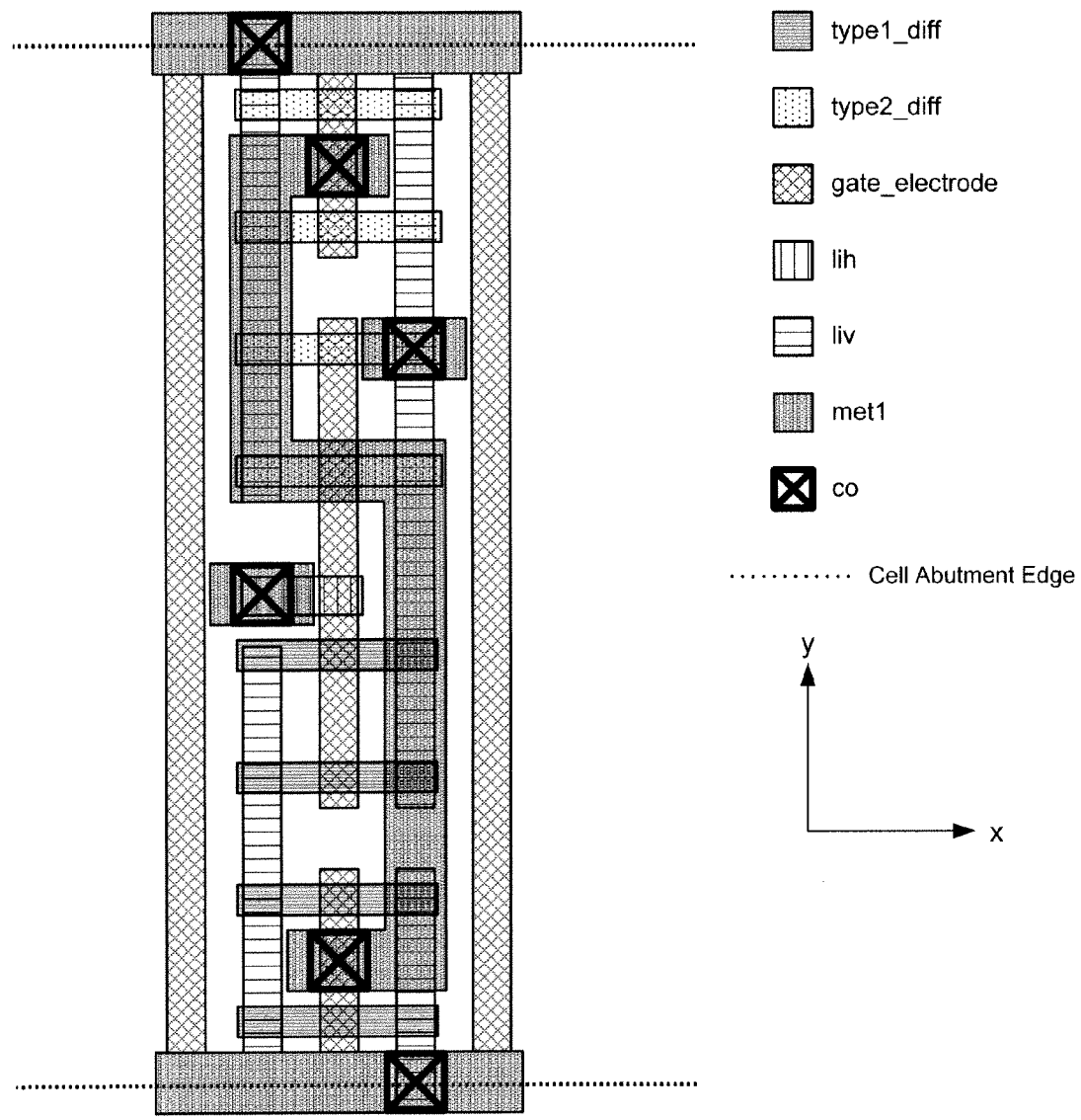

FIGS. 22A/B show a variation of the layout of FIGS. 17A/B having minimum width power rails, no shared local interconnect or diffusion fins under the power rails, and a larger space between p-find and n-fins, in accordance with some embodiments of the present invention. FIG. 22B shows the same layout as FIG. 22A, with the layout depicted in a merged format for clarity.

Figure 23A:
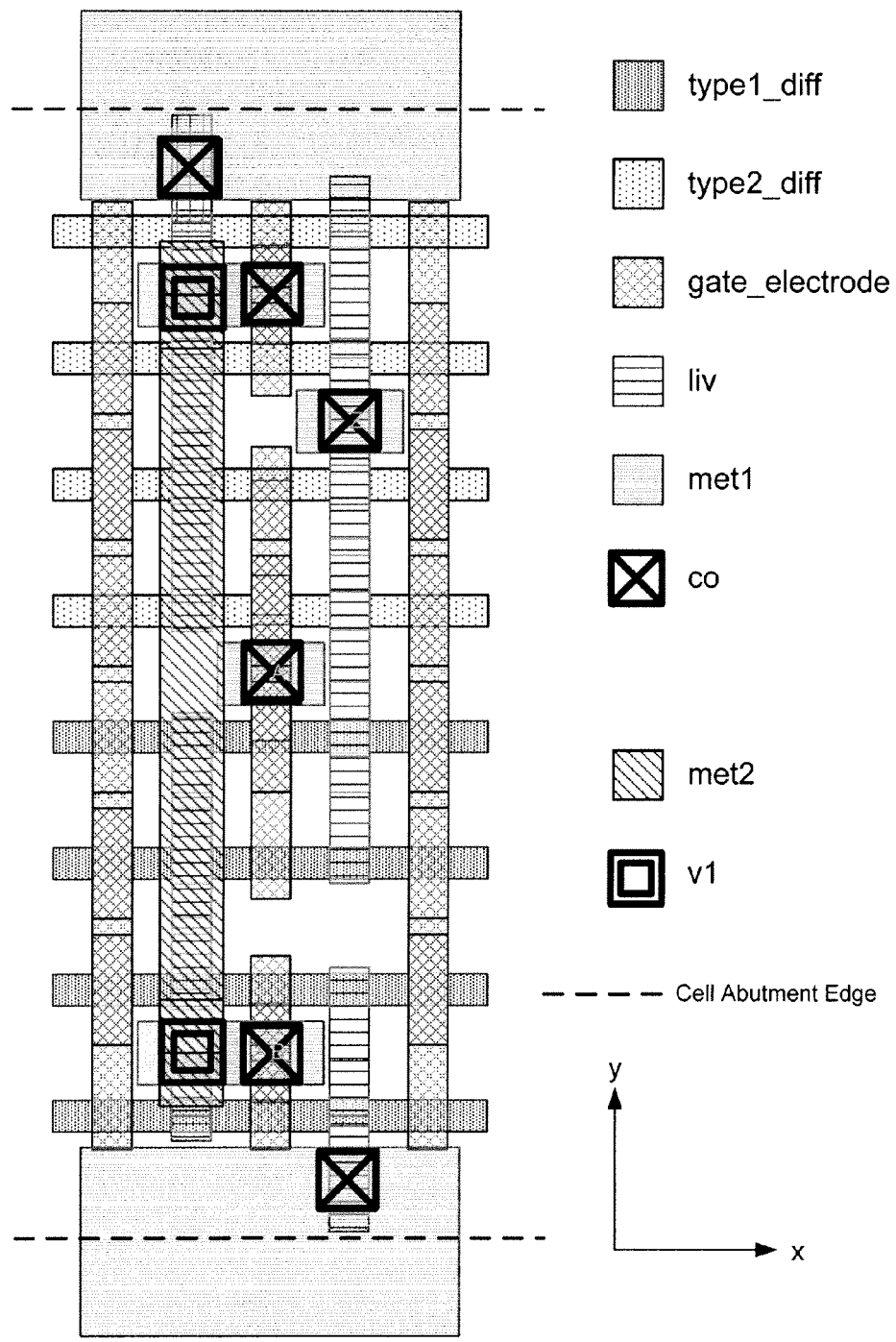
FIGS. 23A/B show a variation of the layout of FIGS. 17A/B, in accordance with some embodiments of the present invention.
Figure 23B:
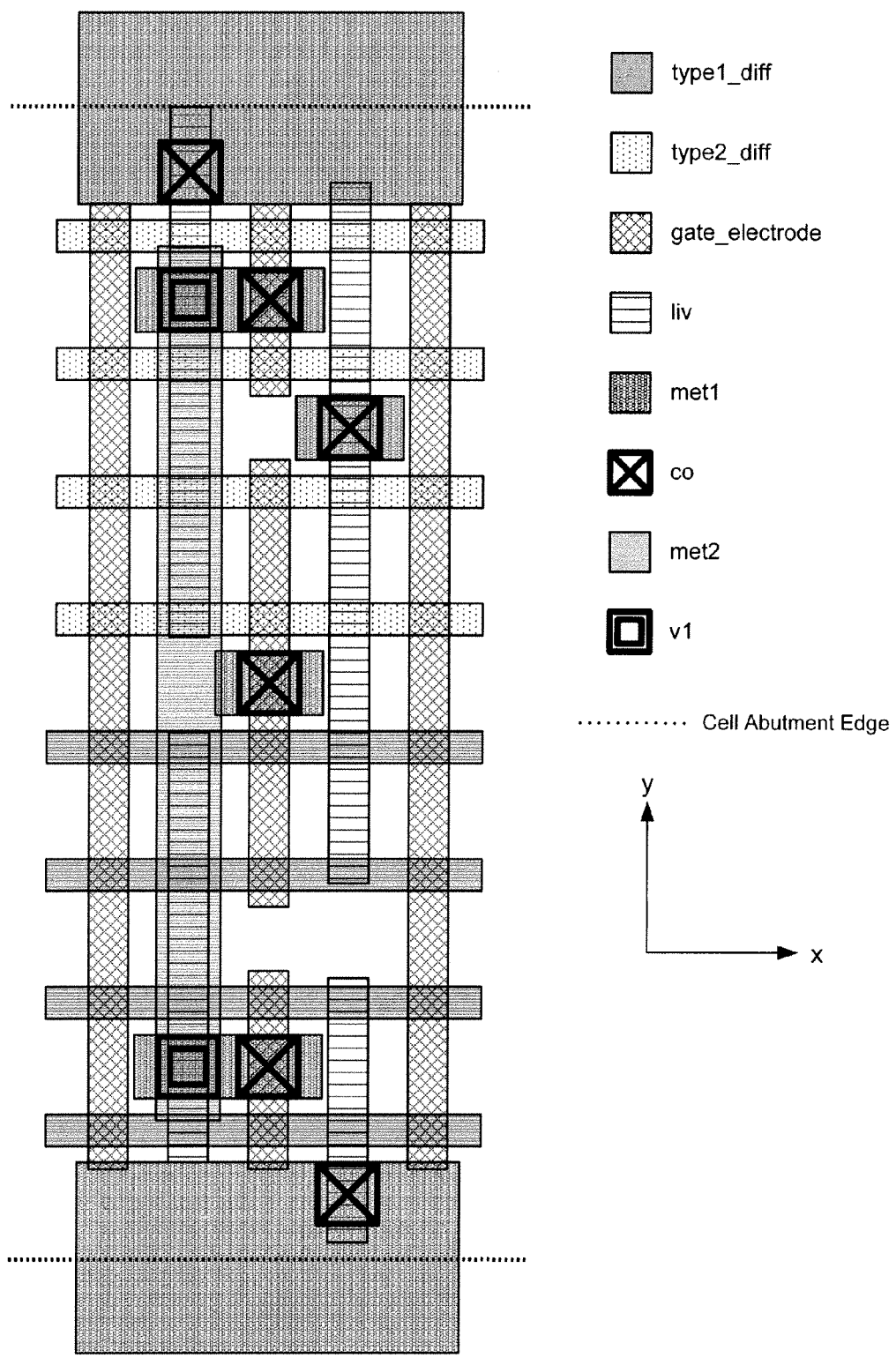

FIGS. 23A/B show a variation of the layout of FIGS. 17A/B, in accordance with some embodiments of the present invention. FIG. 23B shows the same layout as FIG. 23A, with the layout depicted in a merged format for clarity. The layout of FIGS. 23A/B has the following features:
  uni-directional metal interconnect structures, i.e., linear-shaped metal interconnect structures,
  no shared local interconnect or fins under power rails,
  one input pin on highest metal layer, and another input pin and the output pin on the metal layer below,
  gate electrode contact isolated from local interconnect.
Also, FIGS. 23A/B show the diffusion fins before they are cut on the left and right edges.

Figure 24A:
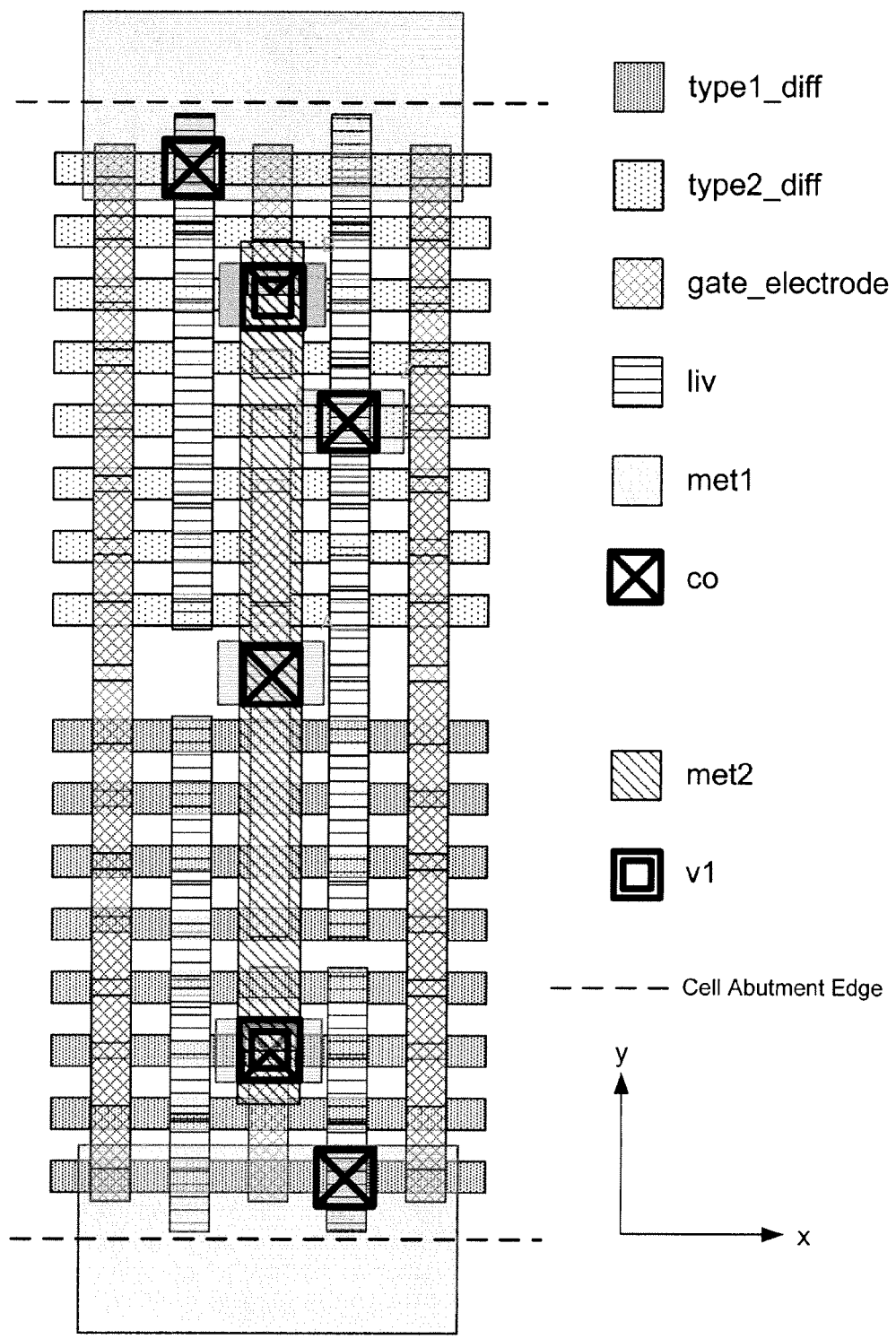
FIGS. 24A/B show a variation of the layout of FIGS. 23A/B, in accordance with some embodiments of the present invention.
Figure 24B:
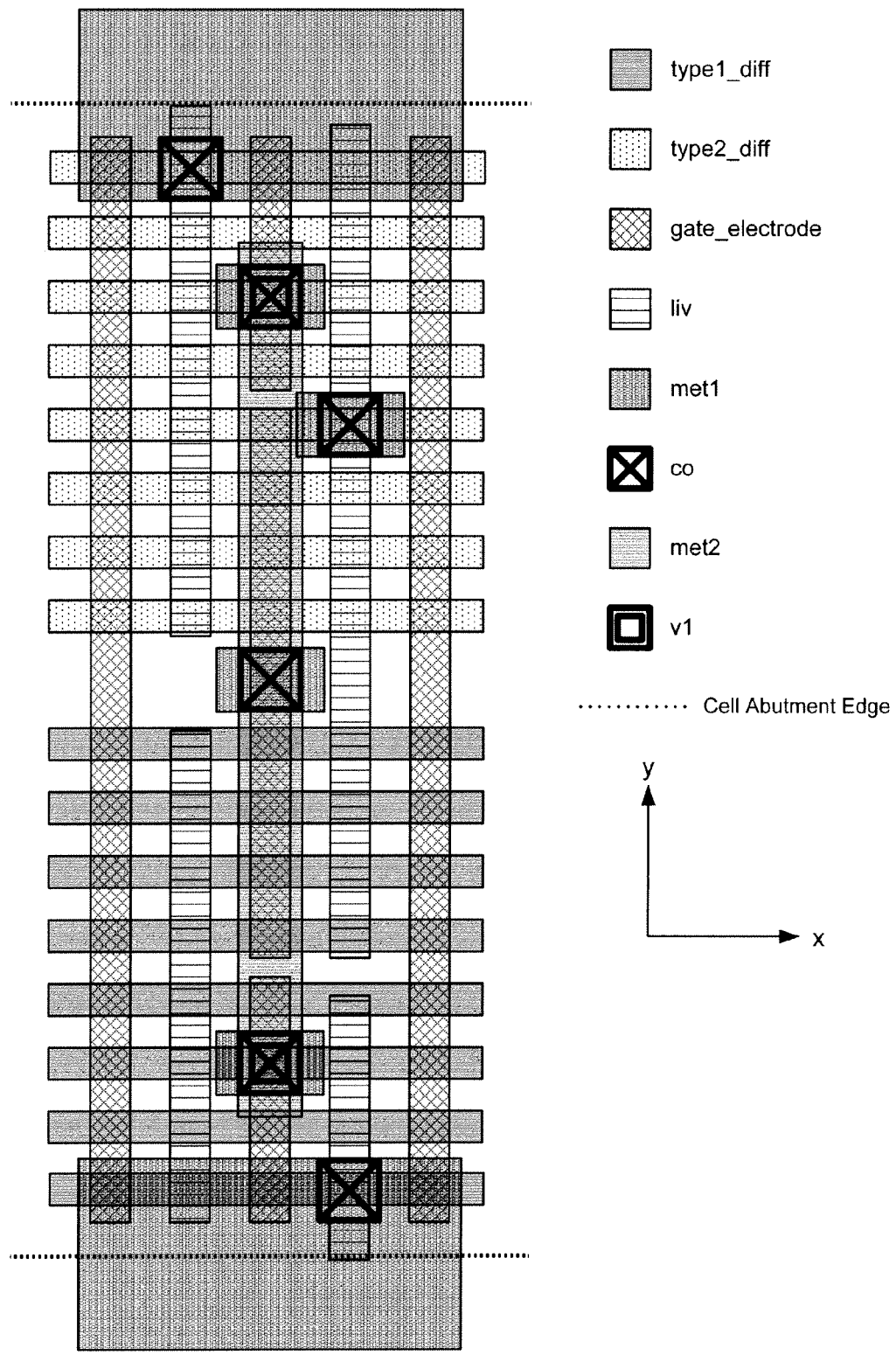

FIGS. 24A/B show a variation of the layout of FIGS. 23A/B, in accordance with some embodiments of the present invention. FIG. 24B shows the same layout as FIG. 24A, with the layout depicted in a merged format for clarity. The layout of FIGS. 24A/B has the following features:
  diffusion fin pitch smaller than metal pitch; diffusion fin pitch one-half of the metal pitch,
  gate electrode and local interconnect cuts shown between diffusion fins; an alternate implementation can have cuts above diffusion fin cuts; this would reduce number of diffusion fins in one or more transistors,
  one input pin on highest metal layer, another input pin and the output pin on the metal layer below,
  spacing between p-type and n- type diffusion fins larger than minimum; one or more diffusion fins omitted between p-type and n-type diffusion fin sections,
  gate electrode contact placed on diffusion fin,
  local interconnect contact placed on diffusion fin, and
  vertical met2 has a different offset in the x direction within the cell.

Figure 25A:
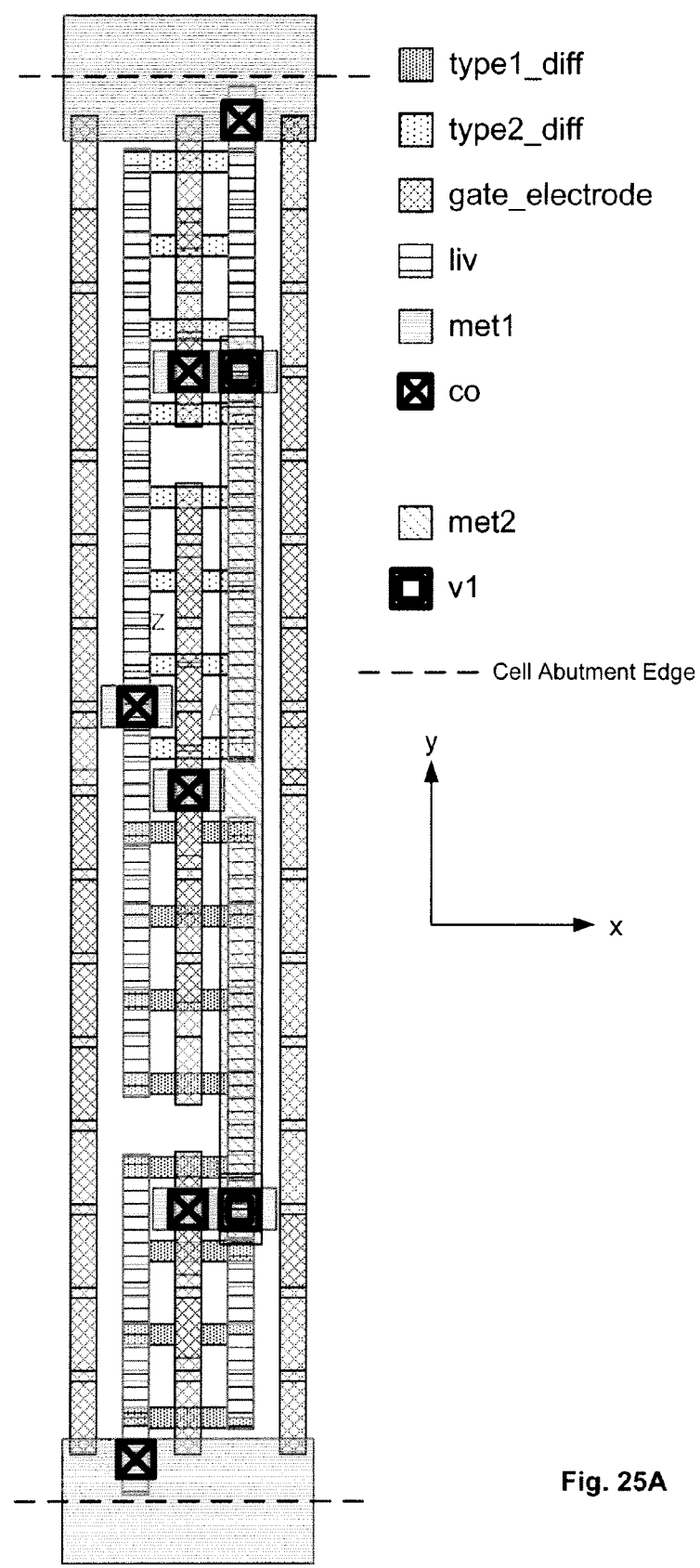
FIGS. 25A/B show a variation of the layout of FIGS. 23A/B, in which the cell is doubled in height, in accordance with some embodiments of the present invention.
Figure 25B:
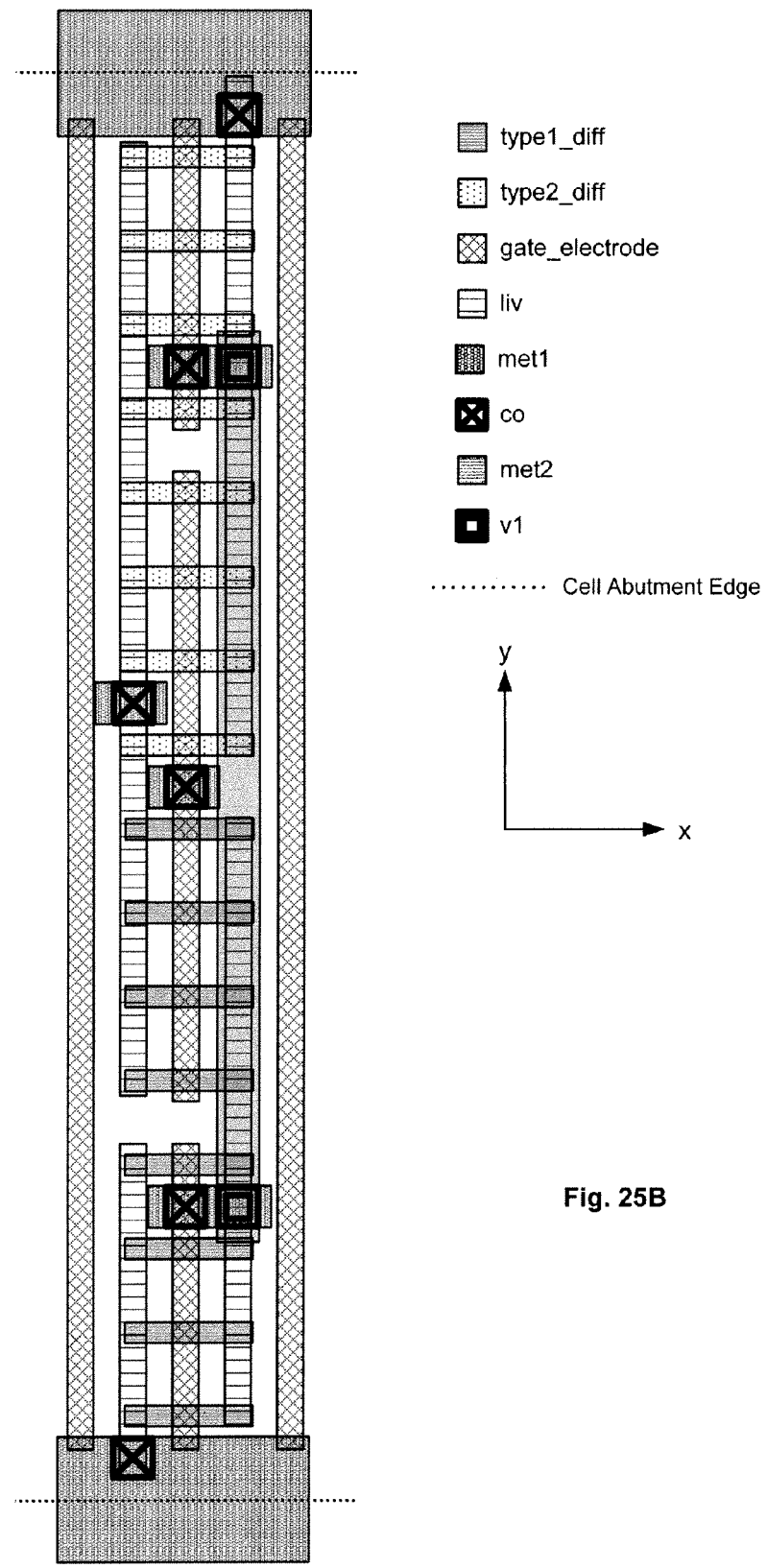

FIGS. 25A/B show a variation of the layout of FIGS. 23A/B, in which the cell is doubled in height, in accordance with some embodiments of the present invention. FIG. 25B shows the same layout as FIG. 25A, with the layout depicted in a merged format for clarity. The layout of FIGS. 25A/B includes twice the total number of diffusion fins in the layout of FIG. 23A/B. The diffusion fin cuts are shown in the layout of FIG. 25A/B.

Figure 26A:
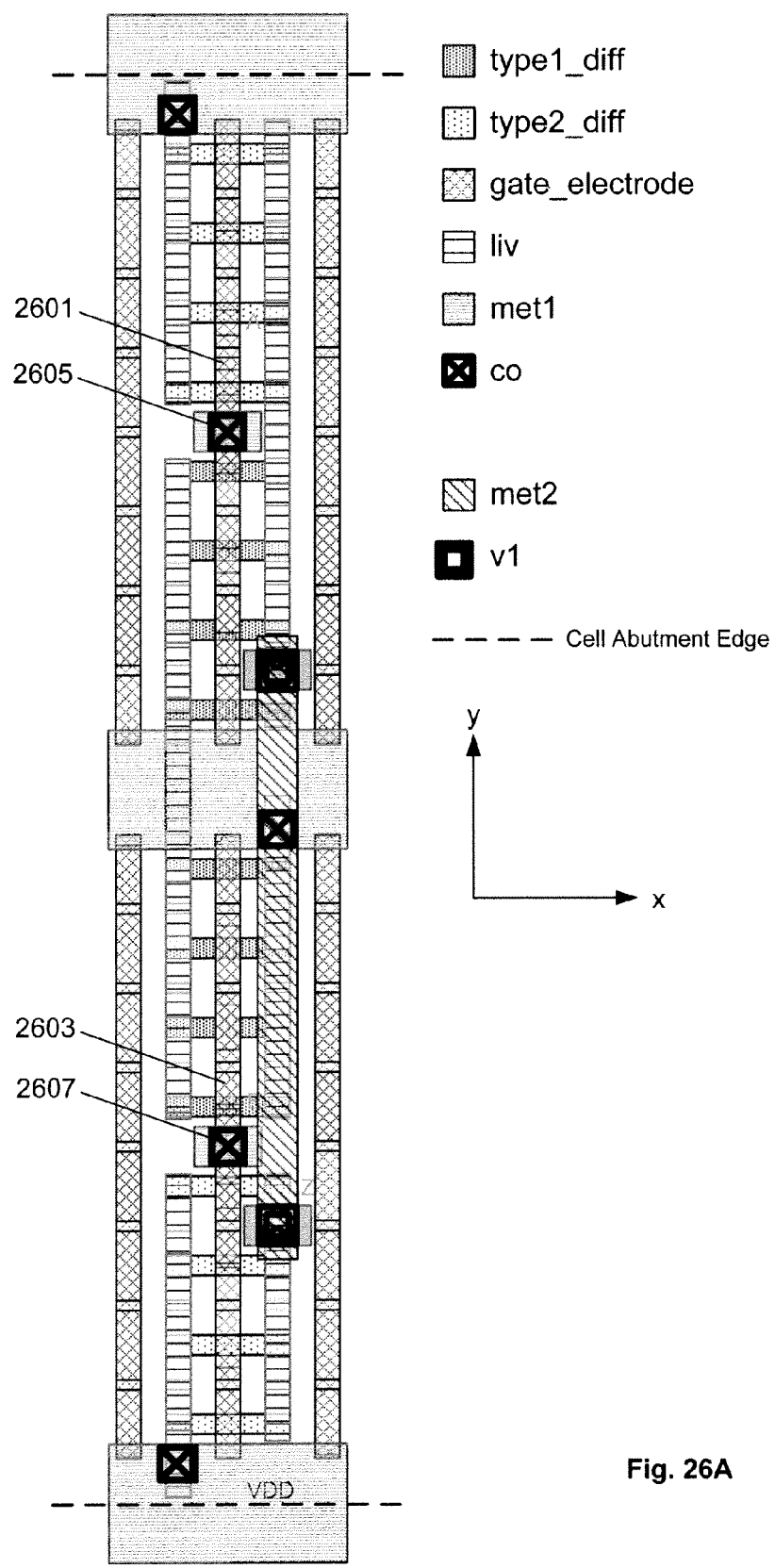
FIGS. 26A/B show an example cell layout implementing diffusion fins, in accordance with some embodiments of the present invention.
Figure 26B:
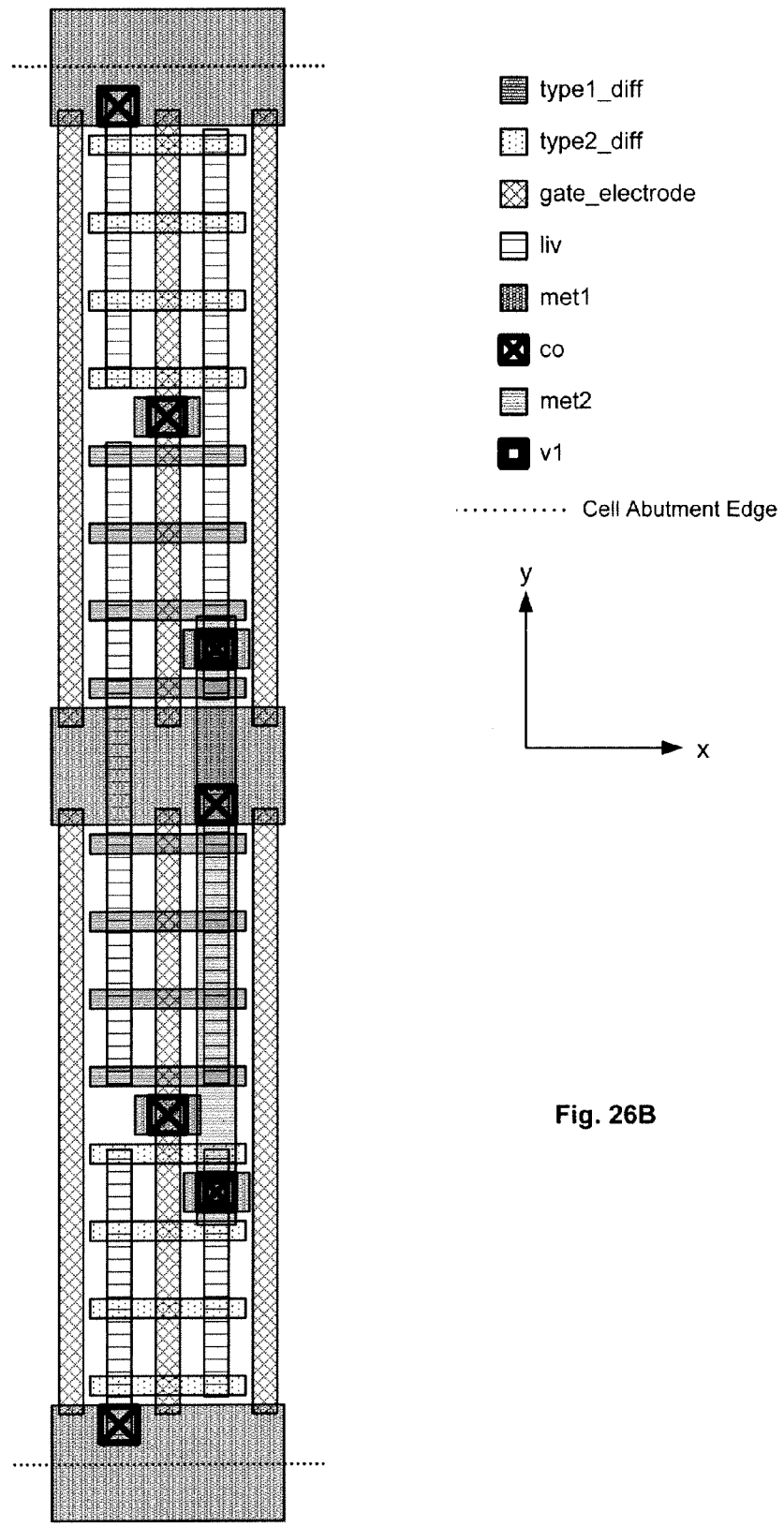

FIGS. 26A/B show an example cell layout implementing diffusion fins, in accordance with some embodiments of the present invention. FIG. 26B shows the same layout as FIG. 26A, with the layout depicted in a merged format for clarity. In the example layout of FIGS. 26A/B, the gate electrode layer includes the following features:
  substantially linear gate electrode structures,
  three or more linear structures on gate electrode layer, at least two of which are dummies,
  dummy structures on gate electrode layer are of same dimension,
  structures on gate electrode layer substantially evenly spaced and/or equal pitched in x direction,
  dummy structures shared with adjacent cell on left and/or right,
  dummy structures cut under power rails,
  single gate electrode structure controlling two or more p-type and n-type transistors, to be separated later in the manufacturing process to form two or more distinct gate electrodes, such as depicted by gate electrode structures 2601 and 2603,
  gate electrodes in the same x location connected to two or more different nets, connected to two or more different input nets, such as depicted by gate electrode structure 2601 connected to input net 2605, and by gate electrode structure 2603 connected to input net 2607, and
  two or more dummy segments in same x location.

In the example layout of FIGS. 26A/13, the diffusion fins include the following features:
  substantially evenly spaced diffusion fins in accordance with substantially equal pitch, diffusion fins can be on a grid, diffusion fin pitch less than 90 nm in some embodiments,
  one or more diffusion fins for each of p-type and n-type,
  same number of p-type and n- type diffusion fins,
  one or more diffusion fins omitted under power rails,
  no diffusion fins omitted between p-type and n-type sections,
  each diffusion fin of substantially equal width and length, and p-type diffusion fins positioned between n-type diffusion fins, vice-versa.

In the example layout of FIGS. 26A/B, the local interconnect include the following features:
gate electrodes and diffusion fin source/drain connections are on different conductor layers; these different conductor layers are isolated from each other,
substantially linear conductor layer parallel to gate for source drain connection; in some embodiments, on same pitch as gate layer; and in some embodiments, this linear conductor layer may be offset by the gate half-pitch, and positive overlap of local interconnect with diffusion fins.

In the example layout of FIGS. 26A/B, the higher level met1 interconnect layer includes the following features:
gate electrode structure contact between diffusion fins, contacts gridded in one or both of the x and y directions, contacts connect local interconnect and gate conductors to the metal layer above,
substantially linear-shaped conductor on output node,
output node and input node pins on different layers,
power rail in middle, opposite power rail at top and bottom; top and bottom power rails shared; all power rails connect to left and right by abutment, and
output node on highest metal level.

Figure 27A:
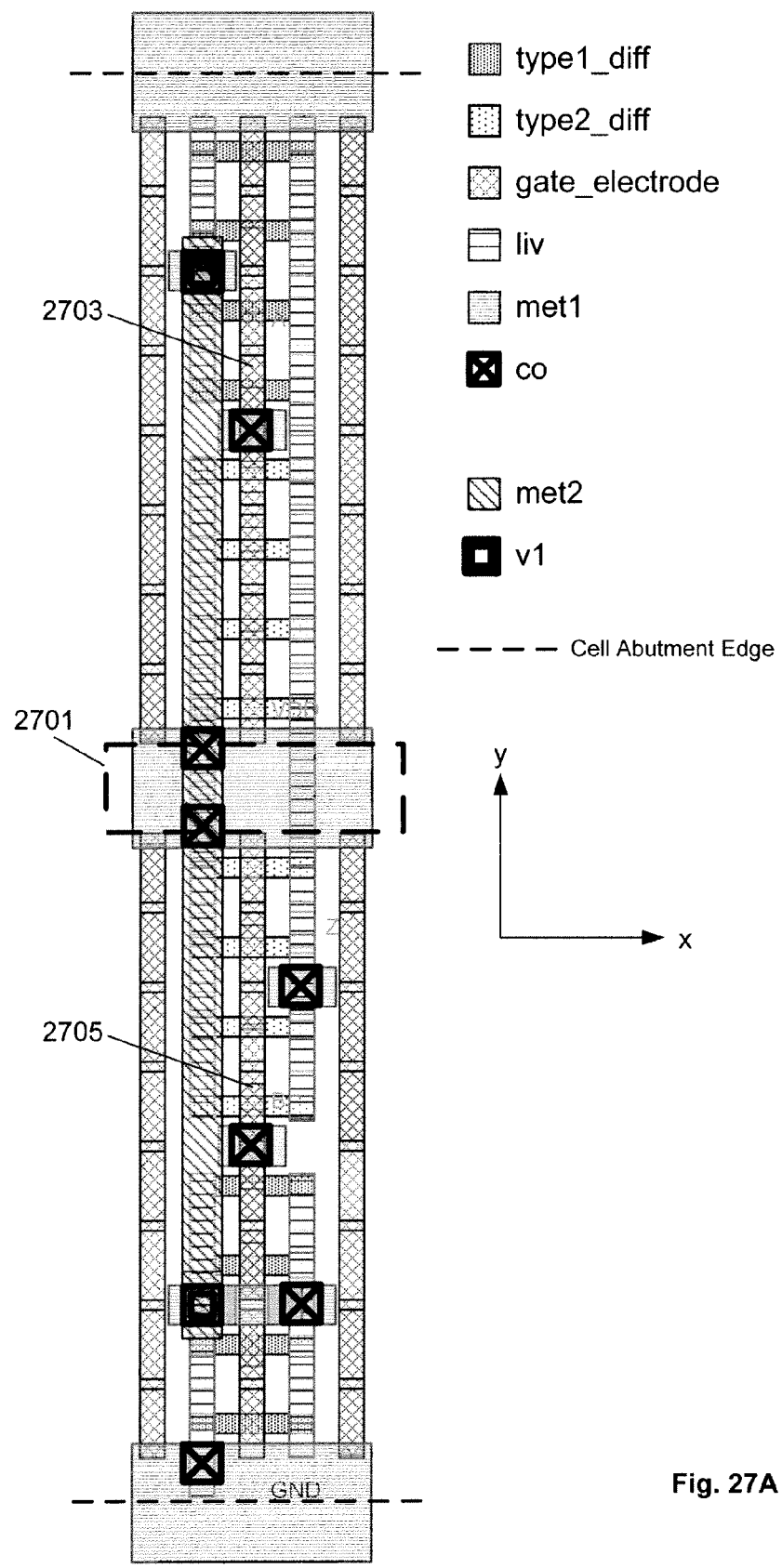
FIGS. 27A/B show a variation of the layout of FIGS. 26A/B, in accordance with some embodiments of the present invention.
Figure 27B:
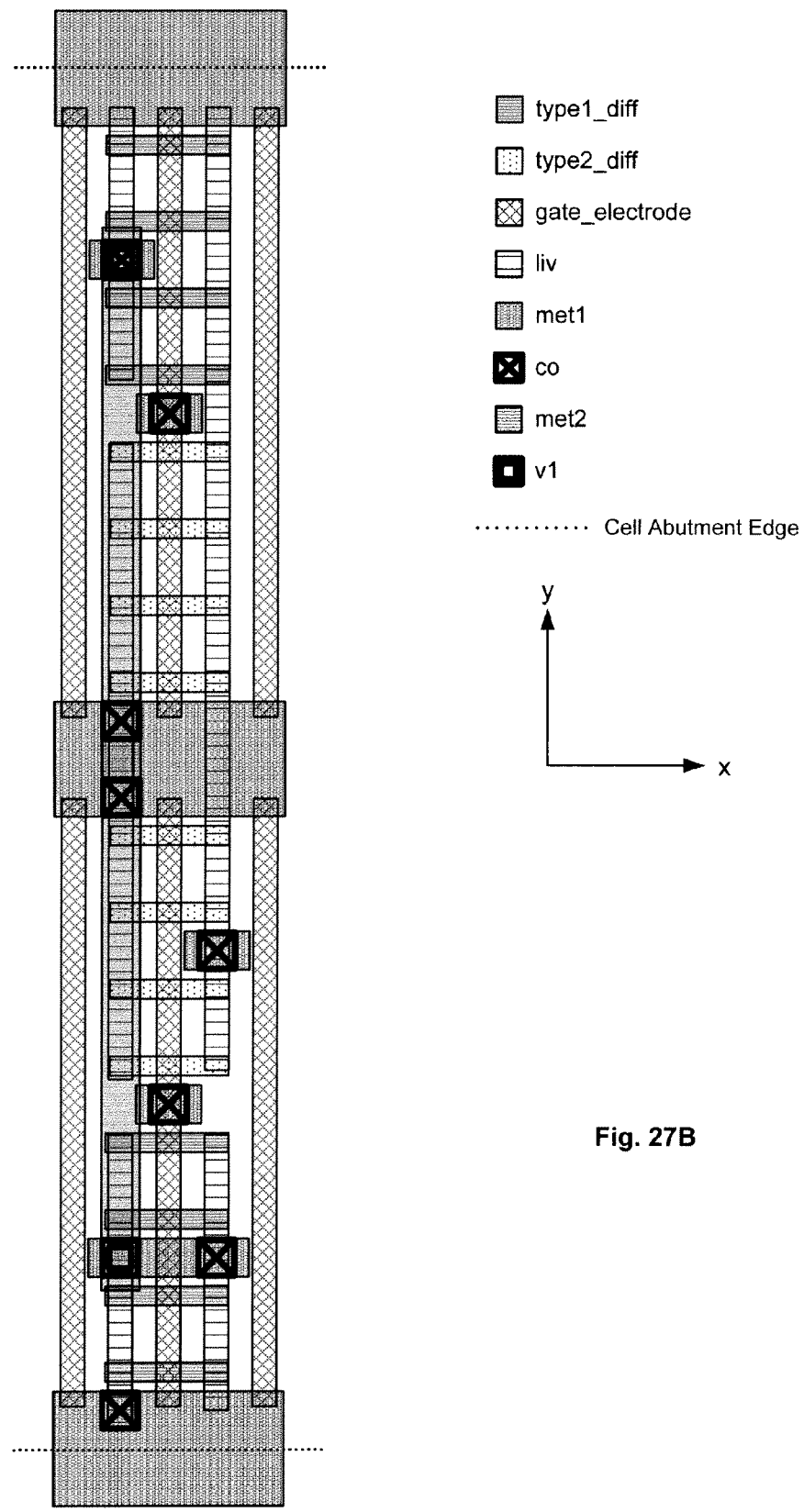

FIGS. 27A/B show a variation of the layout of FIGS. 26A/B, in accordance with some embodiments of the present invention. FIG. 27B shows the same layout as FIG. 27A, with the layout depicted in a merged format for clarity. The layout of FIGS. 27A/B includes the following features:
gate conductor is drawn with a cut layer, such as a cut layer that includes the cut shape 2701,
two gate conductor segments at same x location, each connecting to a different net, each connected to an input net, each controlling a p-type and an n-type transistor constructed with multiple fins, such as gate conductors 2703 and 2705, and
one input pin on highest metal layer, another input pin and the output pin on the metal layer below.

Figure 28A:
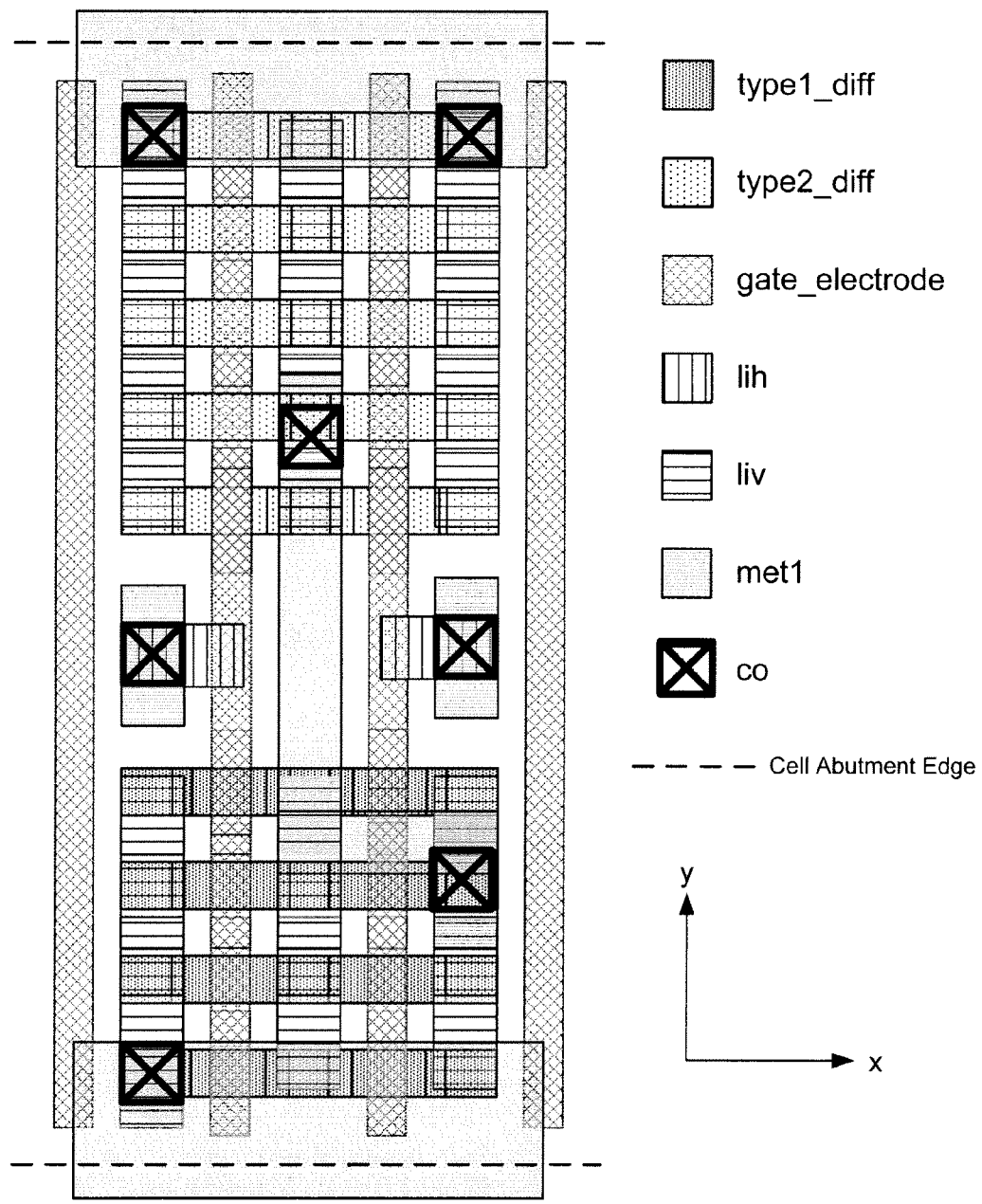
FIGS. 28A/B show an example cell layout implementing diffusion fins, in accordance with some embodiments of the present invention.
Figure 28B:
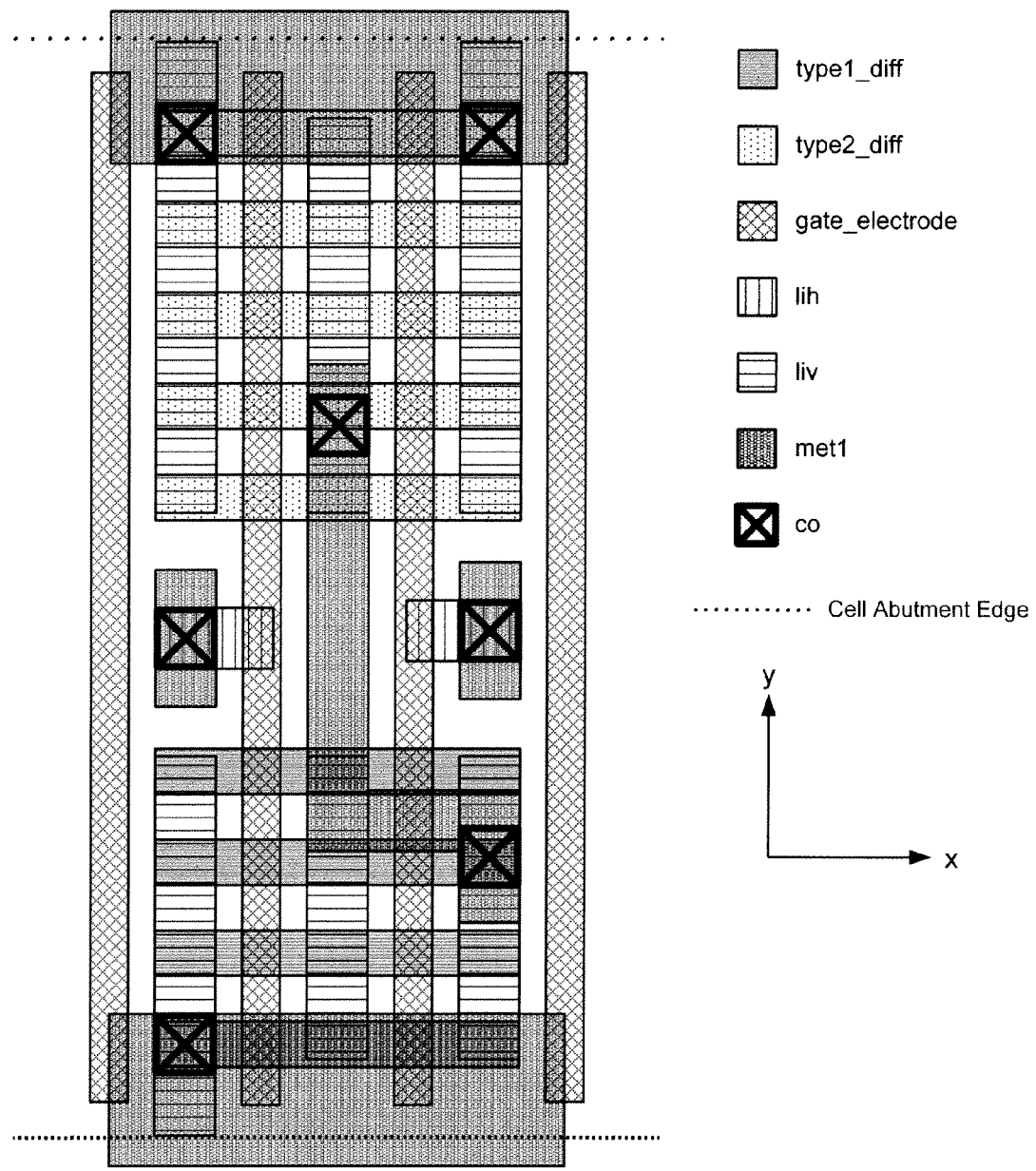

FIGS. 28A/B show an example cell layout implementing diffusion fins, in accordance with some embodiments of the present invention. FIG. 28B shows the same layout as FIG. 28A, with the layout depicted in a merged format for clarity. In the example layout of FIGS. 28A/B, the gate electrode layer includes the following features:
substantially linear gate electrode structures,
three or more linear structures on gate electrode layer, at least two of which are dummies,
three or more gate electrode structures are of same dimension,
structures on gate electrode layer substantially evenly spaced and/or equal pitched in x direction,
dummy structures shared with adjacent cell on left and/or right,
dummy structures cut under power rails, It should be understood that any of the figures presented herein, including the example layout of FIGS. 28A/B, can have the type 1 diffusion fins defined as p-type diffusion fins and the type 2 diffusion fins defined as n-type diffusion fins, or can have the type 1 diffusion fins defined as n-type diffusion fins and the type 2 diffusion fins defined as p-type diffusion fins, depending on the particular implementation embodiment. In the example layout of FIGS. 28A/B, the diffusion fins include the following features:
substantially evenly spaced diffusion fins in accordance with substantially equal pitch, diffusion fins can be on a grid, diffusion fin pitch less than 90 nm in some embodiments,
one or more diffusion fins for each of p-type and n-type,
different number of p-type and n-type diffusion fins,
one or more diffusion fins omitted under power rails,
one or more diffusion fins omitted between p-type and n-type sections,
each diffusion fin of substantially equal width and length.

In the example layout of FIGS. 28A/B, the local interconnect include the following features:
gate electrodes and diffusion fin source/drain connections are directly from a conductor layer,
substantially linear conductor layer parallel to gate for source drain connection; in some embodiments, on same pitch as gate layer; and in some embodiments, this linear conductor layer may be offset by the gate half-pitch,
zero or negative overlap of local interconnect with diffusion fins and gate electrode structures,
local interconnect can be constructed in two steps, vertical local interconnect structures first, followed by horizontal local interconnect structures; each of the steps creates a set of linear, uni-directional local interconnect structures, and
alternatively, two separate local interconnect layers—one vertical local interconnect layer, and one horizontal local interconnect layer.

In the example layout of FIGS. 28A/B, the higher level men interconnect layer includes the following features:
diffusion fins can be positioned underneath the power rails
contacts gridded in one or both of the x and y directions,
contacts connect all local interconnects to the metal layer above, and
contacts can be placed anywhere.

Figure 29A:
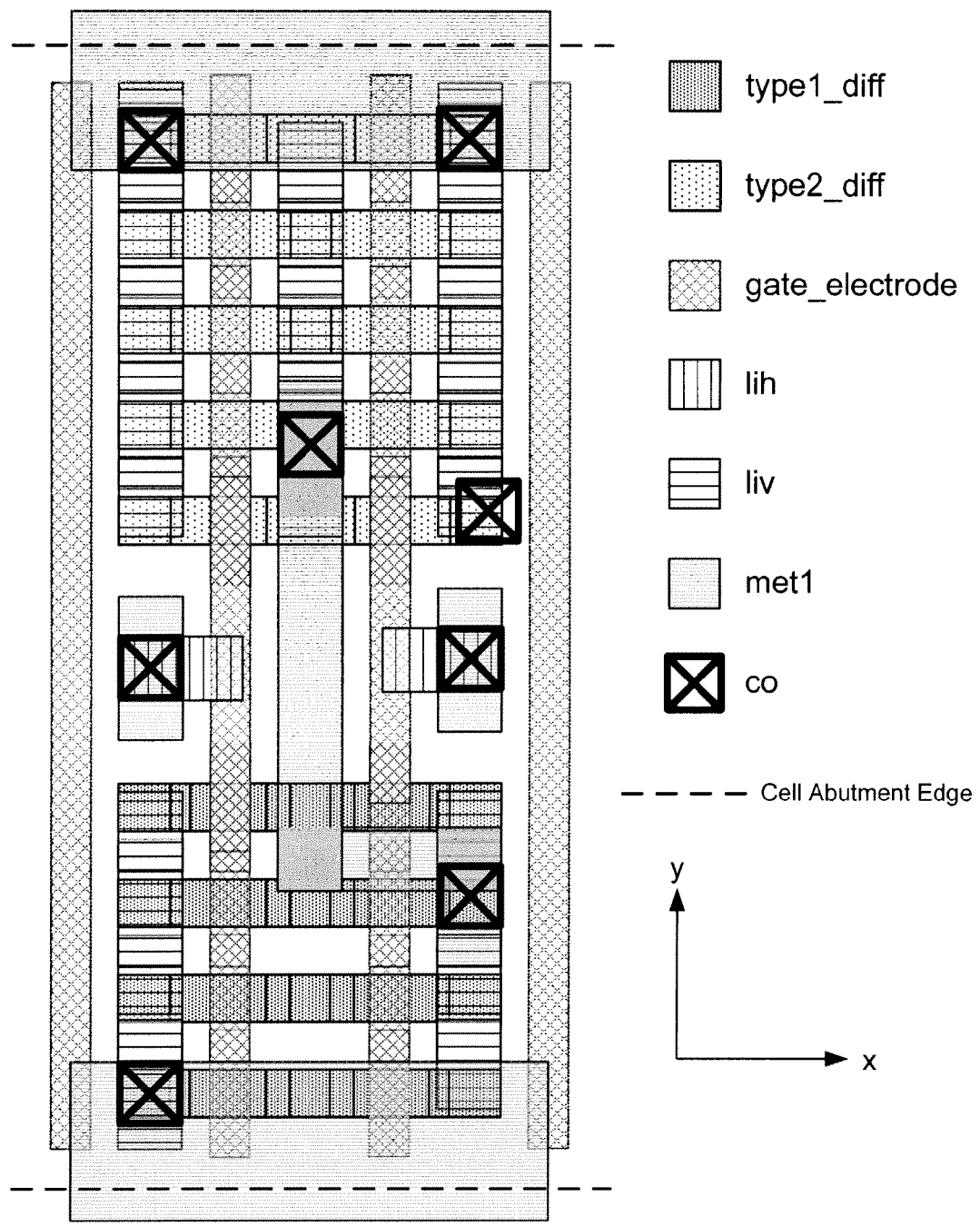
FIGS. 29A/B show a variation of the layout of FIGS. 28A/B in which there are no local interconnect structures present between two gate electrode structures of n-type transistors, in accordance with some embodiments of the present invention.
Figure 29B:
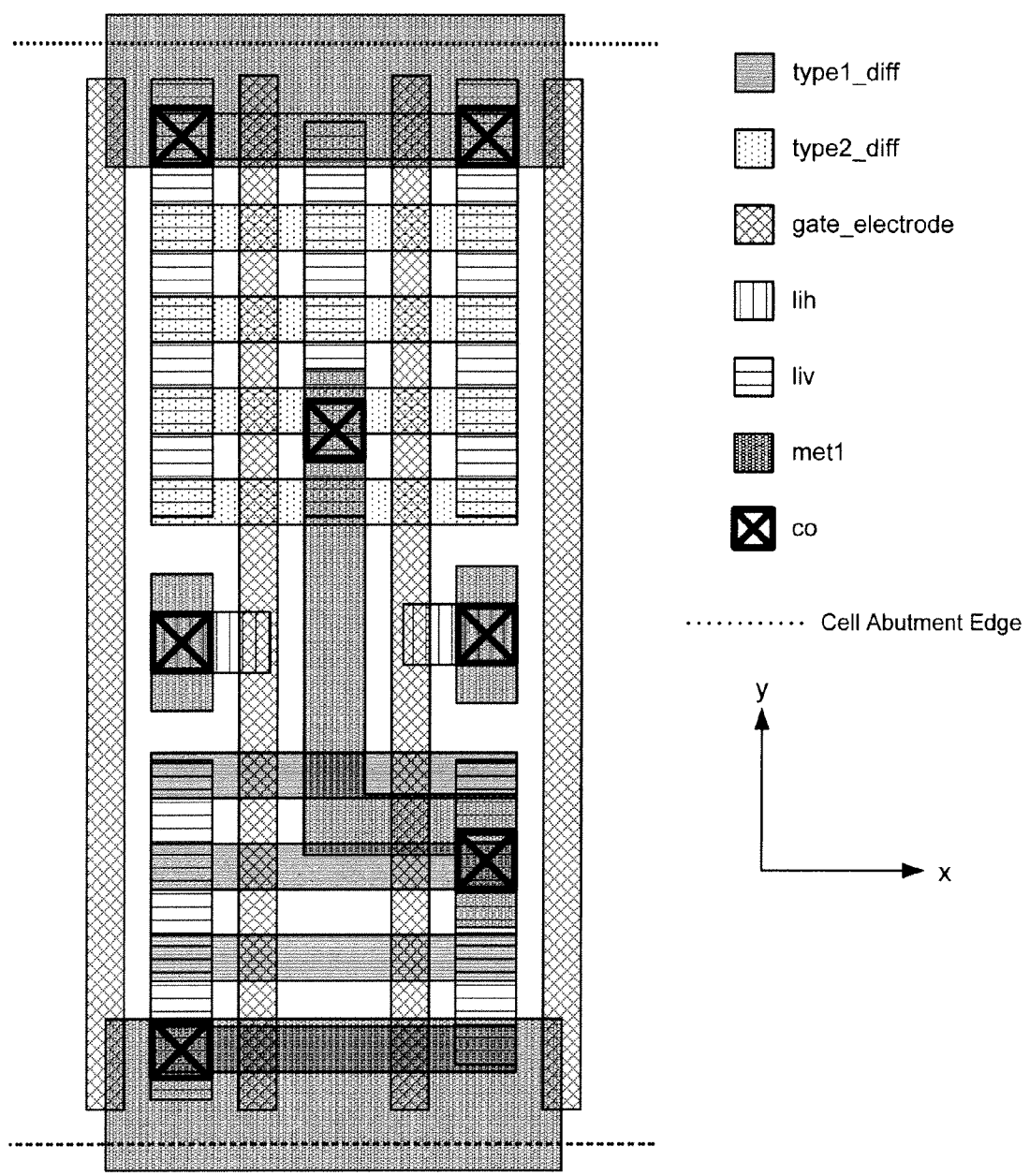

FIGS. 29A/B show a variation of the layout of FIGS. 28A/B in which there are no local interconnect structures present between two gate electrode structures of n-type transistors, in accordance with some embodiments of the present invention. FIG. 29B shows the same layout as FIG. 29A, with the layout depicted in a merged format for clarity.

Figure 30A:
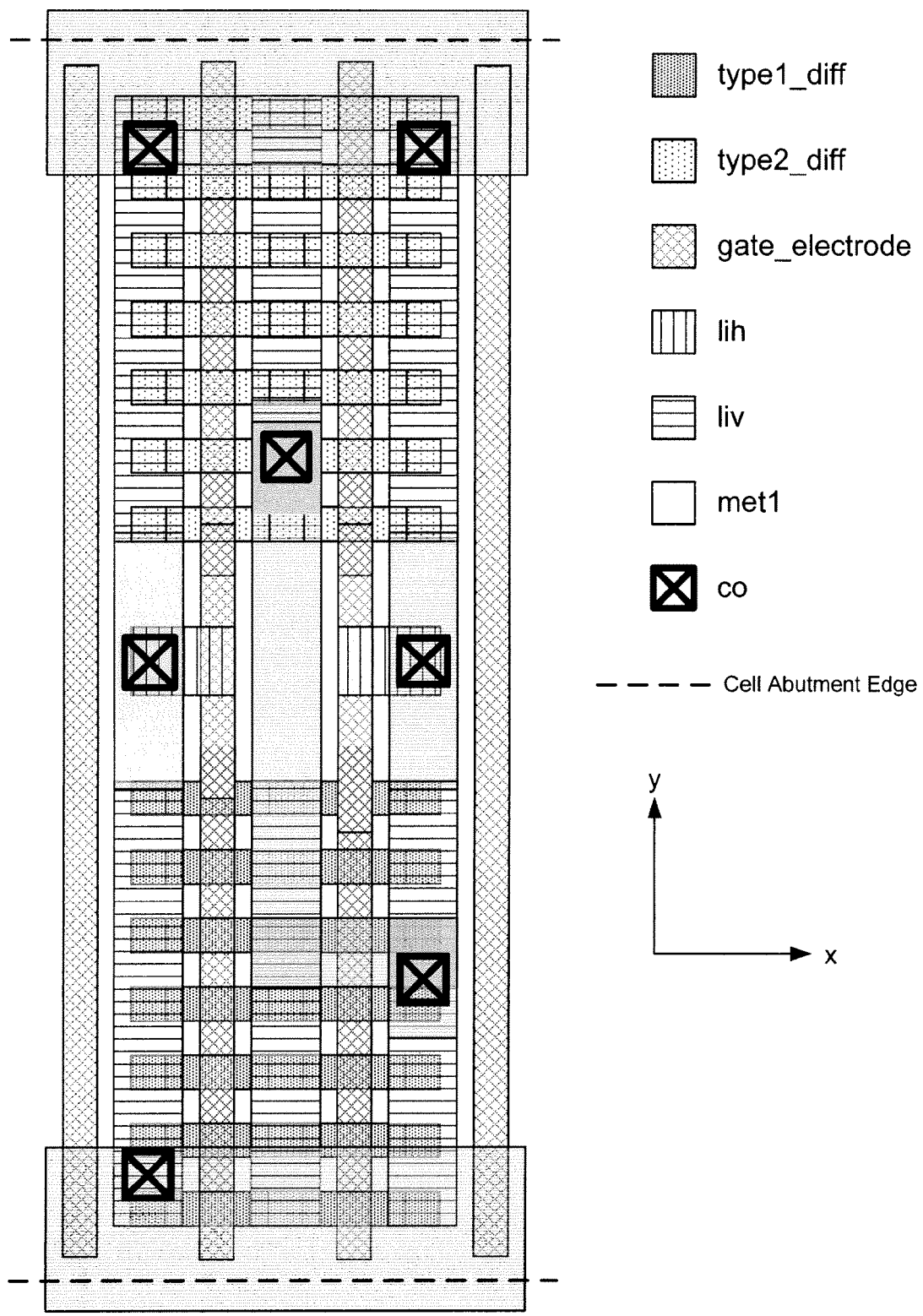
FIGS. 30A/B show an example cell layout implementing diffusion fins, in accordance with some embodiments of the present invention.
Figure 30B:
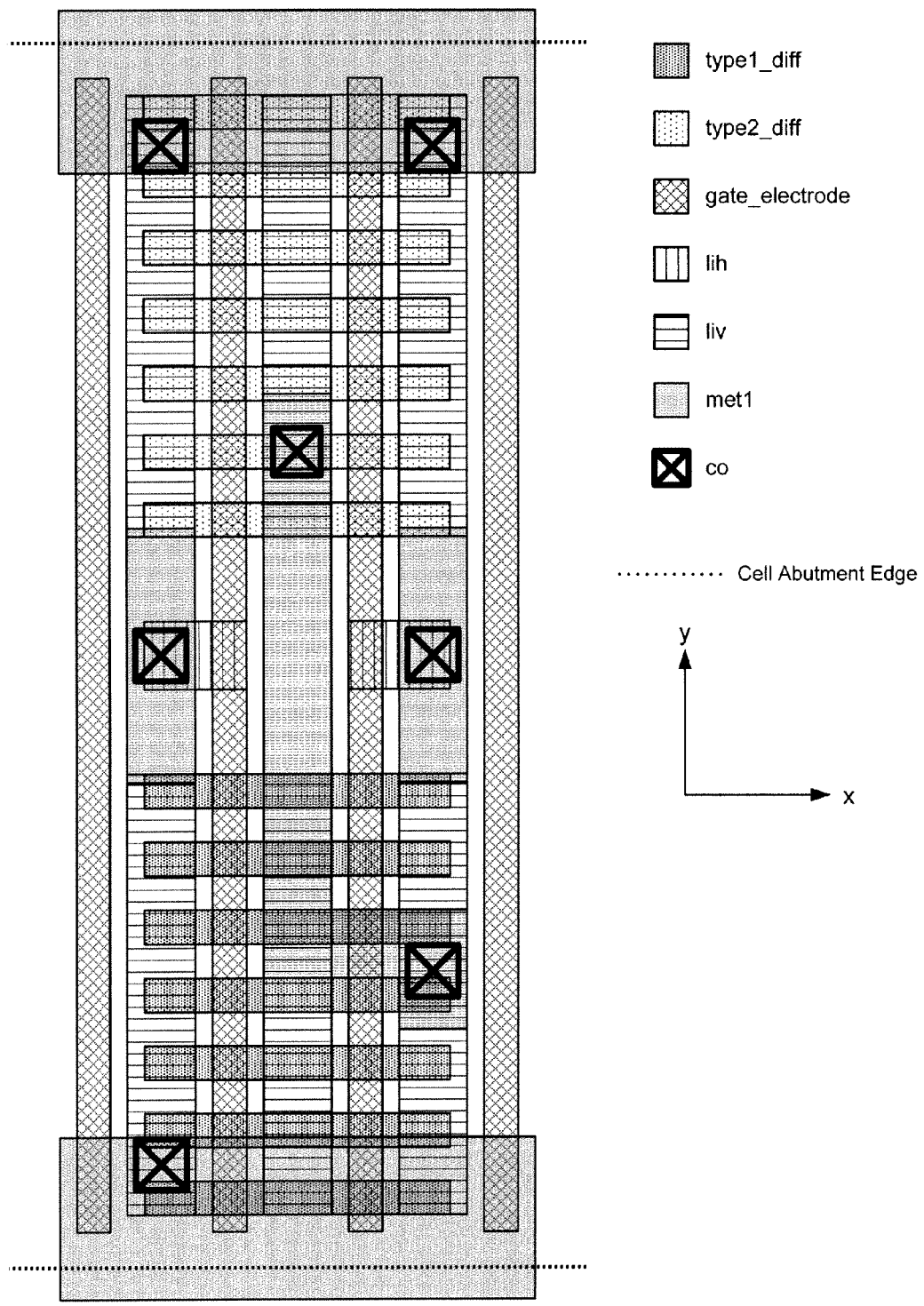

FIGS. 30A/B show an example cell layout implementing diffusion fins, in accordance with some embodiments of the present invention. FIG. 30B shows the same layout as FIG. 30A, with the layout depicted in a merged format for clarity. In the example layout of FIGS. 30A/B, the gate electrode layer includes the following features:
substantially linear gate electrode structures,
three or more linear structures on gate electrode layer, at least two of which are dummies,
three or more gate electrode structures are of same dimension,
structures on gate electrode layer substantially evenly spaced and/or equal pitched in x direction,
dummy structures shared with adjacent cell on left and/or right,
dummy structures cut under power rails, In the example layout of FIGS. 30A/B, the diffusion fins include the following features:
substantially evenly spaced diffusion fins in accordance with substantially equal pitch, diffusion fins can be on a grid, diffusion fin pitch less than 90 nm in some embodiments,
one or more diffusion fins for each of p-type and n-type,
same number of p-type and n-type diffusion fins,
one or more diffusion fins omitted under power rails,
one or more diffusion fins omitted between p-type and n-type sections,
each diffusion fin of substantially equal width and length.

In the example layout of FIGS. 30A/B, the local interconnect include the following features:

gate electrodes and diffusion fin source/drain connections are directly from a conductor layer, substantially linear conductor layer parallel to gate for source drain connection; in some embodiments, on same pitch as gate layer; and in some embodiments, this linear conductor layer may be offset by the gate half-pitch, zero or negative overlap of local interconnect with diffusion fins and gate electrode structures, local interconnect can be constructed in two steps, vertical local interconnect structures first, followed by horizontal local interconnect structures; each of the steps creates a set of linear, uni-directional local interconnect structures, and in some embodiments, vertical and horizontal local interconnect structures can be formed to cross and connect with each other, thereby forming a two-dimensionally varying local interconnect structure, i.e., a local interconnect structure with bends, alternatively, two separate local interconnect layers—one vertical local interconnect layer, and one horizontal local interconnect layer.

In the example layout of FIGS. 30A/B, the higher level met1 interconnect layer includes the following features:

diffusion fins can be positioned underneath the power rails contacts gridded in one or both of the x and y directions, met1 interconnect structures are positioned in accordance with same pitch as gate electrode structures, contacts connect all local interconnects to the metal layer above, and contacts can be placed anywhere.

Figure 31A:
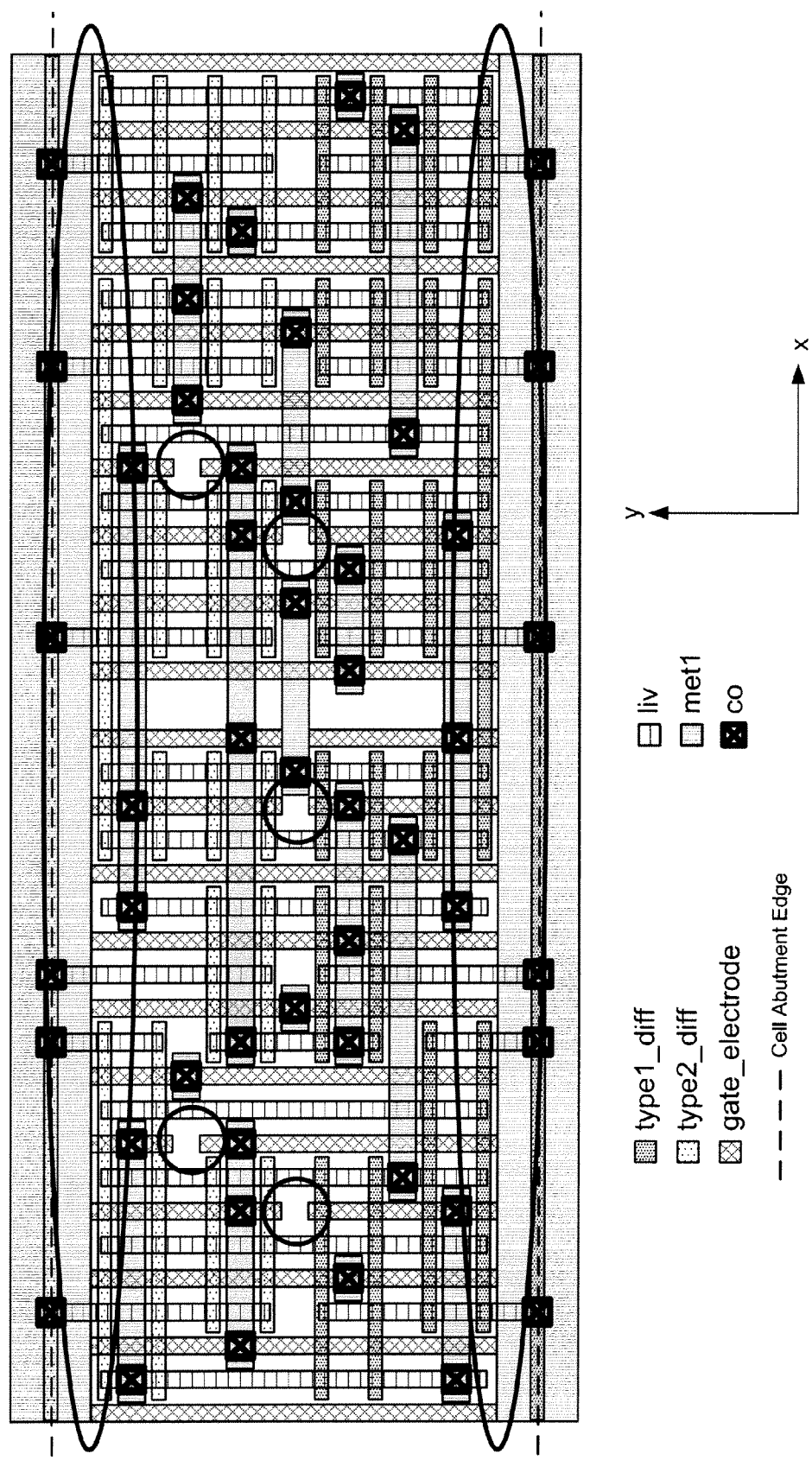
FIG. 31A shows an example sdff cell layout with gate electrode and local interconnect line end gaps centered substantially between diffusion fins, in accordance with some embodiments of the present invention.
Figure 31B:
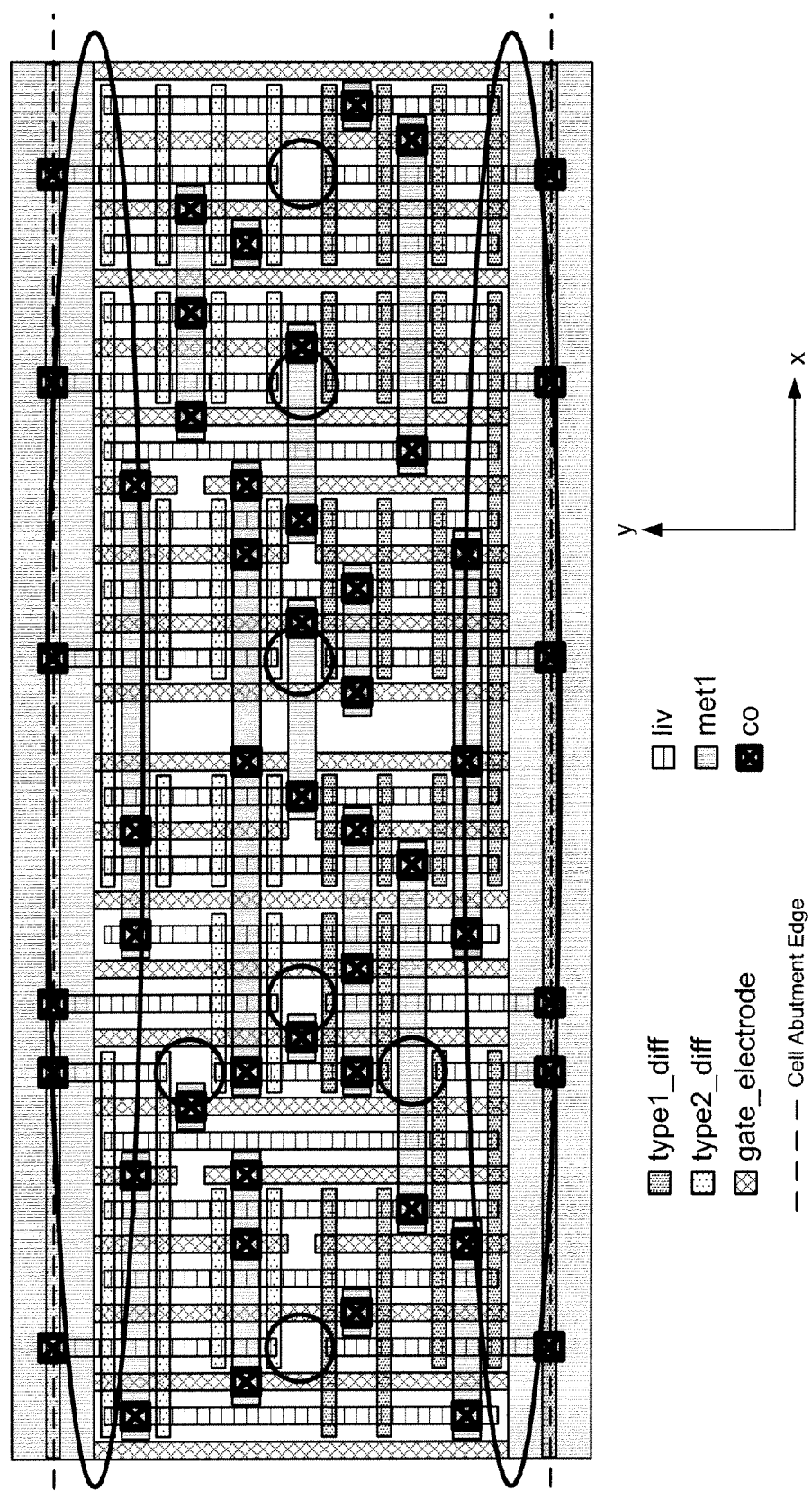
FIG. 31B shows the example sdff cell layout of FIG. 31A, with the local interconnect line end gaps centered substantially between the diffusion fins circled, in accordance with some embodiments of the present invention.
Figure 31C:
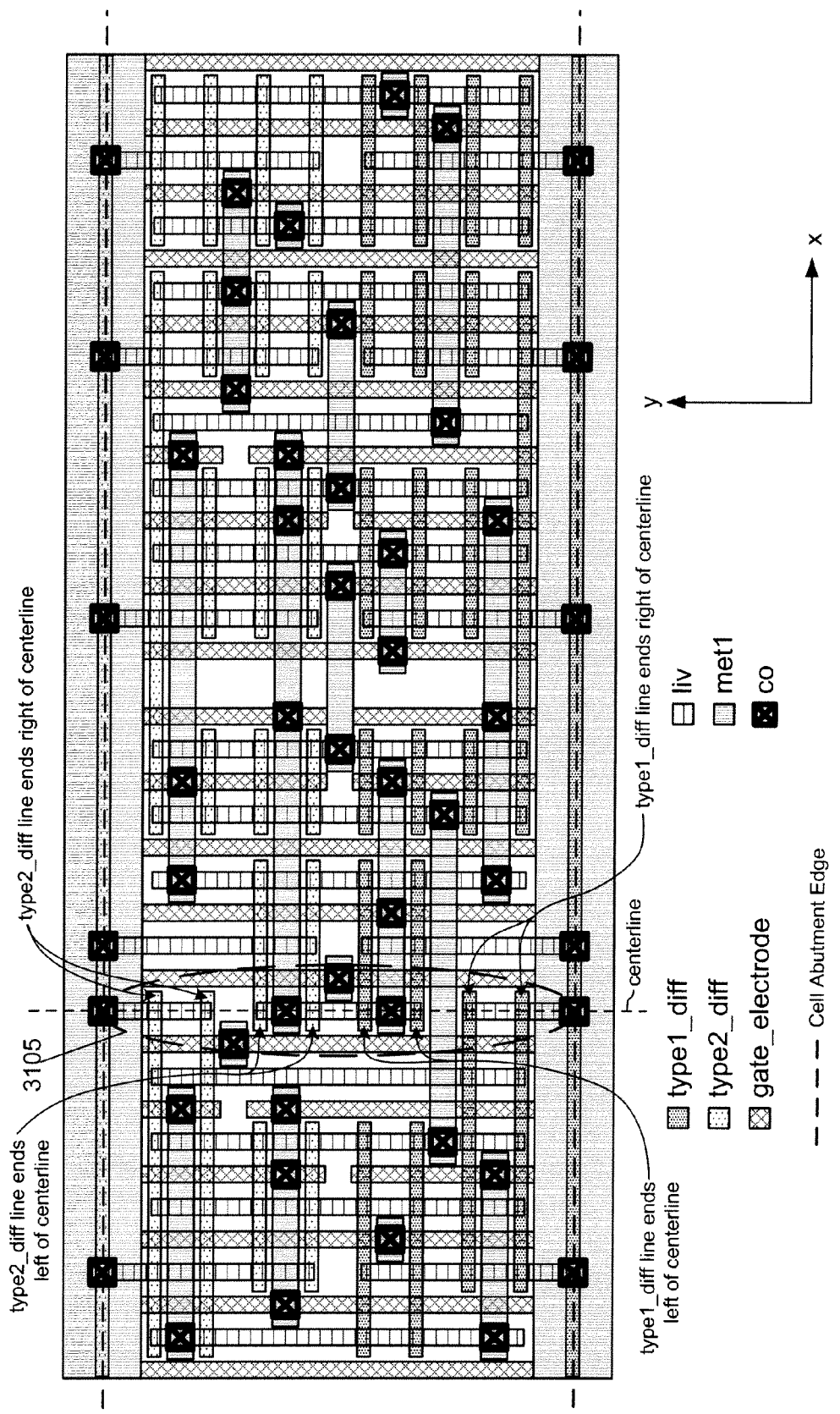
FIG. 31C shows the example sdff cell layout of FIGS. 31A and 31B with annotation of the region between two adjacent gate electrode structures in which the diffusion fin ends overlap each other in the x direction, in accordance with some embodiments of the present invention.

FIG. 31A shows an example sdff cell layout with gate electrode and local interconnect line end gaps centered substantially between diffusion fins, in accordance with some embodiments of the present invention. In FIG. 31A, the gate electrode line end gaps are circled. FIG. 31B shows the example sdff cell layout of FIG. 31A, with the local interconnect line end gaps centered substantially between the diffusion fins circled. Based on FIGS. 31A through 31B, it should be understood that a cell library architecture can be generated in which all gate electrode and vertical interconnect line end gaps are centered substantially between the diffusion fins. FIG. 31C shows the example sdff cell layout of FIGS. 31A and 31B with annotation of the region 3105 between two adjacent gate electrode structures in which the diffusion fin ends overlap each other in the x direction, in accordance with some embodiments of the present invention.

Figure 32:
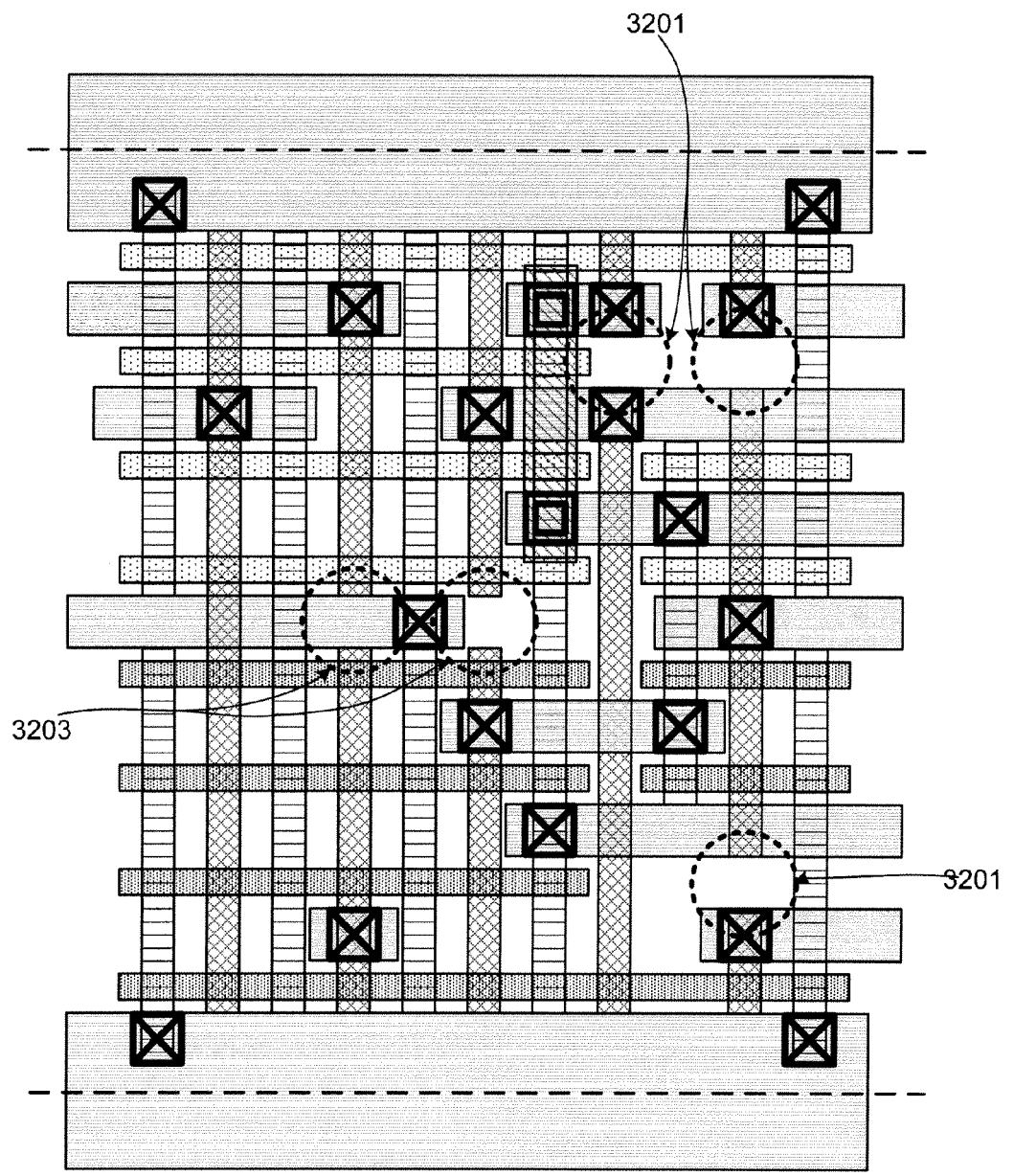
FIG. 32 shows an example layout in which all contact layer structures are placed between the diffusion fins, in accordance with some embodiments of the present invention.
Figure 33:
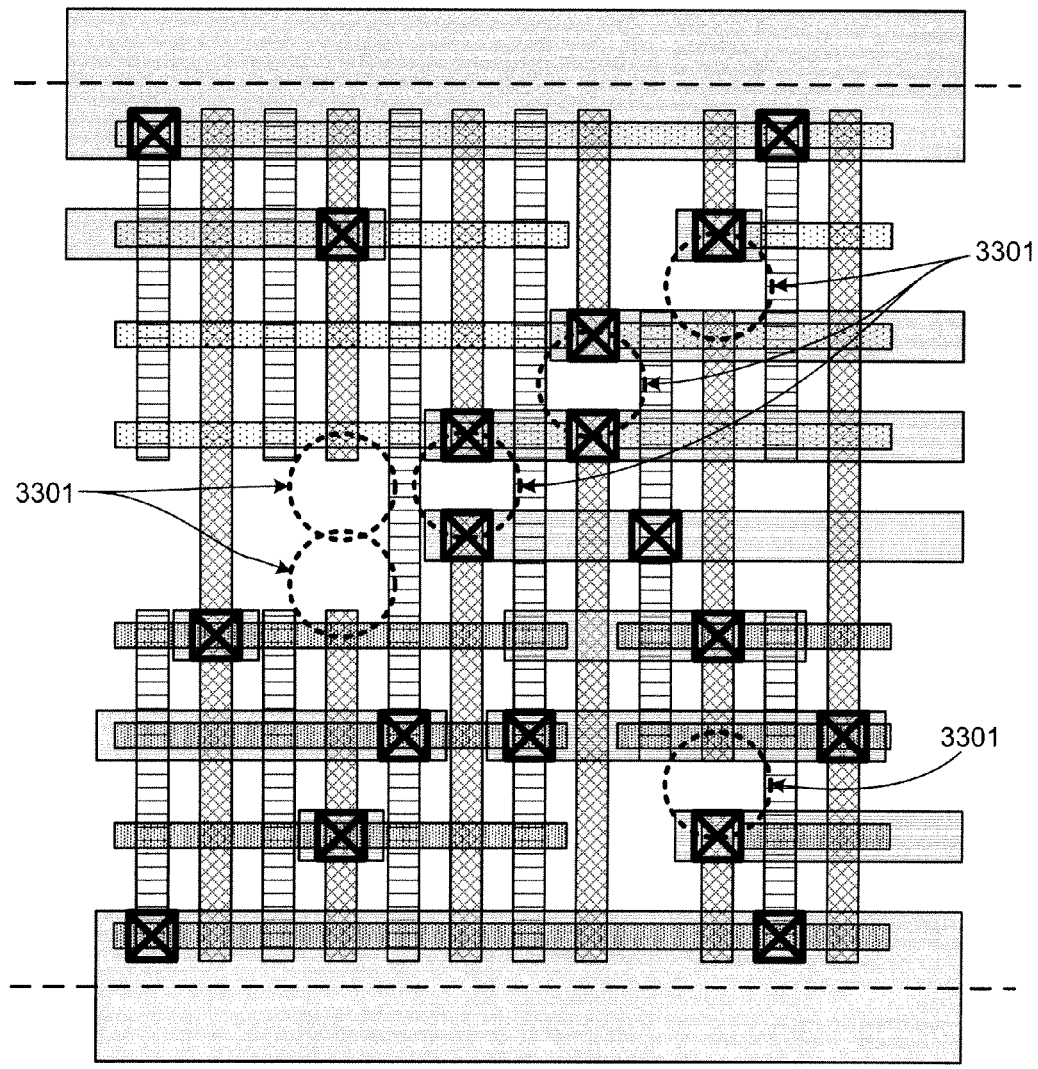
FIGS. 33 and 34 shows example layouts in which all contact layer structures are placed on the diffusion fins, in accordance with some embodiments of the present invention.
Figure 34:
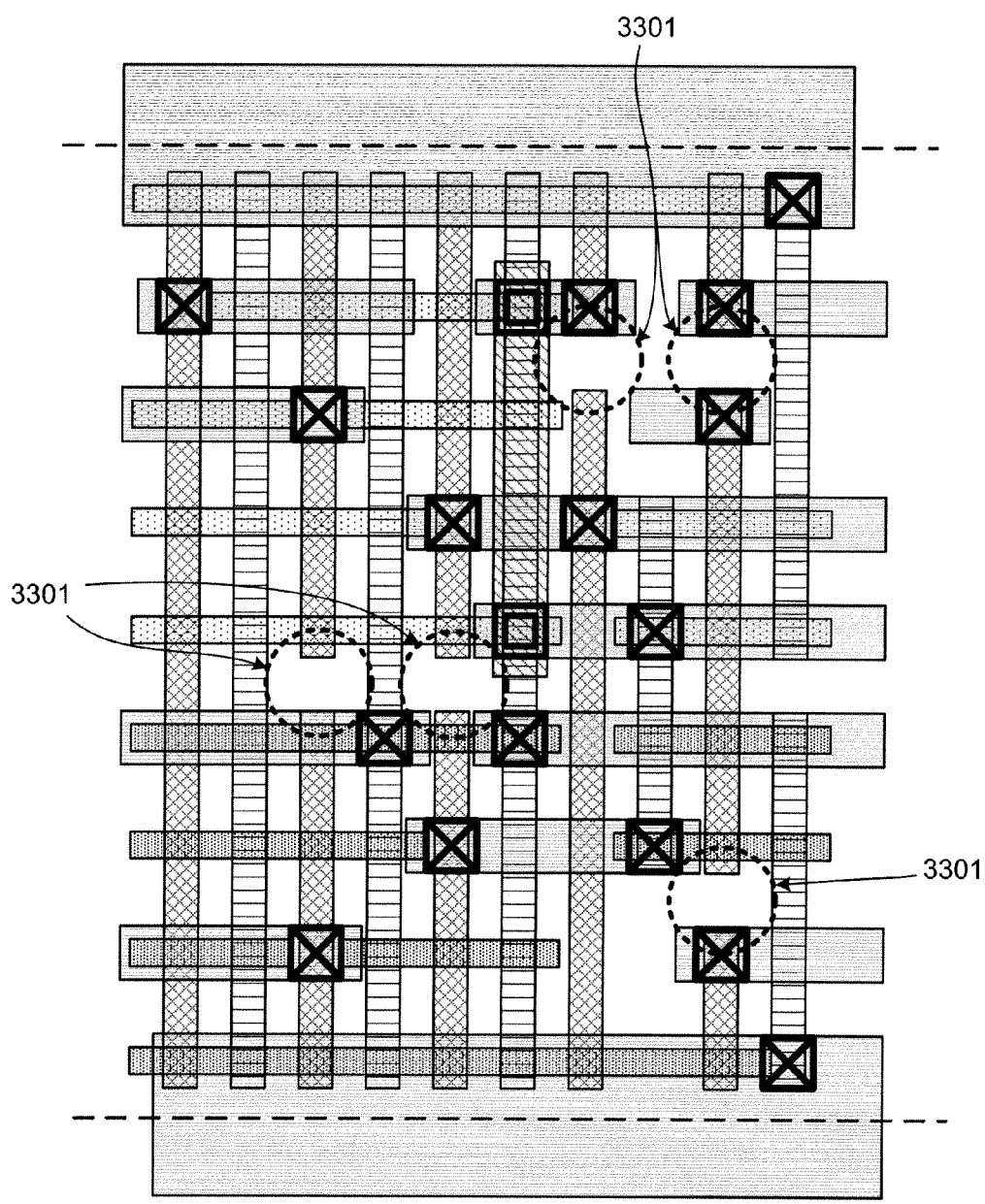
Figure 34:
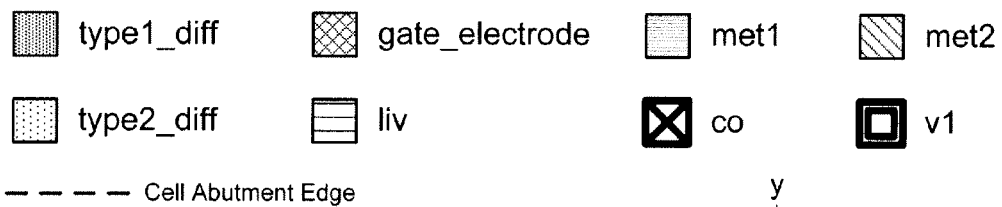

FIGS. 32-34 show three examples of a part of a standard cell circuit layout, in accordance with some embodiments of the present invention. FIG. 32 shows an example layout in which all contact layer structures are placed between the diffusion fins. FIGS. 33 and 34 shows example layouts in which all contact layer structures are placed on the diffusion fins. In the example of FIG. 32, the gate electrode line end gaps in some instances are substantially centered over the diffusion fins, as noted by circles 3201, and in some instances the gate electrode line end gaps are substantially centered between the diffusion fins, as noted by circles 3203. By using a cell architecture that places all of the contact layer structures over the diffusion fins, all gate electrode line end gaps can be substantially centered between the diffusion fins, as noted by circles 3301 in FIGS. 33 and 34. One benefit here is that the gate electrode line end gaps are all on a fixed pitch. From a manufacturing perspective, it does not matter whether the gate electrode line end gaps are centered on the diffusion fins or between the diffusion fins. However, it does matter that the gate electrode line end gaps are not mixed, as in the example of FIG. 32. Having the gate electrode line end gaps all on the same pitch should result in a gate electrode manufacturing process that is either less expensive, more reliable or both.

Figure 48A:
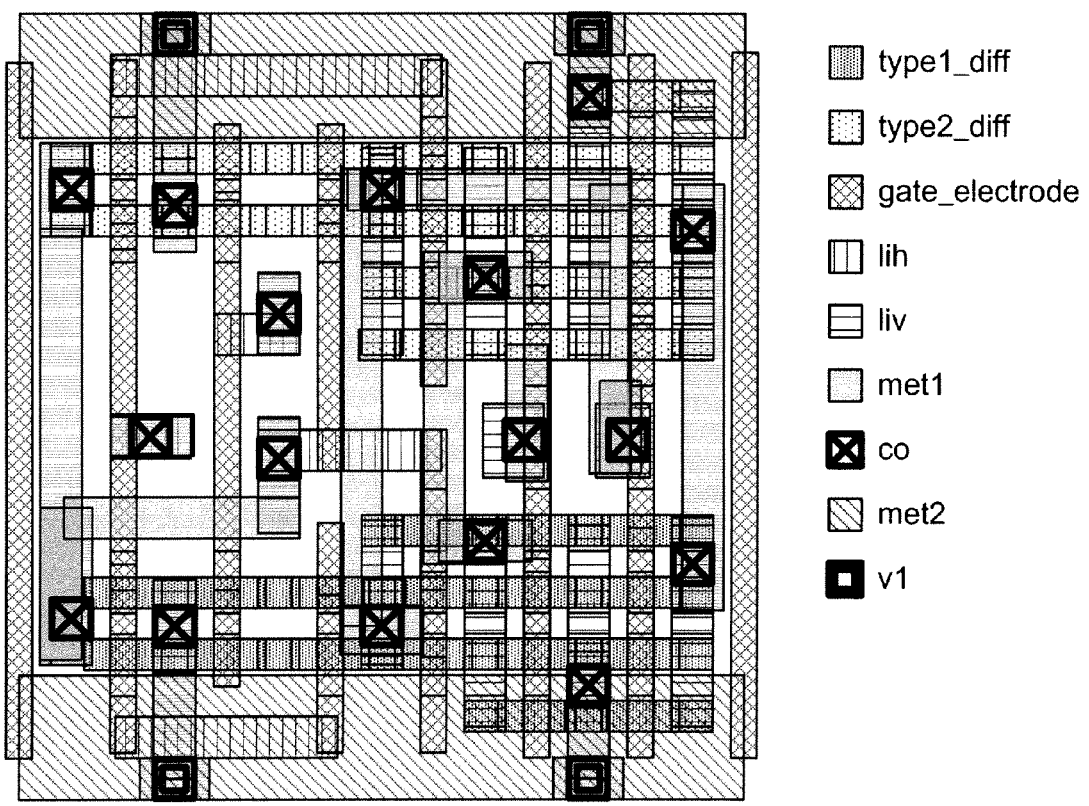
FIGS. 48A/B through 57A/B show cross-couple transistor configurations having transmission gate in the logic path with larger transistors, and tristate gate in other paths, in accordance with some embodiments of the present invention.
Figure 48B:
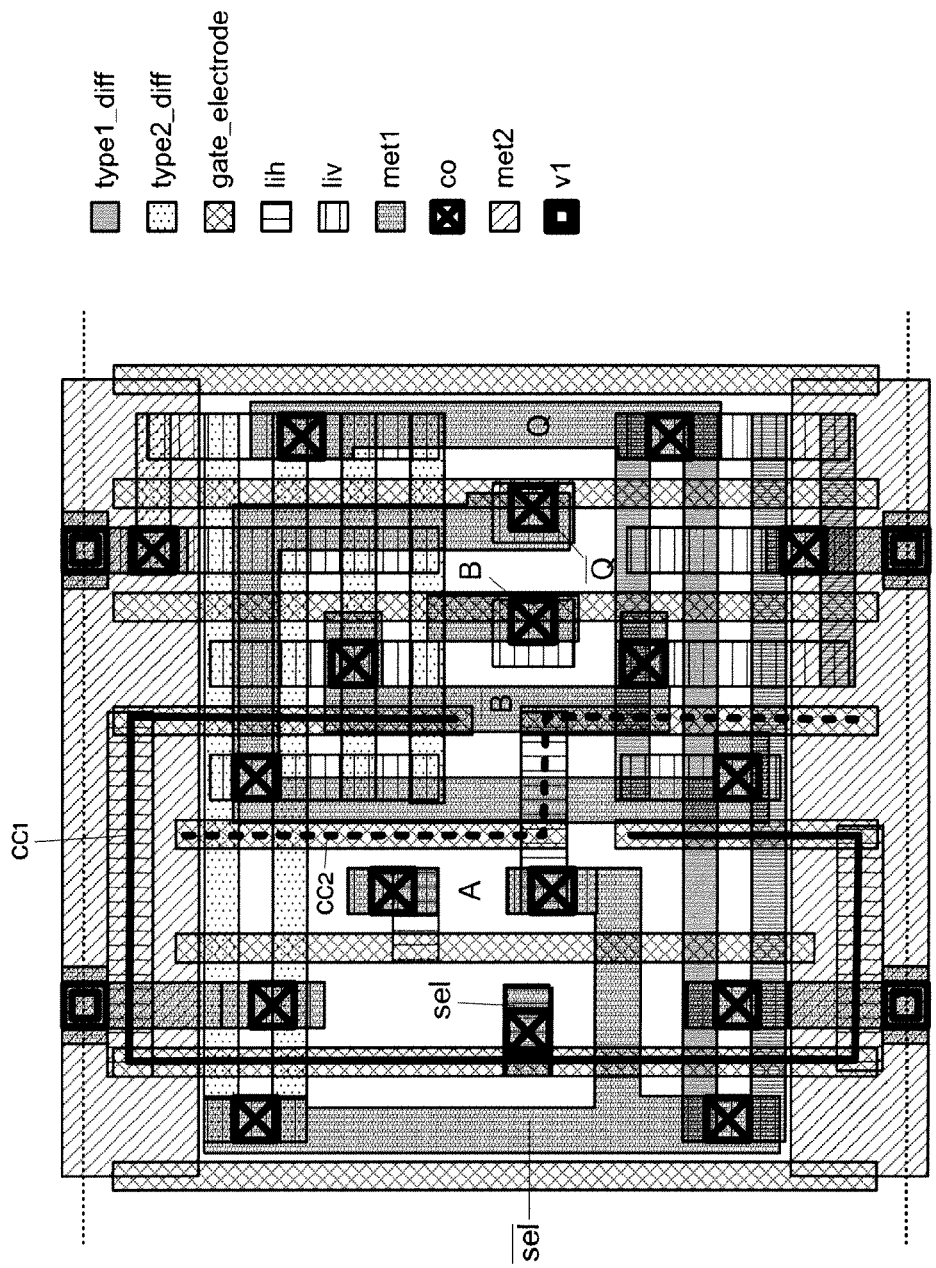
FIG. 48C shows a circuit schematic of the layouts of FIGS. 48A/B through 58A/B, in accordance with some embodiments of the present invention.
Figure 48C:
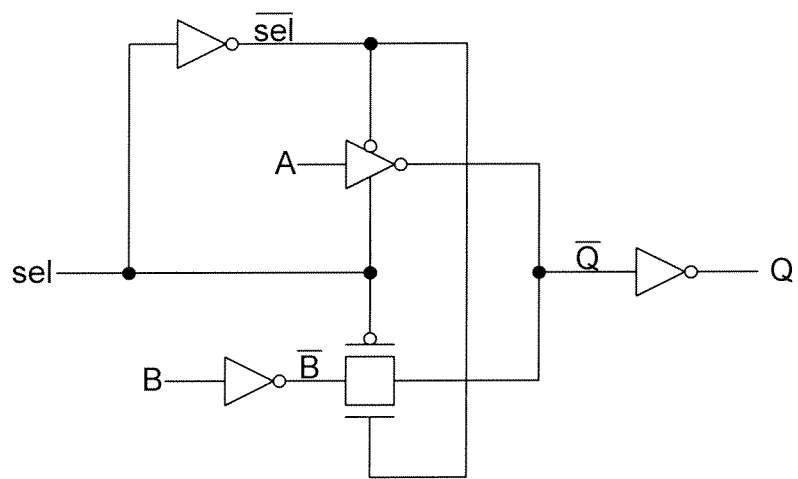
Figure 49A:
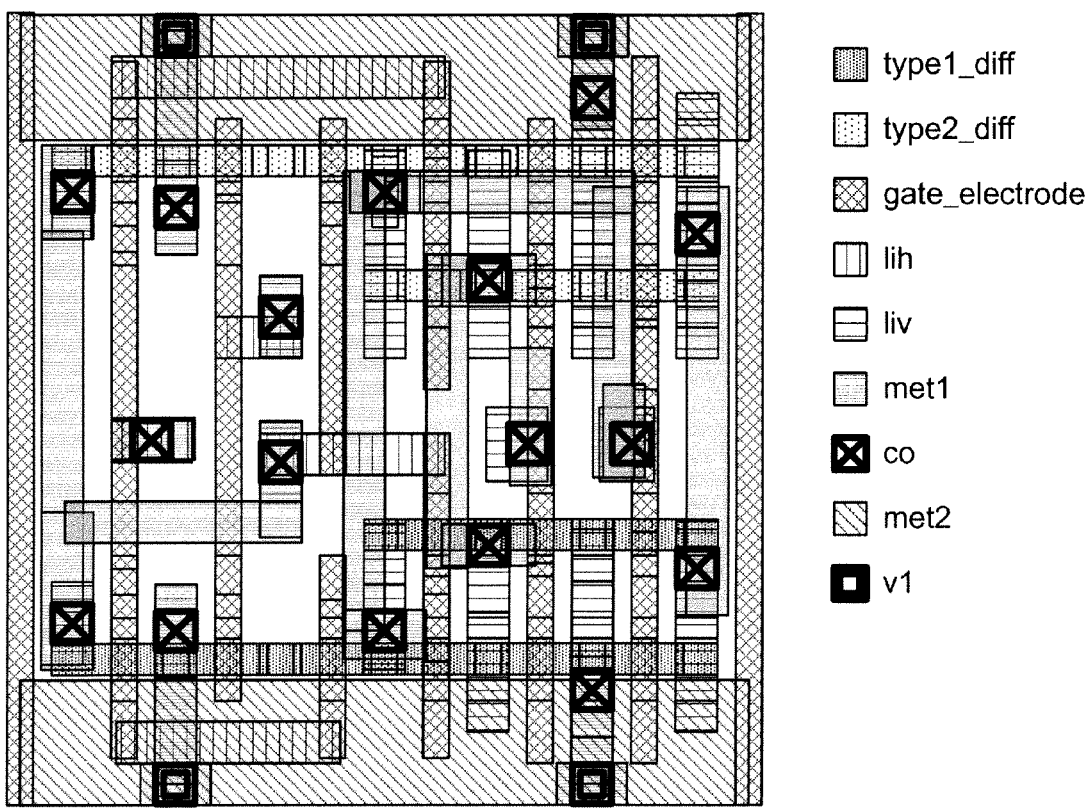
Figure 49B:
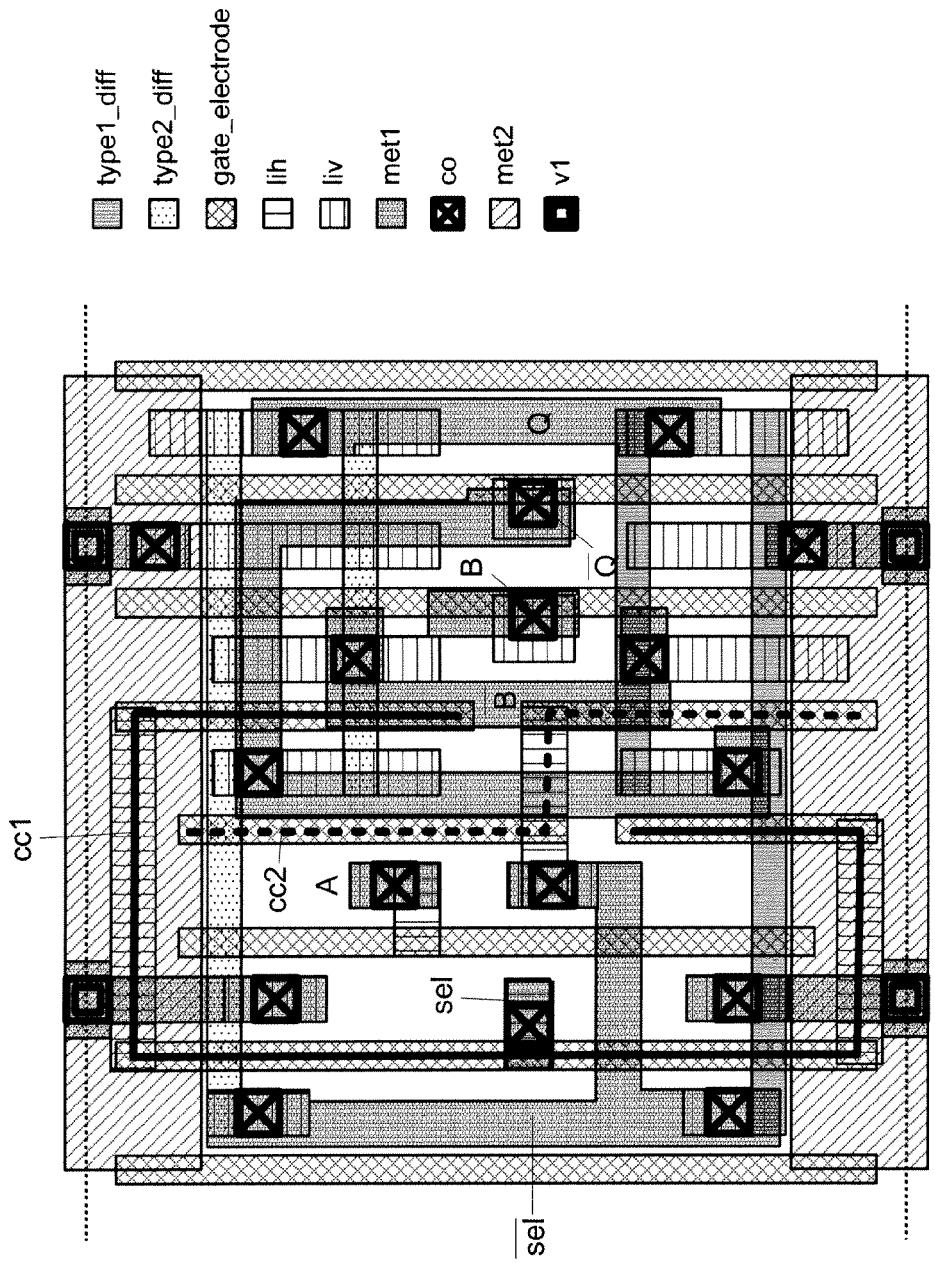
Figure 50A:
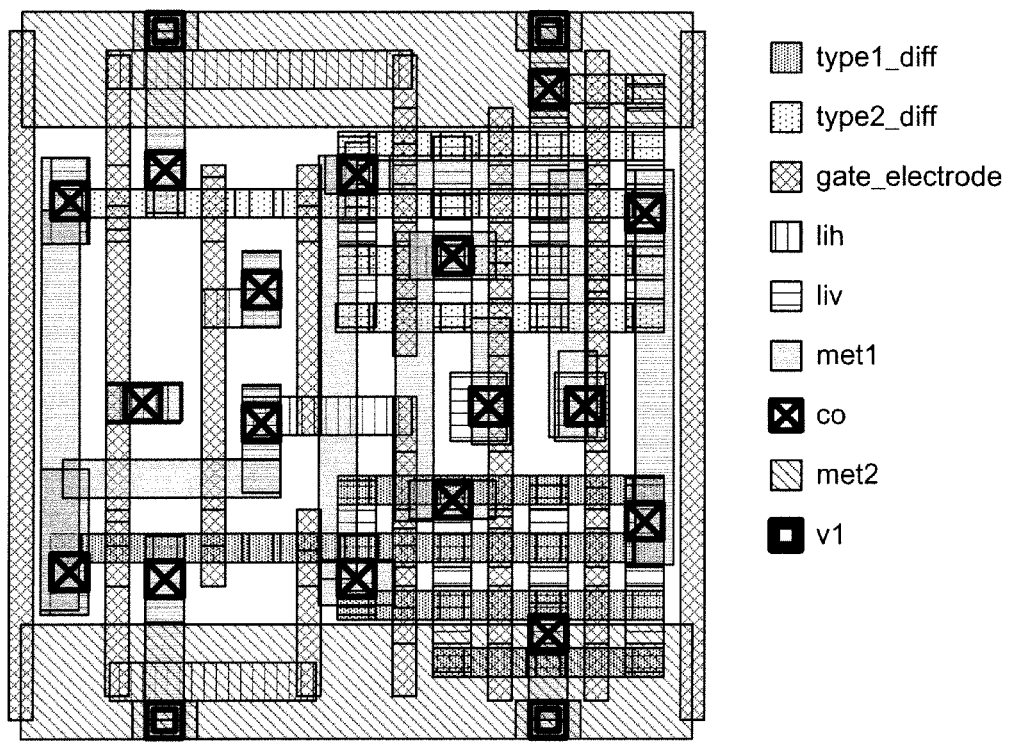
Figure 50B:
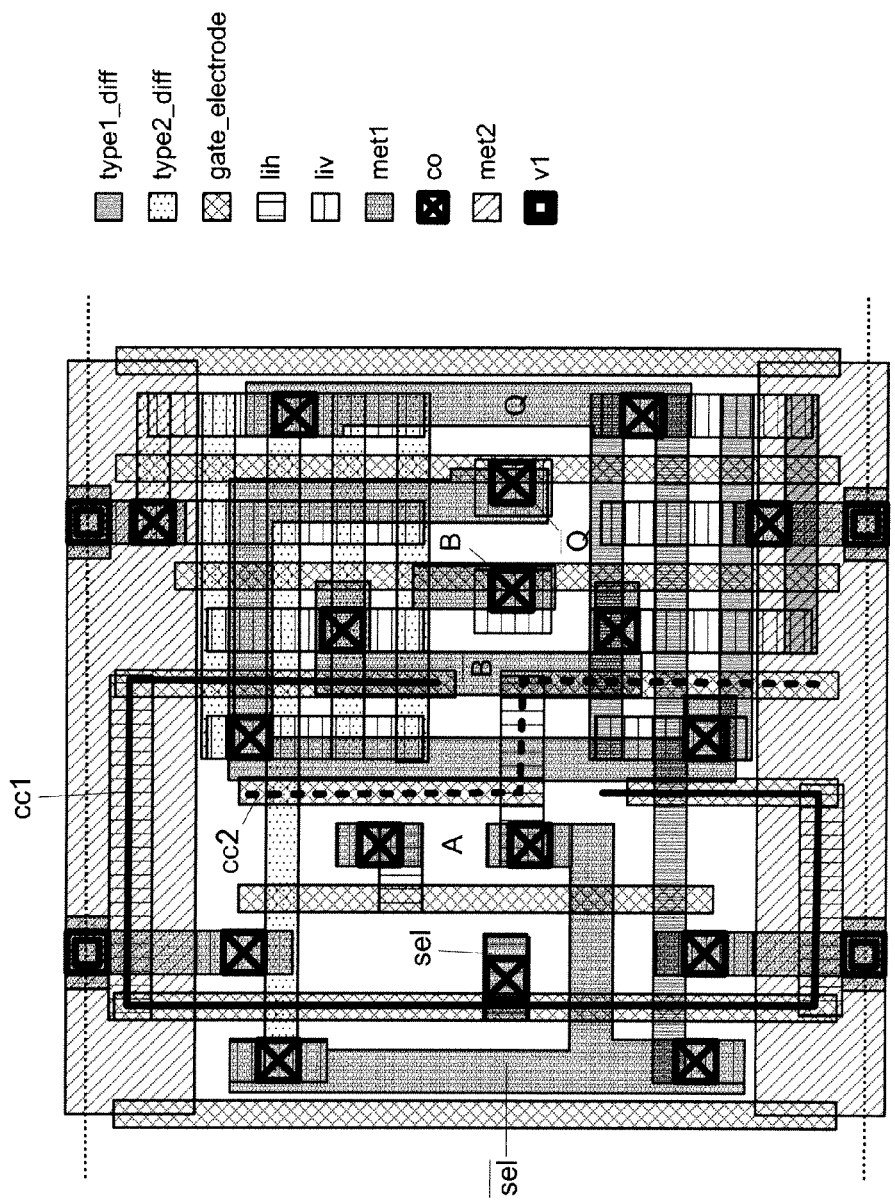
Figure 51A:
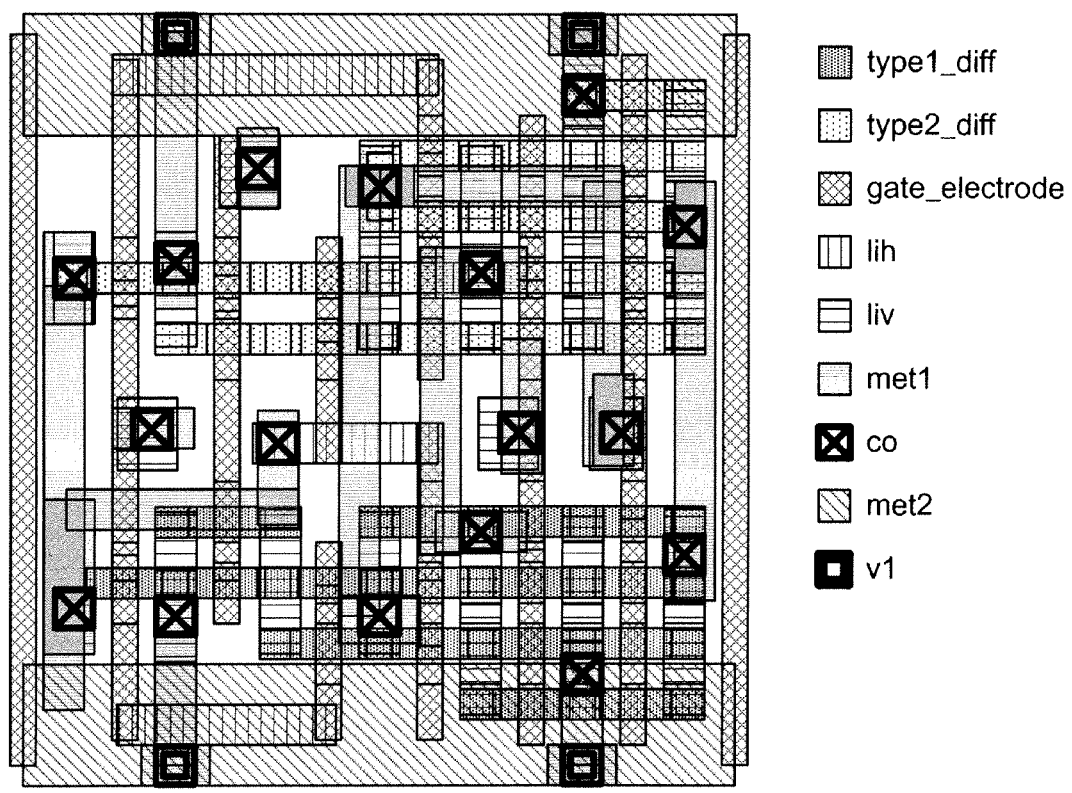
Figure 51B:
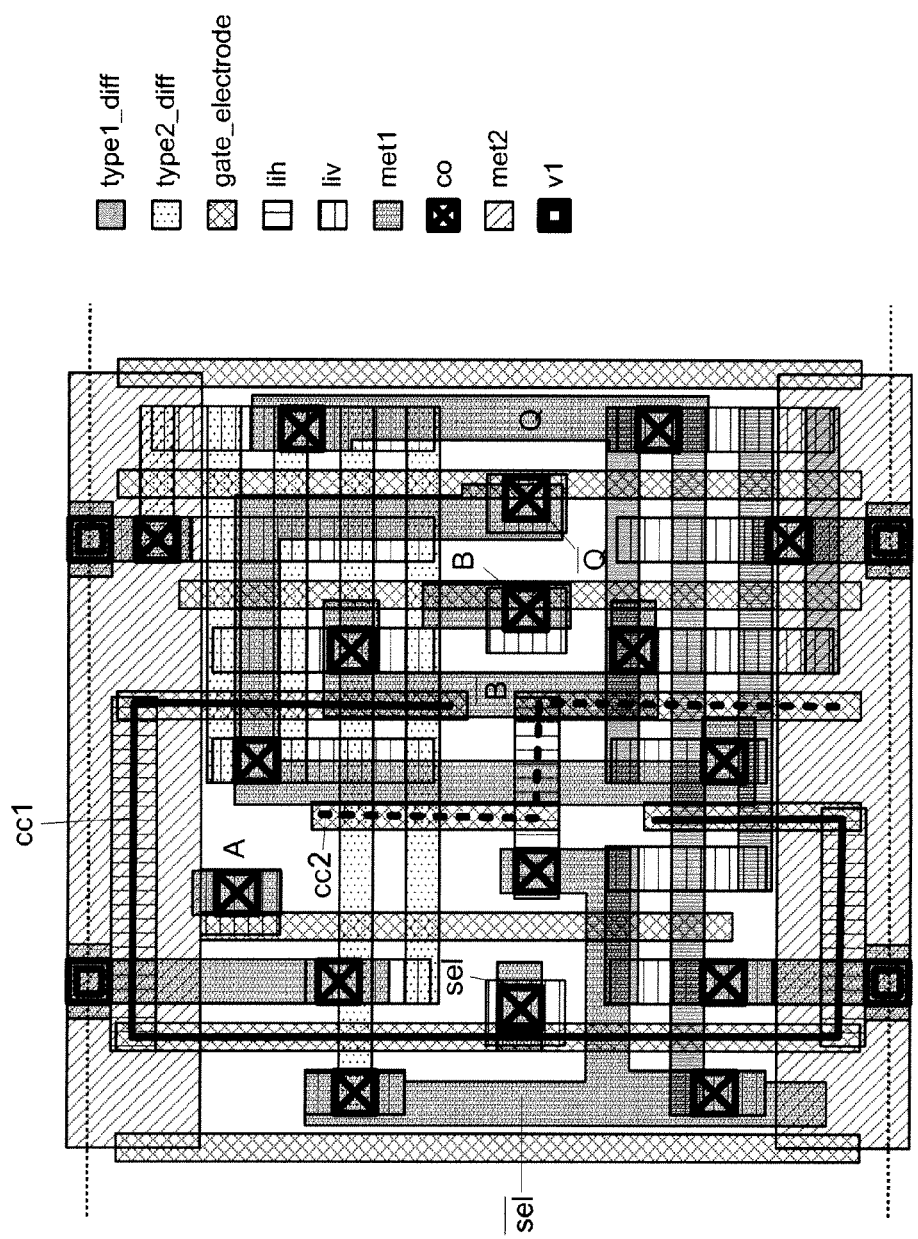
Figure 52A:
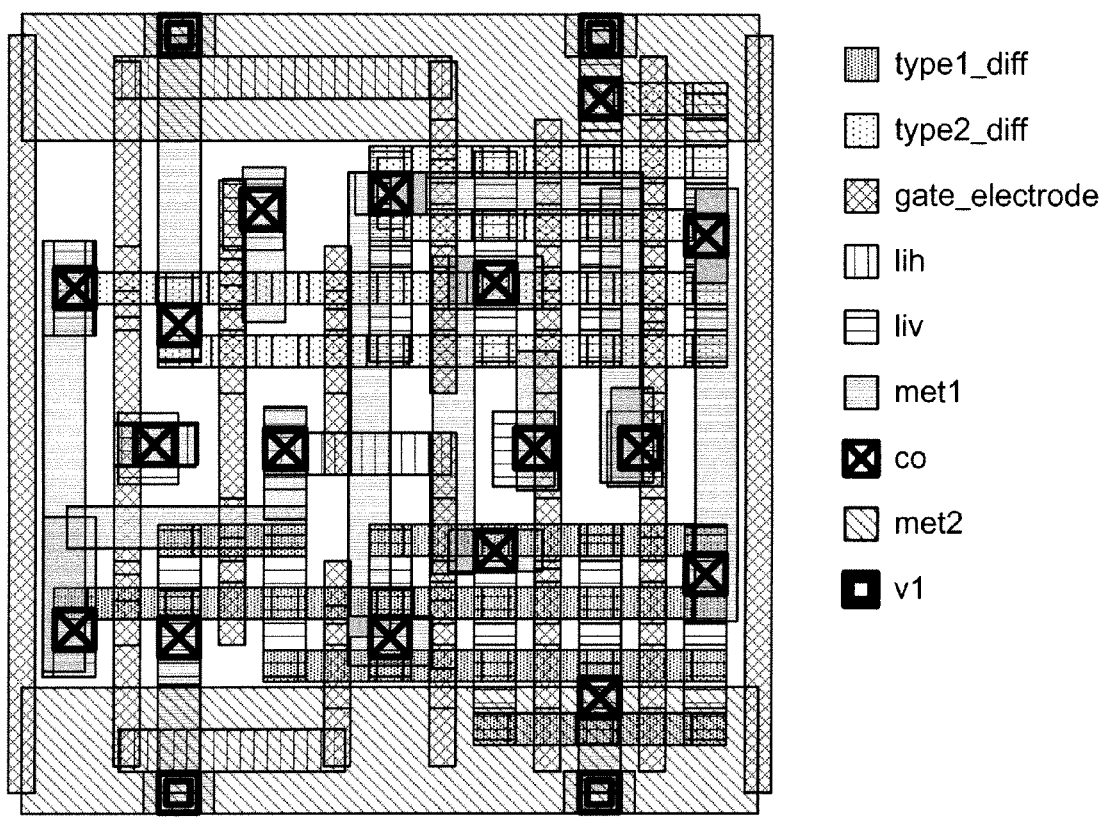
Figure 52B:
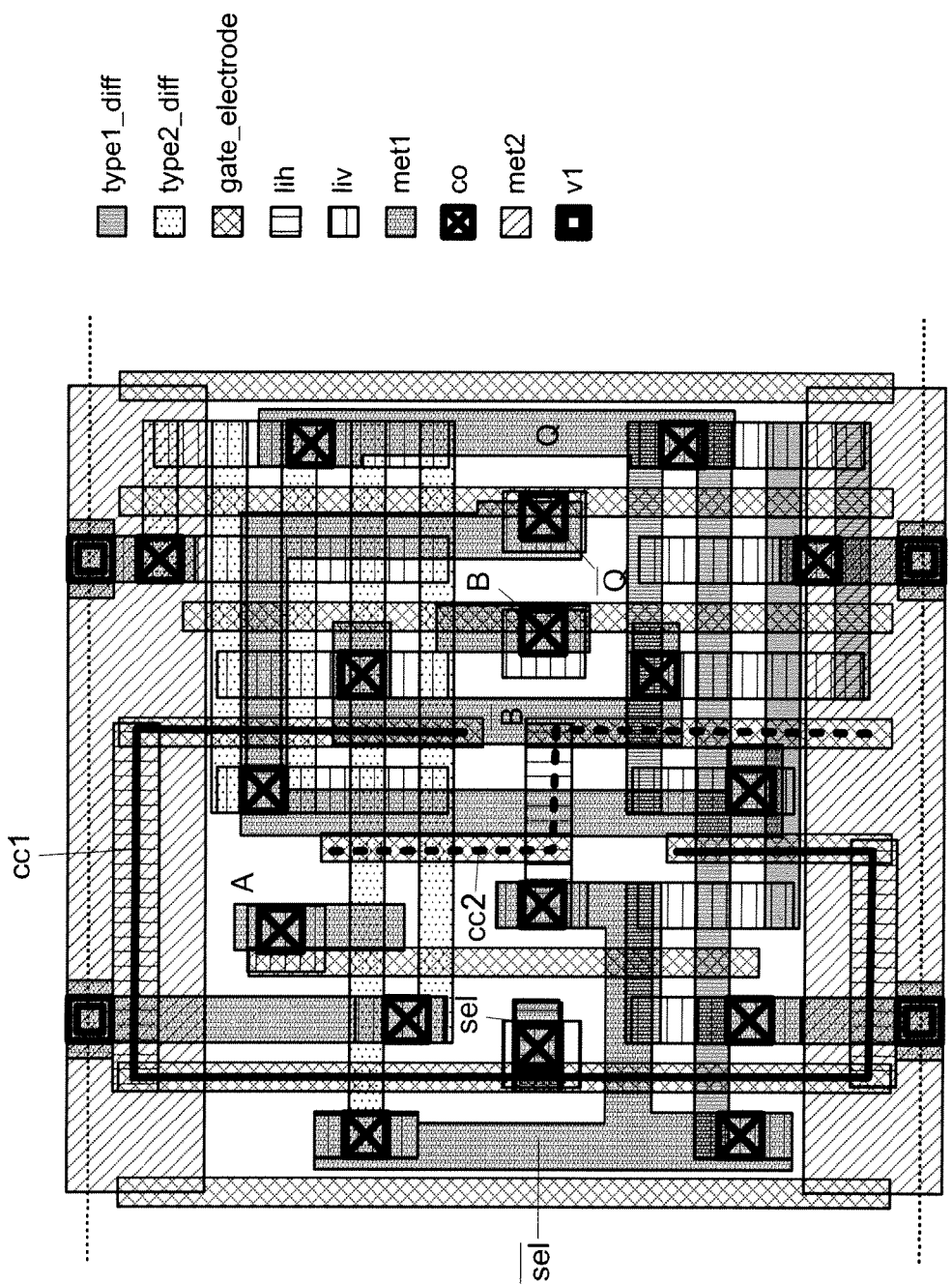
Figure 53A:
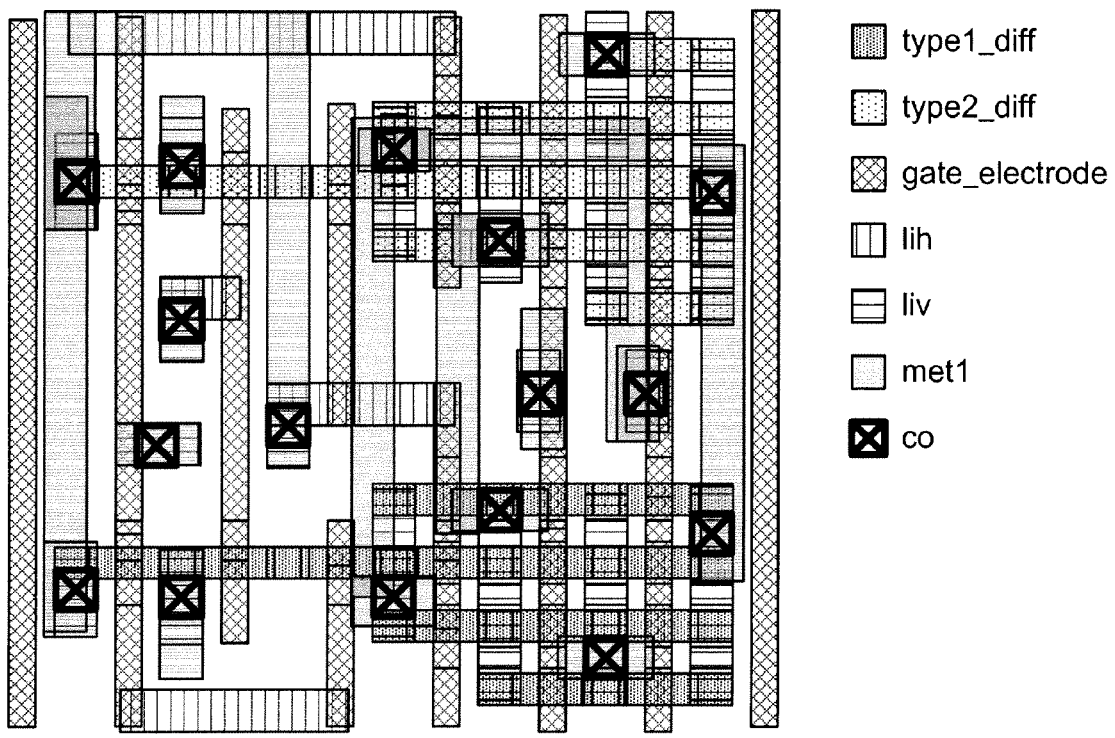
Figure 53B:
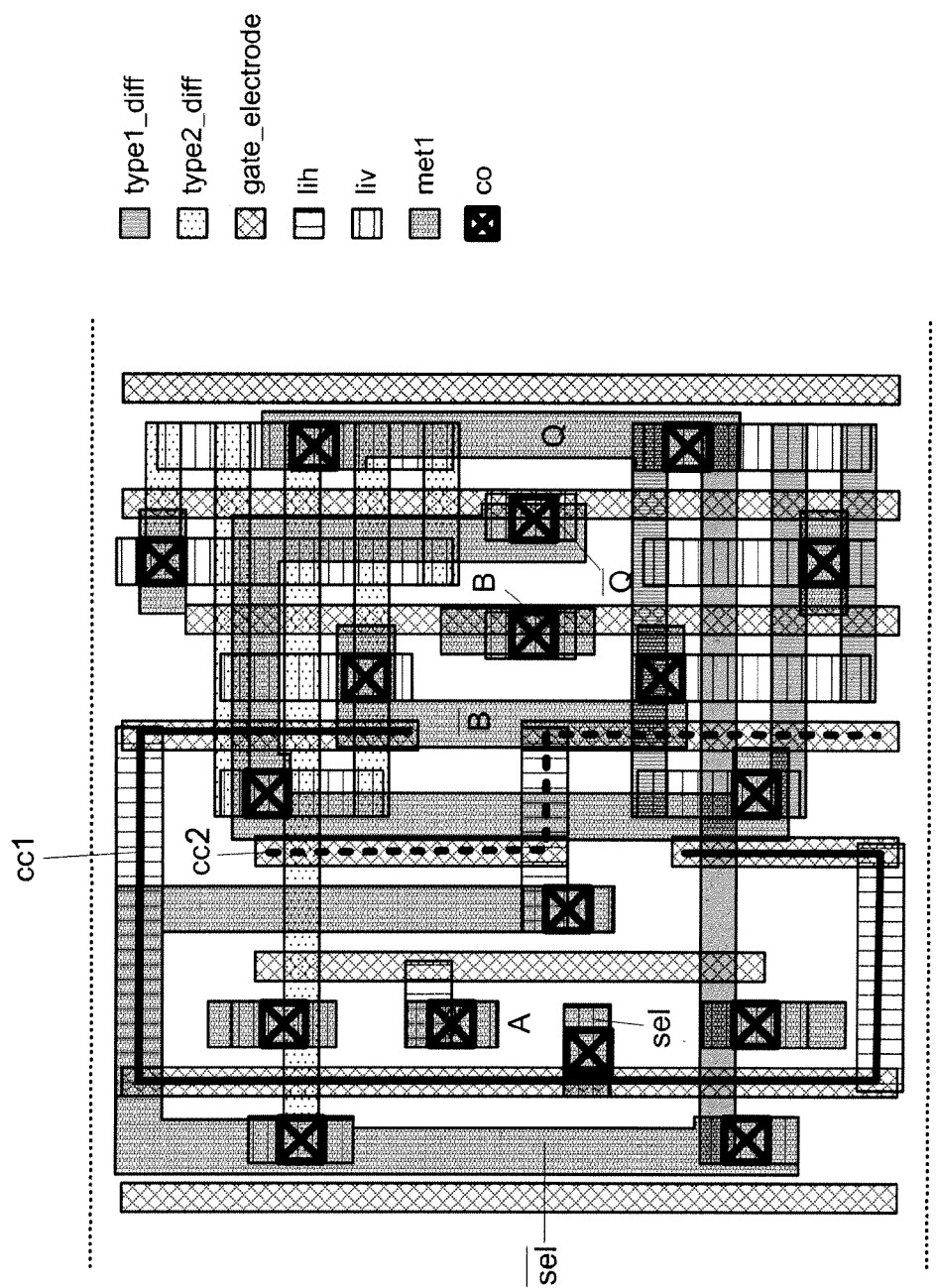
Figure 54A:
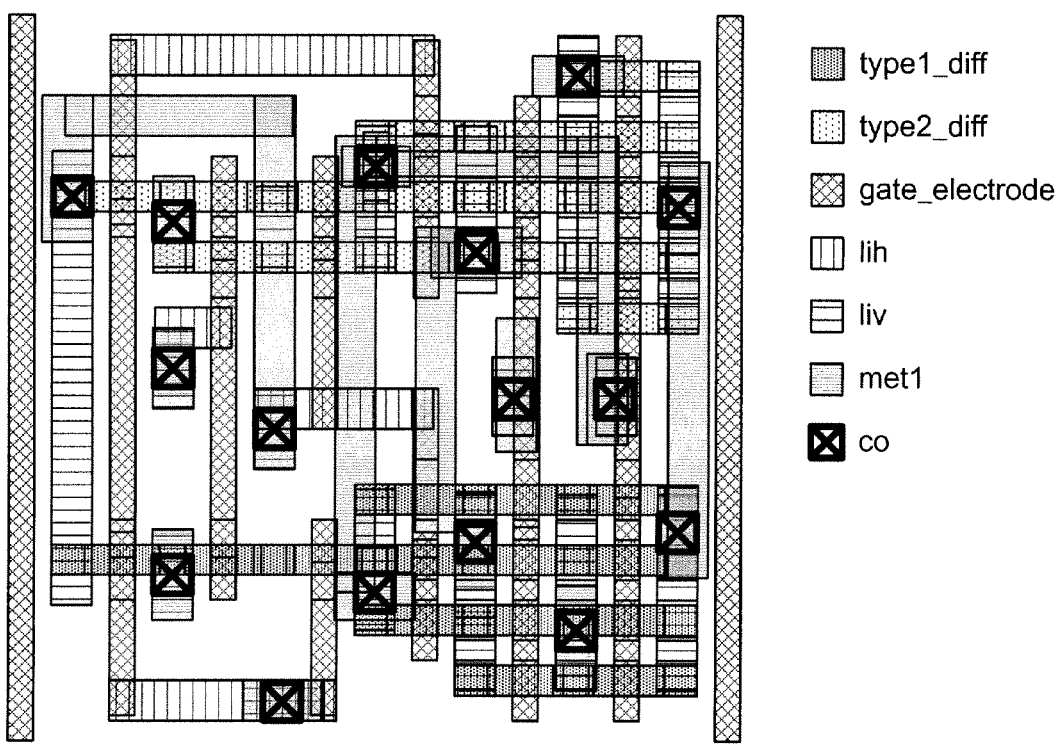
Figure 54B:
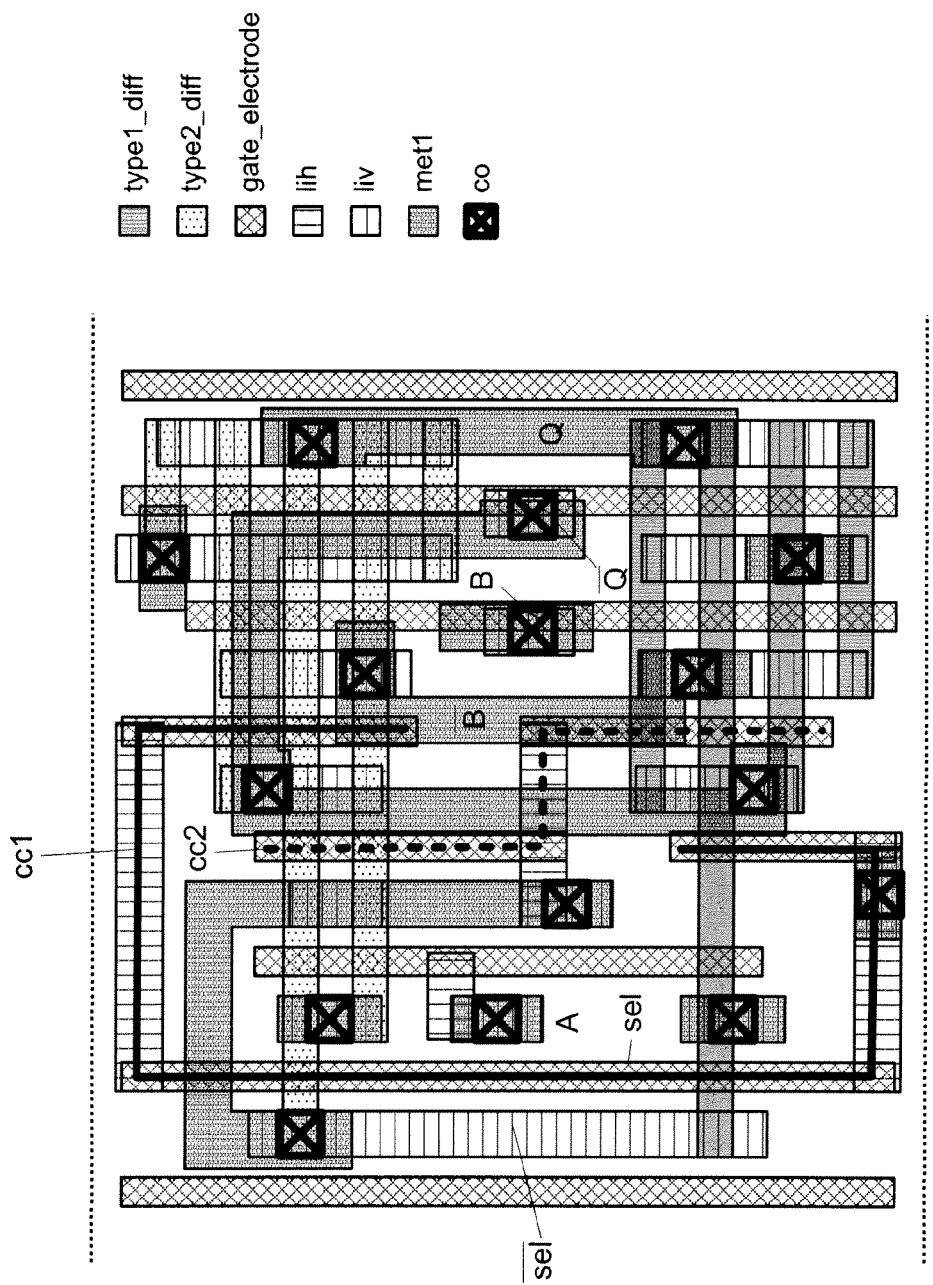
Figure 55A:
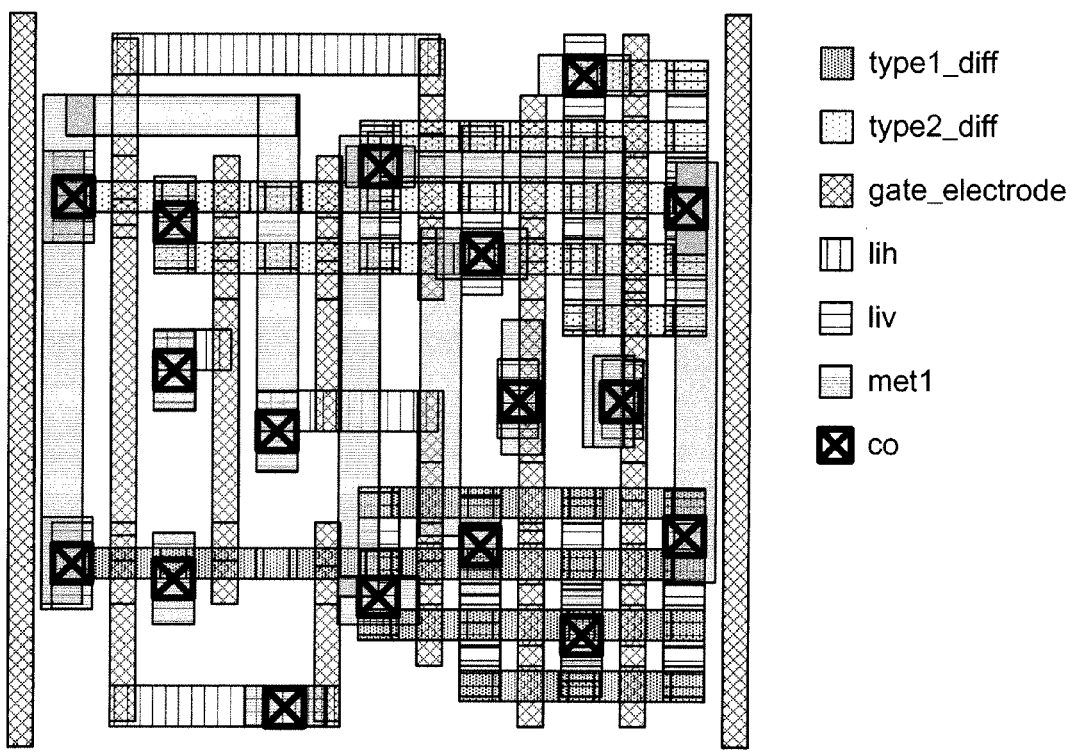
Figure 55B:
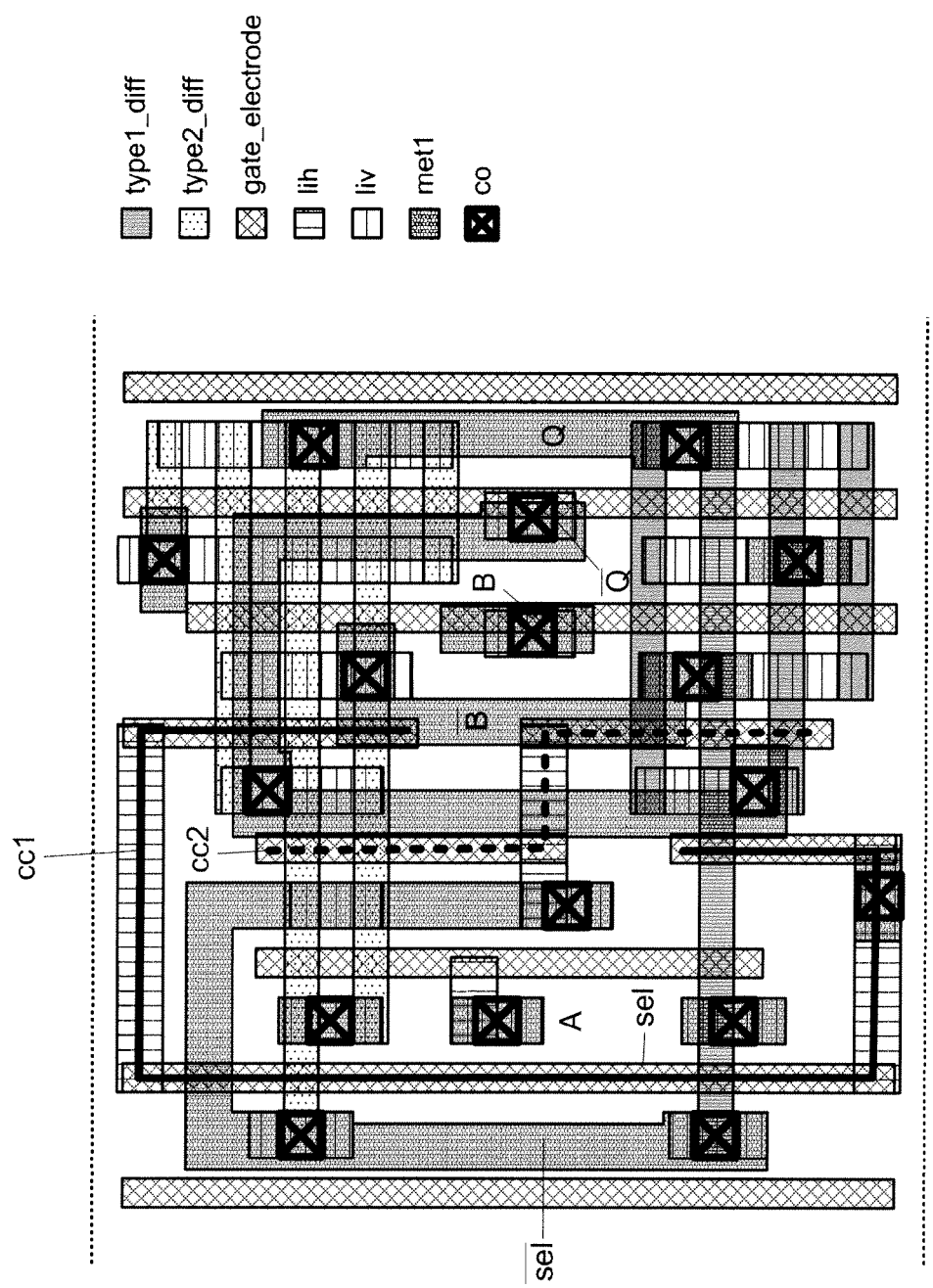
Figure 56A:
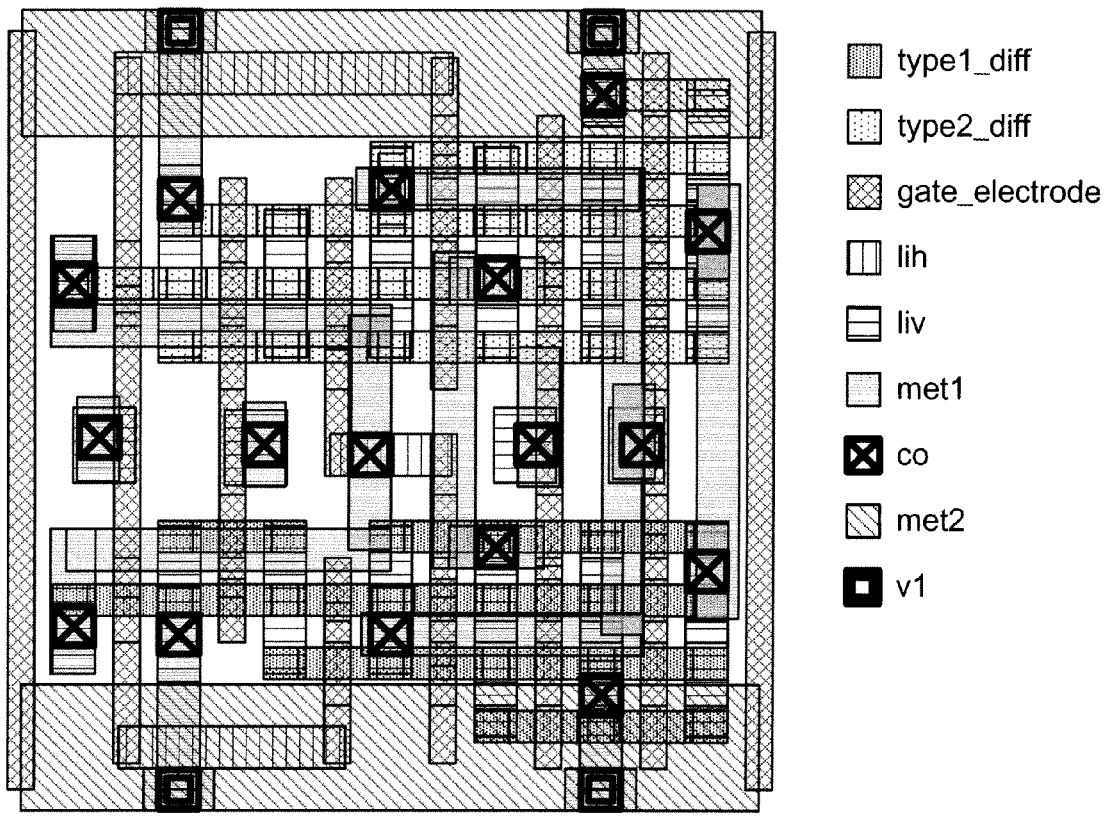
Figure 56B:
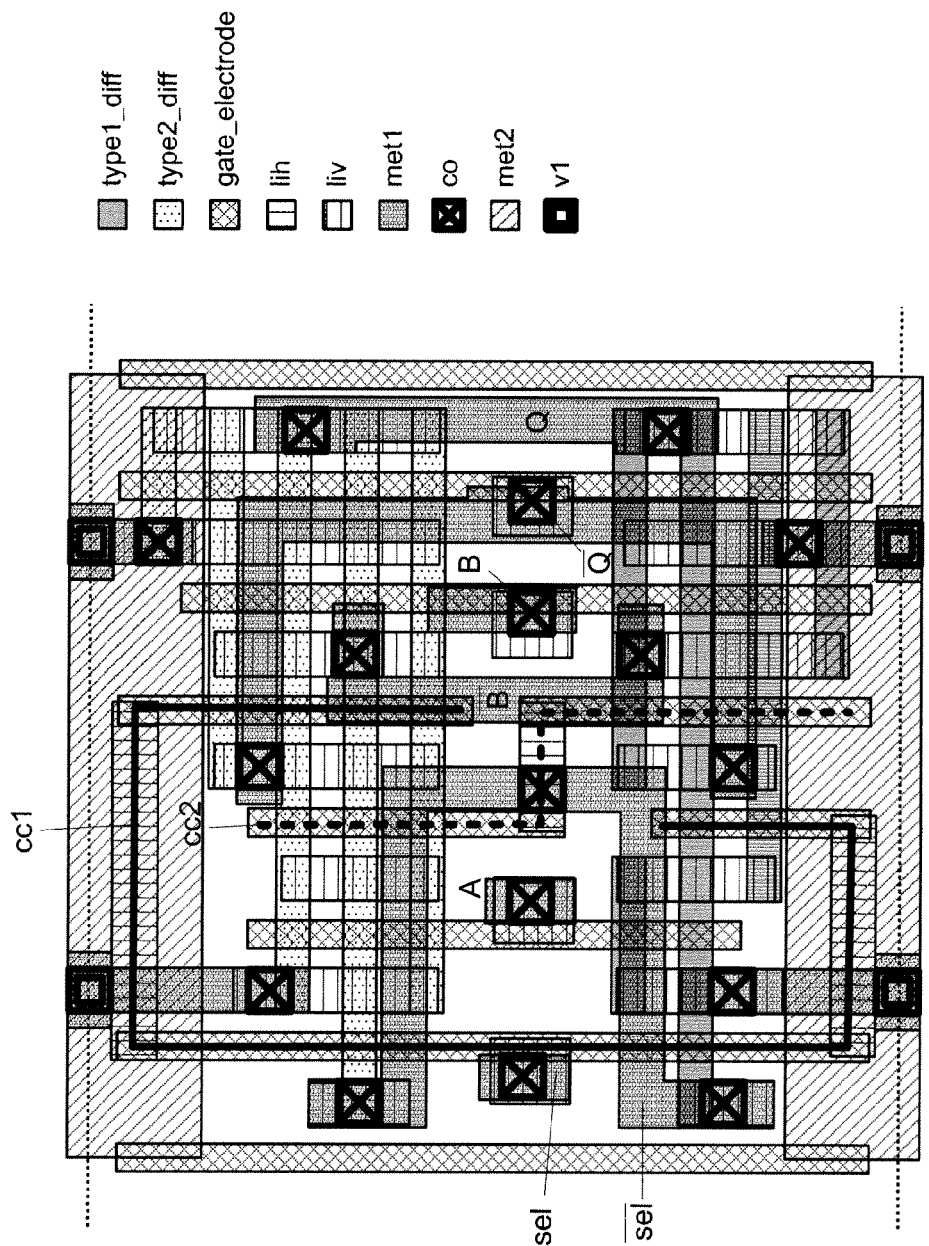
Figure 57A:
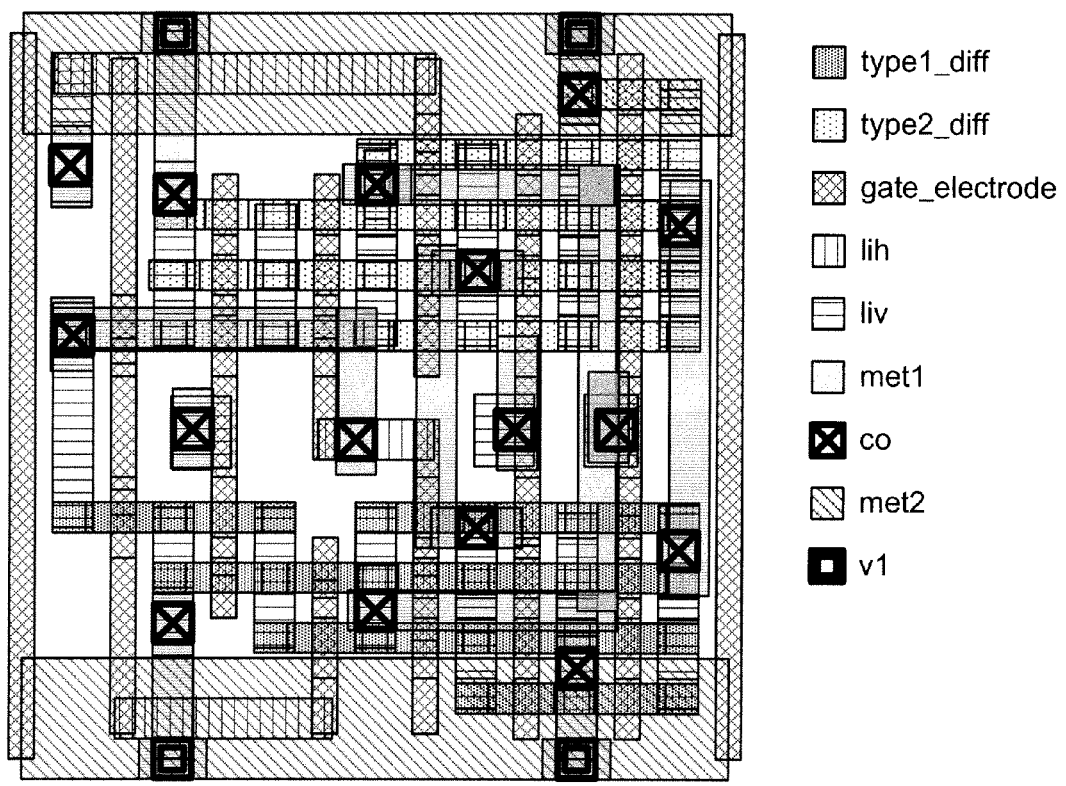
Figure 57B:
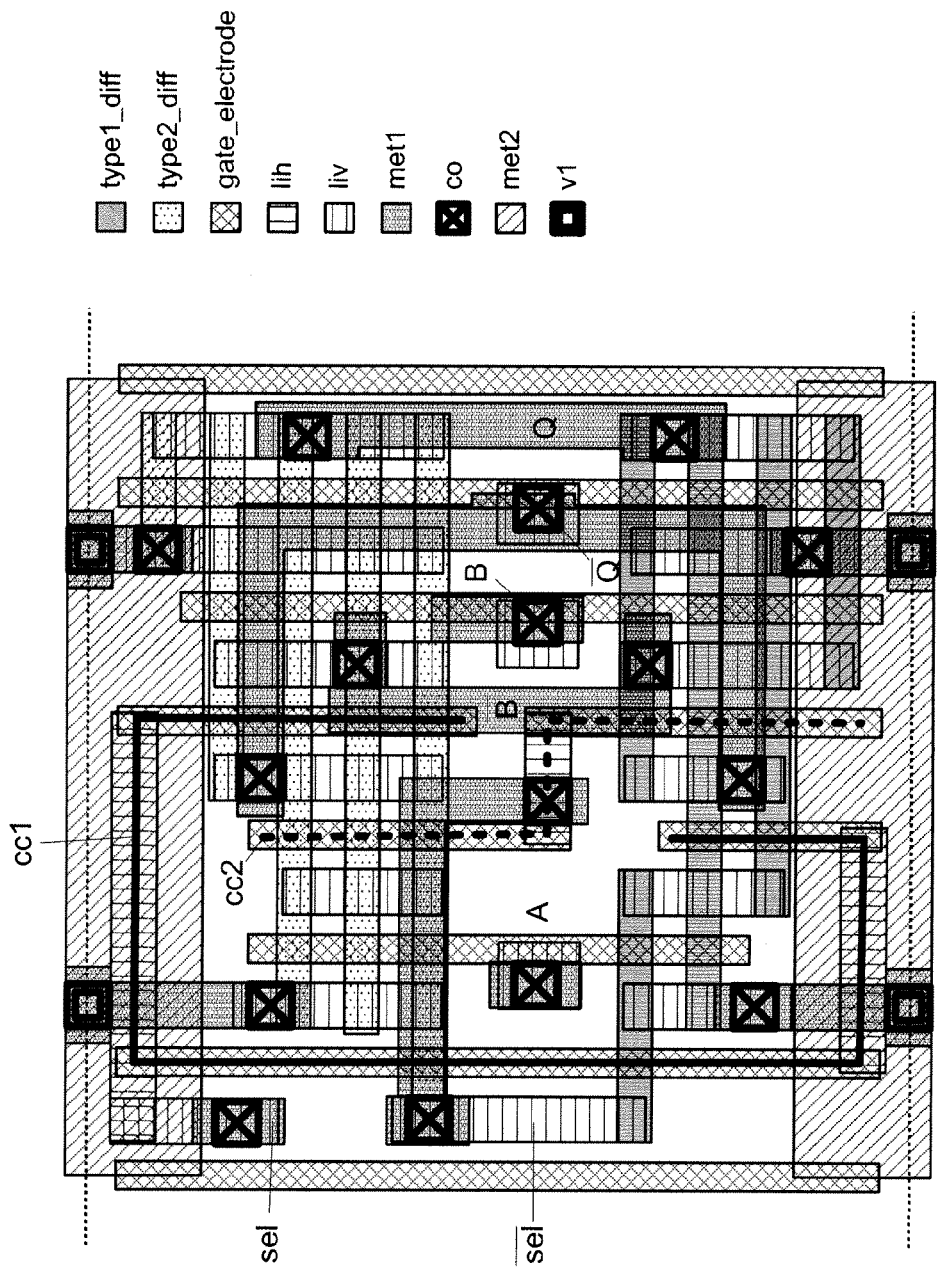
Figure 68A:
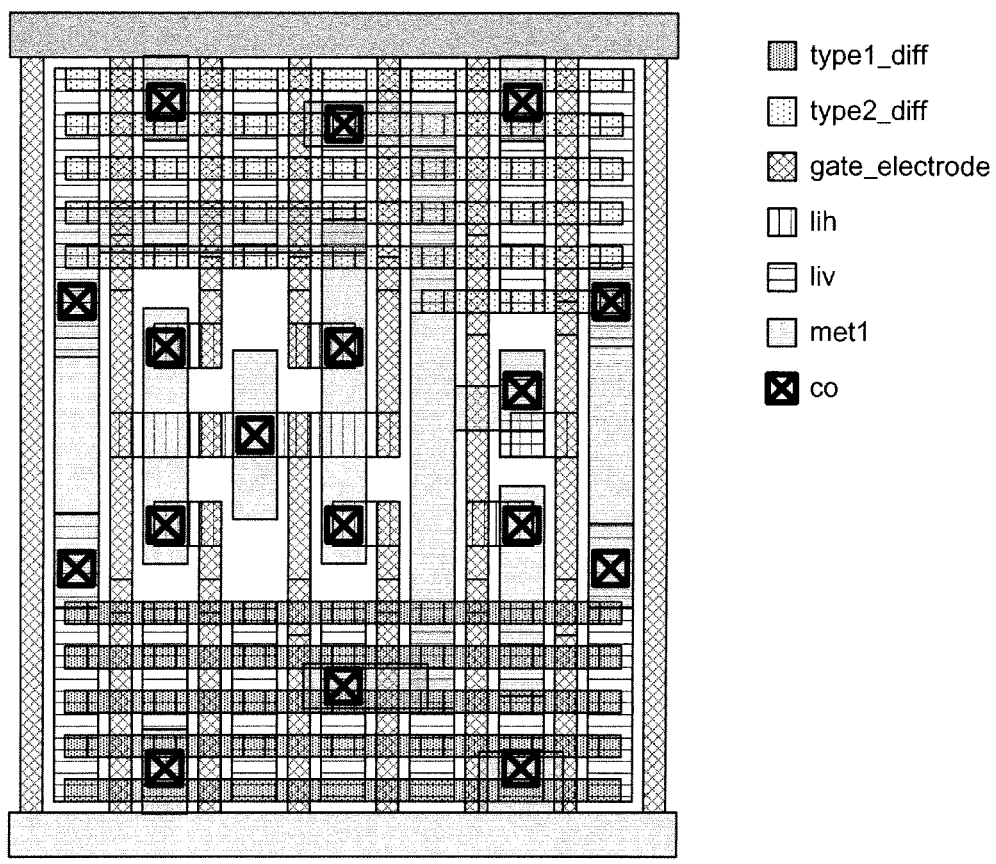
FIGS. 68A/B through 69A/B show cross-couple transistor configurations having tristate gate in both logic paths, in accordance with some embodiments of the present invention.
Figure 68B:
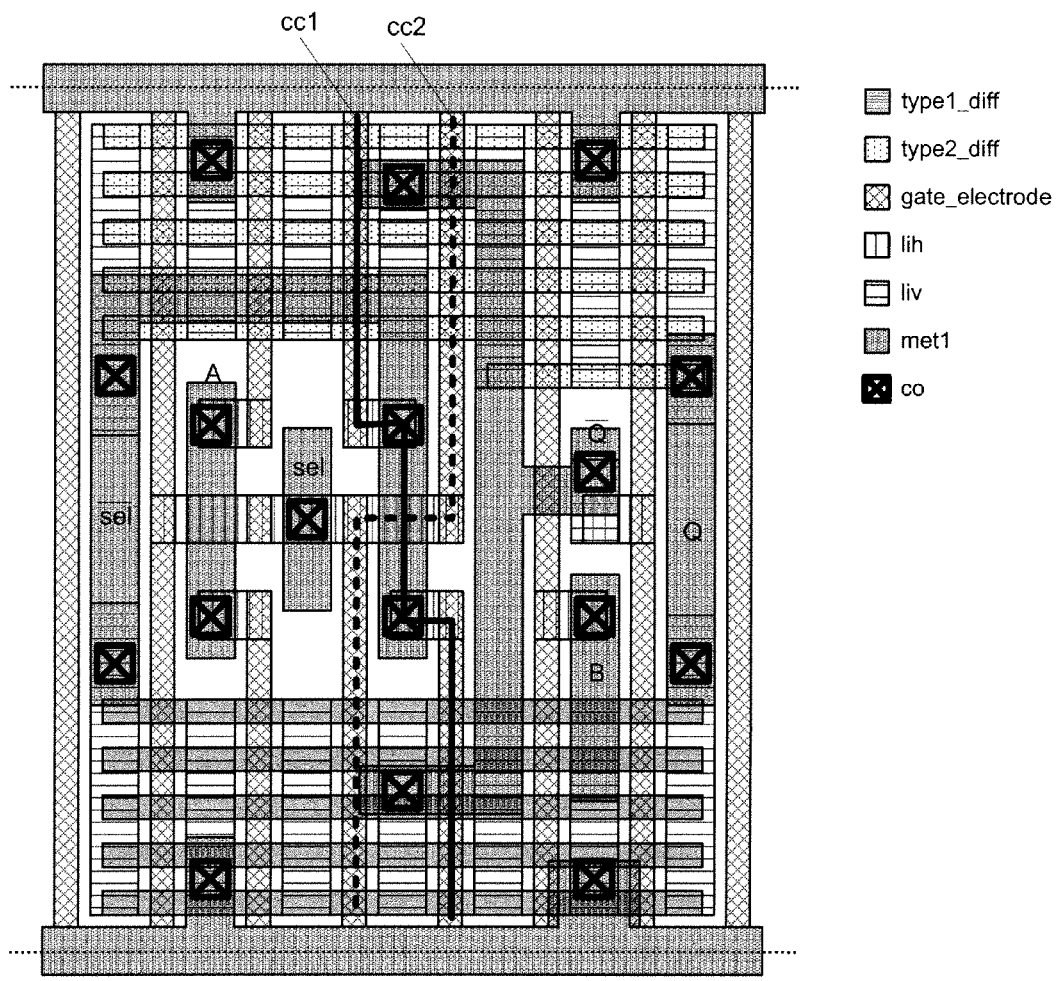
Figure 69A:
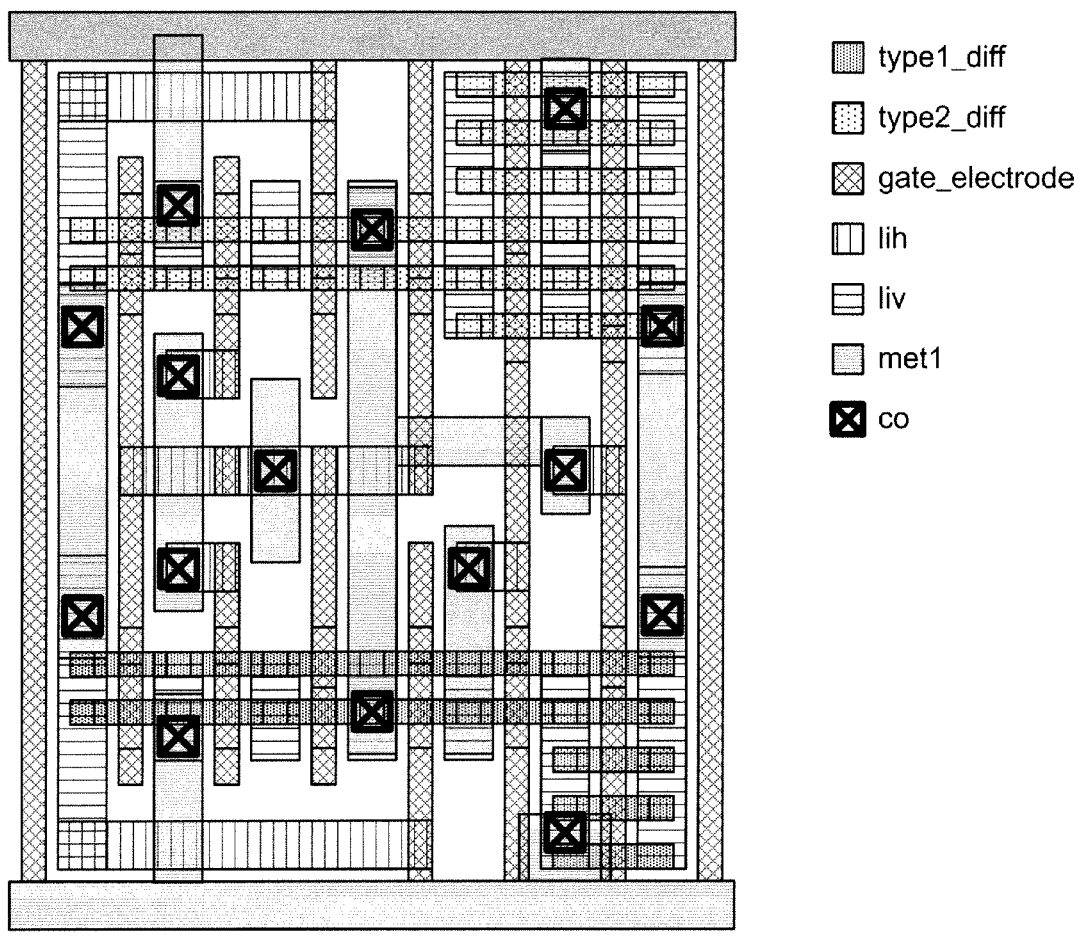
Figure 69B:
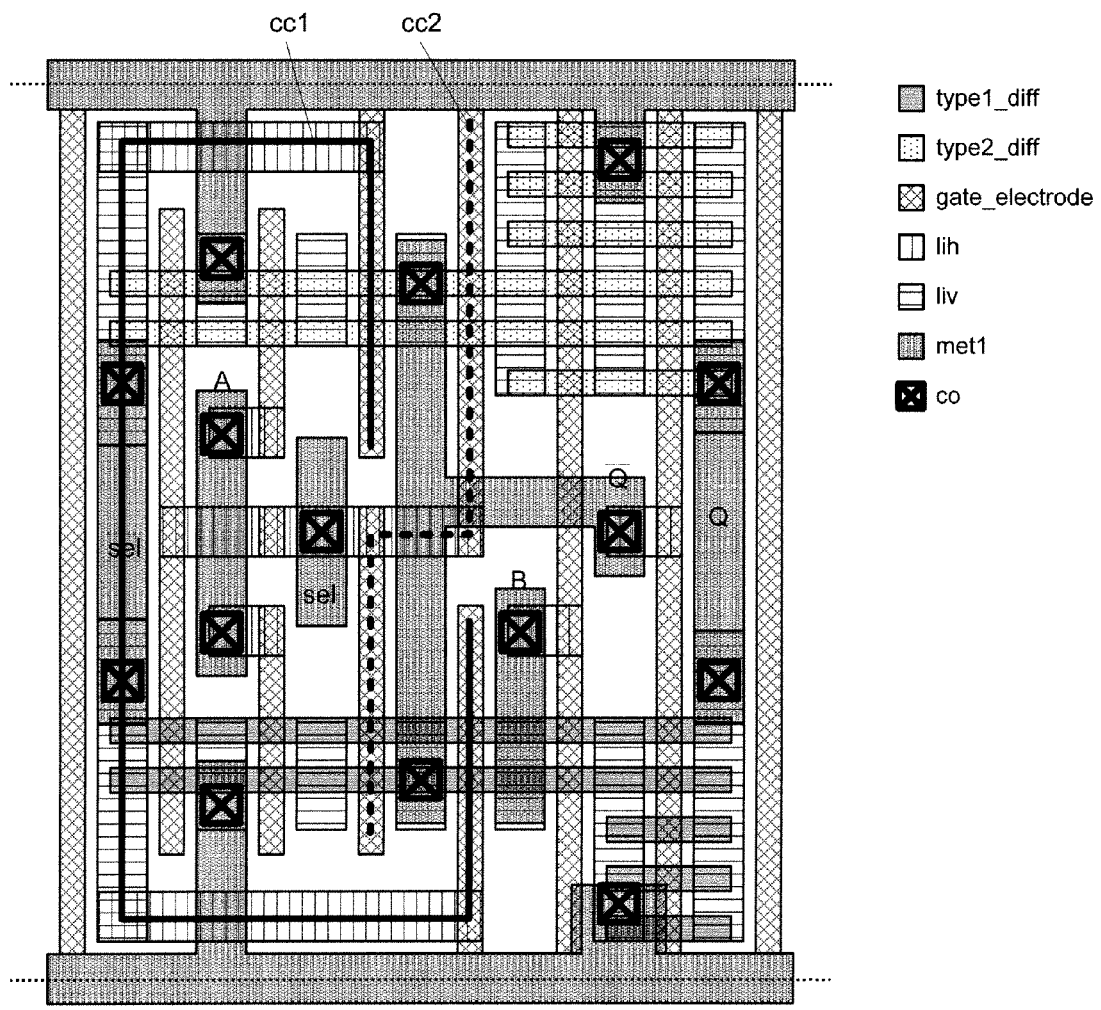

FIGS. 35A-69A show various cell layouts which demonstrate examples of different ways in which a cross-coupled transistor configuration can be implemented using finfet transistors. The cross-couple layouts of FIGS. 35A-69A are shown in the context of a two-input multiplexor circuit (MUX2). FIG. 35C shows a circuit schematic of the layouts of FIGS. 35A/B through 47A/B and 63A/B through 67A/B, in accordance with some embodiments of the present invention. FIG. 48C shows a circuit schematic of the layouts of FIGS. 48A/B through 58A/B, in accordance with some embodiments of the present invention. FIG. 59C shows a circuit schematic of the layout of FIGS. 59A/B, in accordance with some embodiments of the present invention. FIG. 60C shows a circuit schematic of the layouts of FIGS. 60A/B through 62A/B and FIGS. 68A/B through 69A/B, in accordance with some embodiments of the present invention. FIG. 71C shows a circuit schematic of the layouts of FIGS. 71A/B and 77A/B, in accordance with some embodiments of the present invention. FIG. 72C shows a circuit schematic of the layouts of FIGS. 72A/B through 76A/B, in accordance with some embodiments of the present invention. The transistors on the left and right edges are added to the cross-couple to achieve MUX2 functionality. For other functions with cross-couple circuits, these may be different. FIGS. 35B-69B show the same layouts as FIGS. 35A-69A, respectively, with the layouts depicted in a merged format for clarity, and with the nodes of the circuit identified based on the cell layout's circuit schematic. Also, cross-coupled transistor connections are identified in FIGS. 35A-69A by lines cc1 and cc2.

Figure 35A:
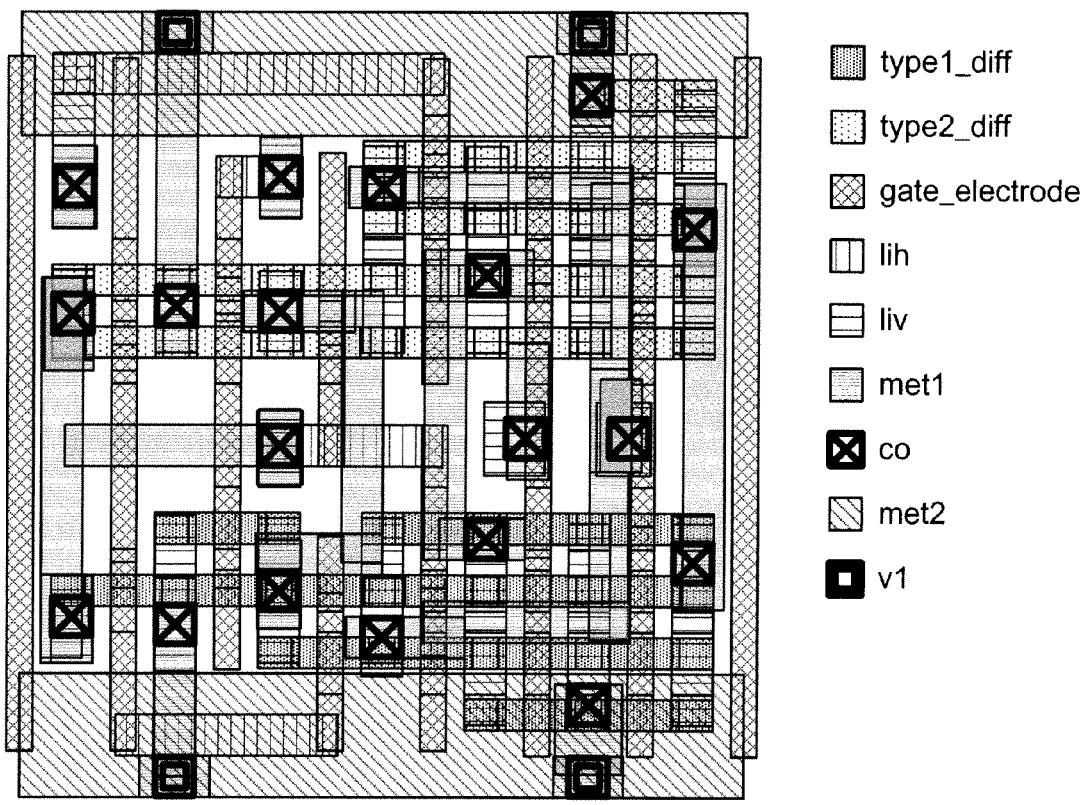
FIGS. 35A/B through 47A/B show cross-couple transistor configurations having transmission gate in both logic paths, requiring all the internal nodes to have a connection between p-type and n-type, in accordance with some embodiments of the present invention.
Figure 35B:
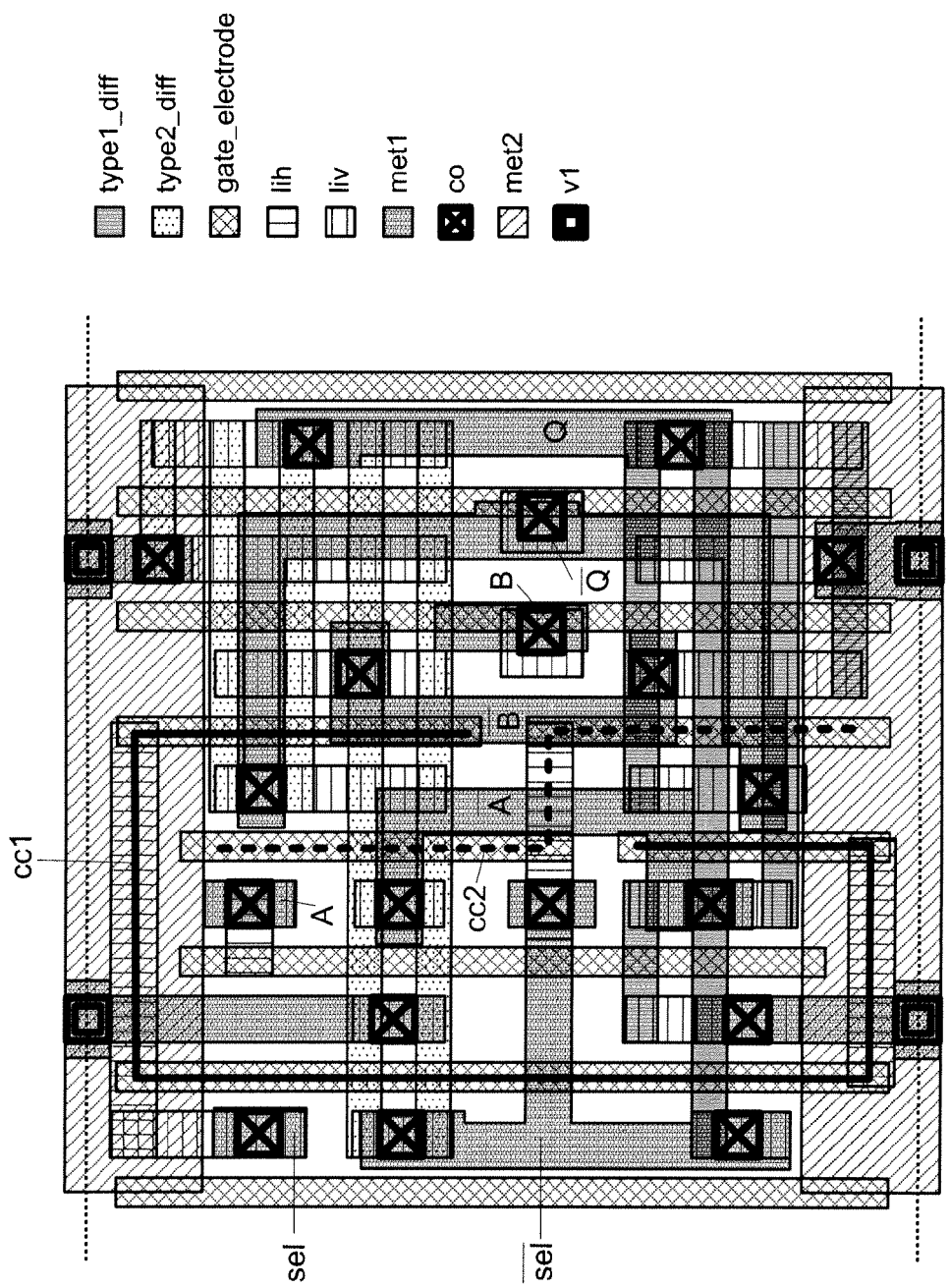
FIG. 35C shows a circuit schematic of the layouts of FIGS. 35A/B through 47A/B and 63A/B through 67A/B, in accordance with some embodiments of the present invention.
Figure 35C:
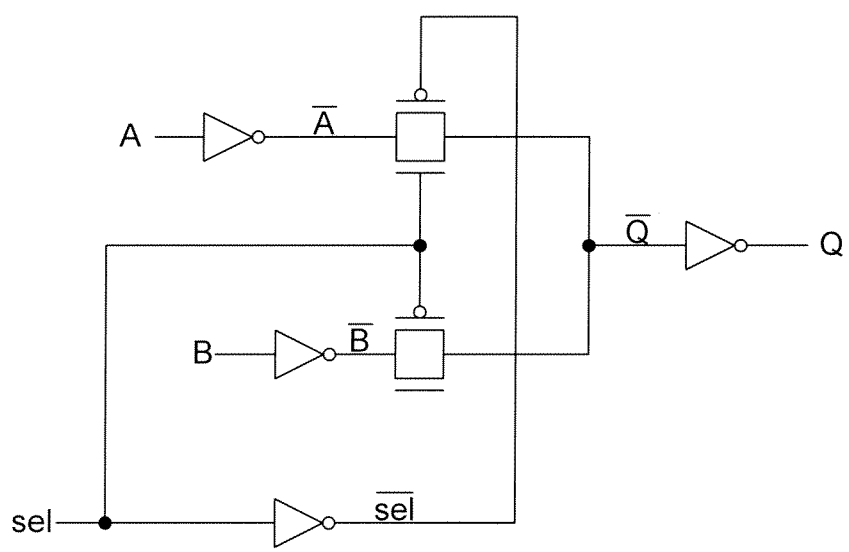
Figure 36A:
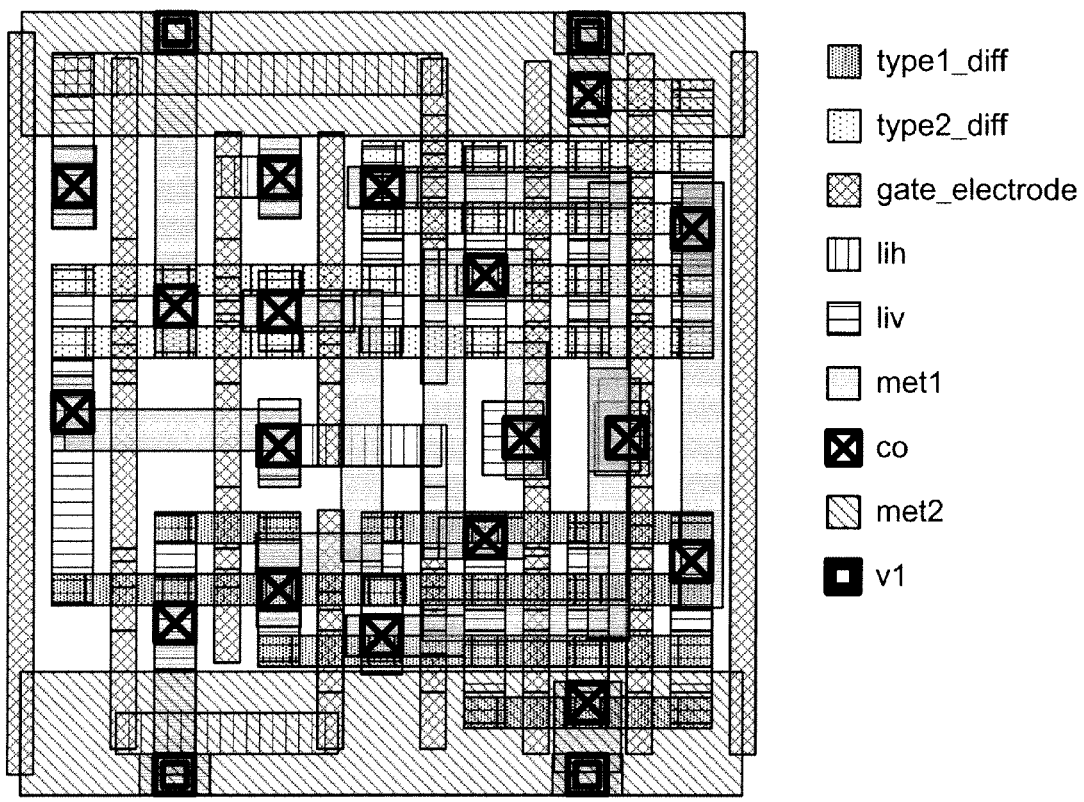
Figure 36B:
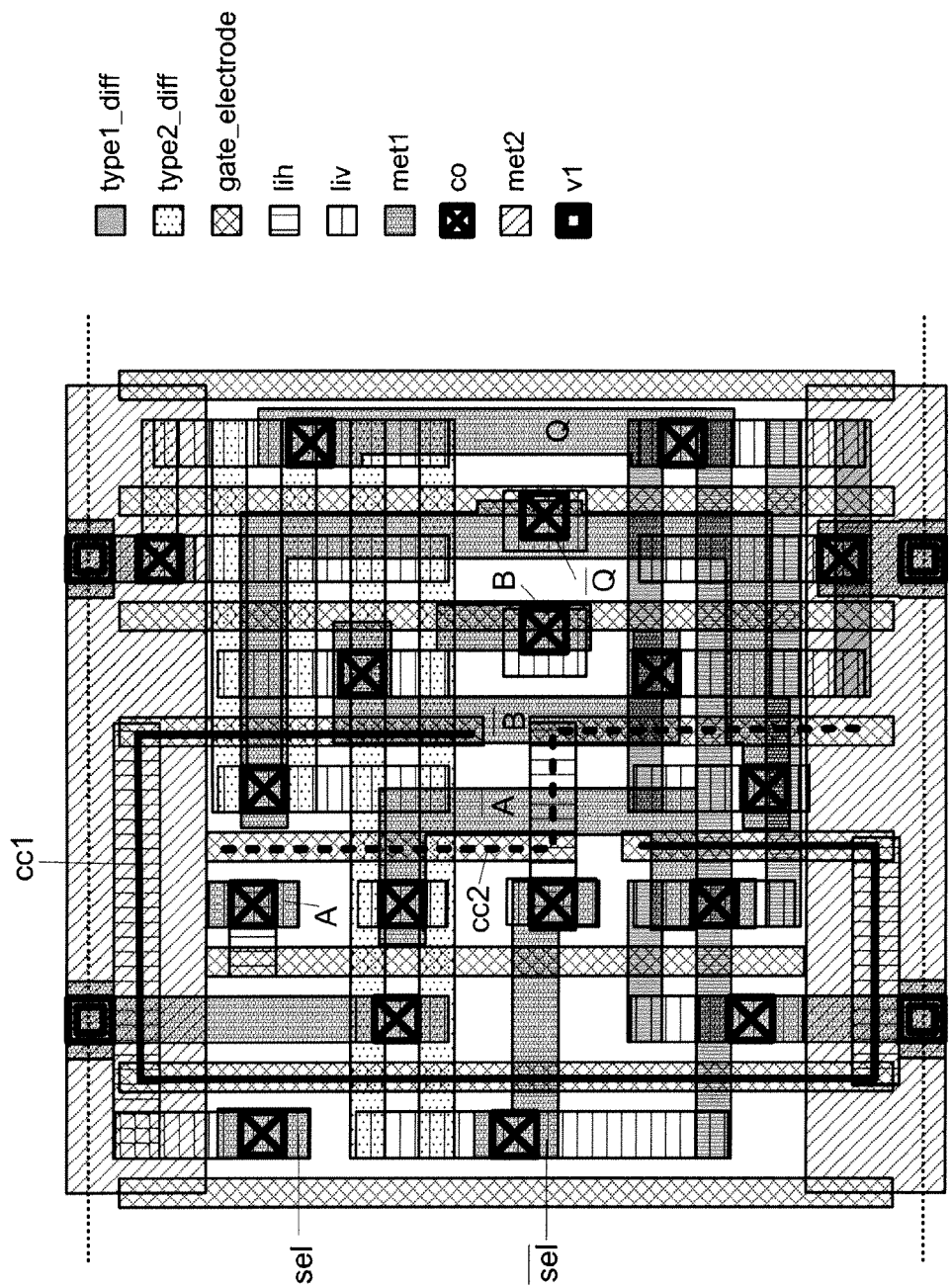

FIGS. 35A/B through 47A/B and 63A/B through 67A/B show cross-couple transistor configurations having transmission gate in both logic paths, requiring all the internal nodes to have a connection between p-type and n-type. FIGS. 48A/B through 57A/B show cross-couple transistor configurations having transmission gate in the logic path with larger transistors, and tristate gate in other paths. Tristate gate does not require a connection between p-type diffusion and n-type diffusion on the internal node.

Figure 58A:
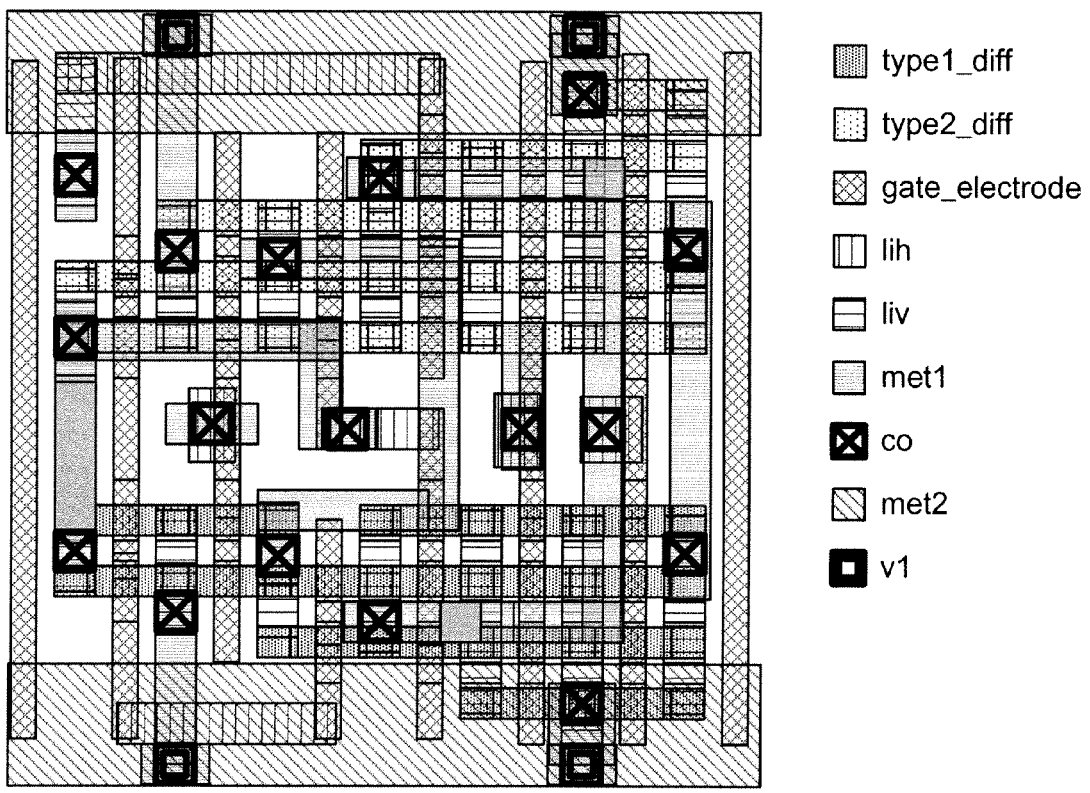
FIGS. 58A/B through 59A/B show cross-couple transistor configurations having transmission gate in the logic path with smaller transistors, and tristate gate in other paths, in accordance with some embodiments of the present invention.
Figure 58B:
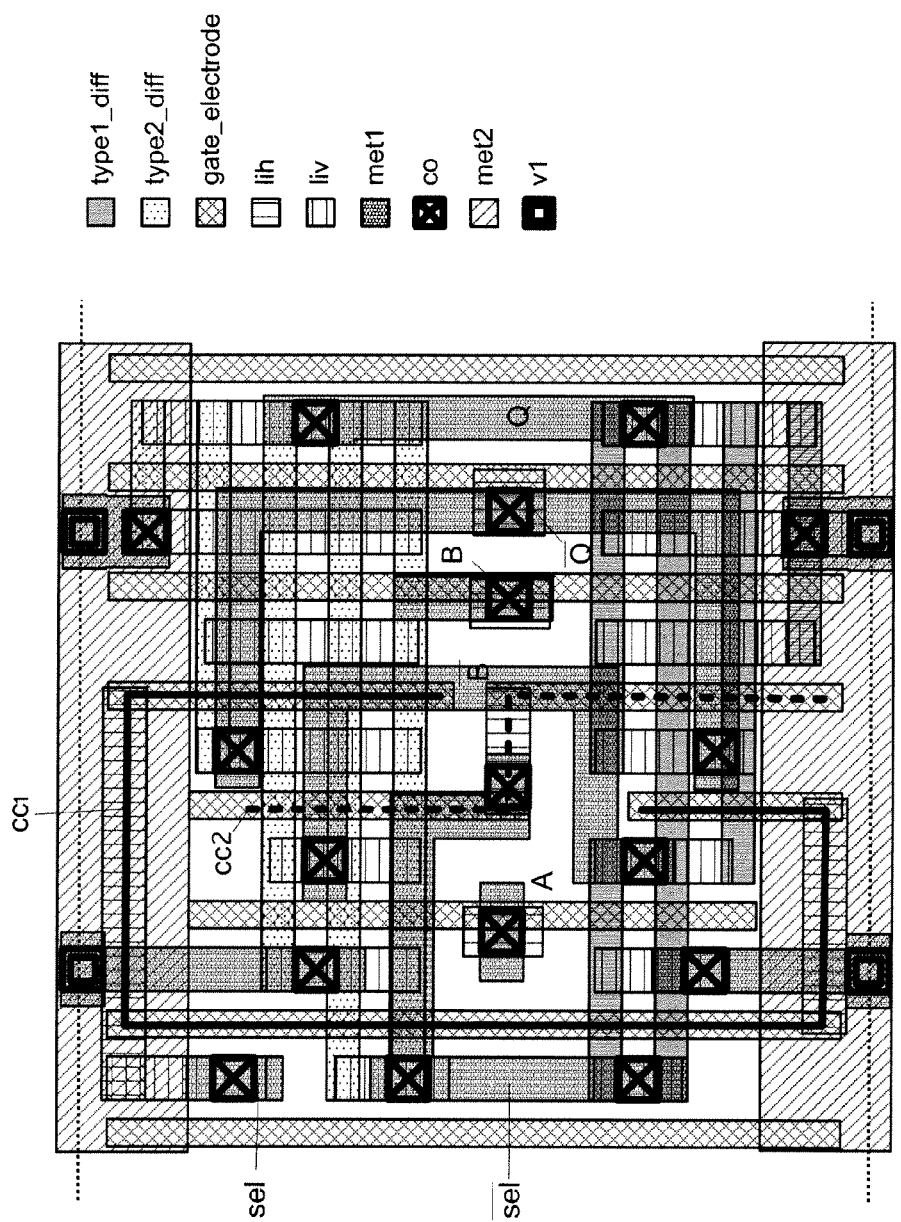
Figure 59A:
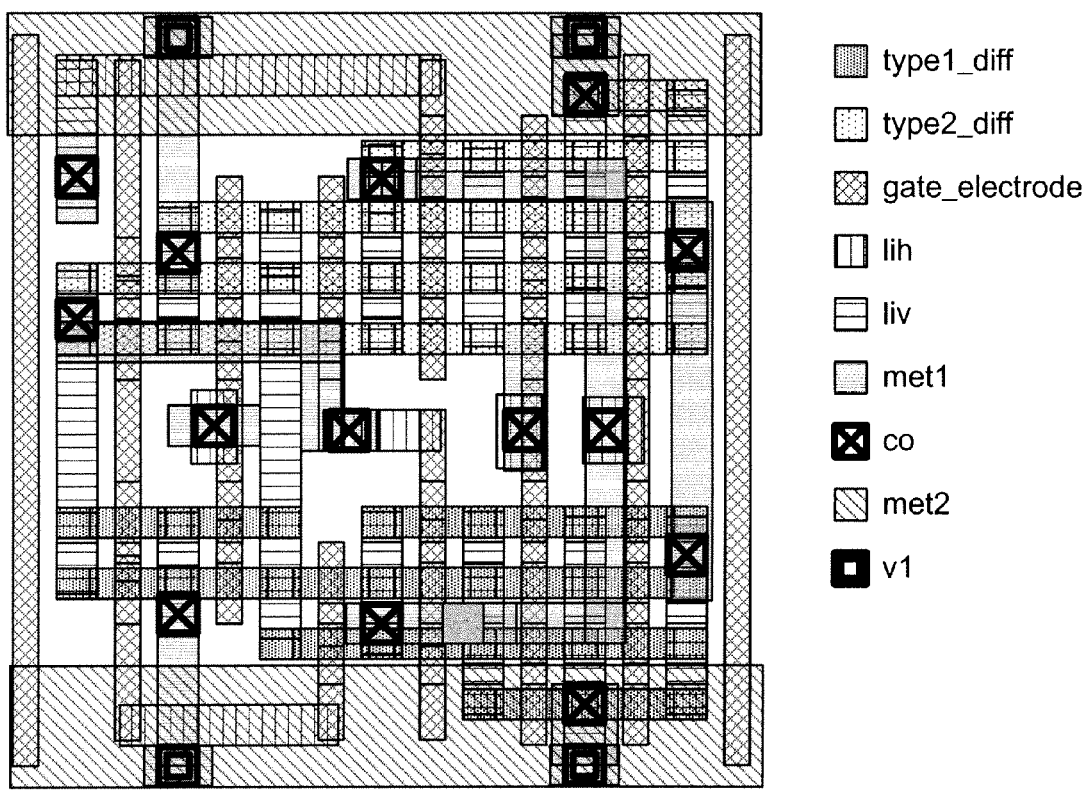
FIG. 59C shows a circuit schematic of the layout of FIGS. 59A/B, in accordance with some embodiments of the present invention.
Figure 59B:
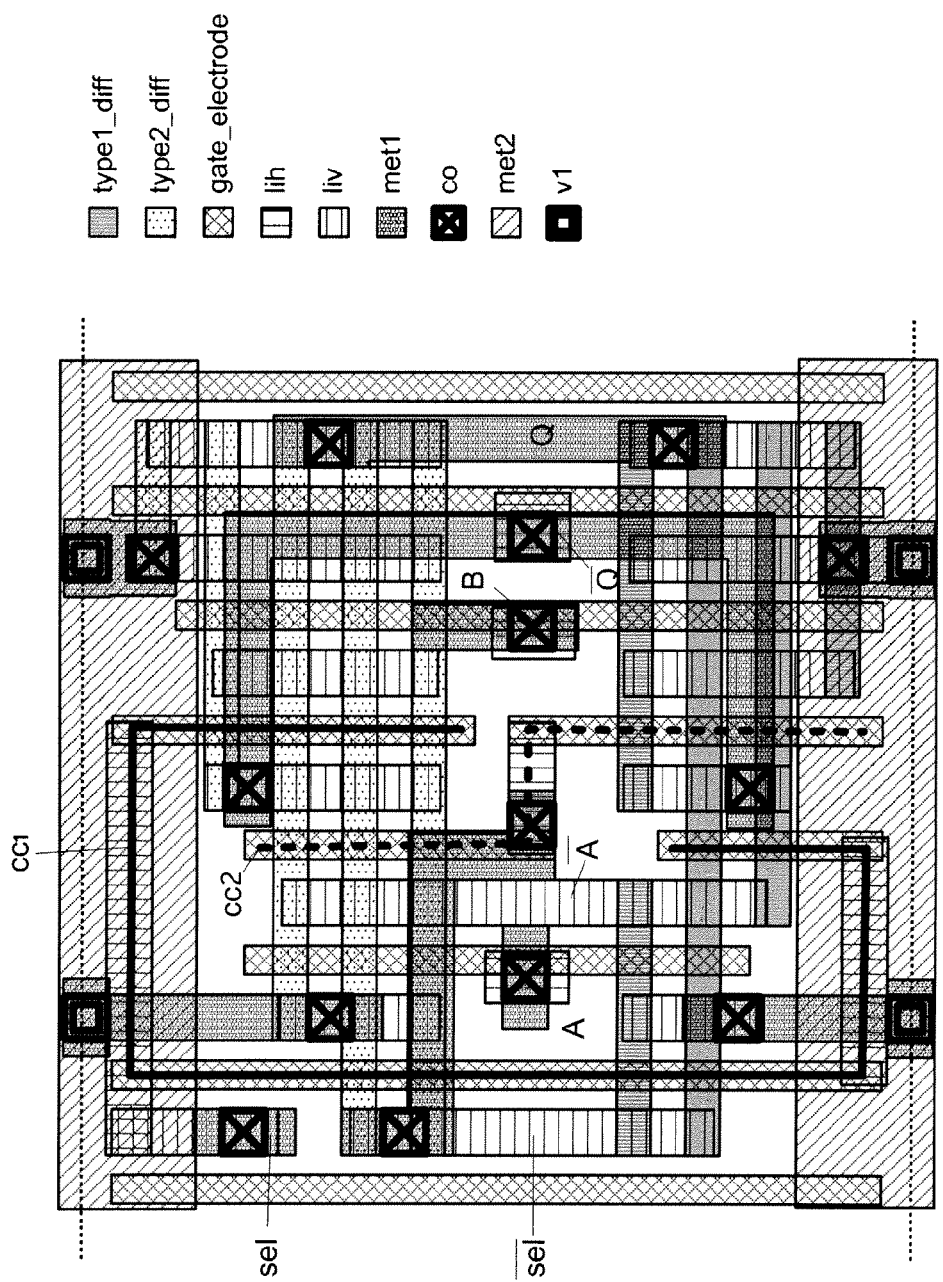
Figure 59C:
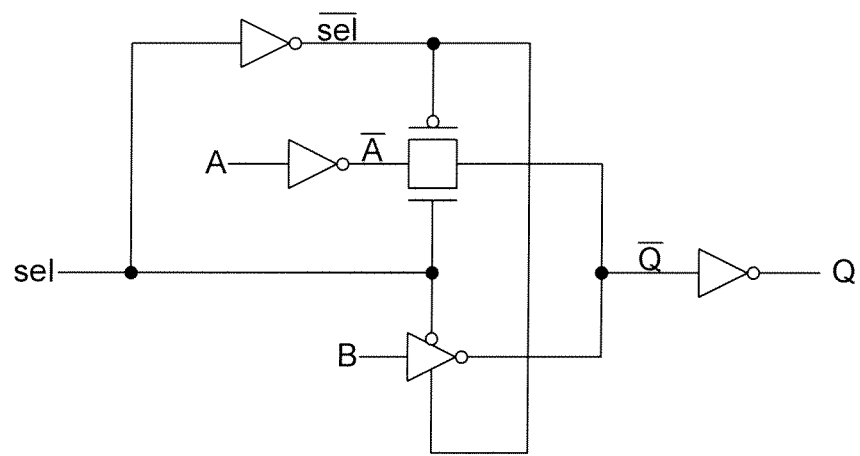

FIGS. 58A/B through 59A/B show cross-couple transistor configurations having transmission gate in the logic path with smaller transistors, and tristate gate in other paths. Tristate gate does not require a connection between p-type diffusion and n-type diffusion on the internal node.

Figure 60A:
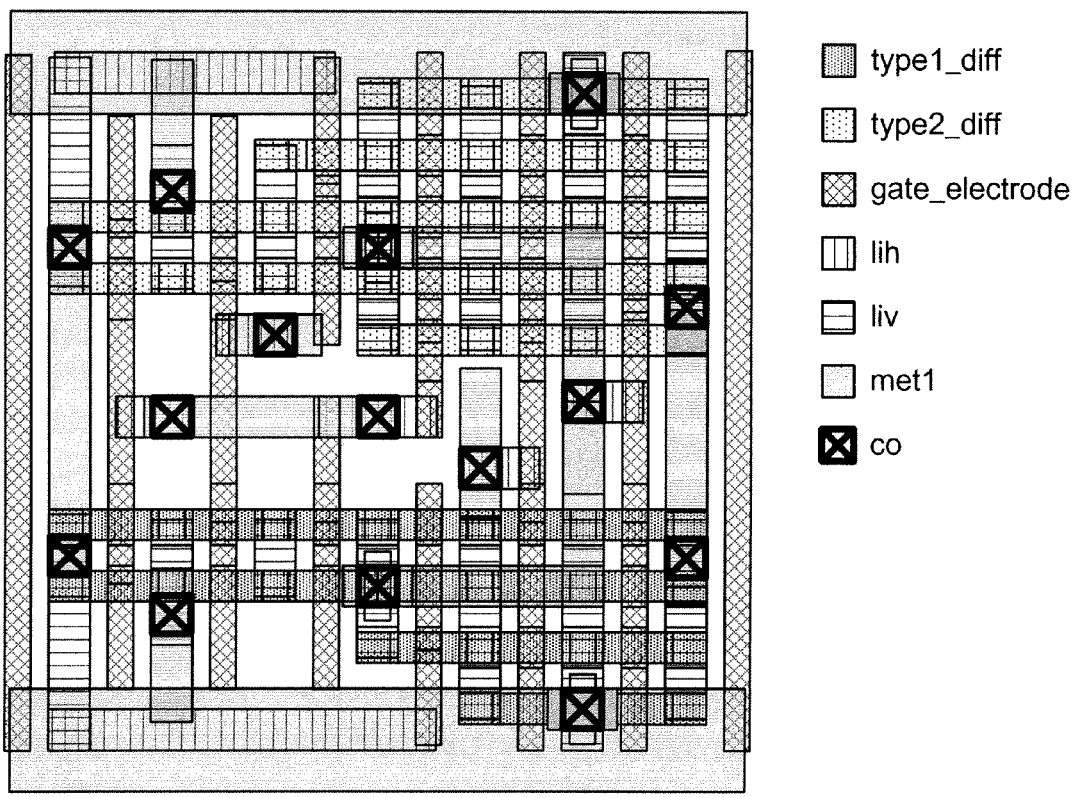
FIGS. 60A/B through 62A/B show cross-couple transistor configurations having tristate gate in both logic paths, in accordance with some embodiments of the present invention.
Figure 60B:
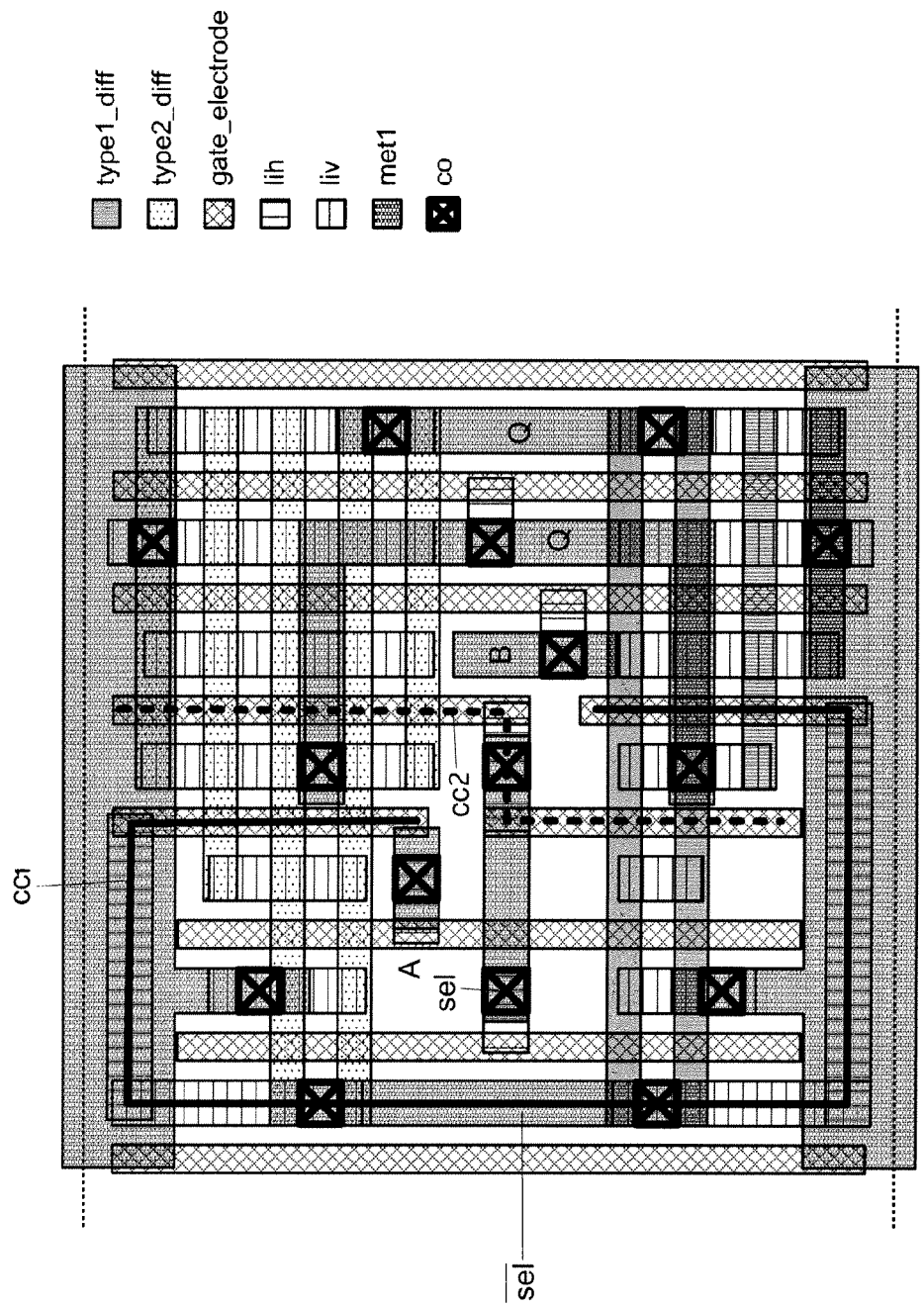
FIG. 60C shows a circuit schematic of the layouts of FIGS. 60A/B through 62A/B and FIGS. 68A/B through 69A/B, in accordance with some embodiments of the present invention.
Figure 60C:
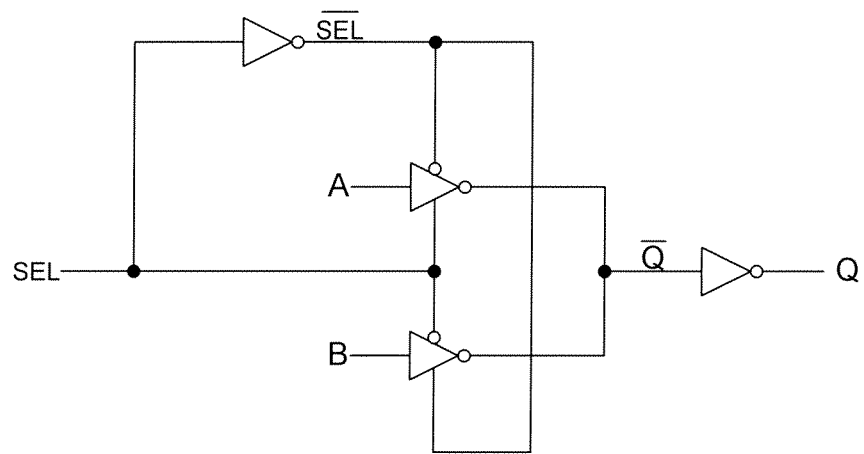
Figure 61A:
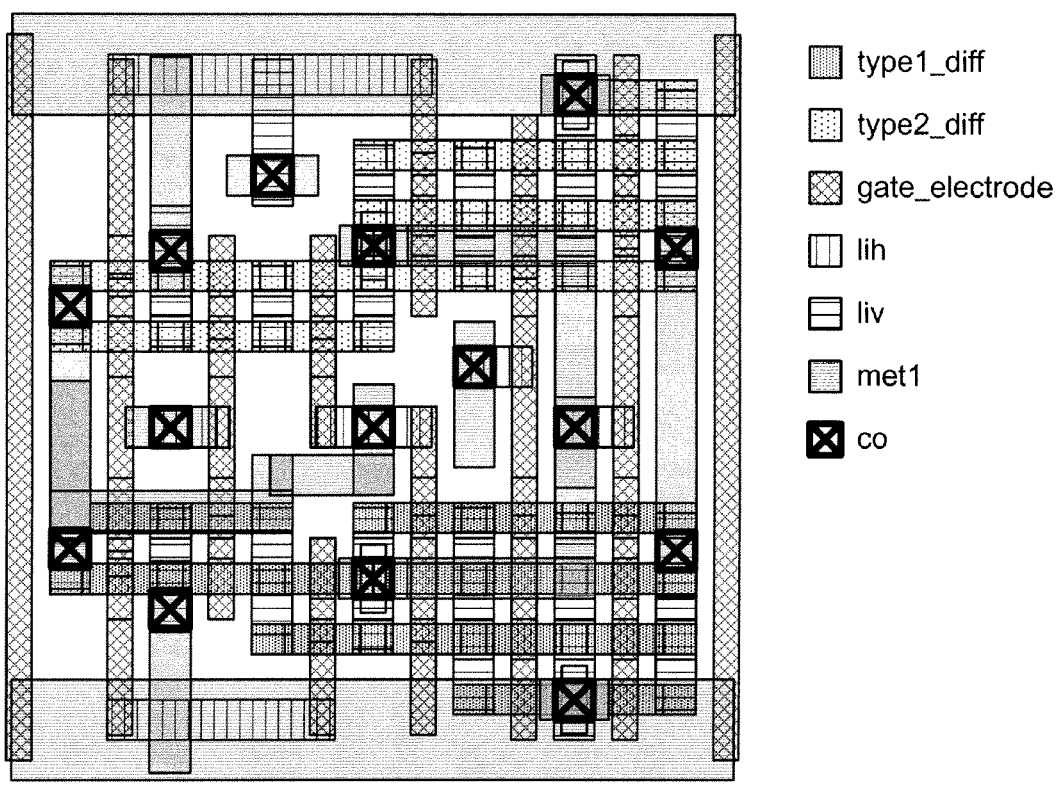
Figure 61B:
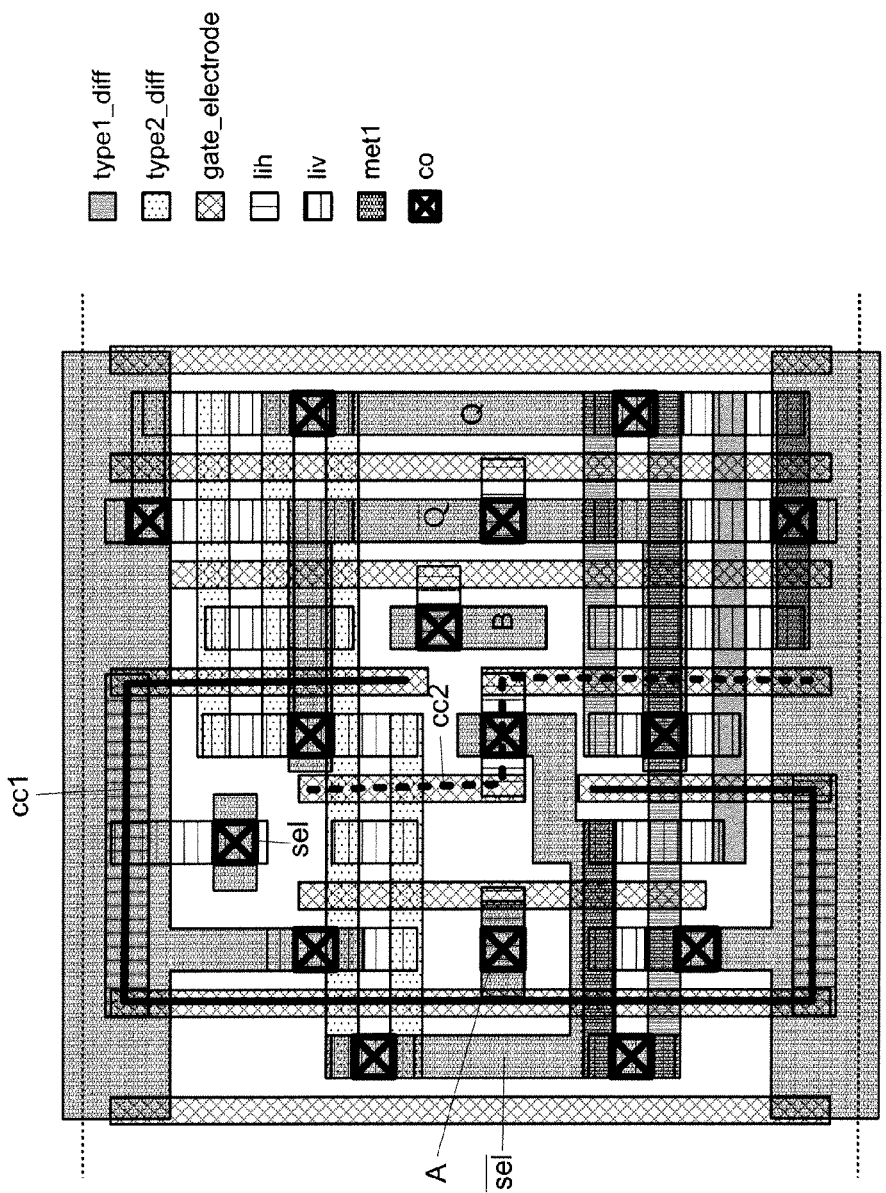
Figure 62A:
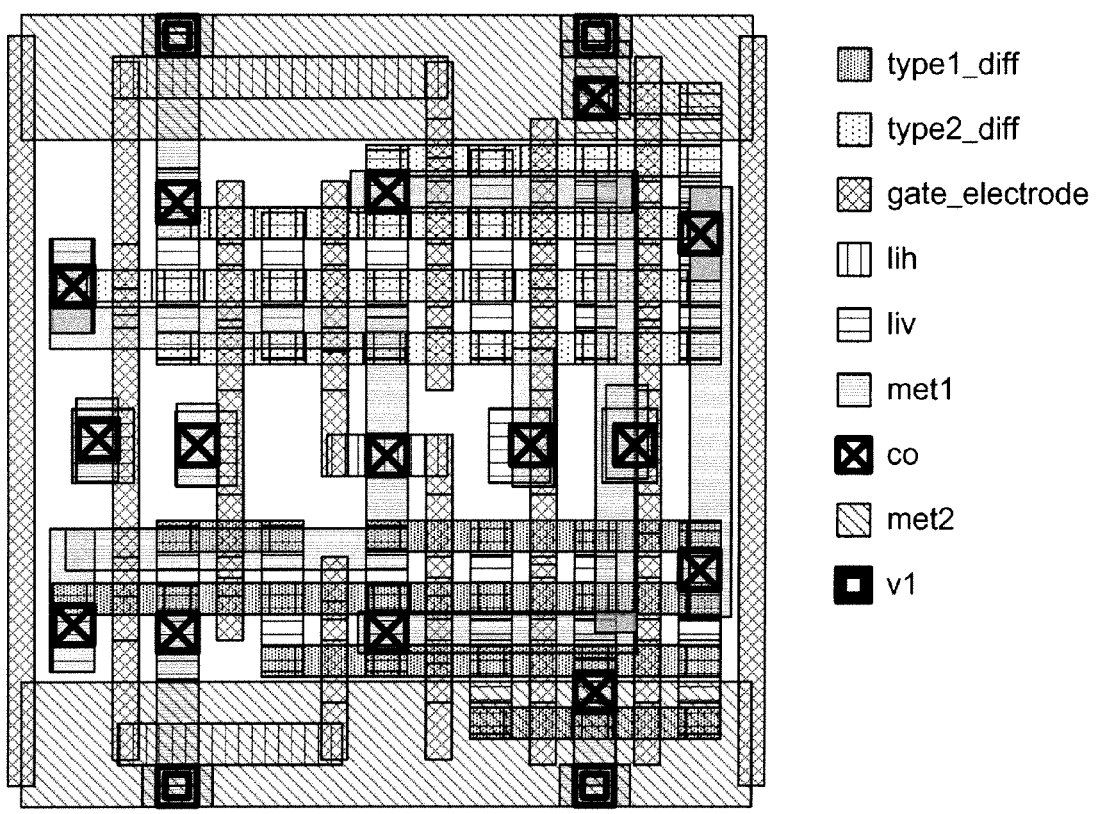
Figure 62B:
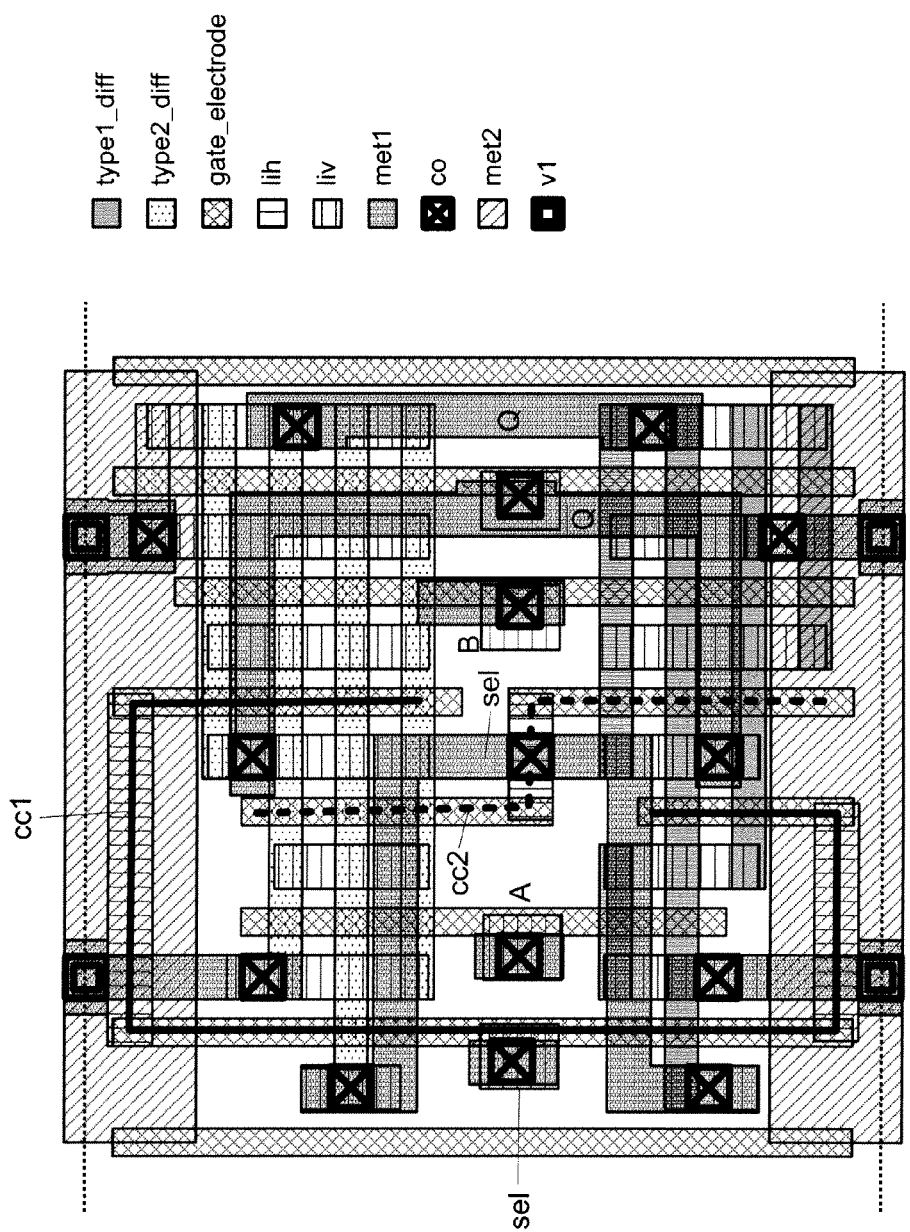

FIGS. 60A/B through 62A/B and 68A/B through 69A/B show cross-couple transistor configurations having tristate gate in both logic paths.

Figure 63A:
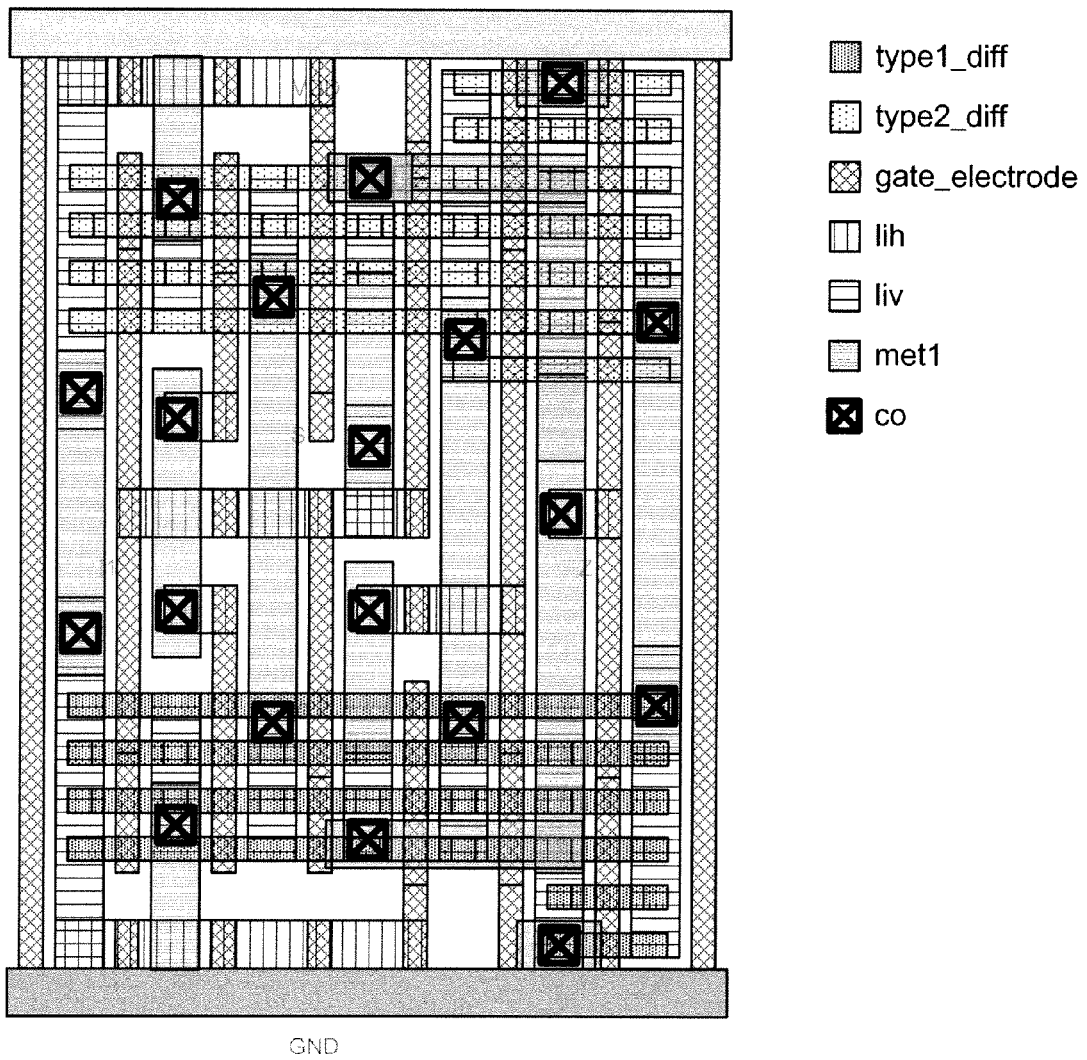
FIGS. 63A/B through 67A/B show cross-couple transistor configurations having transmission gate in both logic paths, requiring all the internal nodes to have a connection between p-type and n-type, in accordance with some embodiments of the present invention.
Figure 63B:
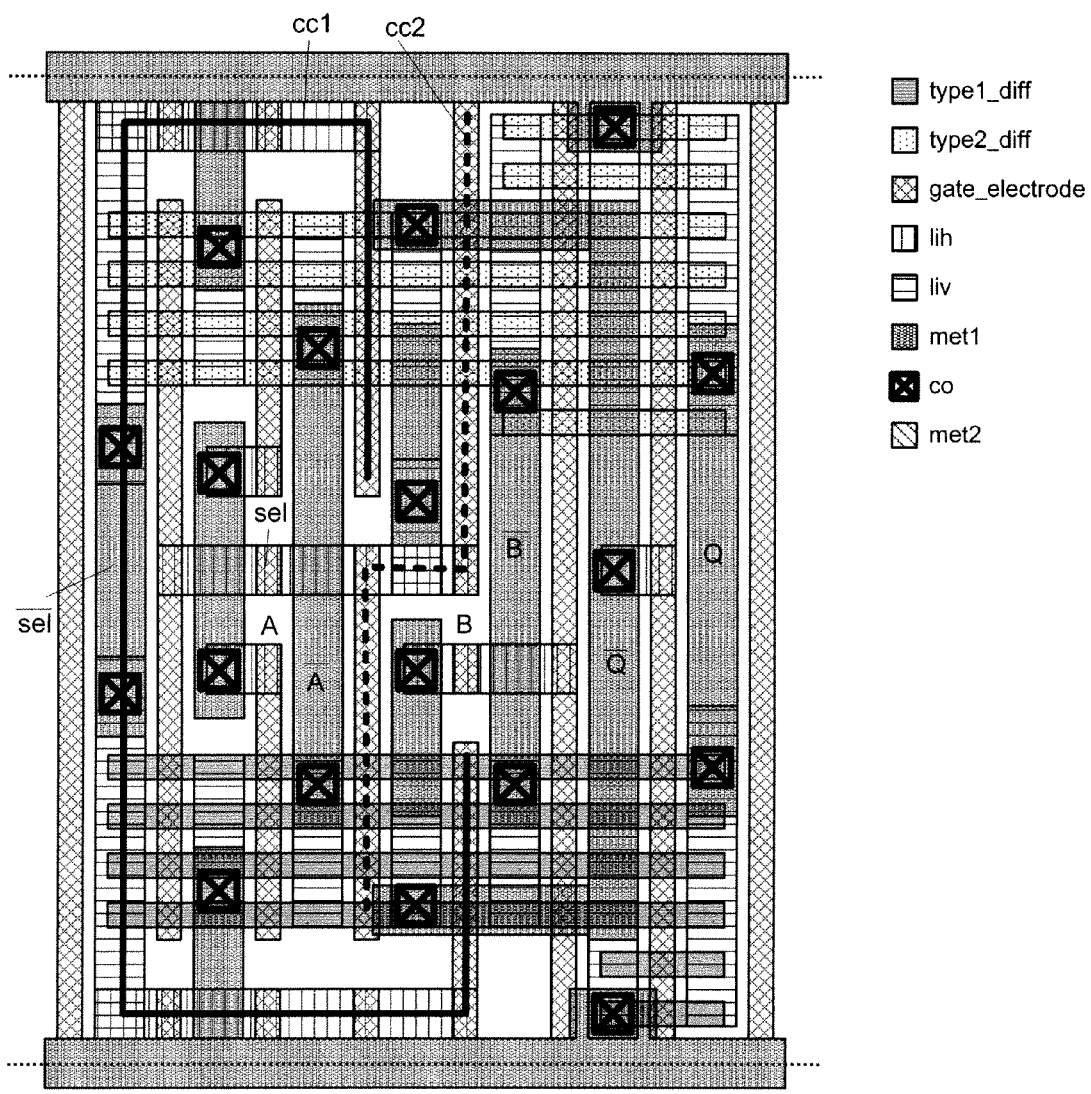
Figure 64A:
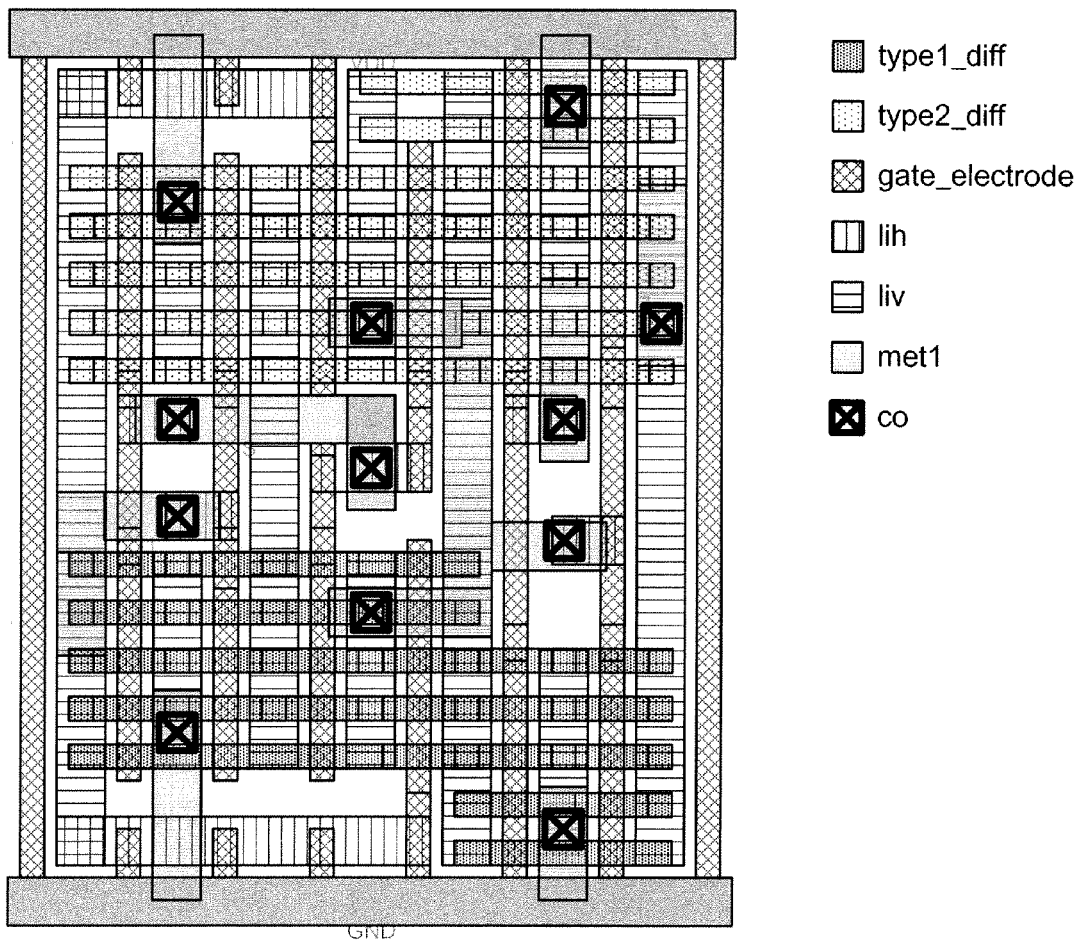
Figure 64B:
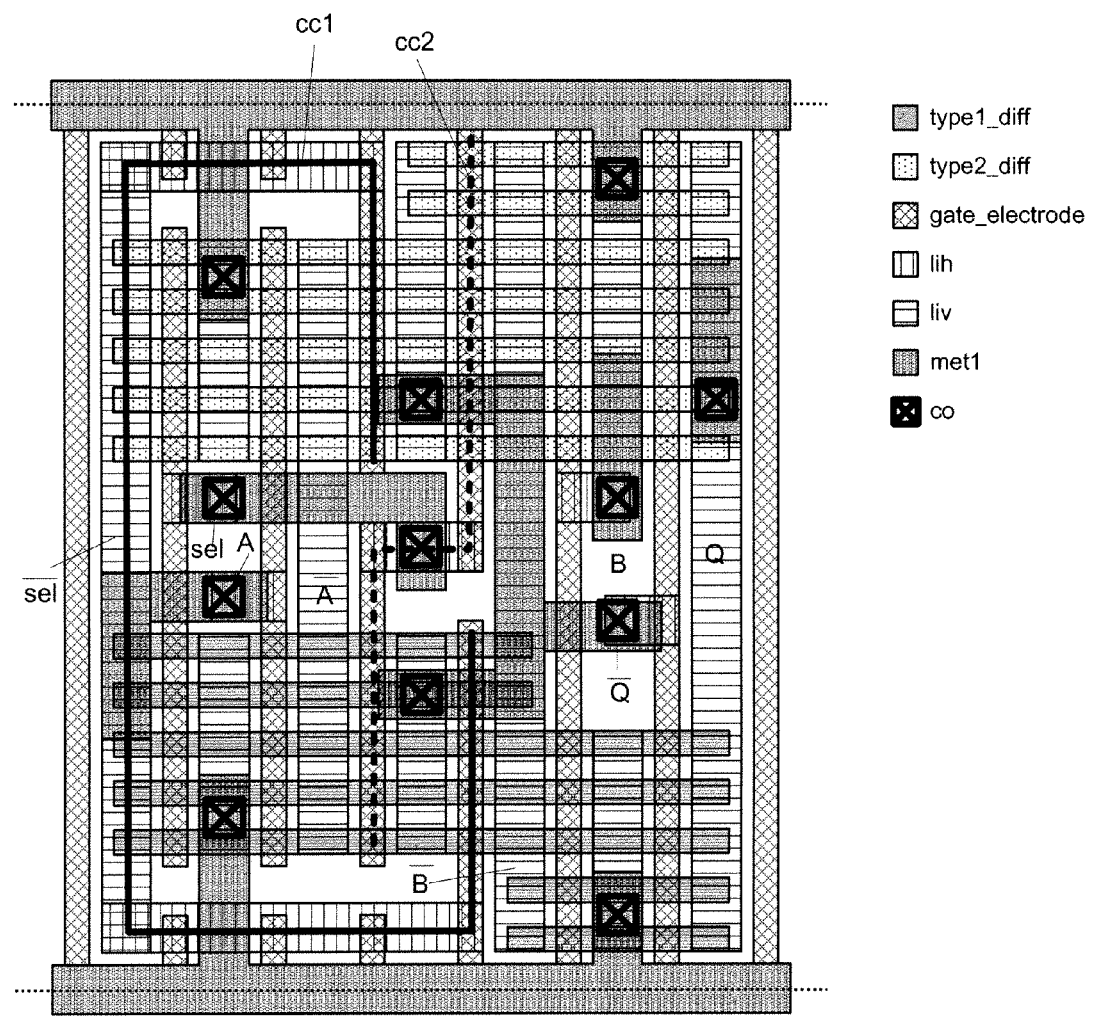
Figure 65A:
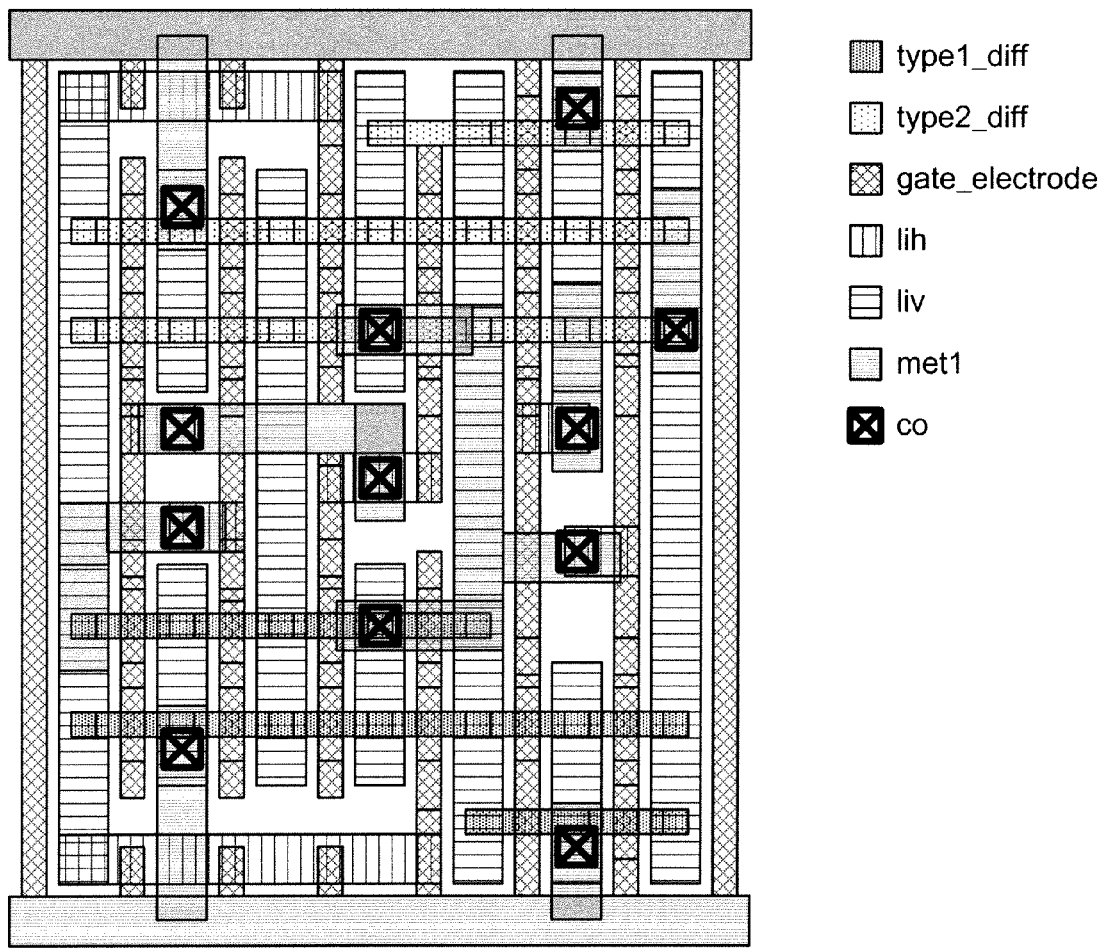
Figure 65B:
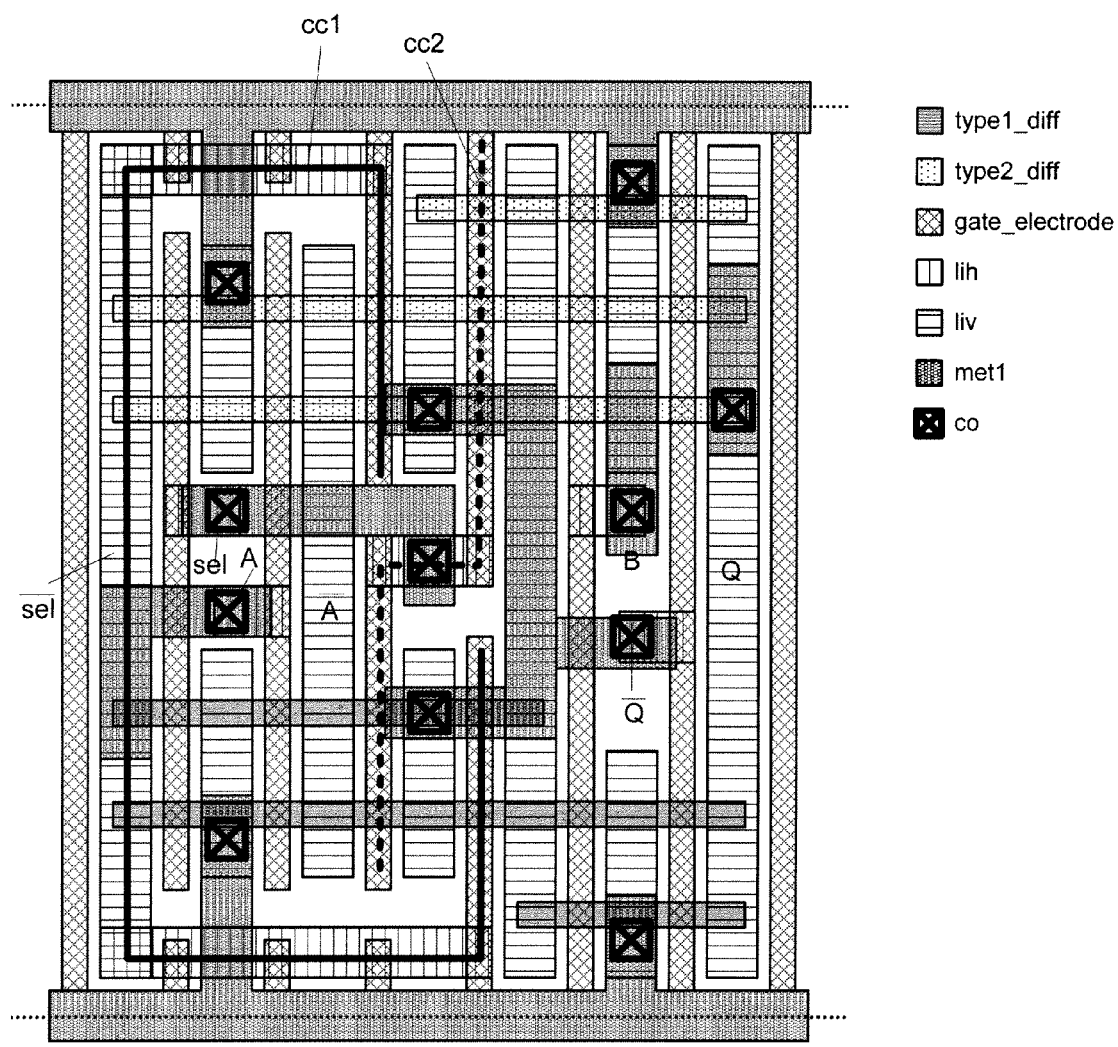
Figure 66A:
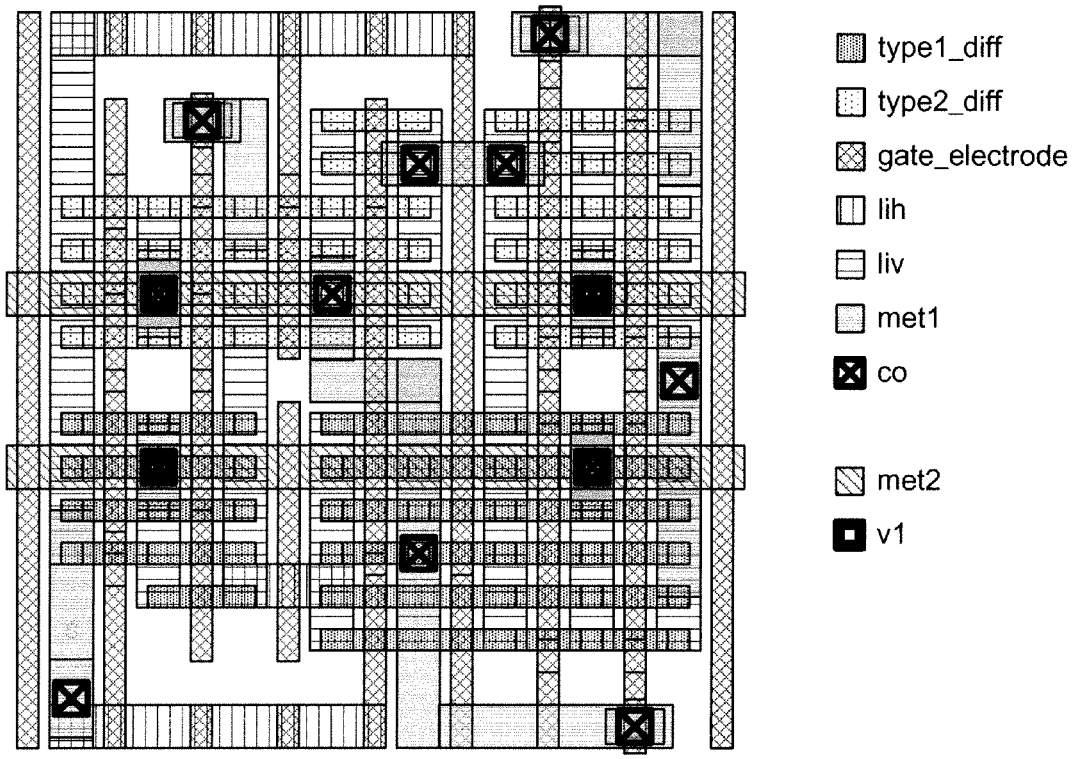
Figure 66B:
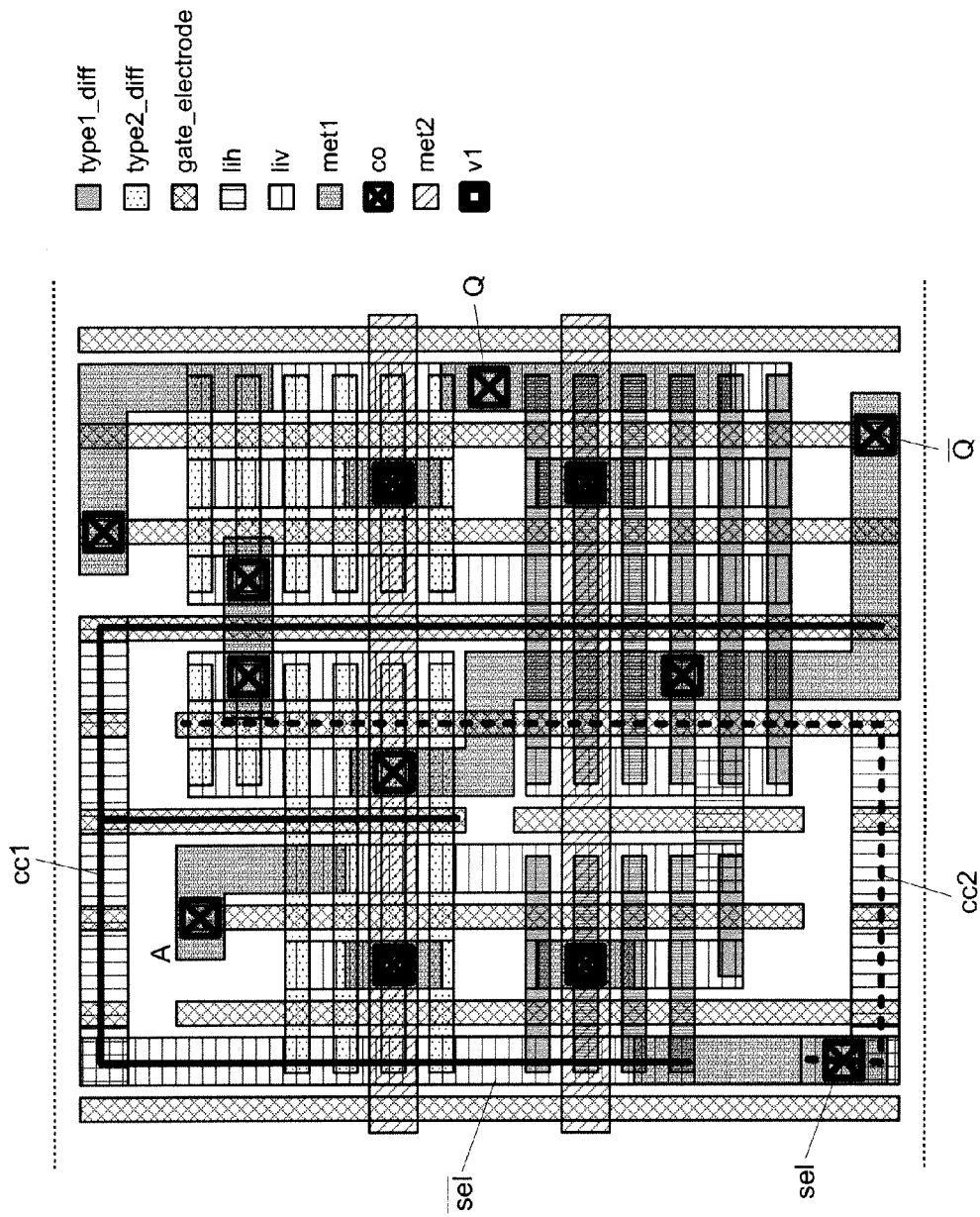
Figure 67A:
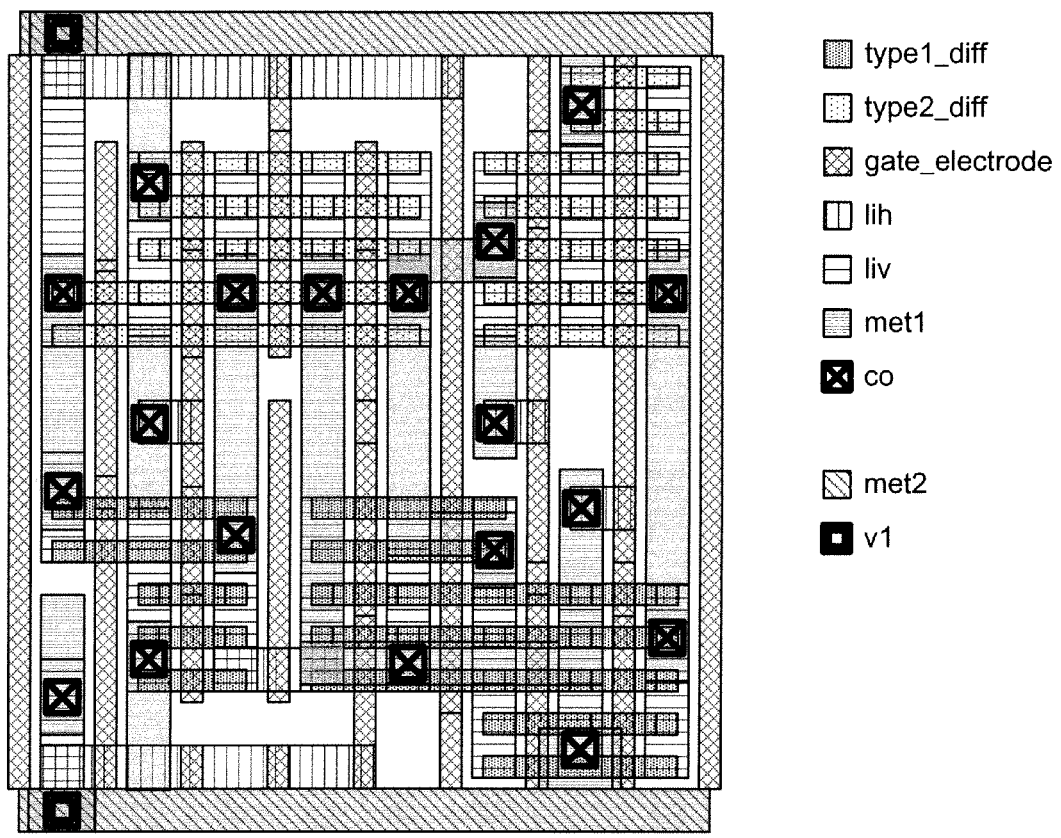
Figure 67B:
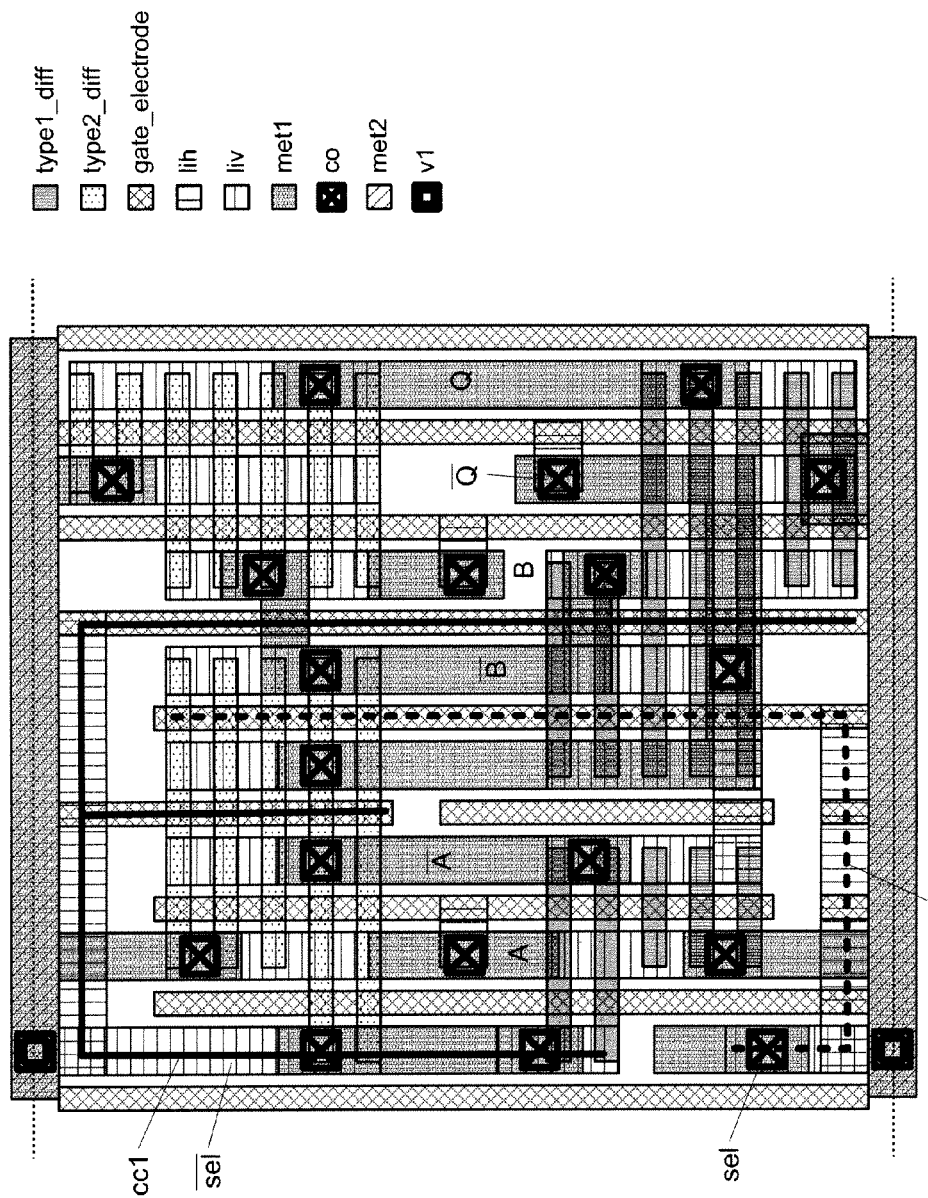

FIGS. 63A/B through 69A/B show cell layouts that have a number of p-type diffusion fins equal to a number of n-type diffusion fins. Some of the other FIGS. 35A/B through 62A/B show cell layouts that a number of p-type diffusion fins not equal to a number of n-type diffusion fins.

Figure 37A:
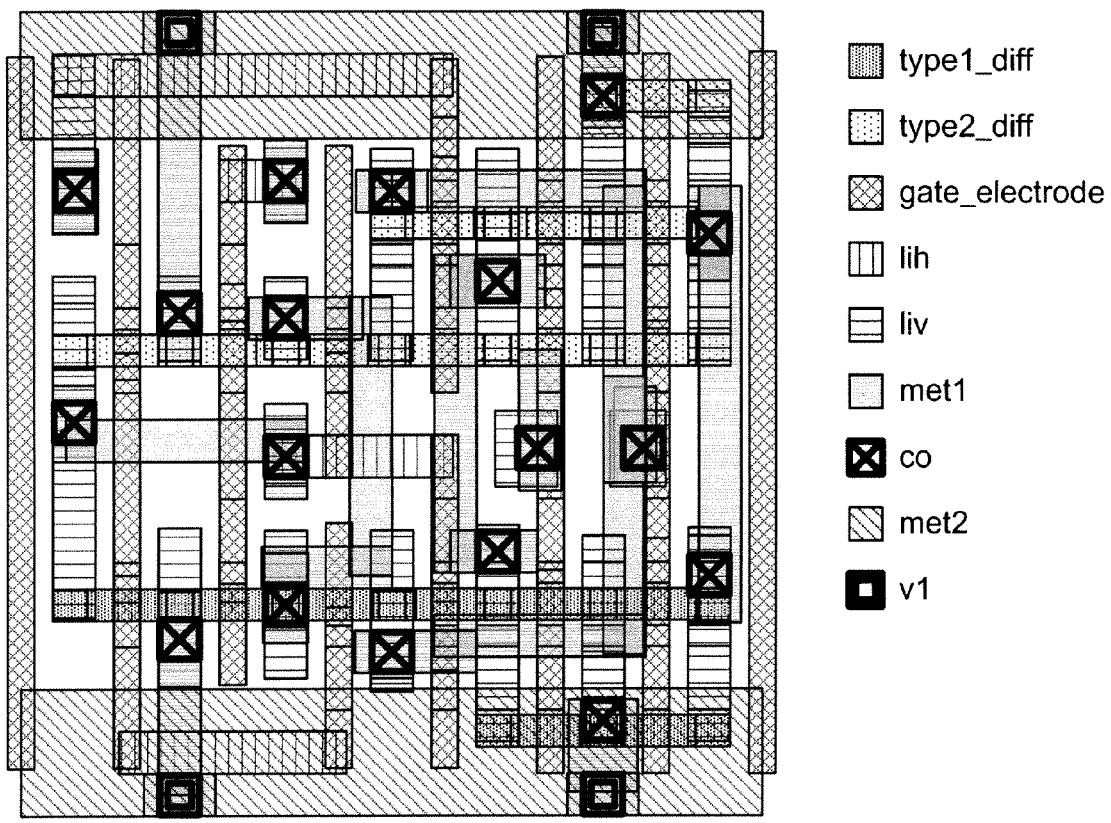
Figure 37B:
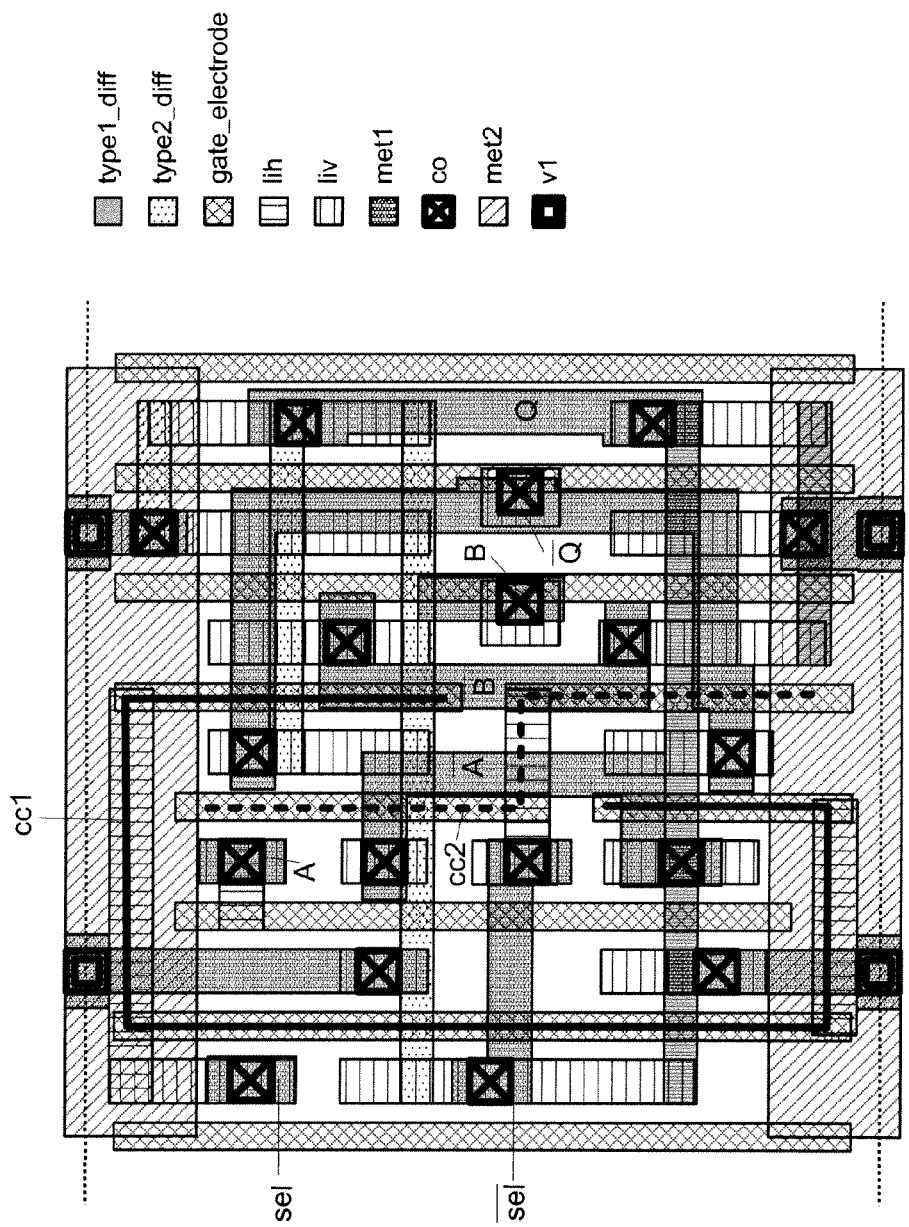
Figure 38A:
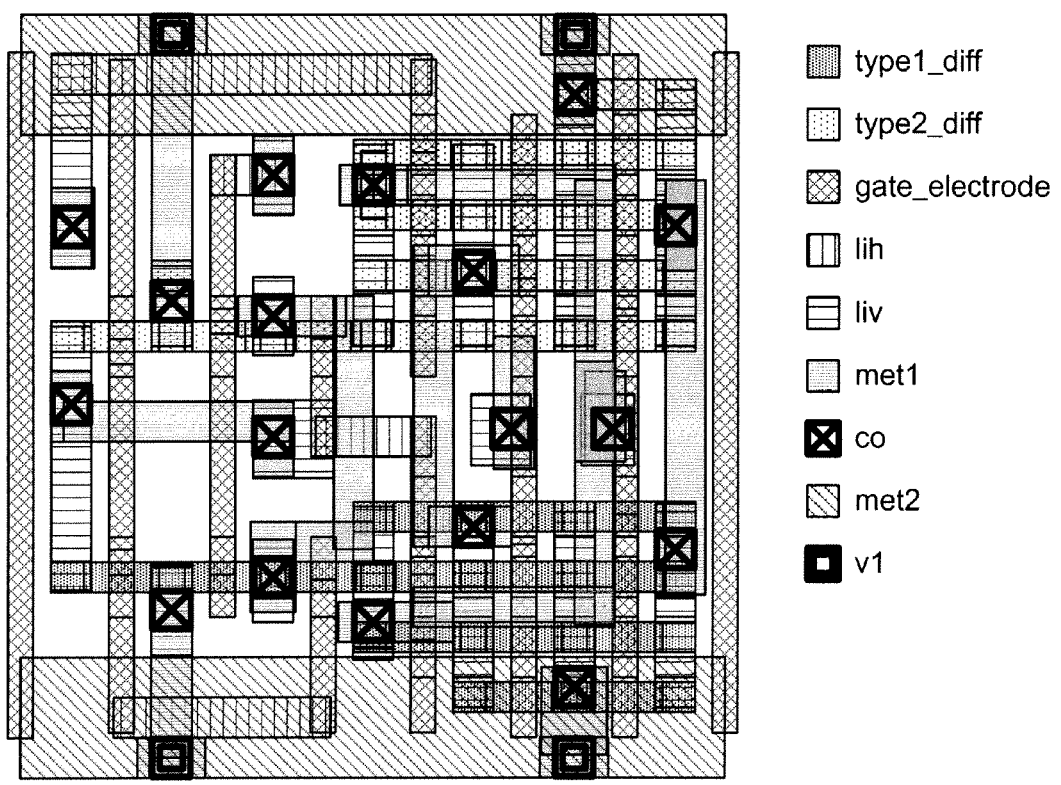
Figure 38B:
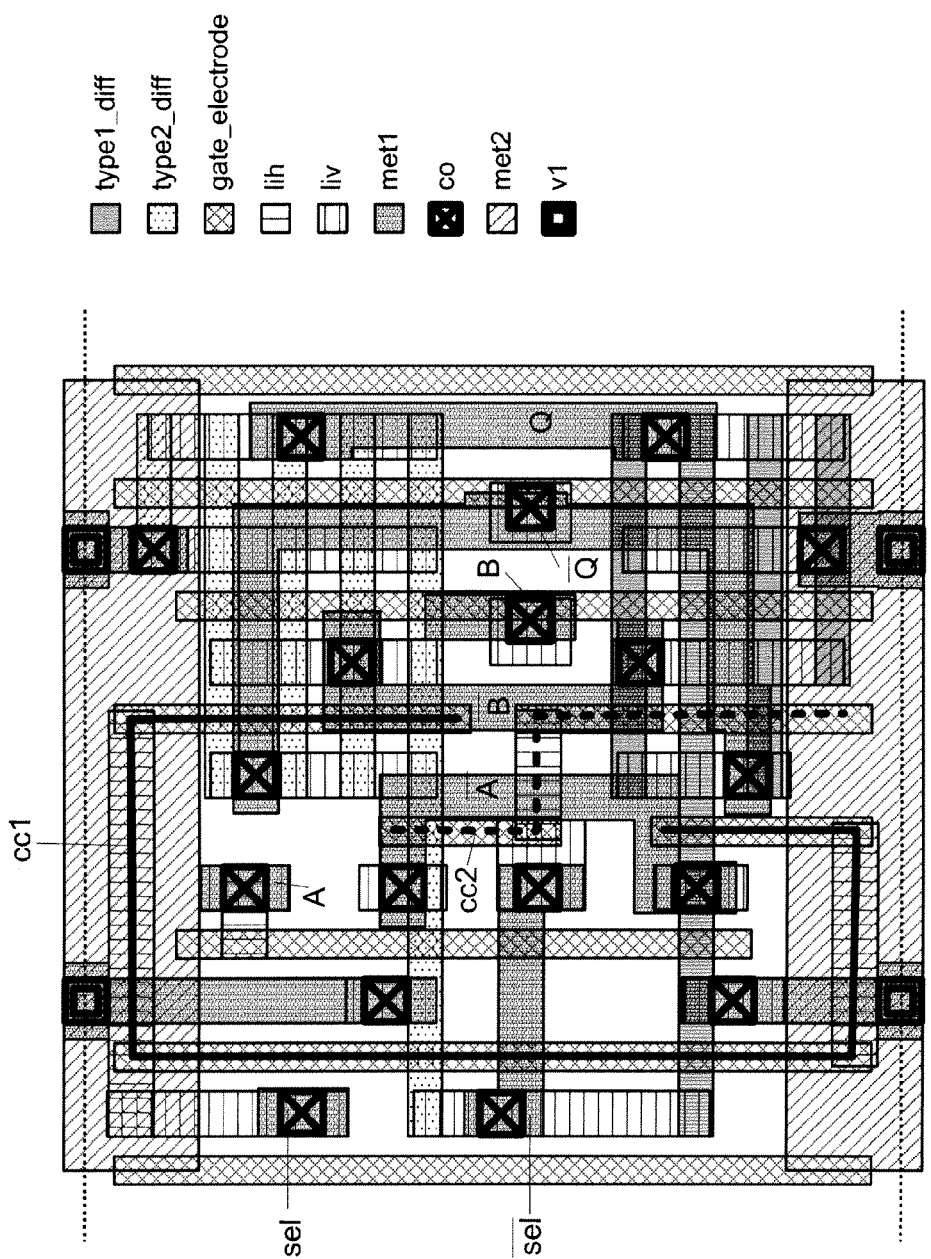
Figure 39A:
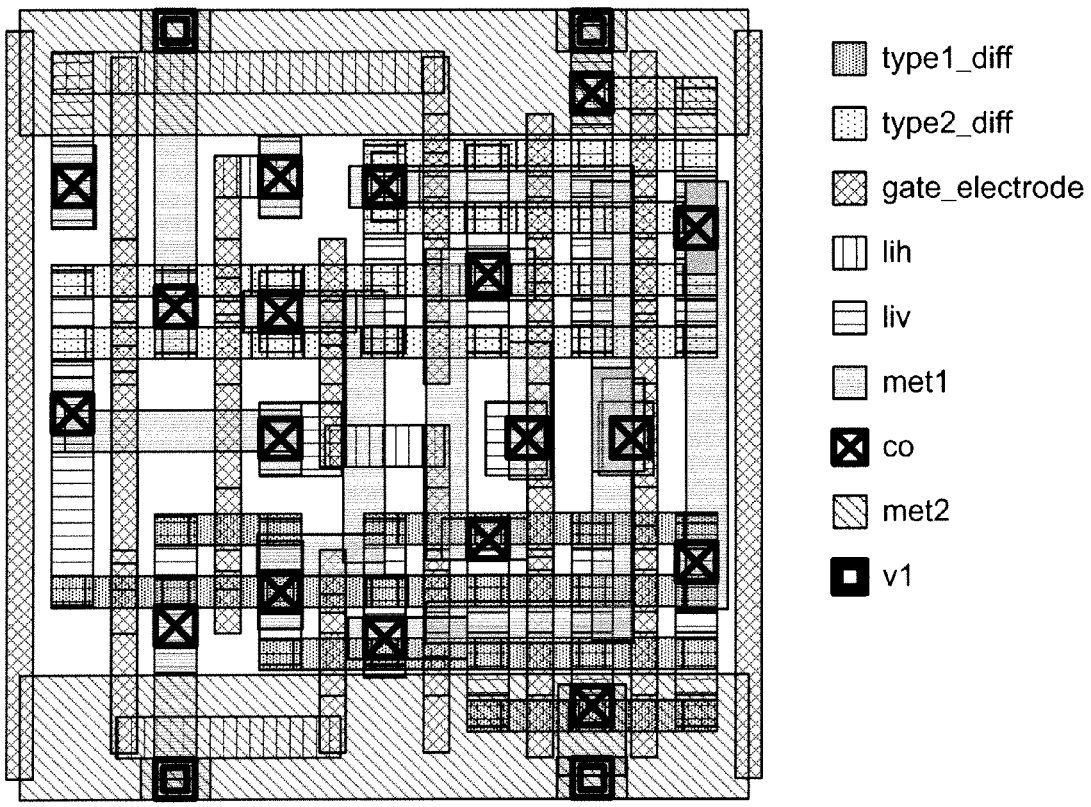
Figure 39B:
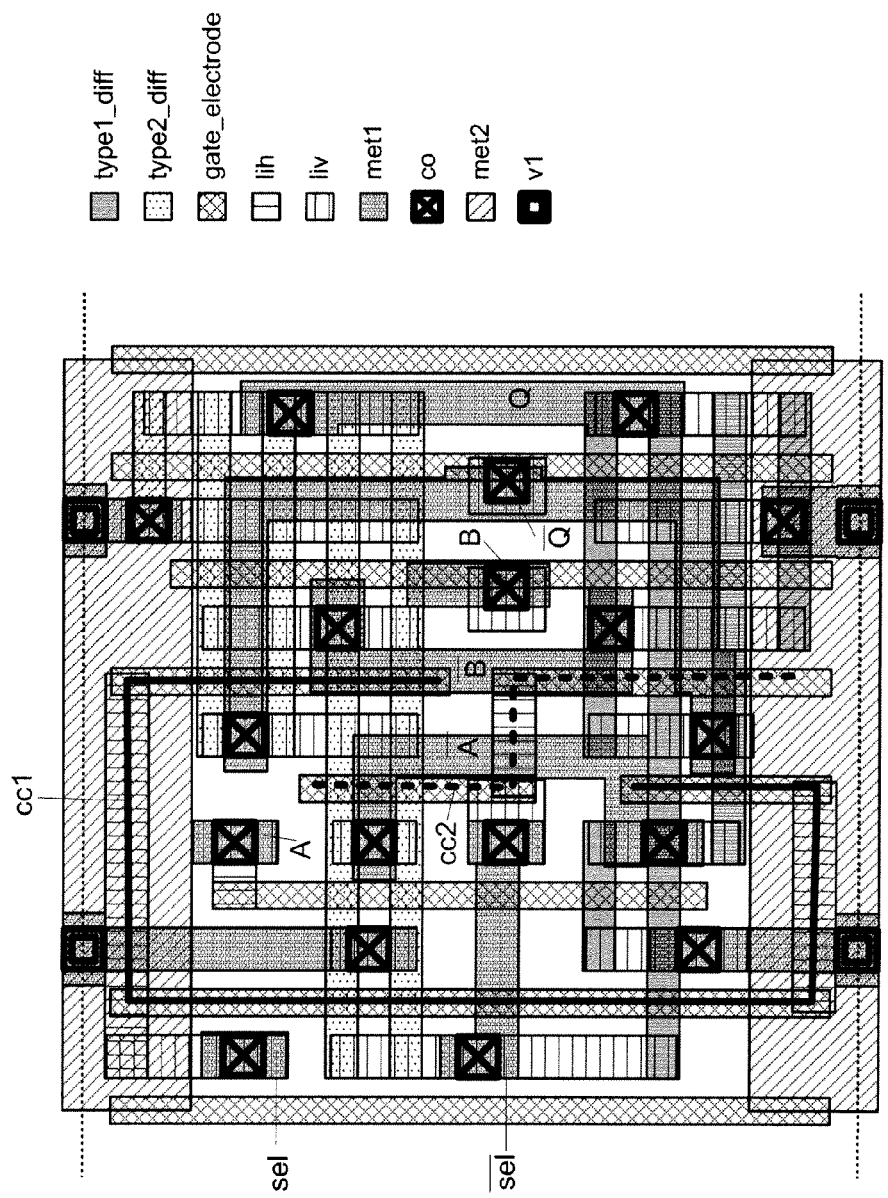
Figure 40A:
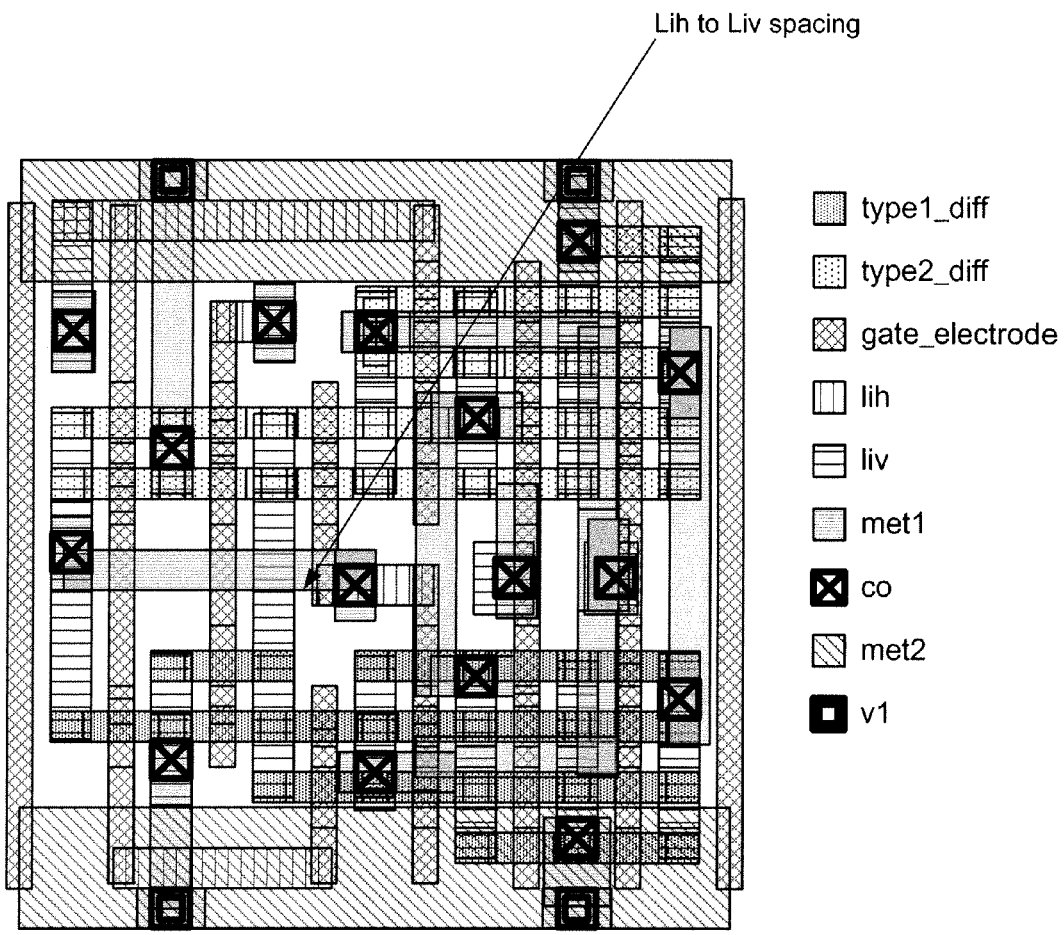
Figure 40B:
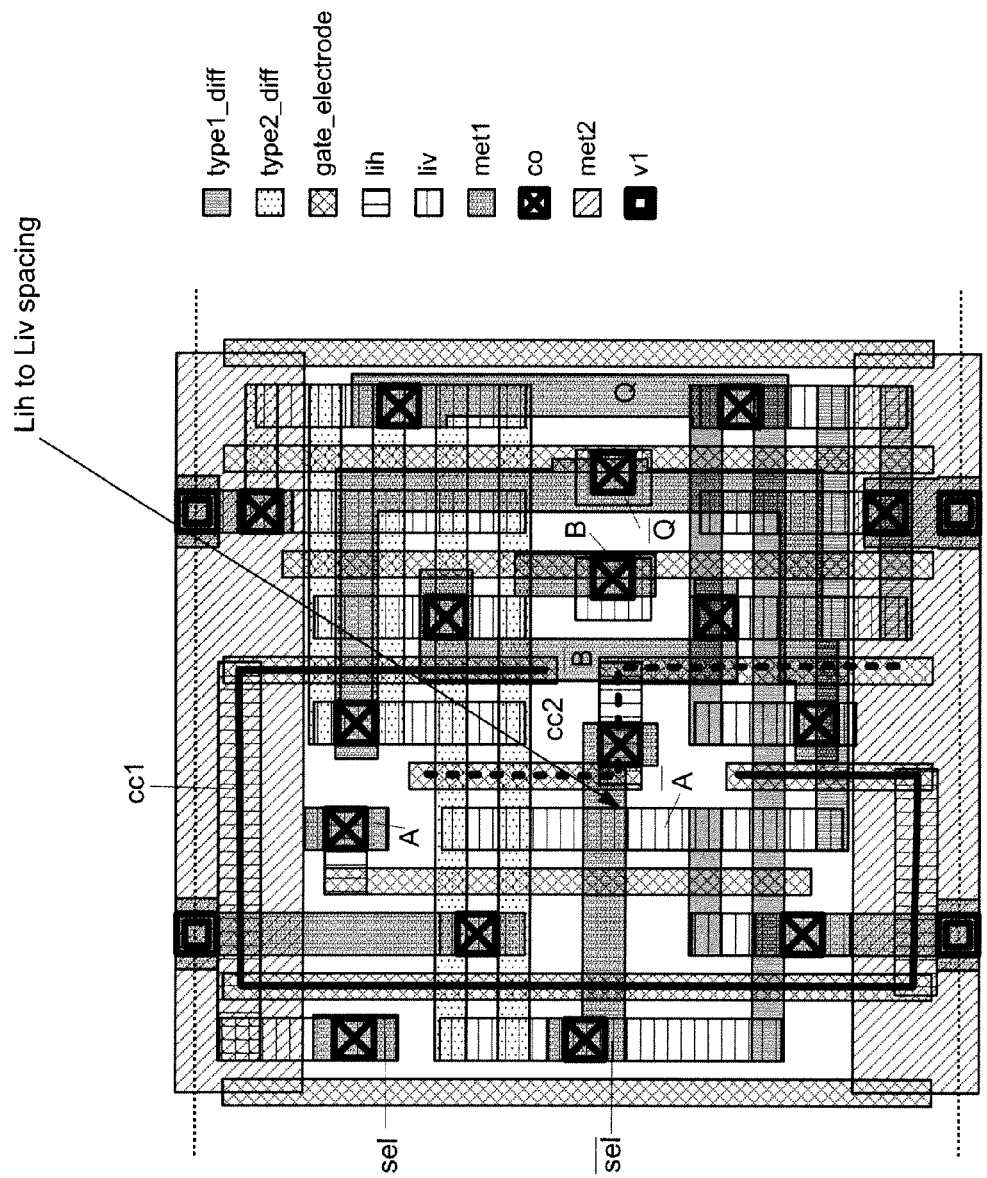
Figure 41A:
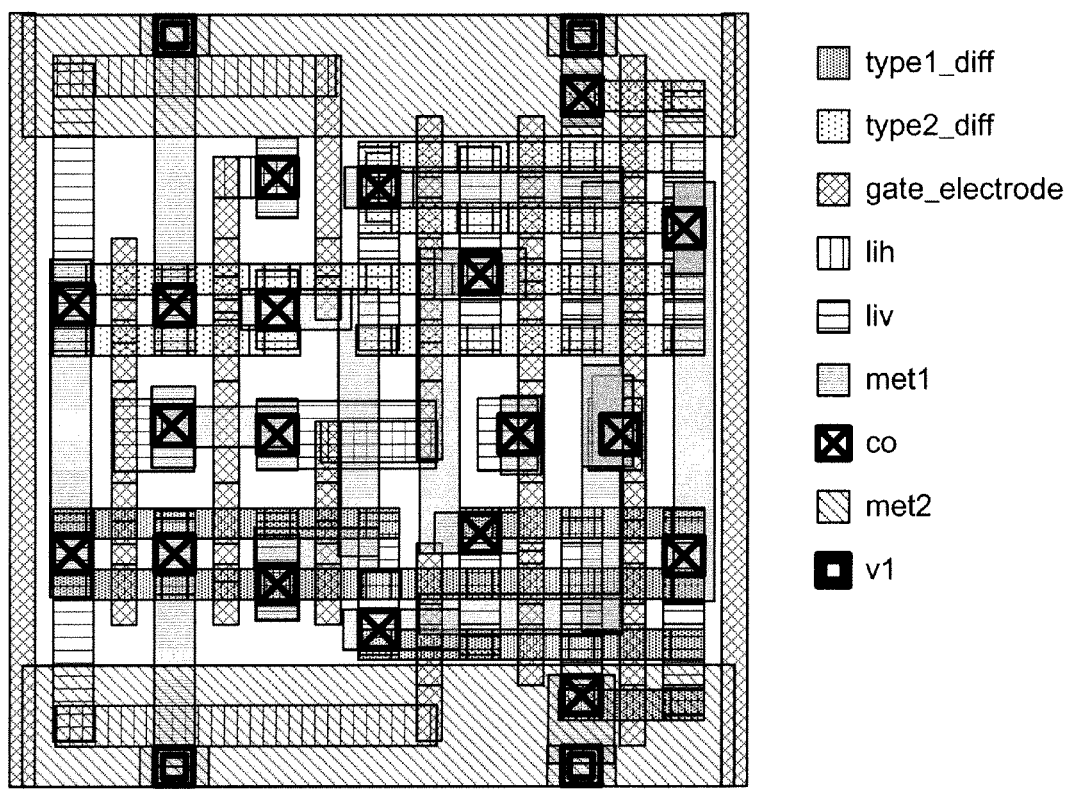
Figure 41B:
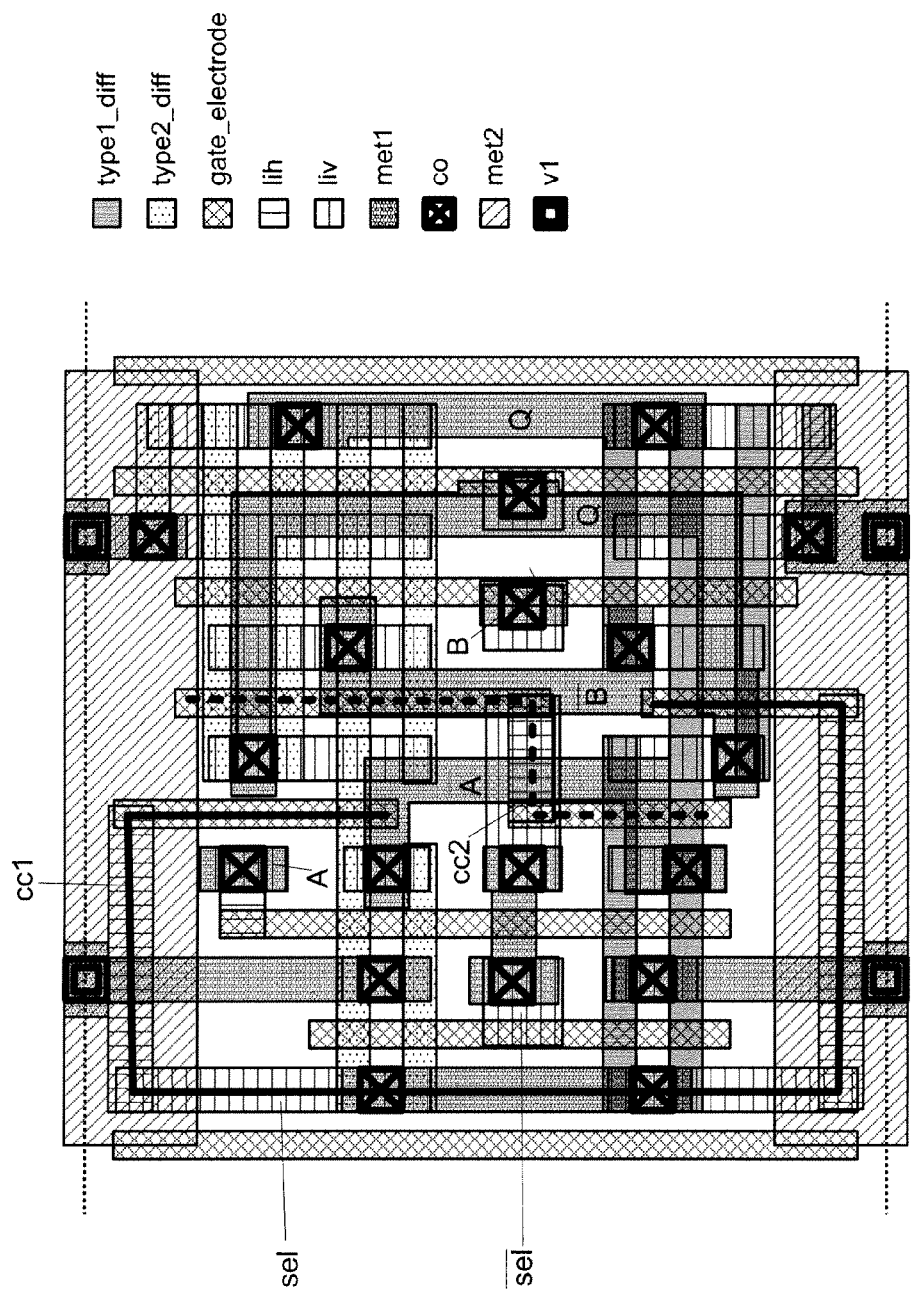
Figure 43A:
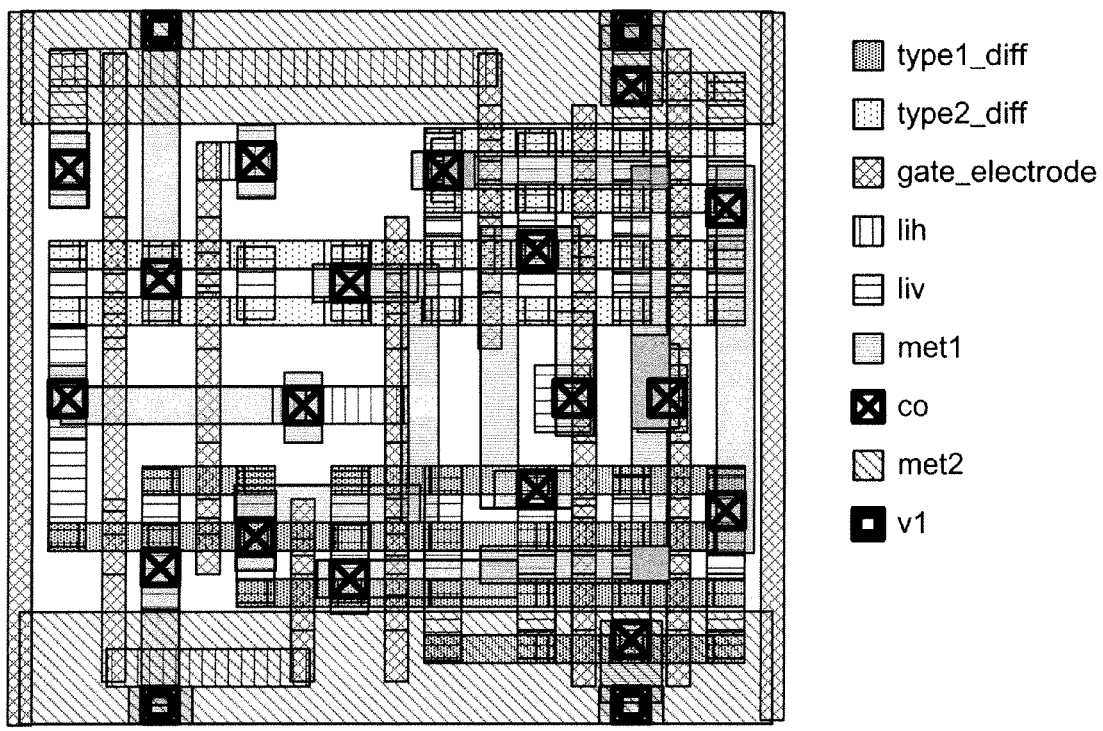
Figure 43B:
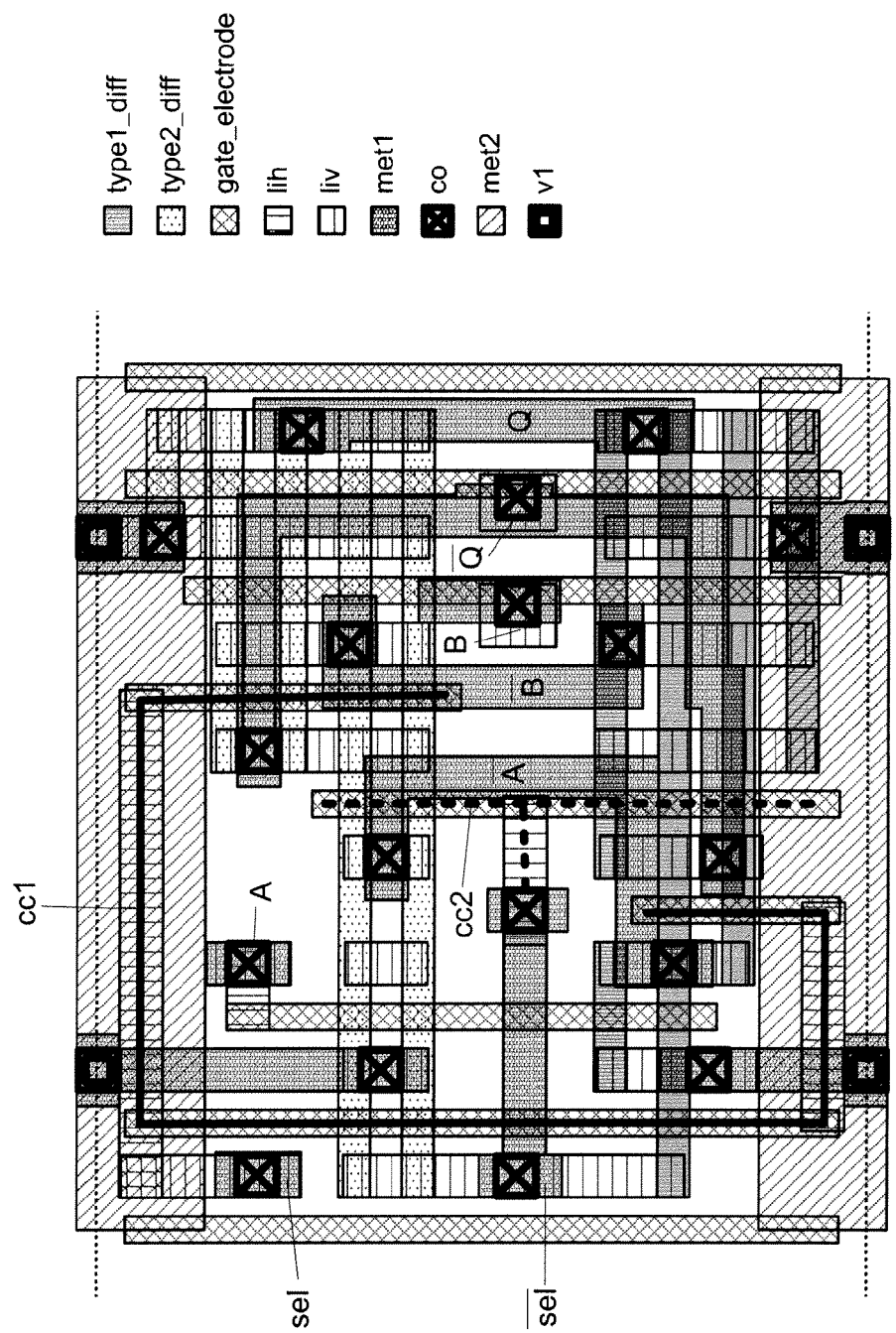
Figure 44A:
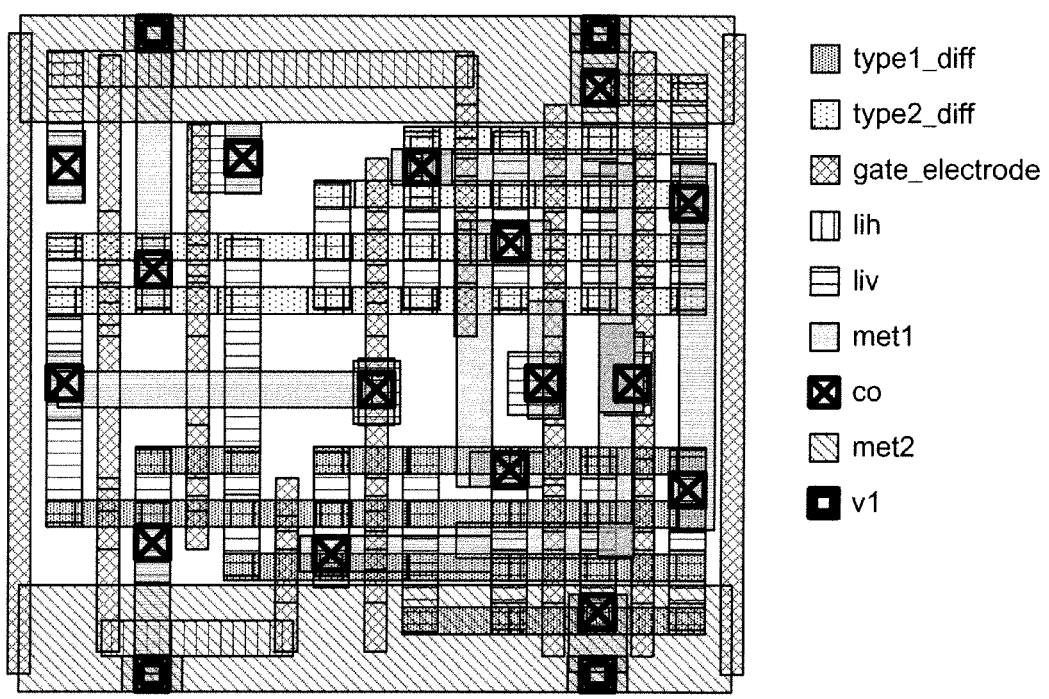
Figure 44B:
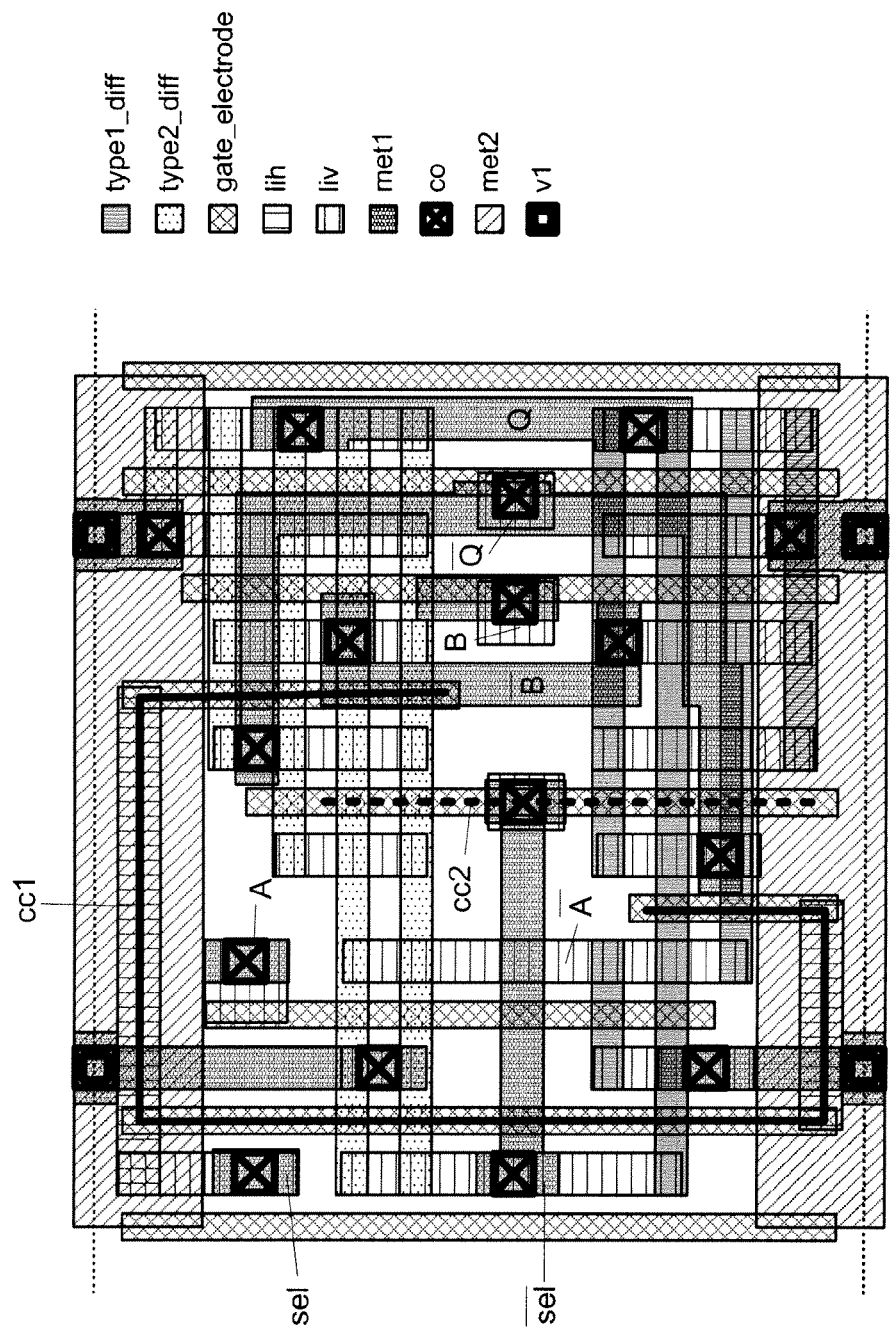
Figure 45A:
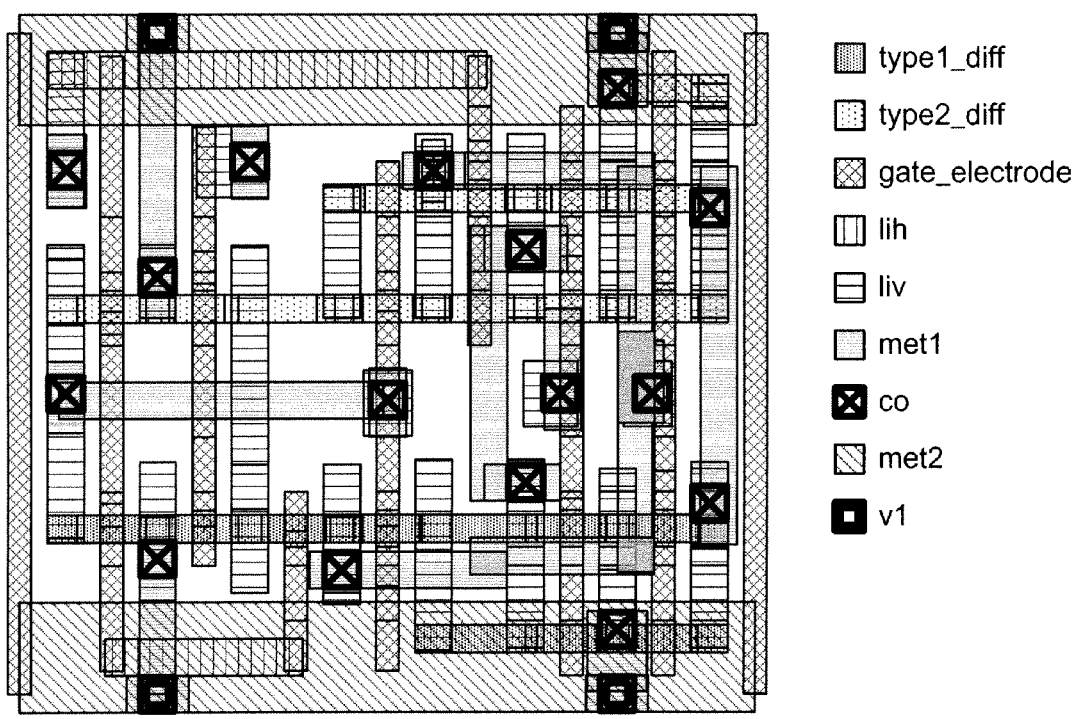
Figure 45B:
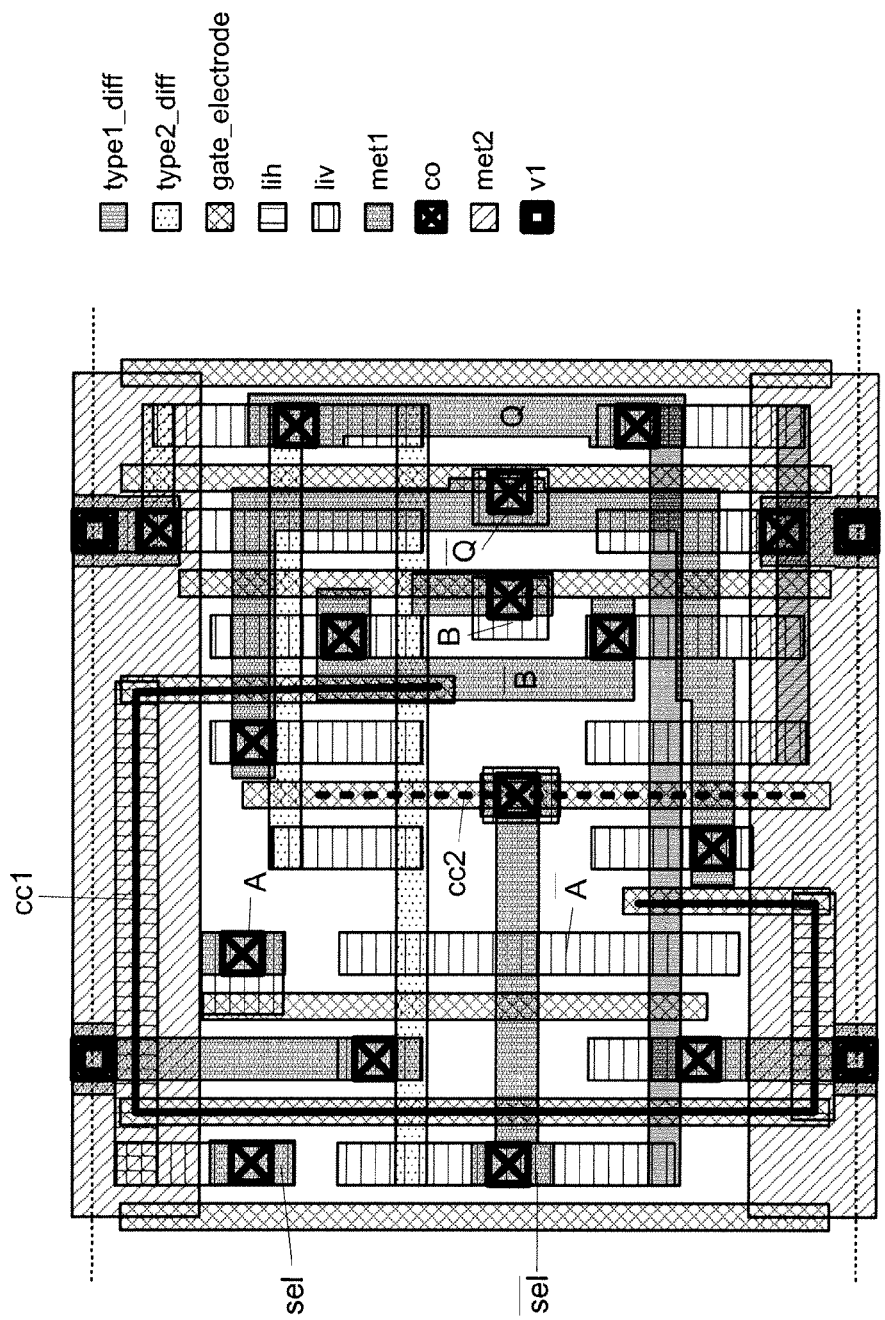
Figure 46A:
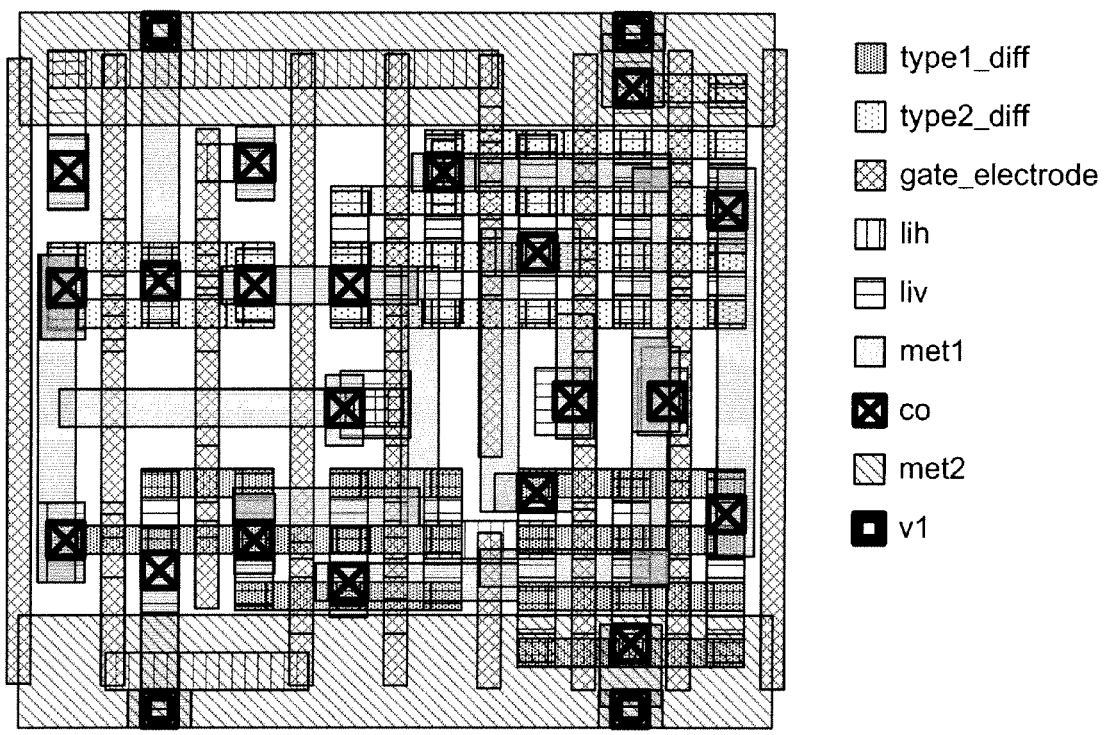
Figure 46B:
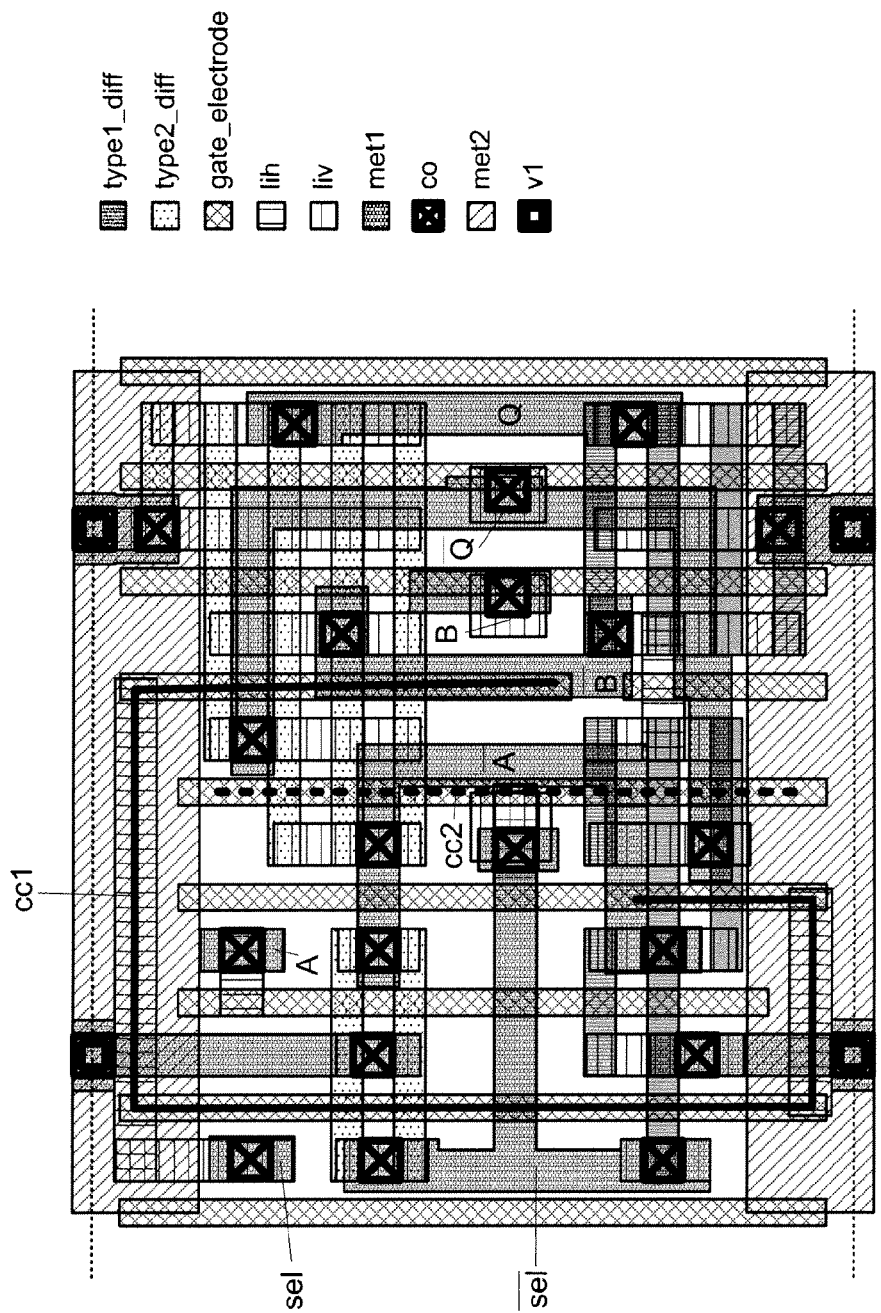
Figure 47A:
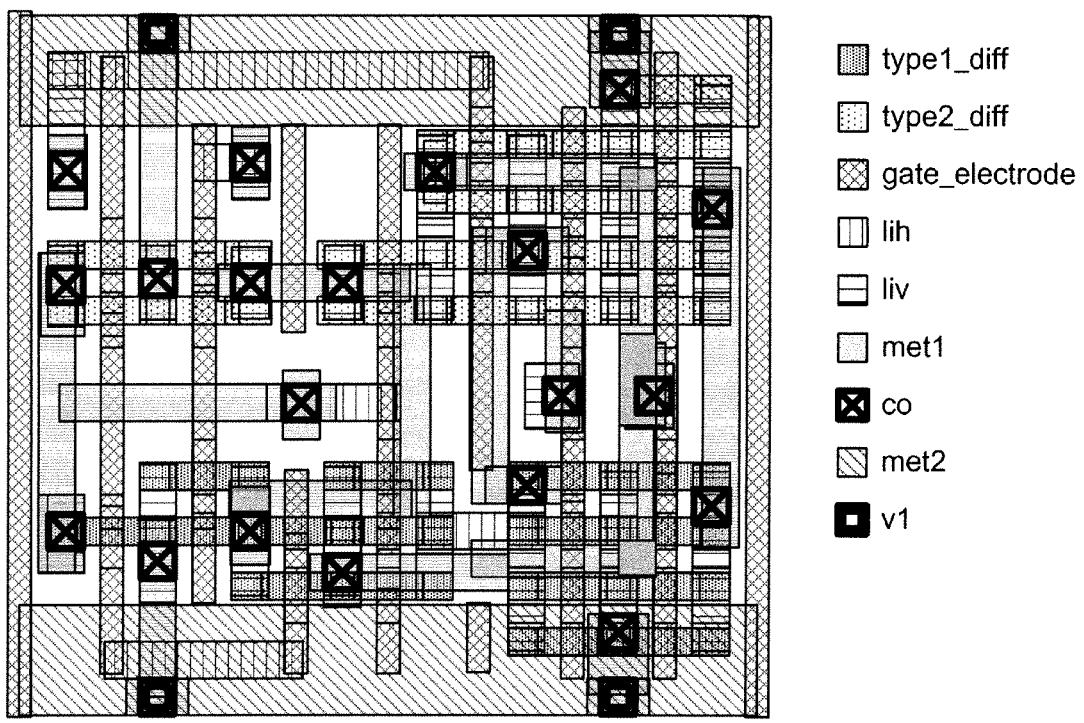
Figure 47B:
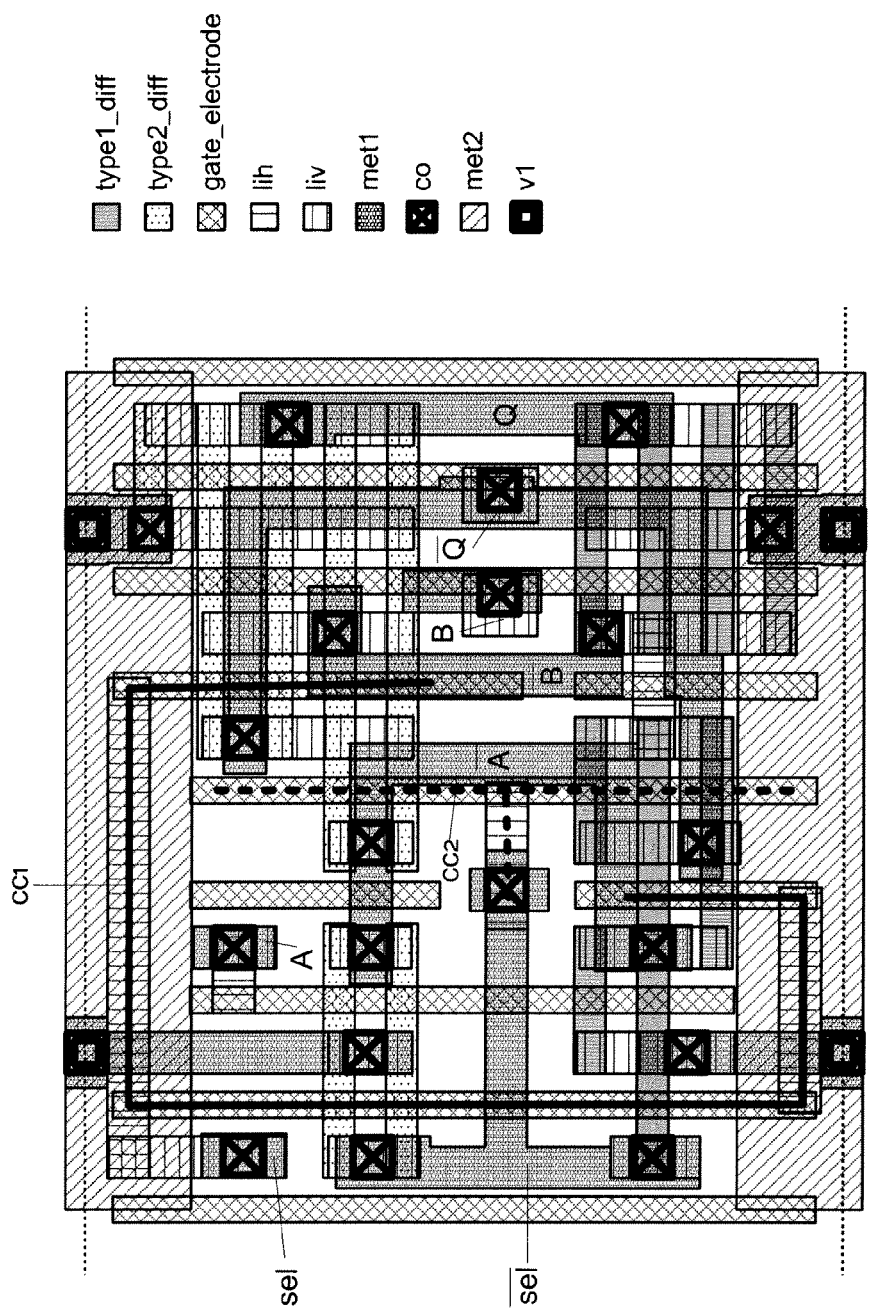

FIGS. 40A/B shows a cell layout that utilizes tighter spacing between horizontal/vertical local interconnect structures. FIGS. 37A/B, 45A1B, and 49A/B show cell layout examples that utilize a larger spacing between diffusion fins. FIGS. 63A/B through 69A/B show cell layout examples that utilize tighter spacing between diffusion fins. FIGS. 43A/B and 44A/B show cell layout examples that utilize a diffusion fin as a wire.

Figure 42A:
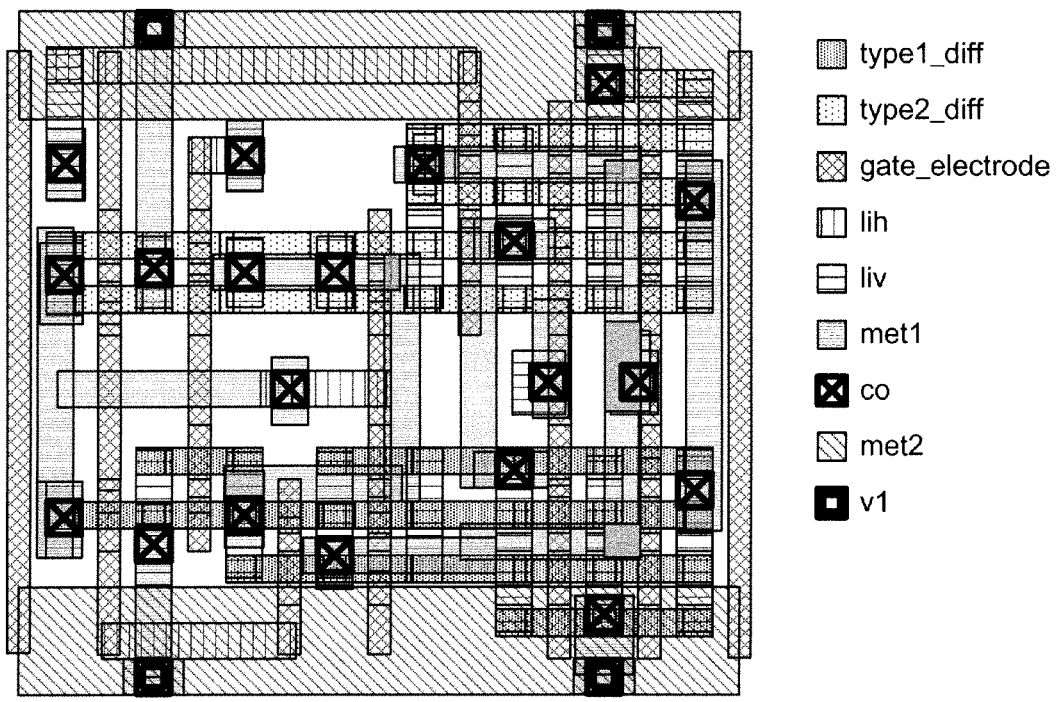
Figure 42B:
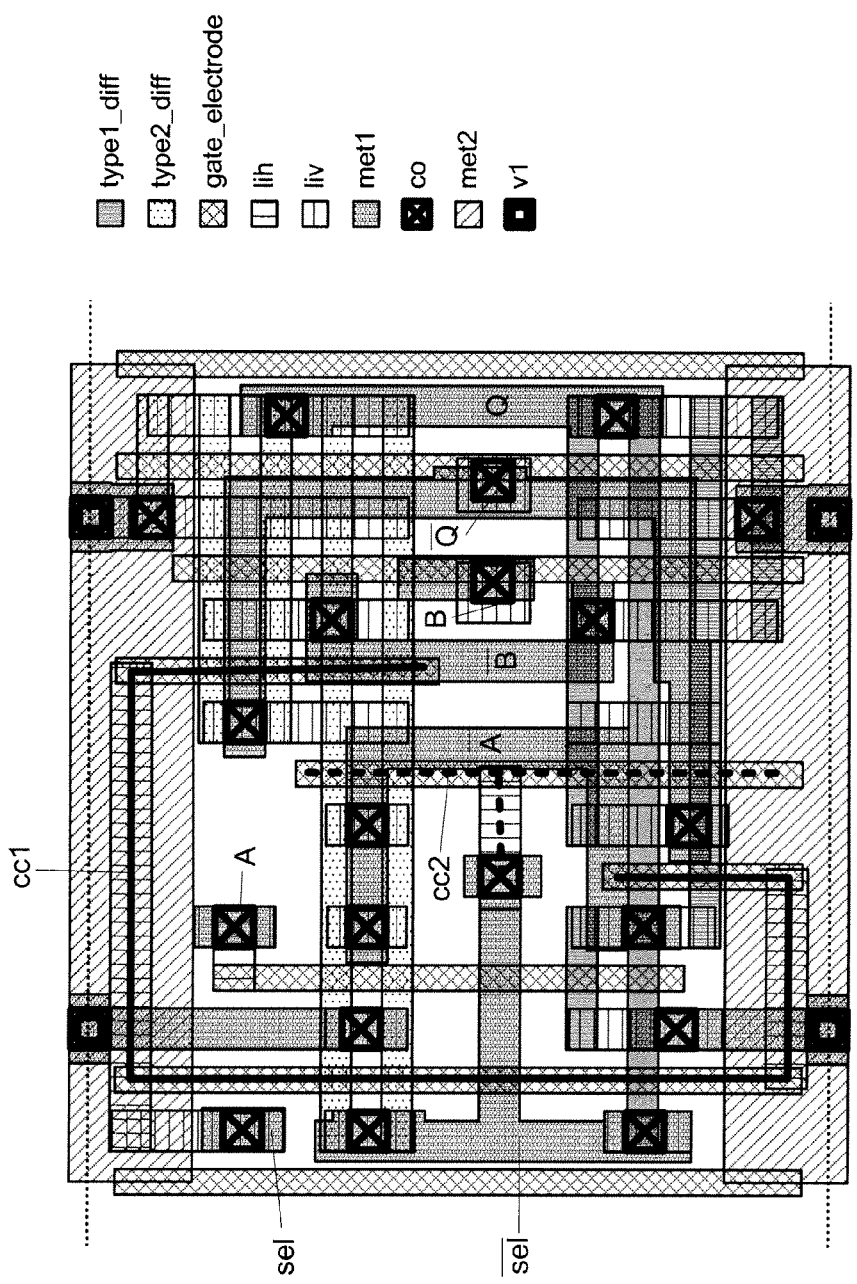

FIGS. 35A/B through 41A/B, 48A/B through 65A/B, and 68A/B through 69A/B shows cell layout examples that utilize a dense gate electrode structure implementation without split gates. FIGS. 42A/B through 47A/B and 66A/B through 67A/B show cell layout examples that utilize a split gate implementation with less wiring and larger transistor sizes.

FIGS. 35A/B through 69A/B show cell layout examples that demonstrate a number of different wiring examples for various cell layouts. FIGS. 35A/B through 69A/B show cell layout examples that demonstrate use of a fully populated gate electrode layer, including extension of gate electrode end caps and use of dummy structures where possible within the gate electrode layer. Some of the cell layouts shown in FIGS. 35A/B through 69A/B show examples of dummy gate electrode layer structures without the cuts at the top and bottom of the cell, i.e., prior to cut mask operation during the fabrication process. Some of the cell layouts, e.g., FIGS. 53A/B through 55A/B and 66A/B shows example cell layouts where power buses are omitted.

These cross-coupled transistor configuration of FIGS. 35A/B through 69A/B include structures formed on each layer as well as on a combination of layers, and many of the cell layout features mentioned above can be applied independent of each other. It should be understood that the cell layouts of FIGS. 35A/B through 69A/B show examples of what can be done with the finfet-based cross-coupled transistor configuration, and in no way represent an all inclusive set of possible cell layout configurations. Any of the features demonstrated in the various cell layout examples of FIGS. 35A/B through 69A/B can be combined to generate additional cell layouts.

Technologies for which the optical resolution is not sufficient to resolve line patterns directly will use some form of pitch division. The pitch division can be self-aligned, using spacers, or through multiple exposure steps at an achievable resolution. For example, for an ArF excimer laser scanner using water immersion of the final lens and a portion of the wafer to be exposed, the optical resolution is limited to ~40 nm. This corresponds to a k1 value of 0.28 for a wavelength of 193 nm and an effective numerical aperture of 1.35. For diffusion fin layers and gate electrode layers and other layers formed with pitch division (for example, spacer double patterning, spacer quadruple patterning, multiple exposure Litho-Etch-Litho-Etch, etc..), even though the layout is done with uniform pitches (lengthwise centerline-to-lengthwise centerline pitches) for the conductive structures, i.e., for the lines, the as-fabricated conductive structures can end up slightly off target due to processing variations, such that multiple (e.g., two, four, etc..) pitches end up on the wafer.

Pitch division can be applied multiple times, for example pitch-division-by-2, pitch-division-by-4, with either the self-aligned spacer approach or multiple lithographic exposures. Pitch-division-by-4 has been reported to achieve lines/spaces of about 11 nm.

One limitation of pitch division is that the resultant line patterns can have slightly different pitches within a pattern. For pitch-division-by-2, this means that groups of two lines will have one pitch, the next group of two lines can have a slightly different pitch, the next group of two lines will have the same pitch as the first group, etc. The result on a finished wafer will be lines which were intended to be on a uniform, fixed pitch but will end up on two or four or other multiple pitches. For self-aligned spacers, the original core line pattern will be drawn on a fixed, uniform pitch. For multiple exposures, each of the exposures will have lines drawn on a uniform fixed pitch. The non-uniform pitch introduced by the pitch division process may be on the order of 10% or less of the final pitch. For example, for a final target pitch of 50 nm, the pitches of each group of two lines may differ by less than 5 nm.

Restricted Gate Level Layout Architecture

The various circuit layouts incorporating finfet transistors, as discussed above, can be implemented within a restricted gate level layout architecture. For the gate level, a number of parallel virtual lines are defined to extend across the layout. These parallel virtual lines are referred to as gate electrode tracks, as they are used to index placement of gate electrodes of various transistors within the layout. In some embodiments, the parallel virtual lines which form the gate electrode tracks are defined by a perpendicular spacing therebetween equal to a specified gate electrode pitch. Therefore, placement of gate electrode segments on the gate electrode tracks corresponds to the specified gate electrode pitch. In another embodiment, the gate electrode tracks can be spaced at variable pitches greater than or equal to a specified gate electrode pitch.

Figure 70A:
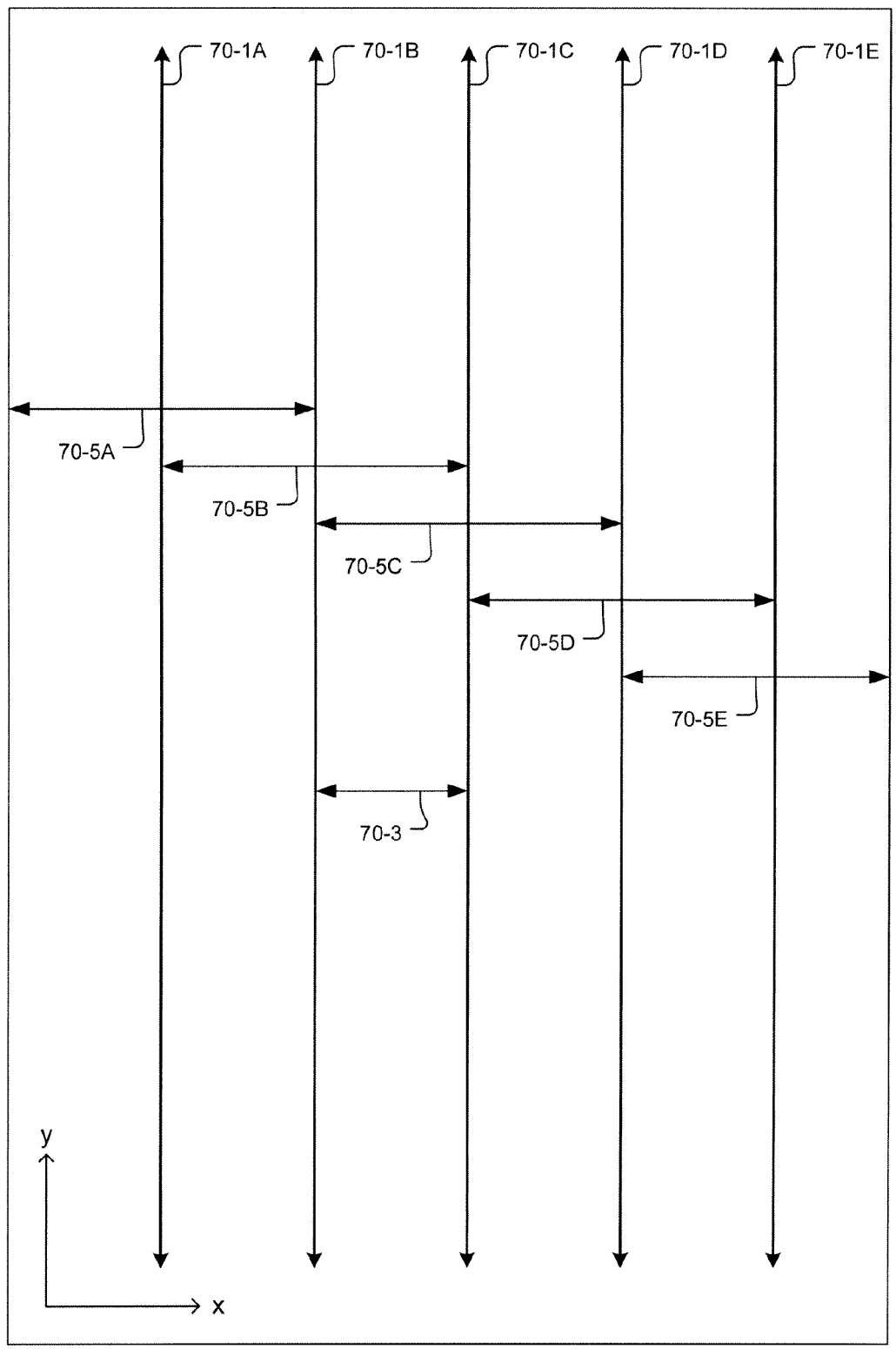
FIG. 70A shows an example of gate electrode tracks 70-1A through 70-1E defined within the restricted gate level layout architecture, in accordance with some embodiments of the present invention.

FIG. 70A shows an example of gate electrode tracks 70-1A through 70-1E defined within the restricted gate level layout architecture, in accordance with some embodiments of the present invention. Gate electrode tracks 70-1A through 70-1E are formed by parallel virtual lines that extend across the gate level layout of the chip, with a perpendicular spacing therebetween equal to a specified gate electrode pitch 70-3.

Within the restricted gate level layout architecture, a gate level feature layout channel is defined about a given gate electrode track so as to extend between gate electrode tracks adjacent to the given gate electrode track. For example, gate level feature layout channels 70-5A through 70-5E are defined about gate electrode tracks 70-1A through 70-1E, respectively. It should be understood that each gate electrode track has a corresponding gate level feature layout channel. Also, for gate electrode tracks positioned adjacent to an edge of a prescribed layout space, e.g., adjacent to a cell boundary, the corresponding gate level feature layout channel extends as if there were a virtual gate electrode track outside the prescribed layout space, as illustrated by gate level feature layout channels 70-5A and 70-5E. It should be further understood that each gate level feature layout channel is defined to extend along an entire length of its corresponding gate electrode track. Thus, each gate level feature layout channel is defined to extend across the gate level layout within the portion of the chip to which the gate level layout is associated.

Within the restricted gate level layout architecture, gate level features associated with a given gate electrode track are defined within the gate level feature layout channel associated with the given gate electrode track. A contiguous gate level feature can include both a portion which defines a gate electrode of a transistor, i.e., of a finfet transistor as disclosed herein, and a portion that does not define a gate electrode of a transistor. Thus, a contiguous gate level feature can extend over both a diffusion region, i.e., diffusion fin, and a dielectric region of an underlying chip level.

In some embodiments, each portion of a gate level feature that forms a gate electrode of a transistor is positioned to be substantially centered upon a given gate electrode track. Furthermore, in this embodiment, portions of the gate level feature that do not form a gate electrode of a transistor can be positioned within the gate level feature layout channel associated with the given gate electrode track. Therefore, a given gate level feature can be defined essentially anywhere within a given gate level feature layout channel, so long as gate electrode portions of the given gate level feature are centered upon the gate electrode track corresponding to the given gate level feature layout channel, and so long as the given gate level feature complies with design rule spacing requirements relative to other gate level features in adjacent gate level layout channels. Additionally, physical contact is prohibited between gate level features defined in gate level feature layout channels that are associated with adjacent gate electrode tracks.

Figure 70B:
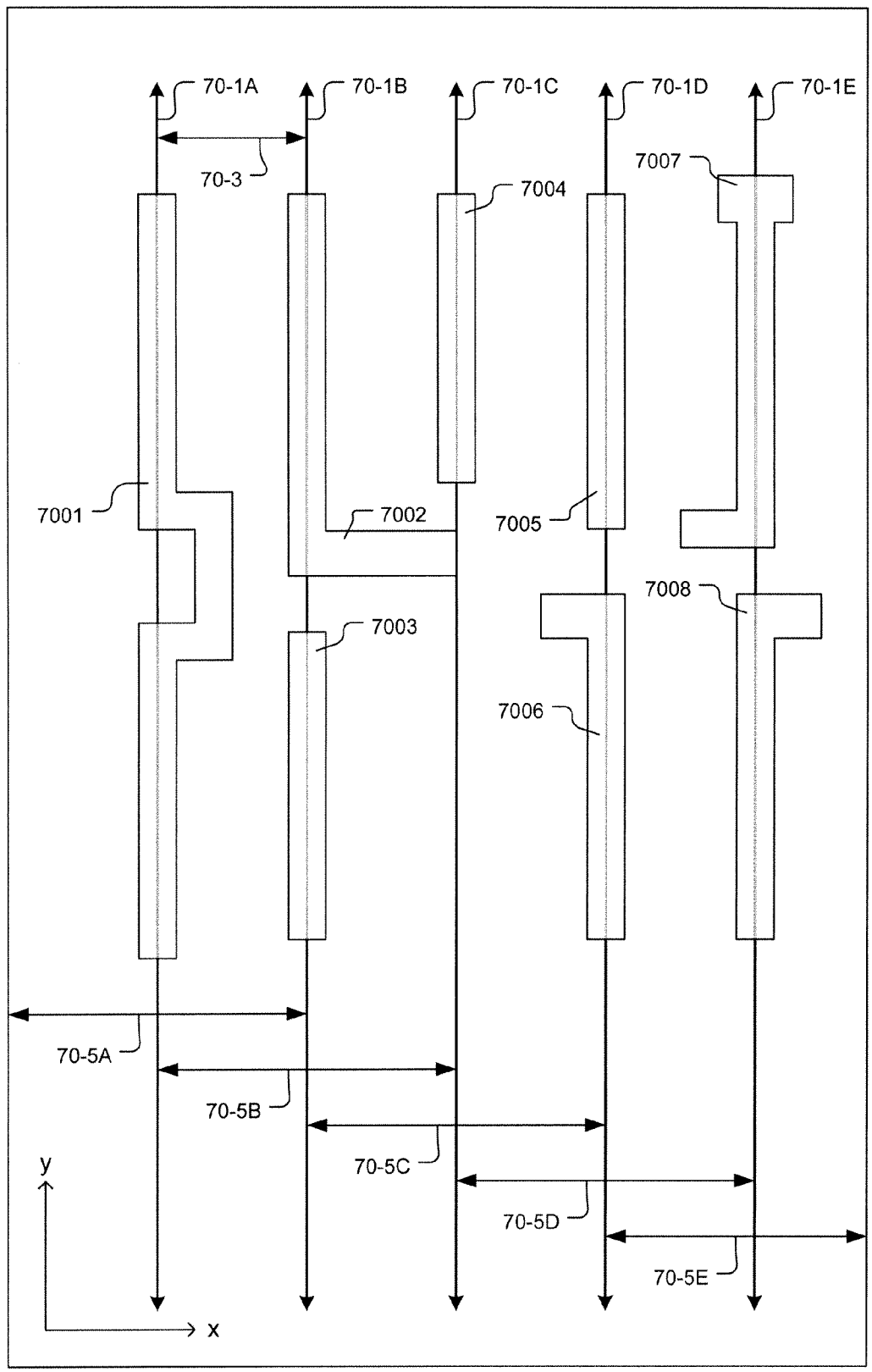
FIG. 70B shows the exemplary restricted gate level layout architecture of FIG. 70A with a number of exemplary gate level features 7001-7008 defined therein, in accordance with some embodiments of the present invention.

FIG. 70B shows the exemplary restricted gate level layout architecture of

FIG. 70A with a number of exemplary gate level features 7001-7008 defined therein, in accordance with some embodiments of the present invention. The gate level feature 7001 is defined within the gate level feature layout channel 70-5A associated with gate electrode track 70-1A. The gate electrode portions of gate level feature 7001 are substantially centered upon the gate electrode track 70-1A. Also, the non-gate electrode portions of gate level feature 7001 maintain design rule spacing requirements with gate level features 7002 and 7003 defined within adjacent gate level feature layout channel 70-5B. Similarly, gate level features 7002-7008 are defined within their respective gate level feature layout channels, and have their gate electrode portions substantially centered upon the gate electrode track corresponding to their respective gate level feature layout channel. Also, it should be appreciated that each of gate level features 7002-7008 maintains design rule spacing requirements with gate level features defined within adjacent gate level feature layout channels, and avoids physical contact with any another gate level feature defined within adjacent gate level feature layout channels.

A gate electrode corresponds to a portion of a respective gate level feature that extends over a diffusion structure, i.e., over a diffusion fin, wherein the respective gate level feature is defined in its entirety within a gate level feature layout channel. Each gate level feature is defined within its gate level feature layout channel without physically contacting another gate level feature defined within an adjoining gate level feature layout channel. As illustrated by the example gate level feature layout channels 70-5A through 70-5E of FIG. 70B, each gate level feature layout channel is associated with a given gate electrode track and corresponds to a layout region that extends along the given gate electrode track and perpendicularly outward in each opposing direction from the given gate electrode track to a closest of either an adjacent gate electrode track or a virtual gate electrode track outside a layout boundary.

Some gate level features may have one or more contact head portions defined at any number of locations along their length. A contact head portion of a given gate level feature is defined as a segment of the gate level feature having a height and a width of sufficient size to receive a gate contact structure. In this instance, "width" is defined across the substrate in a direction perpendicular to the gate electrode track of the given gate level feature, and "height" is defined across the substrate in a direction parallel to the gate electrode track of the given gate level feature. The gate level feature width and height may or may not correspond to the cell width W and cell height H, depending on the orientation of the gate level features within the cell. It should be appreciated that a contact head of a gate level feature, when viewed from above, can be defined by essentially any layout shape, including a square or a rectangle. Also, depending on layout requirements and circuit design, a given contact head portion of a gate level feature may or may not have a gate contact defined thereabove.

A gate level of the some embodiments disclosed herein is defined as a restricted gate level, as discussed above. Some of the gate level features form gate electrodes of transistor devices. Others of the gate level features can form conductive segments extending between two points within the gate level. Also, others of the gate level features may be non-functional with respect to integrated circuit operation. It should be understood that the each of the gate level features, regardless of function, is defined to extend across the gate level within their respective gate level feature layout channels without physically contacting other gate level features defined with adjacent gate level feature layout channels.

In some embodiments, the gate level features are defined to provide a finite number of controlled layout shape-to-shape lithographic interactions which can be accurately predicted and optimized for in manufacturing and design processes. In this embodiment, the gate level features are defined to avoid layout shape-to-shape spatial relationships which would introduce adverse lithographic interaction within the layout that cannot be accurately predicted and mitigated with high probability. However, it should be understood that changes in direction of gate level features within their gate level layout channels are acceptable when corresponding lithographic interactions are predictable and manageable.

It should be understood that each of the gate level features, regardless of function, is defined such that no gate level feature along a given gate electrode track is configured to connect directly within the gate level to another gate level feature defined along a different gate electrode track without utilizing a non-gate level feature. Moreover, each connection between gate level features that are placed within different gate level layout channels associated with different gate electrode tracks is made through one or more non-gate level features, which may be defined in higher interconnect levels, i.e., through one or more interconnect levels above the gate level, or by way of local interconnect features at or below the gate level.

Figure 71A:
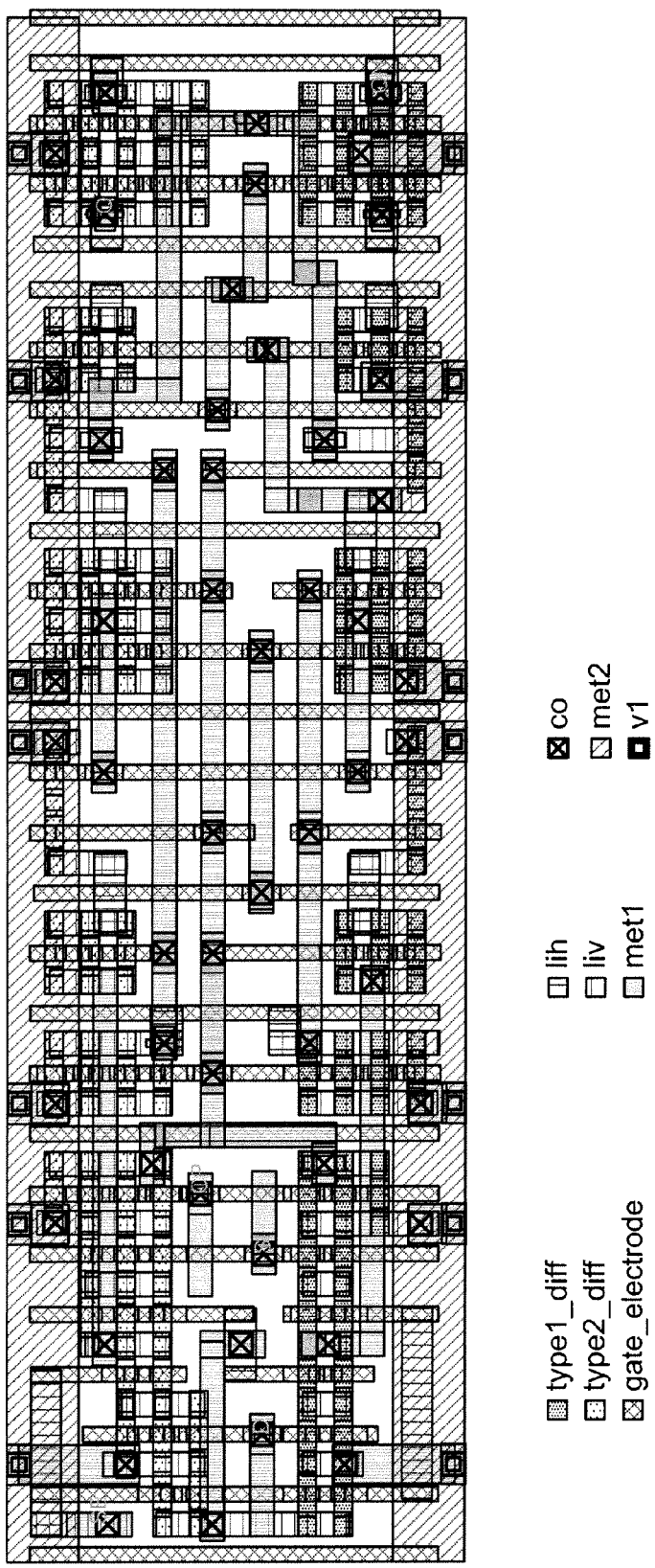
FIGS. 71A/B through 77A/B show a number of example SDFF circuit layouts that utilize both tri-state and transmission gate based cross-coupled circuit structures, in accordance with some embodiments of the present invention.
Figure 71B:
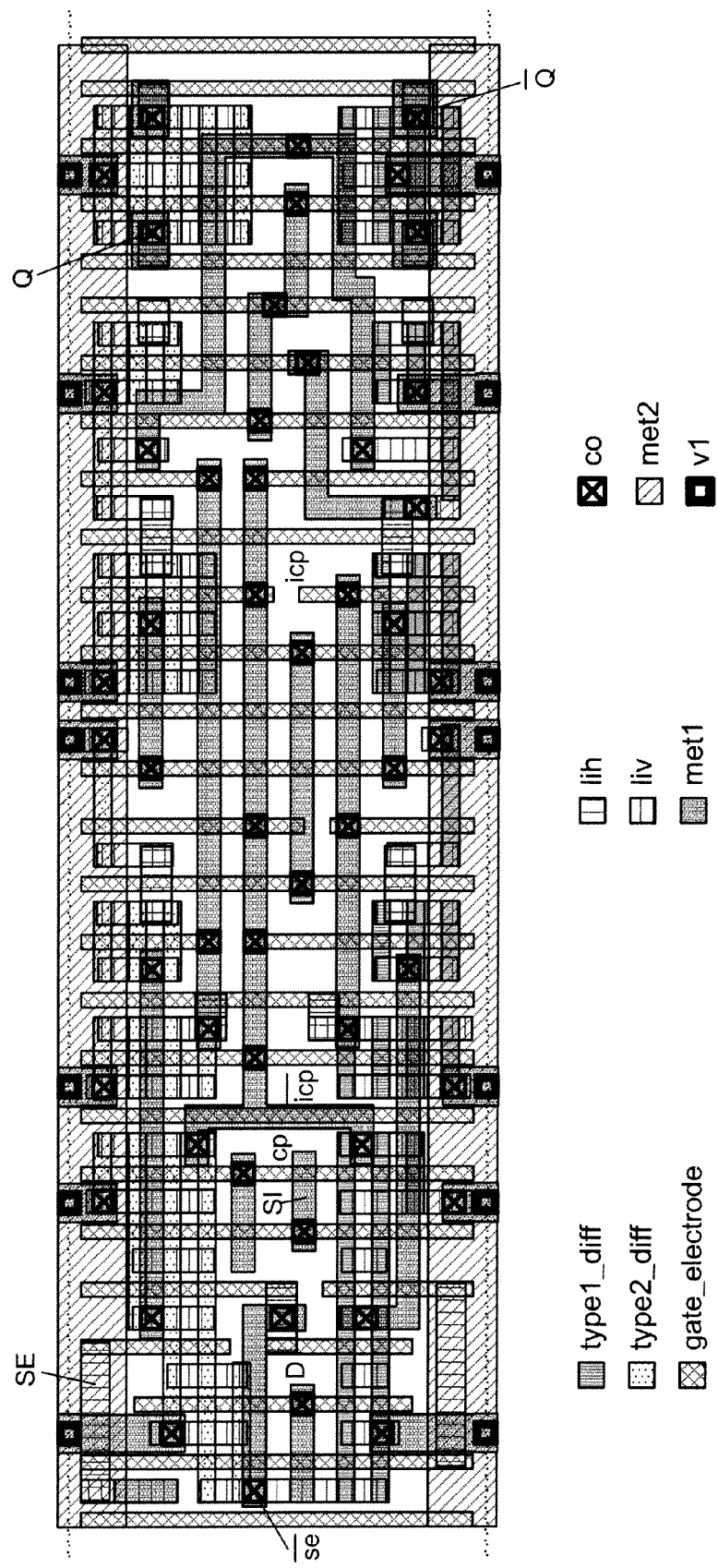
FIG. 71C shows a circuit schematic of the layouts of FIGS. 71A/B and 77A/B, in accordance with some embodiments of the present invention.
Figure 71C:
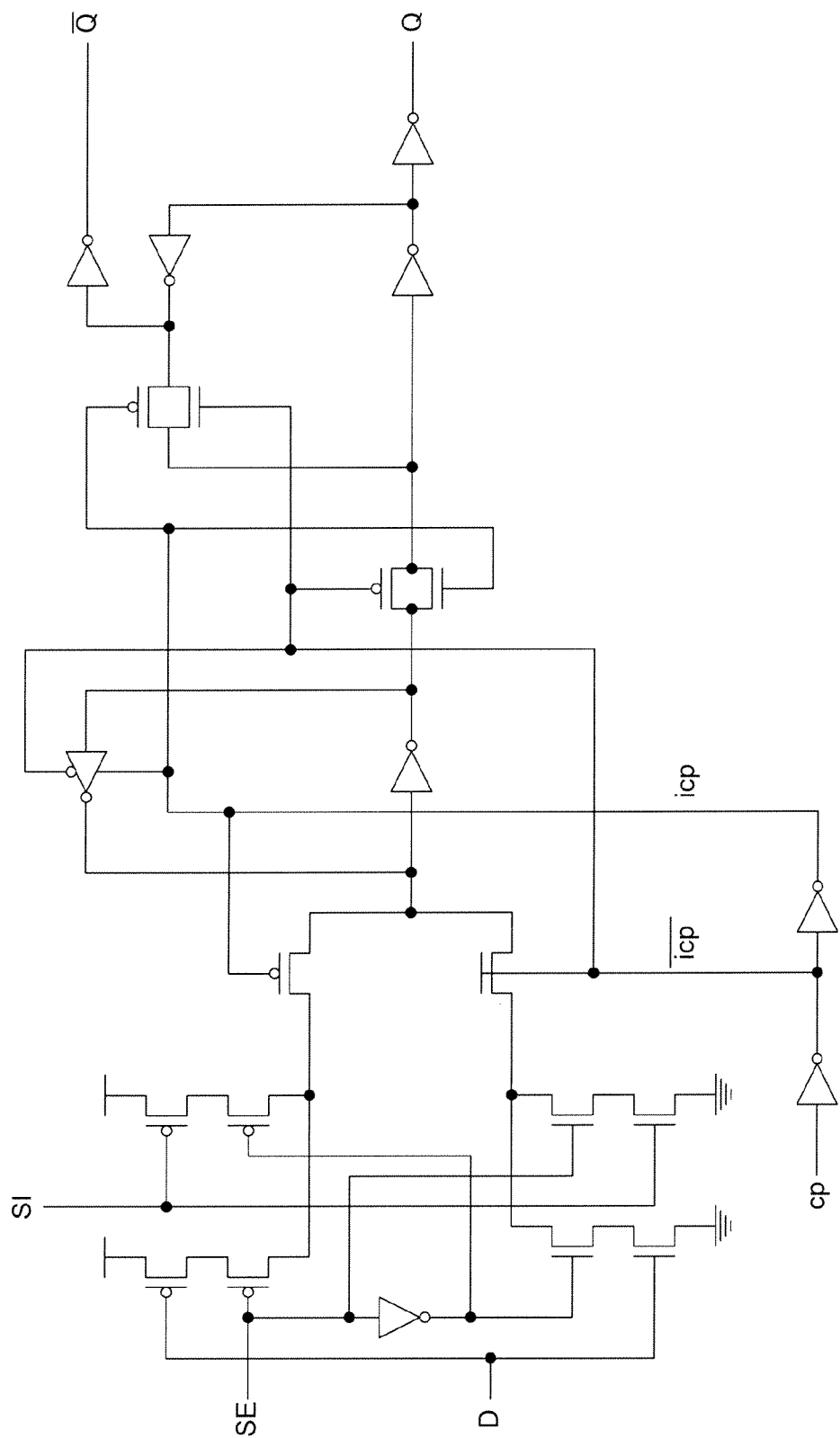
Figure 76A:
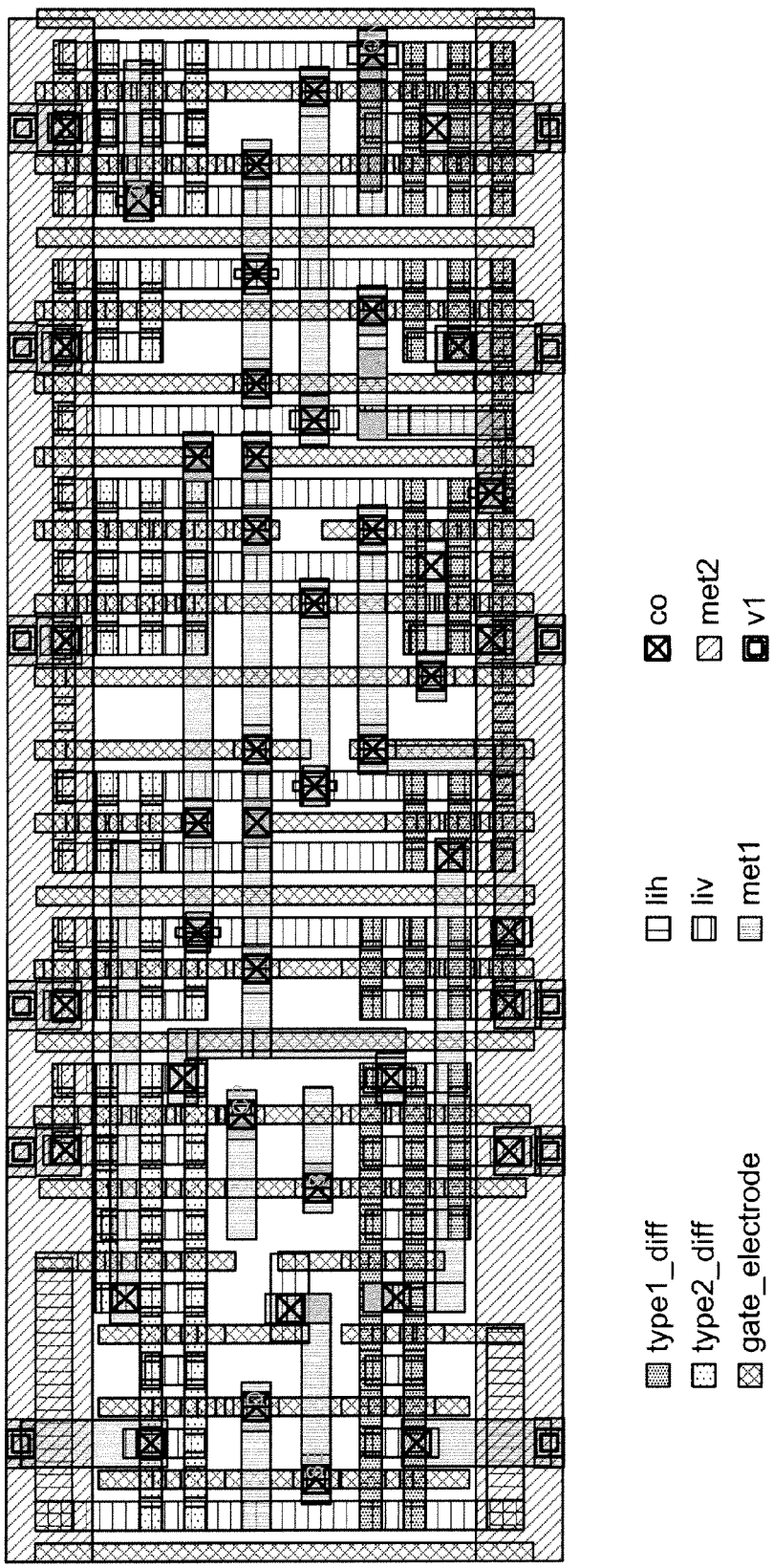
Figure 76B:
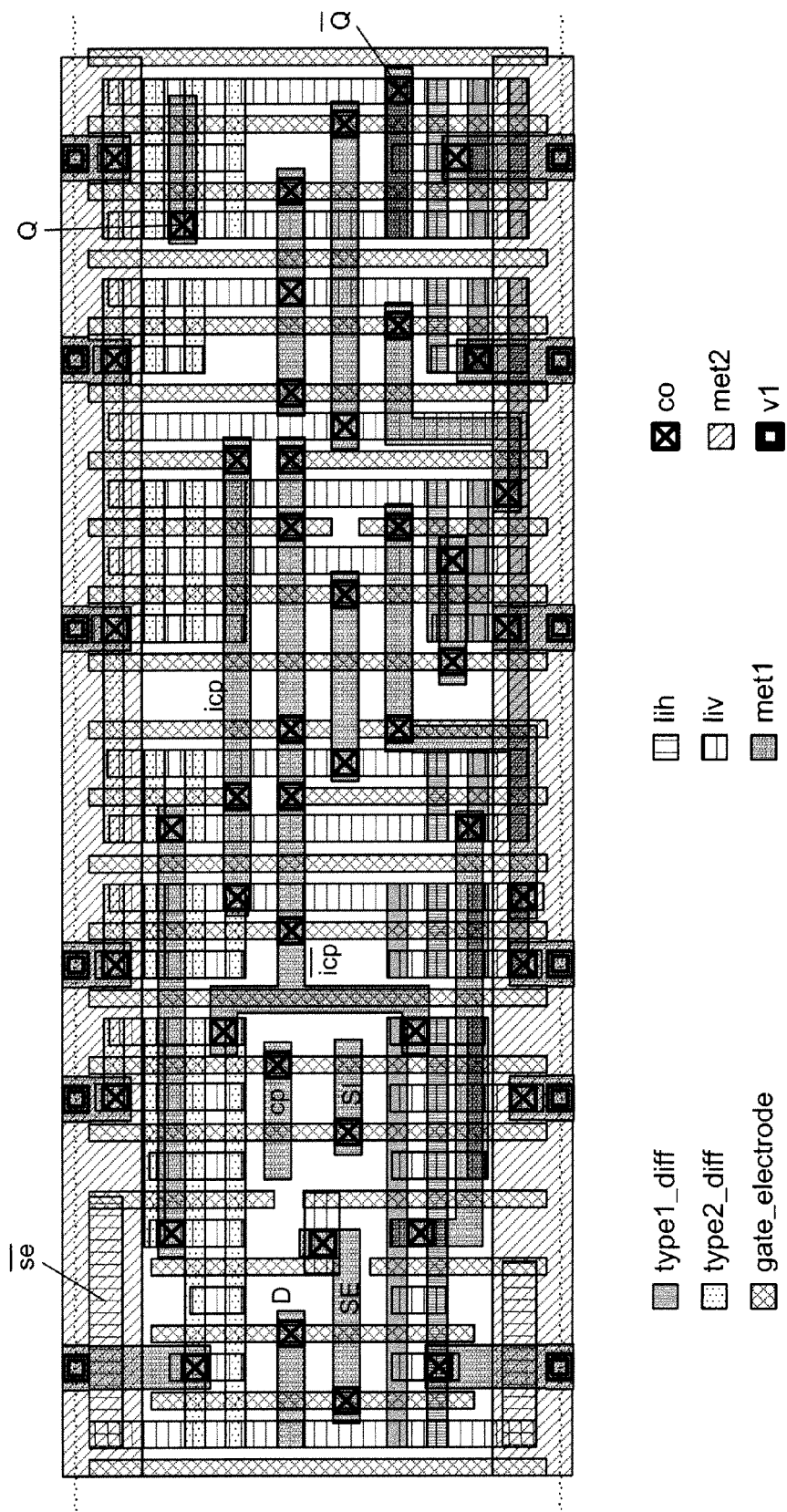
Figure 77A:
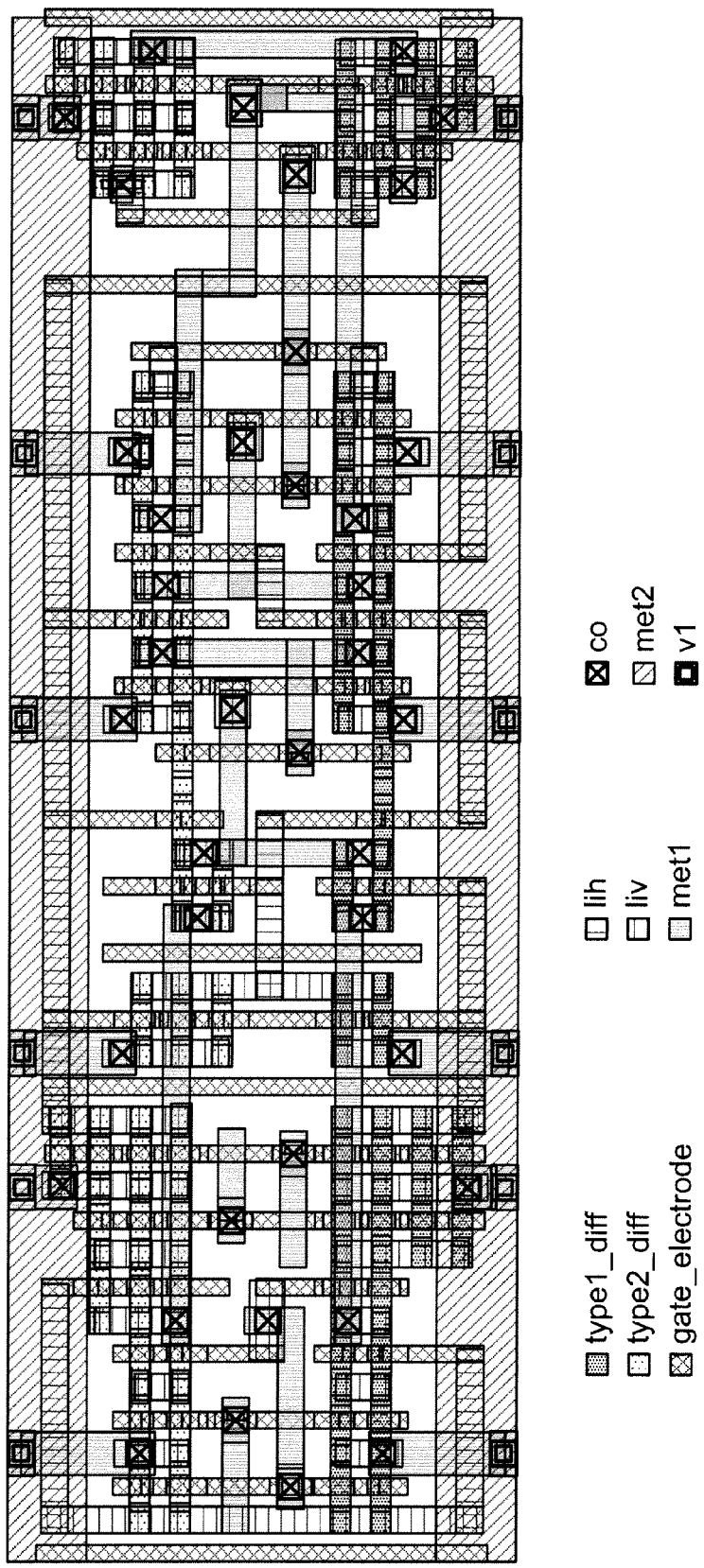
Figure 77B:
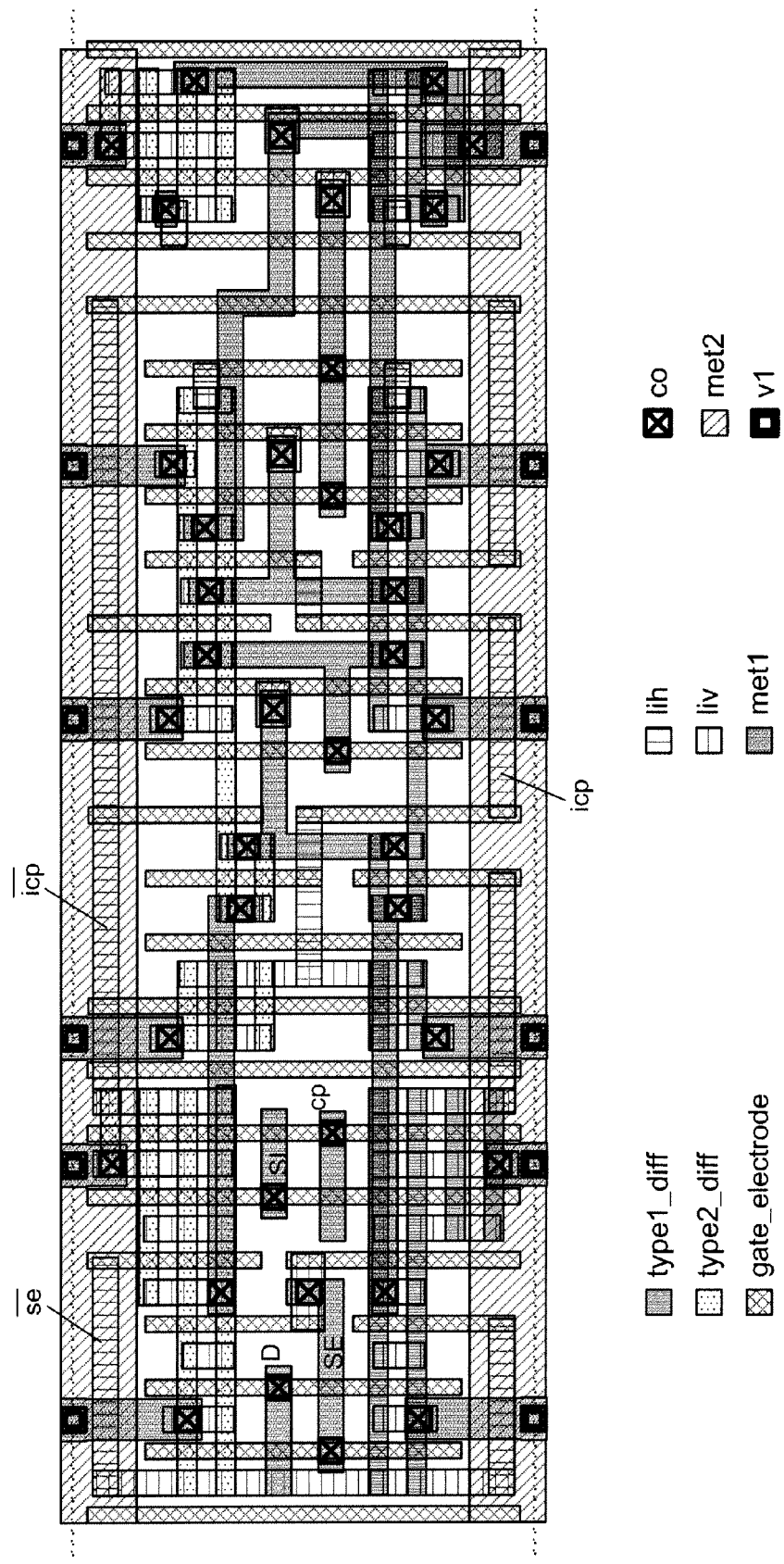

FIGS. 71A/B through 77A/B show a number of example SDFF circuit layouts that utilize both tri-state and transmission gate based cross-coupled circuit structures, in accordance with some embodiments of the present invention. FIG. 71C shows a circuit schematic for FIGS. 71A/B and 77A/B, in accordance with some embodiments of the present invention. FIG. 72C shows a circuit schematic for FIGS. 73A/B through 76A/B, in accordance with some embodiments of the present invention. FIGS. 71B-77B show the same layouts as FIGS. 71A-77A, respectively, with the layouts depicted in a merged format for clarity, and with the nodes of the circuit identified based on the cell layout's circuit schematic. The example SDFF circuit layouts of FIGS. 71A/B through 77A/B include the following features:

1. Gate conductors:
   a. Substantially evenly spaced gate conductors.
   b. Uniform gate conductor line end gaps formed with cut mask, combined with large gate conductor line end gaps to avoid local interconnect, or if there is sufficient space to permit larger gate conductor line end gaps that do not require cuts.
   c. Some gate conductors used as wires in some instances to reduce metal usage, i.e., to reduce higher level interconnect usage.
2. Diffusion fins:
   a. Substantially evenly spaced diffusion fins.
   b. Diffusion fins omitted between p-type and n-type, and on top and bottom cell edges.
   c. Diffusion fin width-to-space relationship may vary, or may have a substantially equal relationship such as depicted in the examples of FIGS. 71A/B through 77A/B.
3. Local interconnect:
   a. Local interconnect structures can connect directly to diffusion fins and gate conductors.
   b. Local interconnect structures can connect to metal 1 (met1 or M1) through a contact layer.
   c. Horizontal and vertical local interconnect structures, such as shown in FIGS. 76A/B by way of example, can be fabricated using separate design layers, i.e., fabricated using separate mask layers.
   d. Horizontal and vertical local interconnect structures can be on the same layer, i.e., on the same mask layer, as shown in the examples of FIGS. 71A/B through 75A/B and 77A/B. Also, during manufacturing, the horizontal and vertical local interconnect structures can be fabricated in two distinct steps, or in a single step.
   e. Local interconnect structures can have positive, zero, or negative overlap with diffusion fins and gate conductors.
   f. Vertical local interconnect can be on similar pitch as gate conductor with half-pitch offset from gate conductors.
4. Contacts:
   a. Contacts can be defined to connect local interconnect structures to metal 1 (men or MO.
   b. Local interconnect structures can have positive, zero, or negative overlap on contact.
   c. Metal 1 (met1 or M1) can have positive, zero, or negative overlap on contact.
5. Metal 2 (met2 or M2)
   a. Metal 2 structures can be uni-directional, i.e., linear-shaped, in some embodiments.
   b. Metal 2 structures can extend in horizontal (x) and/or vertical (y) directions.

The example SDFF circuit layout of FIGS. 71A/B shows the following features, among others:
   Metal 2 is not used for internal wiring.
   Metal 2 is used for power rails.
   Tri-state and transmission gate cross-coupled transistor structures are utilized.
   Local interconnect structures extend in both horizontal (x) and vertical (y) directions.
   Some gate conductors are used as wires, and do not form a gate electrode of a transistor.
   Gate conductor cuts are provided in various locations and combinations.
   Gate conductor cuts are uniform in size.
   Gate conductor layer is fully populated, i.e., at least one gate conductor is positioned at each available gate conductor pitch position within the cell.

Figure 72A:
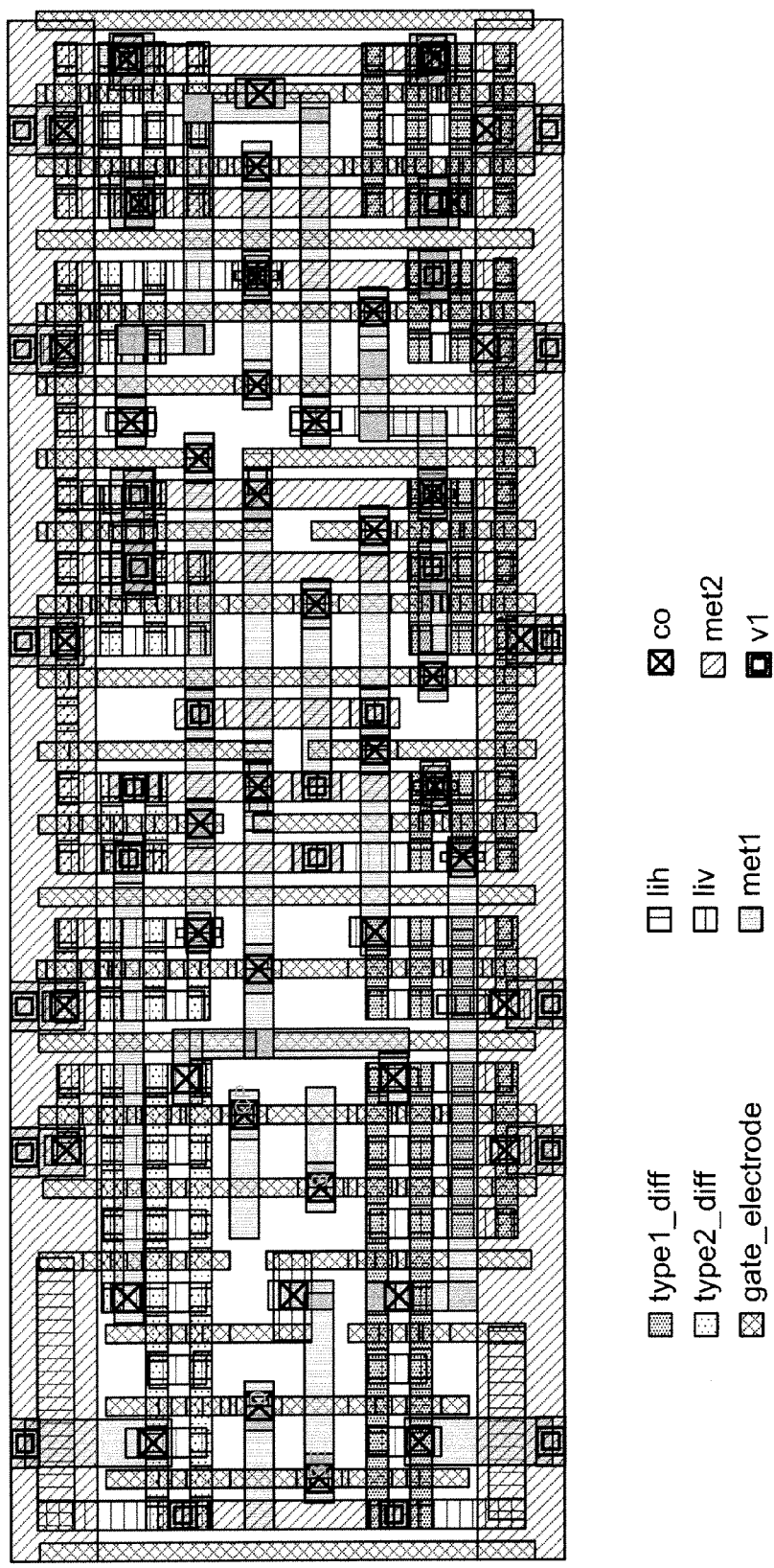
FIG. 72C shows a circuit schematic of the layouts of FIGS. 72A/B through 76A/B, in accordance with some embodiments of the present invention.
Figure 72B:
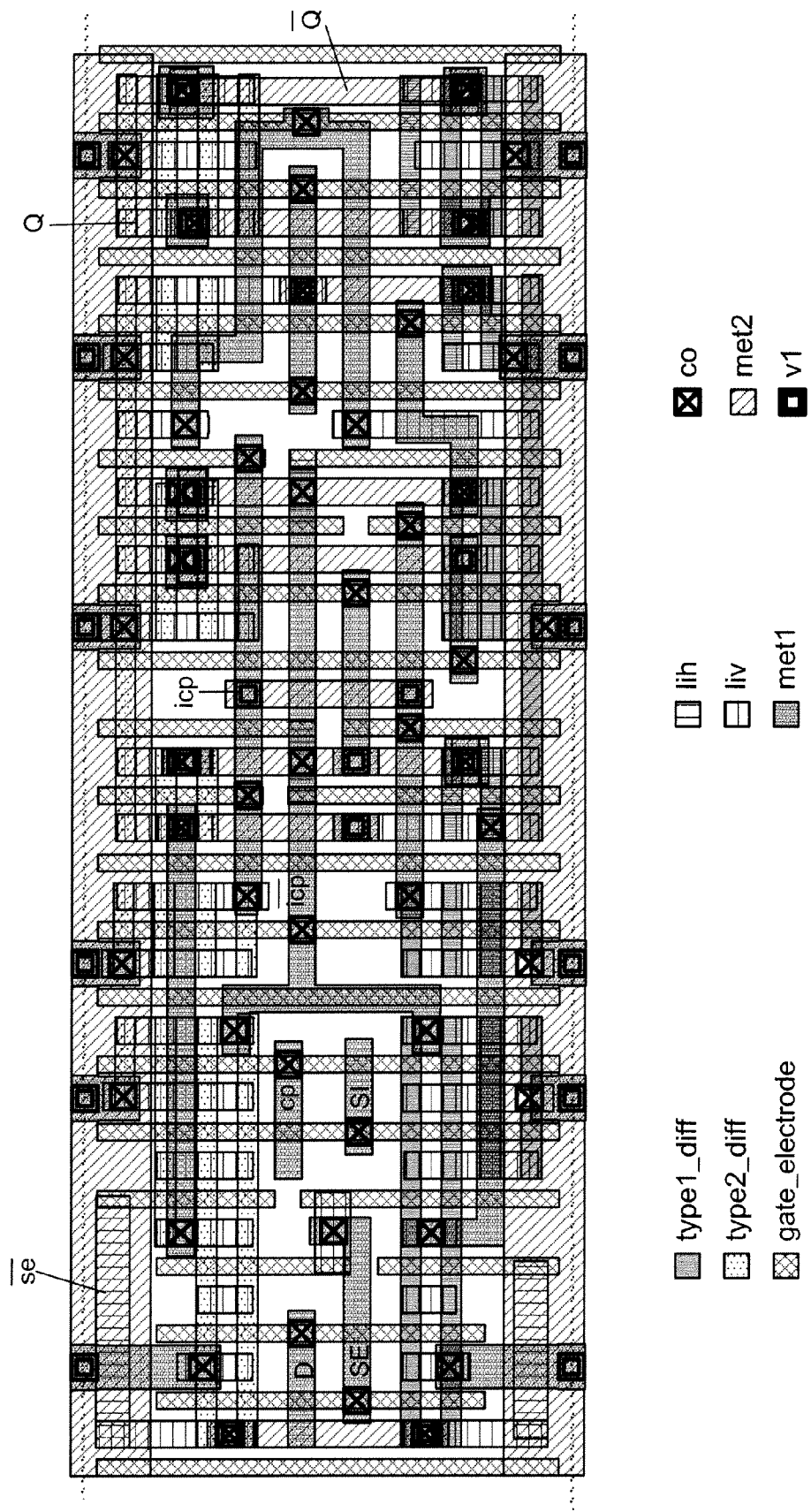
Figure 72C:
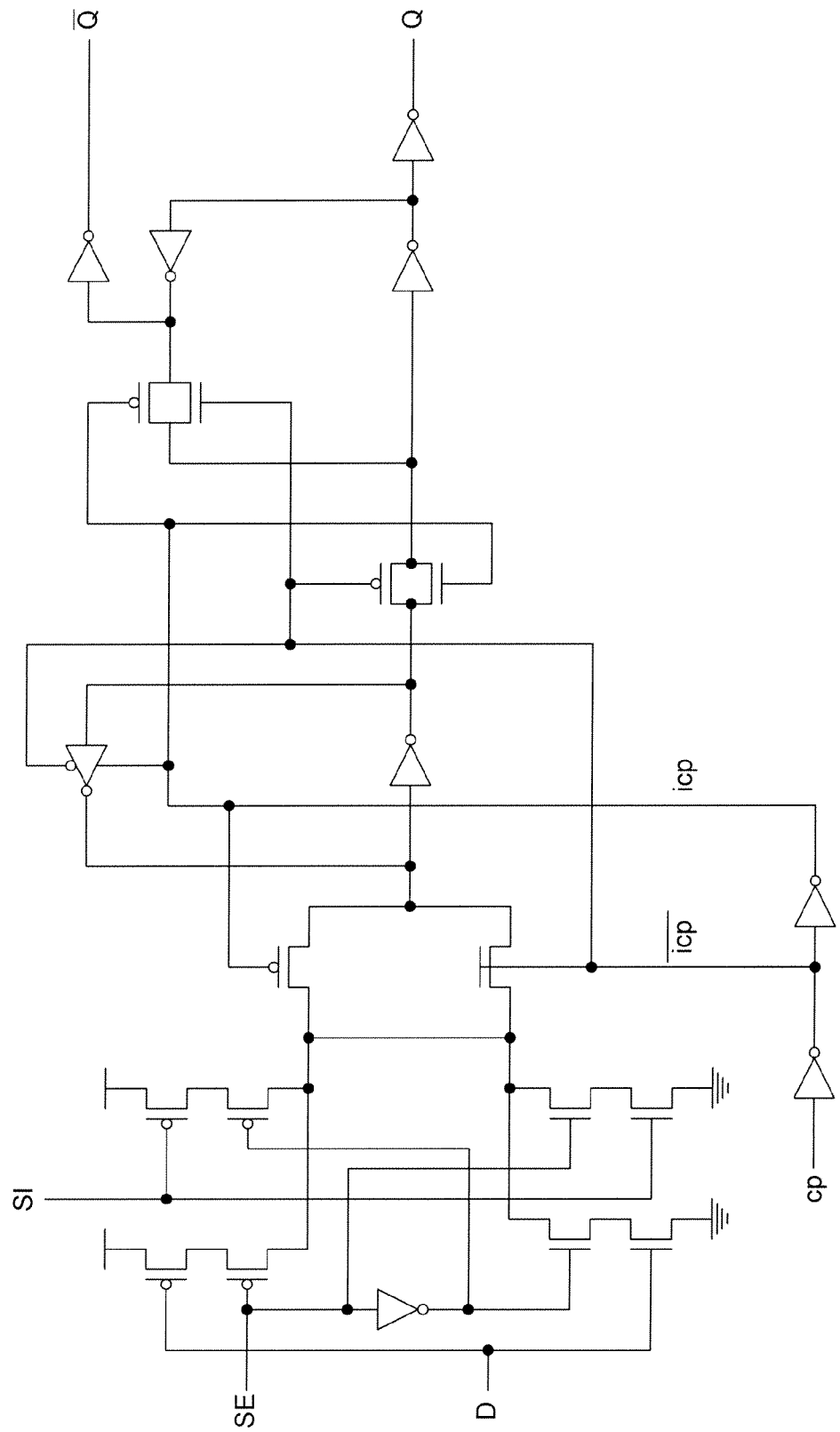

The example SDFF circuit layout of FIGS. 72A/B shows the following features, among others:
   Metal 2 structures are used for internal wiring in vertical (y) direction.
   Denser circuit layout than the example of FIGS. 71A/B.
   Both tri-state and transmission gate cross-coupled transistor structures are utilized.
   Gate conductor layer is fully populated, i.e., at least one gate conductor is positioned at each available gate conductor pitch position within the cell.
   Gate conductor cuts are shown.
   Substantially uniform gate conductor cuts are utilized in various combinations and/or locations to optimize layout.

Figure 73A:
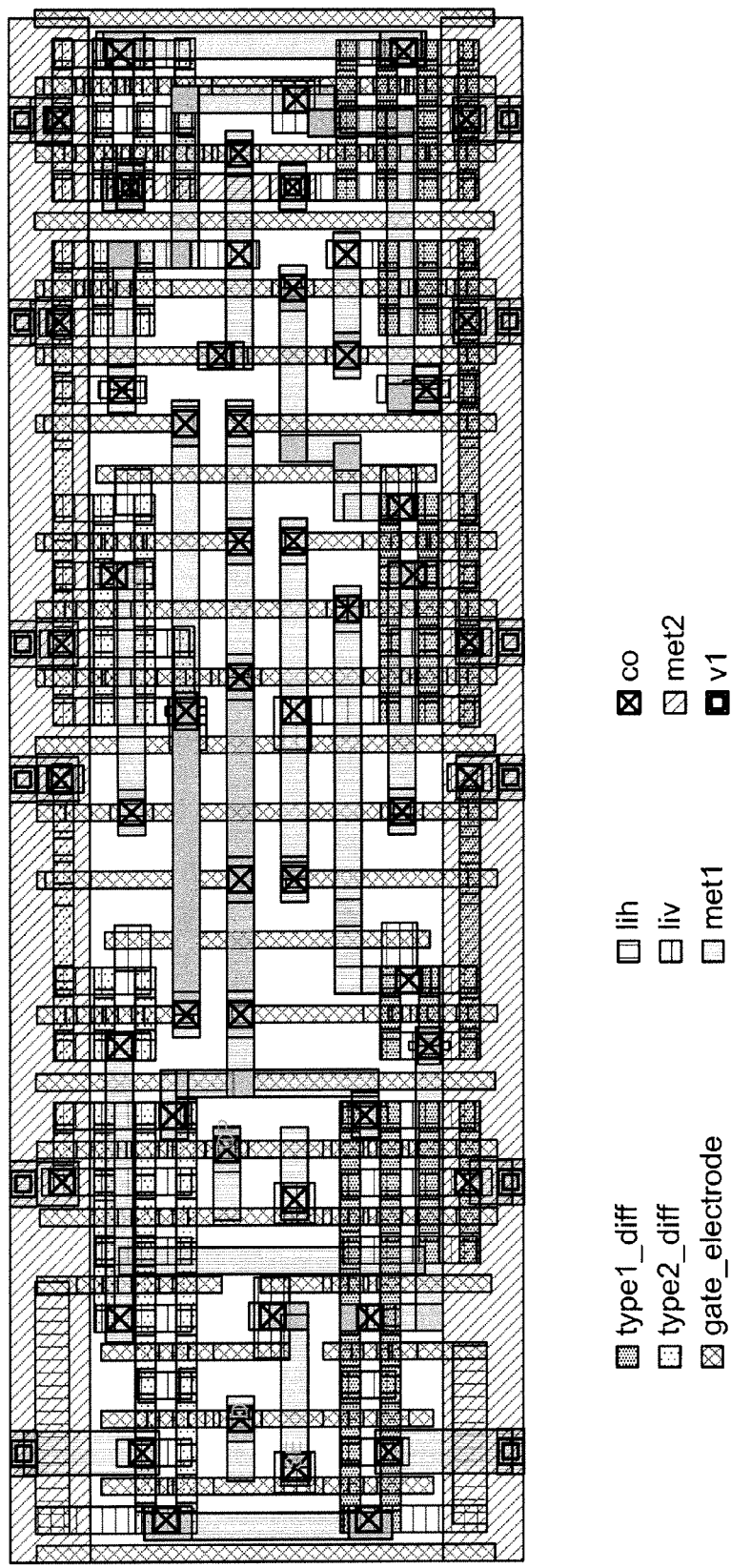
Figure 73B:
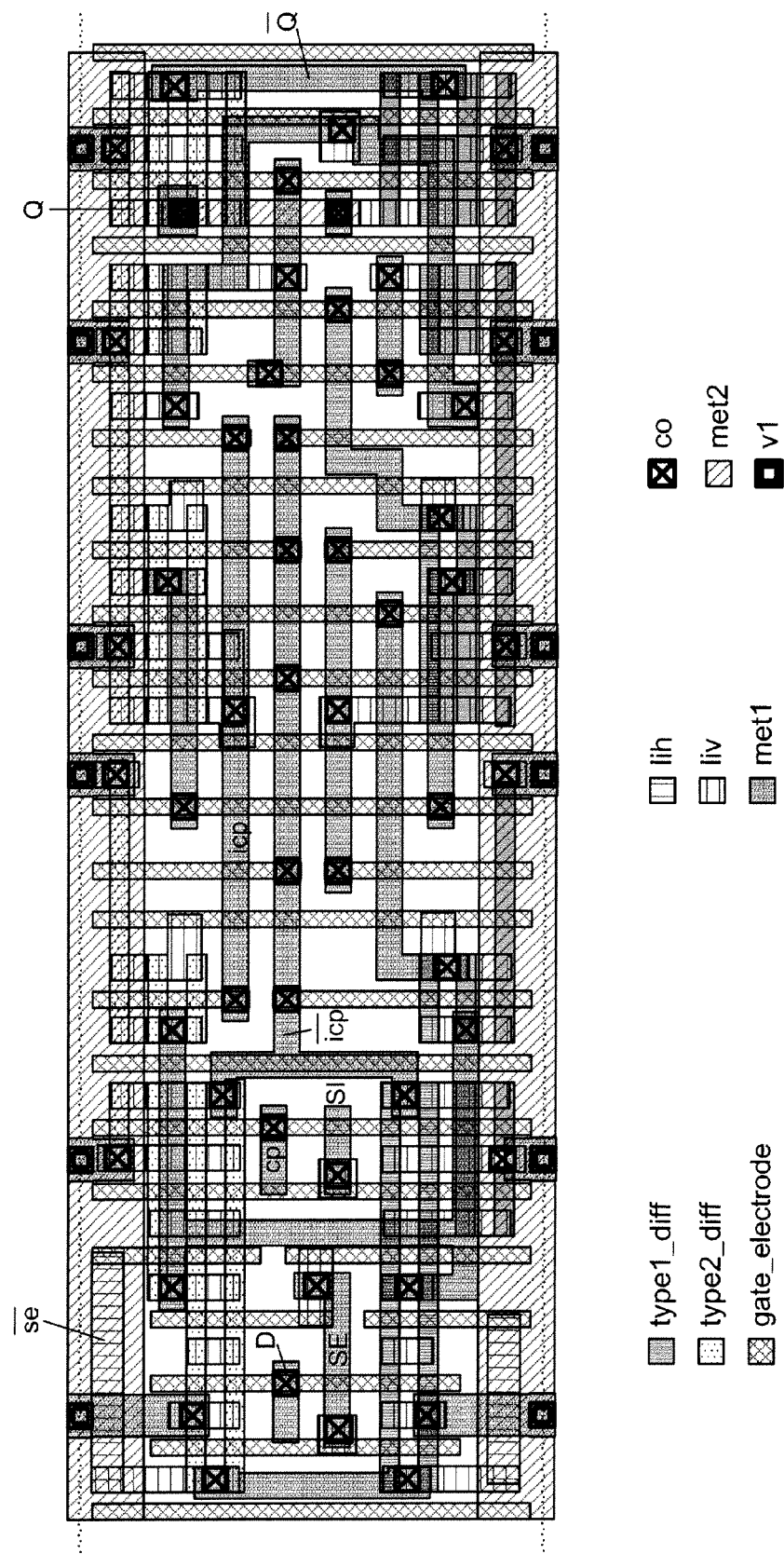
Figure 74A:
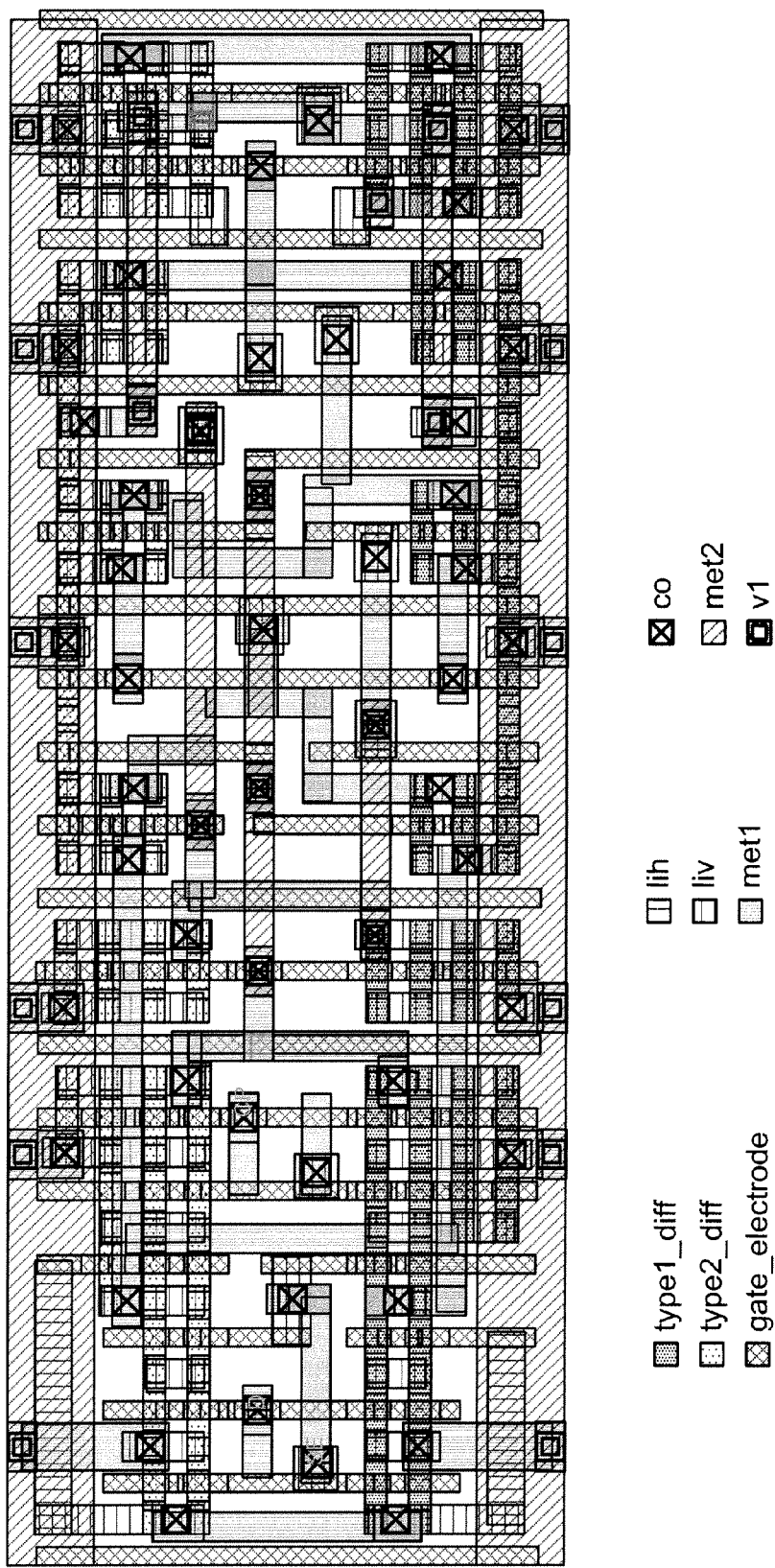
Figure 74B:
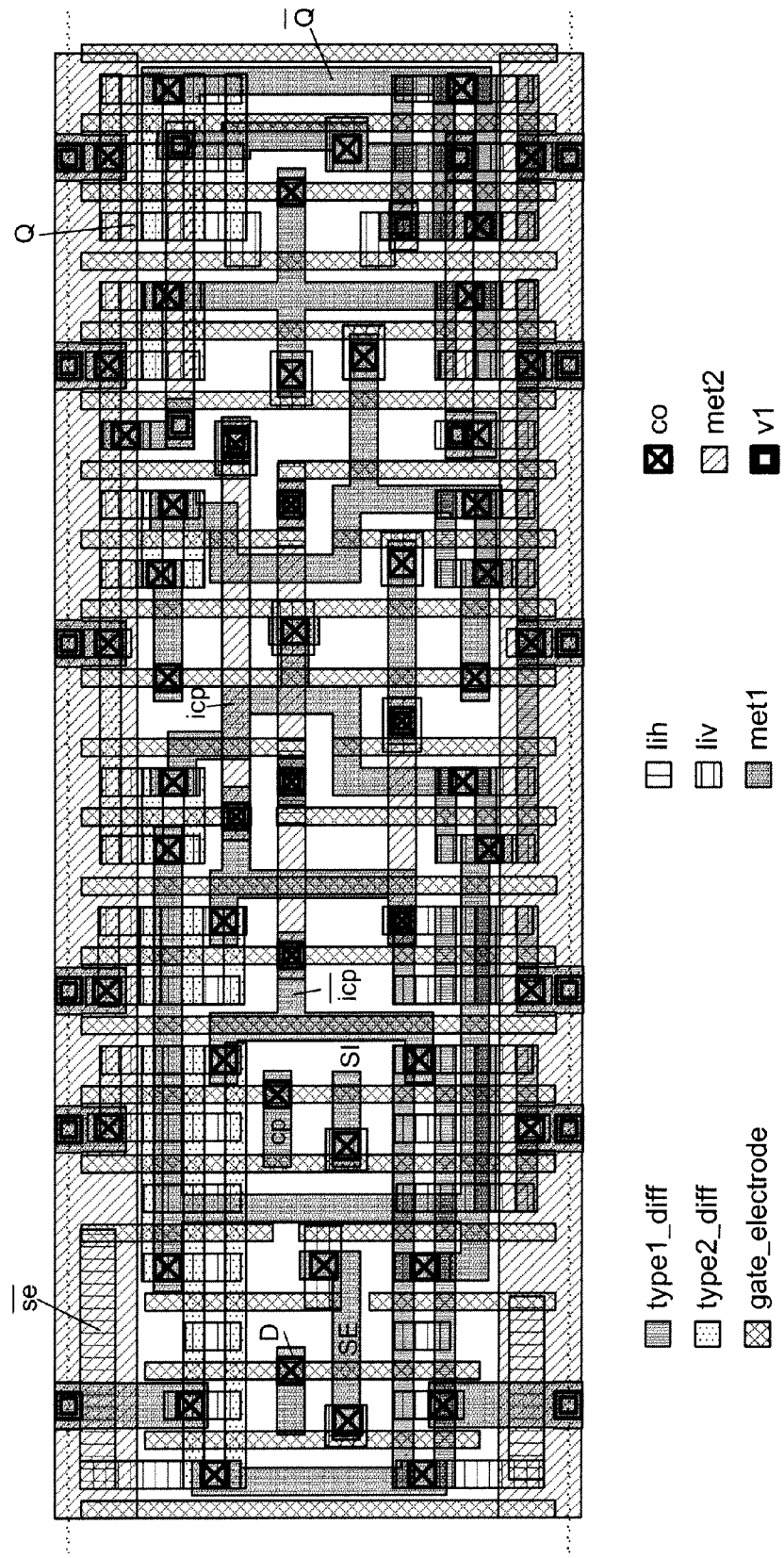
Figure 75A:
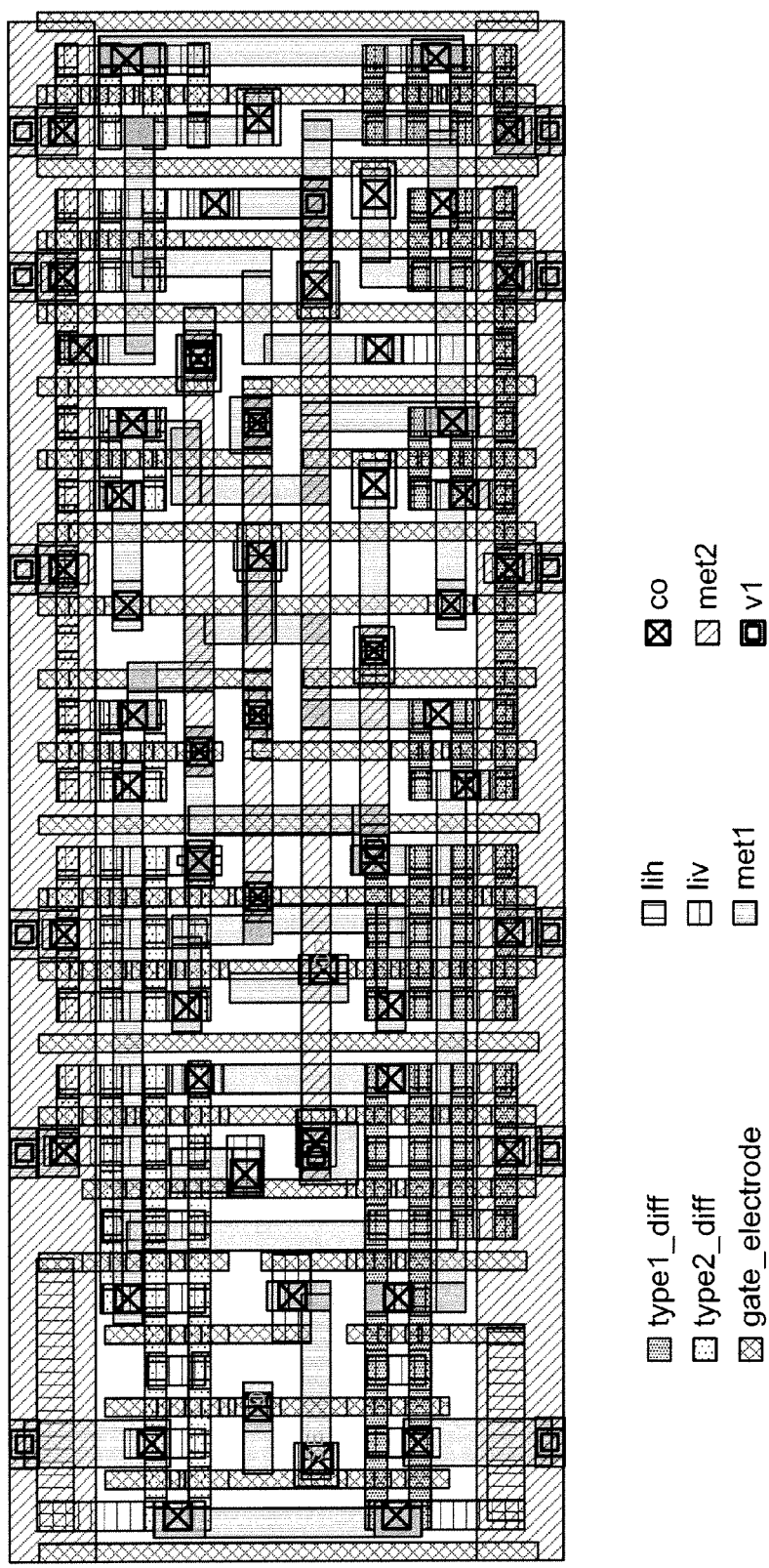
Figure 75B:
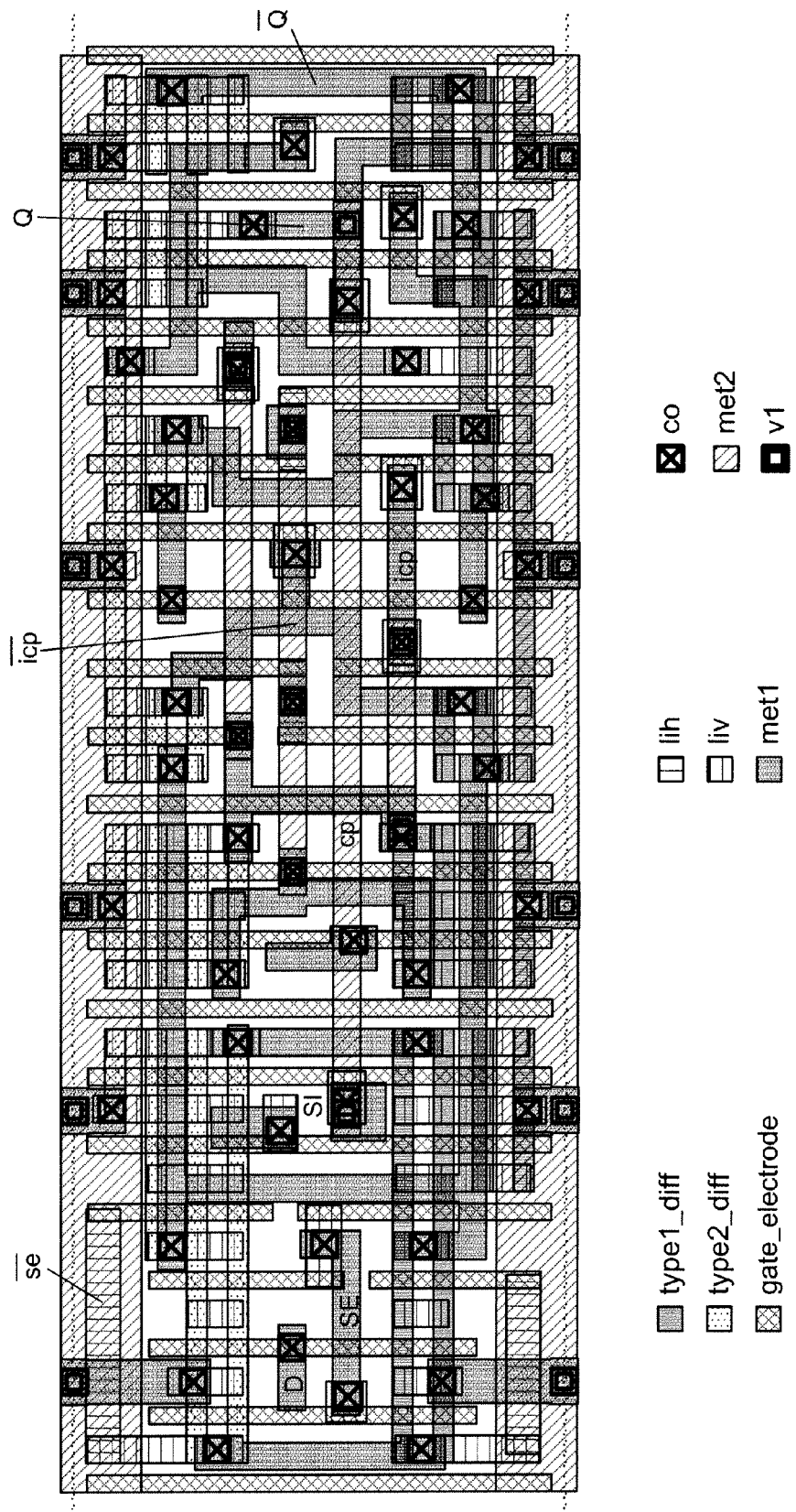

The example SDFF circuit layout of FIGS. 73A/B shows a version of the SDFF circuit that uses both the gate conductor and metal 2 layers for vertical (y-direction) wiring. The example SDFF circuit layout of FIGS. 74A/B shows a version of the SDFF circuit that uses horizontally oriented, i.e., in the x-direction, metal 2 structures for internal wiring. The example SDFF circuit layout of FIGS. 75A/B shows an alternate version of the SDFF circuit that again uses horizontally oriented, i.e., in the x-direction, metal 2 structures for internal wiring. The example SDFF circuit layout of FIGS. 76A/B shows a variation of the layout of FIG. 72A/B with horizontal local interconnect and vertical local interconnect used as separate conductors to allow for removal of the internal metal 2 conductors. The example SDFF circuit layout of FIGS. 77A/B shows a partial SDFF layout illustrating an alternate way to define circuit structures so as to minimize use of metal 2 and maximize transistor density.

It should be understood based on the circuit layouts and description provided herein that in some embodiments one or more of the following features can be utilized:
   a separation distance between co-aligned and adjacently positioned diffusion fin ends (i.e., diffusion fin cut distance) can be less than a size of the gate electrode pitch,
   a vertical local interconnect structure may overlap a diffusion fin (that is horizontally oriented) on one edge (horizontally oriented edge) of the diffusion fin; in this case, some cuts (in a cut mask) used to separate vertical local interconnect structures can be defined to touch or overlap a diffusion fin,
   a horizontal local interconnect structure may overlap a gate electrode structure (that is vertically oriented) on one edge (vertically oriented edge) of the gate electrode structure,
   a size of a gate end cap (i.e., a distance by which a gate electrode structure extends beyond an underlying diffusion fin) can be less than a size of one or more diffusion fin pitches, or less than a size of an average diffusion fin pitch,
   a separation distance between co-aligned and adjacently positioned gate electrode structure ends (i.e., gate electrode structure cut distance) can be less than or equal to a size of one or more diffusion fin pitches, or less than a size of an average diffusion fin pitch,
   a lengthwise centerline separation distance between adjacently positioned n-type and p-type diffusion fins (as measured in the direction perpendicular to the diffusion fins) can be defined as an integer multiple of one or more diffusion fin pitches, or as an integer multiple of an average diffusion fin pitch.

In an example embodiment, a semiconductor device includes a substrate, a first transistor, and a second transistor. The first transistor has a source region and a drain region within a first diffusion fin. The first diffusion fin is structured to project from a surface of the substrate. The first diffusion fin is structured to extend lengthwise in a first direction from a first end of the first diffusion fin to a second end of the first diffusion fin. The second transistor has a source region and a drain region within a second diffusion fin. The second diffusion fin is structured to project from the surface of the substrate. The second diffusion fin is structured to extend lengthwise in the first direction from a first end of the second diffusion fin to a second end of the second diffusion fin. The second diffusion fin is positioned next to and spaced apart from the first diffusion fin. Also, either the first end or the second end of the second diffusion fin is positioned in the first direction between the first end and the second end of the first diffusion fin.

The above-mentioned first and second transistors can be located at different positions in the second direction. Also, each of the first and second transistors can be a three-dimensionally gated transistor.

The above-mentioned first transistor includes a first linear-shaped gate electrode structure that extends lengthwise in a second direction perpendicular to the first direction as viewed from above the substrate. The above-mentioned second transistor includes a second linear-shaped gate electrode structure that extends lengthwise in the second direction perpendicular to the first direction as viewed from above the substrate. At least one of the first and second ends of the first diffusion fin can be positioned in the first direction between the first and second linear-shaped gate electrode structures. And, at least one of the first and second ends of the second diffusion fin can be positioned in the first direction between the first and second linear-shaped gate electrode structures. The first linear-shaped gate electrode structure is positioned next to and spaced apart from the second linear-shaped gate electrode structure.

The semiconductor device can also include a linear-shaped local interconnect structure that extends in the second direction and that is positioned between the first and second linear-shaped gate electrode structures. The linear-shaped local interconnect structure can be substantially centered in the first direction between the first and second linear-shaped gate electrode structures. The linear-shaped local interconnect structure can connect to one or more of the first and second diffusion fins.

The semiconductor device can also include a linear-shaped local interconnect structure that extends in the first direction and that is positioned between the first and second diffusion fins. This linear-shaped local interconnect structure can be substantially centered in the second direction between the first and second diffusion fins. Also, this linear-shaped local interconnect structure can connect to one or more of the first and second gate electrode structures.

The above-mentioned linear-shaped local interconnect structure that extends in the first direction can be referred to as a first linear-shaped local interconnect structure. The semiconductor device can also include a second linear-shaped local interconnect structure that extends in the second direction and that is positioned between the first and second linear-shaped gate electrode structures. The second linear-shaped local interconnect structure can be substantially centered in the first direction between the first and second linear-shaped gate electrode structures. Also, the second linear-shaped local interconnect structure can connect to one or more of the first diffusion fin, the second diffusion fin. Additionally, in some embodiments, the first linear-shaped local interconnect structure can be a first linear segment of a two-dimensionally varying non-linear local interconnect structure, and the second linear-shaped local interconnect structure can be a second linear segment of the two-dimensionally varying non-linear local interconnect structure. And, in some instances, the first and second linear-shaped local interconnect structures can be connected to each other.

The semiconductor device can also include a contact structure positioned between the first and second diffusion fins. In some embodiments, the contact structure can be substantially centered between the first and second diffusion fins. In some embodiments, the contact structure can connect to either the first gate electrode structure or the second gate electrode structure.

The semiconductor device can also include a contact structure positioned between the first and second gate electrode structures. In some embodiments, the contact structure can be substantially centered between the first and second gate electrode structures. Also, in some embodiments, the semiconductor device can include a conductive interconnect structure positioned in the second direction between first and second diffusion fins, where the contact structure connects to the conductive interconnect structure. In some embodiments, the conductive interconnect structure is a lowest level interconnect structure extending in the first direction that is not a diffusion fin.

The semiconductor device can also include a conductive interconnect structure positioned in the first direction between first and second diffusion fins, where the contact structure connects to a conductive interconnect structure. In some embodiments, the conductive interconnect structure is higher-level interconnect structure.

The semiconductor device can also include one or more interconnect structures, where some of the one or more interconnect structures include one or more interconnect segments that extend in the first direction. In some embodiments, some of the one or more interconnect segments that extend in the first direction are positioned between the first and second diffusion fins. Also, in some embodiments, some of the one or more interconnect segments that extend in the first direction are positioned over either the first diffusion fin or the second diffusion fin. In some embodiments, the one or more interconnect segments that extend in the first direction are positioned in accordance with a second direction interconnect pitch as measured in the second direction between respective first direction oriented centerlines of the one or more interconnect segments.

In some embodiments, the first and second diffusion fins can be positioned in accordance with a diffusion fin pitch as measured in the second direction between respective first direction oriented centerlines of the first and second diffusion fins, where the second direction interconnect pitch is a rational multiple of the diffusion fin pitch, with the rational multiple defined as a ratio of integer values.

In some embodiments, each of the first and second diffusion fins is centerline positioned in accordance with either a first diffusion fin pitch as measured in the second direction or a second diffusion fin pitch as measured in the second direction, where the first and second diffusion pitches successively alternate in the second direction, and where an average diffusion fin pitch is an average of the first and second diffusion fin pitches, and where the second direction interconnect pitch is a rational multiple of the average diffusion fin pitch, with the rational multiple defined as a ratio of integer values. In some embodiments, the first diffusion fin pitch is equal to the second diffusion fin pitch. In some embodiments, the first diffusion fin pitch is different than the second diffusion fin pitch.

The above-mentioned one or more interconnect structures can include either a local interconnect structure, a higher-level interconnect structure, or a combination thereof, where the local interconnect structure is a lowest level interconnect structure that is not a diffusion fin, and where the higher-level interconnect structure is an interconnect structure formed at a level above the local interconnect structure relative to the substrate.

In some embodiments, each of the first and second diffusion fins is centerline positioned in accordance with either a first diffusion fin pitch as measured in the second direction or a second diffusion fin pitch as measured in the second direction, where the first and second diffusion pitches successively alternate in the second direction, and where an average diffusion fin pitch is an average of the first and second diffusion fin pitches. Also, the one or more interconnect segments that extend in the first direction can be centerline positioned in accordance with either a first interconnect pitch as measured in the second direction or a second interconnect pitch as measured in the second direction, where the first and second interconnect pitches successively alternate in the second direction, and where an average interconnect pitch is an average of the first and second interconnect pitches. Also, the average interconnect pitch is a rational multiple of the average diffusion fin pitch, with the rational multiple defined as a ratio of integer values.

In some embodiments, the first diffusion fin pitch is equal to the second diffusion fin pitch, and the first interconnect pitch is equal to the second interconnect pitch. In some embodiments, the first diffusion fin pitch is different than the second diffusion fin pitch, and the first interconnect pitch is different than the second interconnect pitch. In some embodiments, the first diffusion fin pitch is equal to the first interconnect pitch, and the second diffusion fin pitch is equal to the second interconnect pitch.

The semiconductor device can also include one or more interconnect structures, where some of the one or more interconnect structures include one or more interconnect segments that extend in the second direction. In some embodiments, some of the one or more interconnect segments that extend in the second direction are positioned between the first and second gate electrode structures. In some embodiments, some of the one or more interconnect segments that extend in the second direction are positioned over either the first gate electrode structure or the second gate electrode structure.

In some embodiments, the one or more interconnect segments that extend in the second direction are positioned in accordance with a first direction interconnect pitch as measured in the first direction between respective second direction oriented centerlines of the one or more interconnect segments. Also, the first and second gate electrode structures can be positioned in accordance with a gate electrode pitch as measured in the first direction between respective second direction oriented centerlines of the first and second gate electrode structures. The first direction interconnect pitch can be a rational multiple of the gate electrode pitch, with the rational multiple defined as a ratio of integer values.

The above-mentioned one or more interconnect structures can include either a local interconnect structure, a higher-level interconnect structure, or a combination thereof, where the local interconnect structure is a lowest level interconnect structure that is not a diffusion fin, and where the higher-level interconnect structure is an interconnect structure formed at a level above the local interconnect structure relative to the substrate.

In some embodiments, the semiconductor device can also include a first plurality of transistors each having a respective source region and a respective drain region formed by a respective diffusion fin. Each diffusion fin of the first plurality of transistors is structured to project from the surface of the substrate. Each diffusion fin of the first plurality of transistors is structured to extend lengthwise in the first direction from a first end to a second end of the respective diffusion fin. The first ends of the diffusion fins of the first plurality of transistors are substantially aligned with each other in the first direction.

Also, the semiconductor device can include a second plurality of transistors each having a respective source region and a respective drain region formed by a respective diffusion fin. Each diffusion fin of the second plurality of transistors is structured to project from the surface of the substrate. Each diffusion fin of the second plurality of transistors is structured to extend lengthwise in the first direction from a first end to a second end of the respective diffusion fin. The first ends of the diffusion fins of the second plurality of transistors are substantially aligned with each other in the first direction. And, one or more of the first ends of the diffusion fins of the second plurality of transistors are positioned in the first direction between the first and second ends of one or more of the diffusion fins of the first plurality of transistors.

In some embodiments, each of the first ends of the diffusion fins of the second plurality of transistors is positioned in the first direction between the first and second ends of one or more of the diffusion fins of the first plurality of transistors. In some embodiments, at least one of the diffusion fins of the second plurality of transistors is positioned next to and spaced apart from at least one diffusion fin of the first plurality of transistors. Also, in some embodiments, the first plurality of transistors can include either n-type transistors, p-type transistors, or a combination of n-type and p-type transistors, and the second plurality of transistors can include either n-type transistors, p-type transistors, or a combination of n-type and p-type transistors. In some embodiments, the first plurality of transistors are n-type transistors and the second plurality of transistors are p-type transistors.

In some embodiments, the first and second pluralities of diffusion fins are positioned to have their respective first direction oriented centerlines substantially aligned to a diffusion fin alignment grating defined by a first diffusion fin pitch as measured in the second direction and a second diffusion fin pitch as measured in the second direction. The first and second diffusion fin pitches occur in an alternating sequence in the second direction. Also, in some embodiments, the diffusion fins of the first and second pluralities of transistors collectively occupy portions at least eight consecutive alignment positions of the diffusion fin alignment grating.

In an example embodiment, a method of fabricating a semiconductor device is disclosed. The method includes providing a substrate. The method also includes forming a first transistor on the substrate, such that the first transistor has a source region and a drain region within a first diffusion fin, and such that the first diffusion fin is formed to project from a surface of the substrate, and such that the first diffusion fin is formed to extend lengthwise in a first direction from a first end of the first diffusion fin to a second end of the first diffusion fin. The method also includes forming a second transistor on the substrate, such that the second transistor has a source region and a drain region within a second diffusion fin, and such that the second diffusion fin is formed to project from the surface of the substrate, and such that the second diffusion fin is formed to extend lengthwise in the first direction from a first end of the second diffusion fin to a second end of the second diffusion fin, and such that the second diffusion fin is foil led at a position next to and spaced apart from the first diffusion fin. Also, the first and second transistors are formed such that either the first end or the second end of the second diffusion fin is formed at a position in the first direction between the first end and the second end of the first diffusion fin.

It should be understood that any circuit layout incorporating finfet transistors as disclosed herein can be stored in a tangible form, such as in a digital format on a computer readable medium. For example, a given circuit layout can be stored in a layout data file, and can be selectable from one or more libraries of cells. The layout data file can be formatted as a GDS II (Graphic Data System) database file, an OASIS (Open Artwork System Interchange Standard) database file, or any other type of data file format suitable for storing and communicating semiconductor device layouts. Also, multi-level layouts of a cell incorporating finfet transistors as disclosed herein can be included within a multi-level layout of a larger semiconductor device. The multi-level layout of the larger semiconductor device can also be stored in the form of a layout data file, such as those identified above.

Also, the invention described herein can be embodied as computer readable code on a computer readable medium. For example, the computer readable code can include a layout data file within which a layout of a cell incorporating finfet transistors as disclosed herein is stored. The computer readable code can also include program instructions for selecting one or more layout libraries and/or cells that include finfet transistors as disclosed herein. The layout libraries and/or cells can also be stored in a digital format on a computer readable medium.

The computer readable medium mentioned herein is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. Multiple computer readable media distributed within a network of coupled computer systems can also be used to store respective portions of the computer readable code such that the computer readable code is stored and executed in a distributed fashion within the network.

In an example embodiment, a data storage device has computer executable program instructions stored thereon for rendering a layout of a semiconductor device. The data storage device includes computer program instructions for defining a first transistor to be formed on a substrate, such that the first transistor is defined to have a source region and a drain region within a first diffusion fin, and such that the first diffusion fin is defined to project from a surface of the substrate, and such that the first diffusion fin is defined to extend lengthwise in a first direction from a first end of the first diffusion fin to a second end of the first diffusion fin. The data storage device also includes computer program instructions for defining a second transistor to be formed on the substrate, such that the second transistor is defined to have a source region and a drain region within a second diffusion fin, and such that the second diffusion fin is defined to project from the surface of the substrate, and such that the second diffusion fin is defined to extend lengthwise in the first direction from a first end of the second diffusion fin to a second end of the second diffusion fin, and such that the second diffusion fin is defined to be positioned next to and spaced apart from the first diffusion fin, and such that the second diffusion fin is defined to have either its first end or its second end positioned in the first direction between the first end and the second end of the first diffusion fin.

It should be further understood that any circuit layout incorporating finfet transistors as disclosed herein can be manufactured as part of a semiconductor device or chip. In the fabrication of semiconductor devices such as integrated circuits, memory cells, and the like, a series of manufacturing operations are performed to define features on a semiconductor wafer. The wafer includes integrated circuit devices in the form of multi-level structures defined on a silicon substrate. At a substrate level, transistor devices with diffusion regions and/or diffusion fins are formed. In subsequent levels, interconnect metallization lines are patterned and electrically connected to the transistor devices to define a desired integrated circuit device. Also, patterned conductive layers are insulated from other conductive layers by dielectric materials.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A semiconductor device, comprising:
a substrate;
a first transistor having a source region and a drain region within a first diffusion fin, the first diffusion fin structured to project from a surface of the substrate, the first diffusion fin structured to extend lengthwise in a first direction from a first end of the first diffusion fin to a second end of the first diffusion fin;
a second transistor having a source region and a drain region within a second diffusion fin, the second diffusion fin structured to project from the surface of the substrate, the second diffusion fin structured to extend lengthwise in the first direction from a first end of the second diffusion fin to a second end of the second diffusion fin, the second diffusion fin positioned next to and spaced apart from the first diffusion fin,
wherein either the first end or the second end of the second diffusion fin is positioned in the first direction at a location between the first end and the second end of the first diffusion fin, the location offset in the first direction from the first end and the second end of the first diffusion fin.

2. A semiconductor device as recited in claim 1, wherein the first and second transistors are located at different positions in the second direction perpendicular to the first direction.

3. A semiconductor device as recited in claim 1, wherein each of the first and second transistors is a three-dimensionally gated transistor.

4. A semiconductor device as recited in claim 1, wherein the first transistor includes a first linear-shaped gate electrode structure that extends lengthwise in a second direction perpendicular to the first direction as viewed from above the substrate, and
wherein the second transistor includes a second linear-shaped gate electrode structure that extends lengthwise in the second direction perpendicular to the first direction as viewed from above the substrate,
wherein at least one of the first and second ends of the first diffusion fin is positioned in the first direction between the first and second linear-shaped gate electrode structures, and
wherein at least one of the first and second ends of the second diffusion fin is positioned in the first direction between the first and second linear-shaped gate electrode structures.

5. A semiconductor device as recited in claim 4, wherein the first linear-shaped gate electrode structure is positioned next to and spaced apart from the second linear-shaped gate electrode structure.

6. A semiconductor device as recited in claim 4, further comprising:
a linear-shaped local interconnect structure that extends in the second direction and that is positioned between the first and second linear-shaped gate electrode structures.

7. A semiconductor device as recited in claim 6, wherein the linear-shaped local interconnect structure is substantially centered in the first direction between the first and second linear-shaped gate electrode structures.

8. A semiconductor device as recited in claim 6, wherein the linear-shaped local interconnect structure connects to one or more of the first and second diffusion fins.

9. A semiconductor device as recited in claim 4, further comprising:
a linear-shaped local interconnect structure that extends in the first direction and that is positioned between the first and second diffusion fins.

10. A semiconductor device as recited in claim 9, wherein the linear-shaped local interconnect structure is substantially centered in the second direction between the first and second diffusion fins.

11. A semiconductor device as recited in claim 9, wherein the linear-shaped local interconnect structure connects to one or more of the first and second gate electrode structures.

12. A semiconductor device as recited in claim 9, wherein the linear-shaped local interconnect structure is a first linear-shaped local interconnect structure, the semiconductor device further including a second linear-shaped local interconnect structure that extends in the second direction and that is positioned between the first and second linear-shaped gate electrode structures.

13. A semiconductor device as recited in claim 12, wherein the second linear-shaped local interconnect structure is substantially centered in the first direction between the first and second linear-shaped gate electrode structures.

14. A semiconductor device as recited in claim 12, wherein the second linear-shaped local interconnect structure connects to one or more of the first diffusion fin, the second diffusion fin.

15. A semiconductor device as recited in claim 12, wherein the first linear-shaped local interconnect structure is a first linear segment of a two-dimensionally varying non-linear local interconnect structure, and wherein the second linear-shaped local interconnect structure is a second linear segment of the two-dimensionally varying non-linear local interconnect structure.

16. A semiconductor device as recited in claim 15, wherein the first and second linear-shaped local interconnect structures are connected to each other.

17. A semiconductor device as recited in claim 4, further comprising:
a contact structure positioned between the first and second diffusion fins.

18. A semiconductor device as recited in claim 17, wherein the contact structure is substantially centered between the first and second diffusion fins.

19. A semiconductor device as recited in claim 18, wherein the contact structure connects to either the first gate electrode structure or the second gate electrode structure.

20. A semiconductor device as recited in claim 4, further comprising:
a contact structure positioned between the first and second gate electrode structures.

21. A semiconductor device as recited in claim 20, wherein the contact structure is substantially centered between the first and second gate electrode structures.

22. A semiconductor device as recited in claim 20, further comprising:
a conductive interconnect structure positioned in the second direction between first and second diffusion fins, wherein the contact structure connects to the conductive interconnect structure.

23. A semiconductor device as recited in claim 22, wherein the conductive interconnect structure is a lowest level interconnect structure extending in the first direction that is not a diffusion fin.

24. A semiconductor device as recited in claim 22, wherein the conductive interconnect structure is higher-level interconnect structure.

25. A semiconductor device as recited in claim 20, further comprising:
a conductive interconnect structure positioned in the first direction between first and second diffusion fins, wherein the contact structure connects to a conductive interconnect structure.

26. A semiconductor device as recited in claim 4, further comprising:
one or more interconnect structures, wherein some of the one or more interconnect structures include one or more interconnect segments that extend in the first direction.

27. A semiconductor device as recited in claim 26, wherein some of the one or more interconnect segments that extend in the first direction are positioned between the first and second diffusion fins.

28. A semiconductor device as recited in claim 26, wherein some of the one or more interconnect segments that extend in the first direction are positioned over either the first diffusion fin or the second diffusion fin.

29. A semiconductor device as recited in claim 26, wherein the one or more interconnect segments that extend in the first direction are positioned in accordance with a second direction interconnect pitch as measured in the second direction between respective first direction oriented centerlines of the one or more interconnect segments.

30. A semiconductor device as recited in claim 29, wherein the first and second diffusion fins are positioned in accordance with a diffusion fin pitch as measured in the second direction between respective first direction oriented centerlines of the first and second diffusion fins, and
wherein the second direction interconnect pitch is a rational multiple of the diffusion fin pitch, the rational multiple defined as a ratio of integer values.

31. A semiconductor device as recited in claim 29, wherein each of the first and second diffusion fins is centerline positioned in accordance with either a first diffusion fin pitch as measured in the second direction or a second diffusion fin pitch as measured in the second direction, wherein the first and second diffusion pitches successively alternate in the second direction, and wherein an average diffusion fin pitch is an average of the first and second diffusion fin pitches, and
wherein the second direction interconnect pitch is a rational multiple of the average diffusion fin pitch, the rational multiple defined as a ratio of integer values.

32. A semiconductor device as recited in claim 31, wherein the first diffusion fin pitch is equal to the second diffusion fin pitch.

33. A semiconductor device as recited in claim 31, wherein the first diffusion fin pitch is different than the second diffusion fin pitch.

34. A semiconductor device as recited in claim 26, wherein the one or more interconnect structures include either a local interconnect structure, a higher-level interconnect structure formed at a level above a local interconnect structure relative to the substrate, or both a local interconnect structure and a higher-level interconnect structure formed at a level above the local interconnect structure relative to the substrate, wherein the local interconnect structure is a lowest level interconnect structure that is not a diffusion fin.

35. A semiconductor device as recited in claim 26, wherein each of the first and second diffusion fins is centerline positioned in accordance with either a first diffusion fin pitch as measured in the second direction or a second diffusion fin pitch as measured in the second direction, wherein the first and second diffusion pitches successively alternate in the second direction, and wherein an average diffusion fin pitch is an average of the first and second diffusion fin pitches, and
wherein the one or more interconnect segments that extend in the first direction are centerline positioned in accordance with either a first interconnect pitch as measured in the second direction or a second interconnect pitch as measured in the second direction, wherein the first and second interconnect pitches successively alternate in the second direction, and wherein an average interconnect pitch is an average of the first and second interconnect pitches, wherein the average interconnect pitch is a rational multiple of the average diffusion fin pitch, the rational multiple defined as a ratio of integer values.

36. A semiconductor device as recited in claim 35, wherein the first diffusion fin pitch is equal to the second diffusion fin pitch, and the first interconnect pitch is equal to the second interconnect pitch.

37. A semiconductor device as recited in claim 35, wherein the first diffusion fin pitch is different than the second diffusion fin pitch, and the first interconnect pitch is different than the second interconnect pitch.

38. A semiconductor device as recited in claim 35, wherein the first diffusion fin pitch is equal to the first interconnect pitch, and the second diffusion fin pitch is equal to the second interconnect pitch.

39. A semiconductor device as recited in claim 4, further comprising:

one or more interconnect structures, wherein some of the one or more interconnect structures include one or more interconnect segments that extend in the second direction.

40. A semiconductor device as recited in claim 39, wherein some of the one or more interconnect segments that extend in the second direction are positioned between the first and second gate electrode structures.

41. A semiconductor device as recited in claim 39, wherein some of the one or more interconnect segments that extend in the second direction are positioned over either the first gate electrode structure or the second gate electrode structure.

42. A semiconductor device as recited in claim 39, wherein the one or more interconnect segments that extend in the second direction are positioned in accordance with a first direction interconnect pitch as measured in the first direction between respective second direction oriented centerlines of the one or more interconnect segments.

43. A semiconductor device as recited in claim 42, wherein the first and second gate electrode structures are positioned in accordance with a gate electrode pitch as measured in the first direction between respective second direction oriented centerlines of the first and second gate electrode structures, and wherein the first direction interconnect pitch is a rational multiple of the gate electrode pitch, the rational multiple defined as a ratio of integer values.

44. A semiconductor device as recited in claim 39, wherein the one or more interconnect structures include either a local interconnect structure, a higher-level interconnect structure, or a combination thereof, wherein the local interconnect structure is a lowest level interconnect structure that is not a diffusion fin, and wherein the higher-level interconnect structure is an interconnect structure formed at a level above the local interconnect structure relative to the substrate.

45. A semiconductor device as recited in claim 1, further comprising:

a first plurality of transistors each having a respective source region and a respective drain region formed by a respective diffusion fin, each diffusion fin of the first plurality of transistors structured to project from the surface of the substrate, each diffusion fin of the first plurality of transistors structured to extend lengthwise in the first direction from a first end to a second end of the respective diffusion fin, wherein the first ends of the diffusion fins of the first plurality of transistors are substantially aligned with each other in the first direction, a second plurality of transistors each having a respective source region and a respective drain region formed by a respective diffusion fin, each diffusion fin of the second plurality of transistors structured to project from the surface of the substrate, each diffusion fin of the second plurality of transistors structured to extend lengthwise in the first direction from a first end to a second end of the respective diffusion fin, wherein the first ends of the diffusion fins of the second plurality of transistors are substantially aligned with each other in the first direction, and wherein one or more of the first ends of the diffusion fins of the second plurality of transistors are positioned in the first direction between the first and second ends of one or more of the diffusion fins of the first plurality of transistors.

46. A semiconductor device as recited in claim 45, wherein each of the first ends of the diffusion fins of the second plurality of transistors is positioned in the first direction between the first and second ends of one or more of the diffusion fins of the first plurality of transistors.

47. A semiconductor device as recited in claim 46, wherein at least one of the diffusion fins of the second plurality of transistors is positioned next to and spaced apart from at least one diffusion fin of the first plurality of transistors.

48. A semiconductor device as recited in claim 45, wherein the first plurality of transistors includes either n-type transistors, p-type transistors, or a combination of n-type and p-type transistors, and wherein the second plurality of transistors includes either n-type transistors, p-type transistors, or a combination of n-type and p-type transistors.

49. A semiconductor device as recited in claim 45, wherein the first plurality of transistors are n-type transistors and the second plurality of transistors are p-type transistors.

50. A semiconductor device as recited in claim 45, wherein the first and second pluralities of diffusion fins are positioned to have their respective first direction oriented centerlines substantially aligned to a diffusion fin alignment grating defined by a first diffusion fin pitch as measured in the second direction perpendicular to the first direction and a second diffusion fin pitch as measured in the second direction, where the first and second diffusion fin pitches occur in an alternating sequence in the second direction.

51. A semiconductor device as recited in claim 50, wherein the diffusion fins of the first and second pluralities of transistors collectively occupy portions at least eight consecutive alignment positions of the diffusion fin alignment grating.

52. A method of fabricating a semiconductor device, comprising:

providing a substrate;

forming a first transistor on the substrate, the first transistor having a source region and a drain region within a first diffusion fin, the first diffusion fin formed to project from a surface of the substrate, the first diffusion fin formed to extend lengthwise in a first direction from a first end of the first diffusion fin to a second end of the first diffusion fin;

forming a second transistor on the substrate, the second transistor having a source region and a drain region within a second diffusion fin, the second diffusion fin formed to project from the surface of the substrate, the second diffusion fin formed to extend lengthwise in the first direction from a first end of the second diffusion fin to a second end of the second diffusion fin, the second diffusion fin formed at a position next to and spaced apart from the first diffusion fin, wherein either the first end or the second end of the second diffusion fin is formed at a location in the first direction between the first end and the second end of the first diffusion fin, the location offset in the first direction from the first end and the second end of the first diffusion fin.

* * * * *